US005493671A

United States Patent [19]

Pitt et al.

[11] Patent Number: 5,493,671

[45] Date of Patent: Feb. 20, 1996

[54] METHOD AND APPARATUS FOR CONVERSION OF DATABASE DATA INTO A DIFFERENT FORMAT ON A FIELD BY FIELD BASIS USING A TABLE OF CONVERSION PROCEDURES

[75] Inventors: Janice S. Pitt, Bellingham; John Lawton, West Roxbury, both of Mass.

[73] Assignee: Marcam Corporation, Newton, Mass.

[21] Appl. No.: 70,982

[22] Filed: Jun. 4, 1993

[51] Int. Cl.[6] .......... G06F 17/30

[52] U.S. Cl. .......... 395/500; 395/600; 364/280.4; 364/283.4; 364/DIG. 1

[58] Field of Search .......... 395/500, 600, 395/650, 700

[56] References Cited

U.S. PATENT DOCUMENTS

| | | | |
|---|---|---|---|
| 4,559,614 | 12/1985 | Peek et al. | 395/500 |
| 5,058,000 | 10/1991 | Cox et al. | 395/600 |
| 5,146,593 | 9/1992 | Brandle et al. | 395/700 |
| 5,226,161 | 7/1993 | Khoyi et al. | 395/650 |
| 5,278,978 | 1/1994 | Demers et al. | 395/600 |

FOREIGN PATENT DOCUMENTS

| | | | |
|---|---|---|---|
| 0408132A1 | 1/1991 | European Pat. Off. | G06F 15/403 |
| 0449494A3 | 10/1991 | European Pat. Off. | G06F 15/40 |
| 5046449 | 2/1993 | Japan . | |

OTHER PUBLICATIONS

Chip Zeitschrift Fuer Mikrocomputer–Technik, No. 2 Sup, (Feb. 1989), Wurzburg De, pp. 250–254, D. Winkler, "Austausch mit Komfort".

*Primary Examiner*—Thomas G. Black
*Assistant Examiner*—John C. Loomis
*Attorney, Agent, or Firm*—Choate, Hall & Stewart

[57] ABSTRACT

A data conversion apparatus and method for translating information stored in a first relational database to that stored in a second relational database, and for translating information in a relational database used by a first selected version of a computer program into information stored in a second relational database for use by a second selected version of a computer program. The apparatus and method thus allow the sharing of data by computer systems running different versions of a given software package. The data conversion apparatus includes a first file storage element for storing a first relational database having a plurality of digital records representing information used by a first selected version of a computer program, and a second file storage element capable of storing a second relational database representing at least a portion of the information from the first database for use by a second selected version of the computer program. The apparatus further includes a file management element that converts information from the first database for storage in the second. That conversion is performed as a function of the identities of the first and second selected versions of the computer program. The file management element includes table entry elements that identify, in table-like form, the procedures for translating individual records or fields of information stored in the first relational database into a form compatible with the second software subroutines, each of which executes steps necessary for converting data between computer program version. Each file management table entry stores the names of the respective formats.

8 Claims, 4 Drawing Sheets

METHOD AND APPARATUS FOR CONVERSION OF DATABASE DATA INTO A DIFFERENT FORMAT ON A FIELD BY FIELD BASIS USING A TABLE OF CONVERSION PROCEDURES

AUTHORIZATION

A portion of the disclosure of this patent document contains material which is subject to copyright protection. The copyright owner has no objection to facsimile reproduction by anyone of the patent document or the patent disclosure, as it appears in the Patent and Trademark Office patent file or records, but otherwise reserves all copyright rights whatsoever.

BACKGROUND

This invention relates to the conversion of digital data transferred between relational databases and more particularly, for example, to the conversion of data transferred between computer systems running different versions of the same software.

A localized working environment with multiple computer systems typically runs a single version of any given software package, thereby making simple the transfer and sharing of data between the systems. Thus, for example, a company that uses computers to monitor and control manufacturing operations at a single site will generally run the very same computer-aided manufacturing software package on each of its computers. In the event data is transferred from one of those systems, it need not be converted for use on another system.

In a non-localized environment, however, sharing of data between multiple computer systems can be problematic. Companies having geographically diverse facilities may run different versions of a given software package at each site. For example, a multinational company may employ a first version of a software package in connection with its operations in France, while using a second version of that same package for its operations at a sister facility in Germany. While it may be desirable to transfer data between these facilities, differences in the structure of the underlying data files may make such a transfer difficult if not virtually impossible.

According to one prior art solution, data transferred between computer systems (e.g., between the French and German sites) would be printed at one site and manually re-entered at the other. This results in time delay, loss of man-hours and a corresponding loss in productivity. According to another such solution, a programmer would be employed to write a special-purpose computer to convert records used at one site to those used at the other site. The difficulties in finding a programmer with sufficient knowledge of the data structures and of the local system and software may itself prove to be a daunting task.

In view of the foregoing, an object of the invention is to provide improved methods and apparatus for sharing data and, more particularly, for sharing data used by different software versions of a given software package.

Another object of the invention is to provide improved methods and apparatus for converting data transferred between computer systems employing different software versions.

Still another object of the invention is to provide such improved methods and apparatus that are more cost effective, and that are compatible with preexisting computer hardware.

Yet another object is to provide a system for convening data transferred between relational databases.

Other general and more specific objects of this invention will in part be obvious and will in pan be evident from the description and drawings which follow.

SUMMARY OF THE INVENTION

The aforementioned and other objects are achieved by the invention which provides a data conversion apparatus and method for translating information stored in a first relational database to that stored in a second relational database and, more particularly, for translating information in a relational database used by a first selected version of a computer program into information stored in a second relational database for use by a second selected version of a computer program. The apparatus and method thus allow the sharing of data by computer systems running different versions of a given software package.

According to one aspect of the invention, a data conversion apparatus includes a first file storage element for storing a first relational database (i.e., a spreadsheet-like collection of information) having a plurality of digital records (each constituting, typically, a collection of fields of data relating to a single entity or transaction similar to a row in a spreadsheet) representing information used by a first selected version of a computer program, and a second file storage element capable of storing a second relational database representing at least a portion of the information from the first database for use by a second selected version of the computer program. The apparatus further includes a file management element that converts information from the first database for storage in the second. That conversion is performed as a function of the identities of the first and second selected versions of the computer program (e.g., as a function of their names and respective version numbers).

According to another aspect of the invention, the file management element includes table entry elements that identify, in table-like form, the procedures for translating individual records or fields of information stored in the first relational database into a form compatible with the second computer program version. For example, a record structure contained within the first relational database contains information used by a first version of a computer program, e.g., version 2.0. These version 2.0-compatible records are processed by the file management element for translation into record structures that are compatible with a second version of the computer program, e.g., version 3.0, and stored within the second relational database.

In a related aspect of the invention, each file management table entry stores the names of software subroutines, each of which executes steps necessary for converting data between the respective formats.

In other related aspects of the invention, an execution element accesses a given entry listed in a selected table entry element based on the respective identities of the versions (e.g., the version numbers) of the computer programs.

In yet another aspect of the invention, the first and second file storage elements (along with their respective databases) reside remotely from one another. The file management element includes a data transfer element and a disassembler element. The data transfer element converts records in the first database, prior to transfer to the remote database, into a standard transfer file format. The disassembler element disassembles the records, subsequent to transfer, component structures (e.g., fields) that are subsequently processed by the conversion subroutine.

Still other aspects of the invention provide a method for data transfer and conversion paralleling the operations described above.

These and other aspects of the invention will in part be obvious and evident from the detailed description and the drawings which follow.

BRIEF DESCRIPTION OF THE DRAWINGS

The foregoing and other aspects of the invention may be more fully understood from the following description, when read together with the accompanying drawings in which.

DETAILED DESCRIPTION OF THE ILLUSTRATED EMBODIMENT

Figure 1:
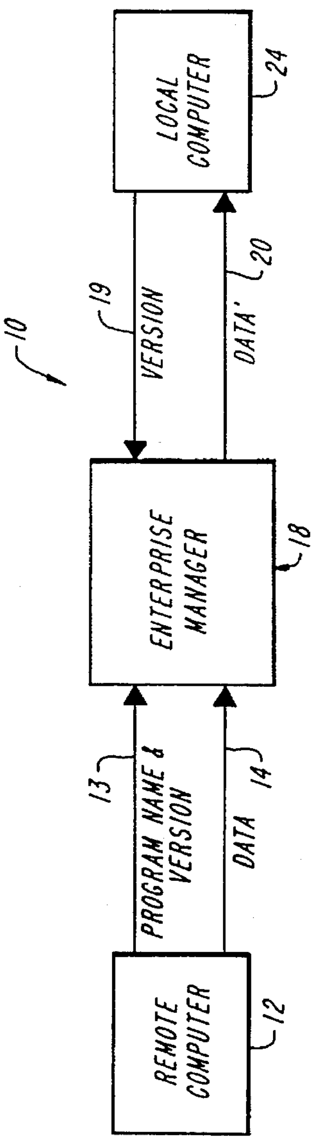
FIG. 1 illustrates data and control signal pathways utilized by a preferred data conversion apparatus of the present invention.

FIG. 1 illustrates data and control signal pathways utilized by a preferred data conversion apparatus of the present invention. The system 10 includes a remote computer 12, a file management element 18 (referred to as an "enterprise manager"), and a local computer 24, coupled as shown. Although the illustration shows two computer systems, those skilled in the art will appreciate that the teachings herein can be applied to the conversion of information transferred between more computer systems, as well as the conversion of information between differing versions of a selected program residing on a single computer system.

Referring to the drawing, the remote computer 12 communicates to the enterprise manager 18 a signal 13 representative of the name of a selected program for which data is to be converted and the version of that program used by the remote computer 12. The remote computer 12 also communicates to the enterprise manager 18 at least selected data 14 to be converted. The local computer 24 likewise communicates to the enterprise manager 18 a signal 19 representative of the identity of the version of the program being used by that computer 24.

The enterprise manager 18 responds to the information provided by signals 13 and 19 by converting the information represented by signal 14 into data having a format for use by the second version of the program on the remote computer. That converted data is communicated to the remote computer as data signal 20.

Computers 12 and 24 preferably comprise conventional general-purpose computers that are programmed, operated and adapted with an enterprise manager 18 in accord with the teachings below. Those skilled in the art will appreciate that, although the discussion of the illustrated embodiment herein is directed to the conversion of data transferred between two versions of a given program, those teachings are equally applicable to the conversion of data transferred between any relational databases, or the like, having known file structures.

Figure 2:
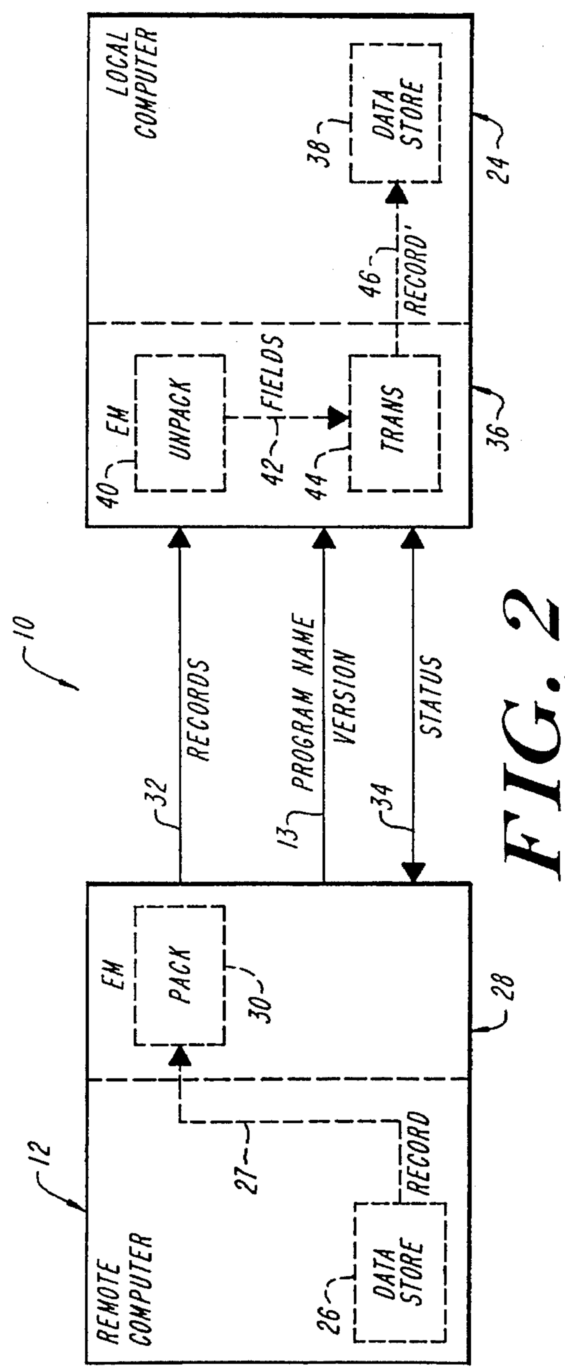
FIG. 2 is a schematic block diagram of a preferred data conversion apparatus according to the invention.

FIG. 2 depicts a schematic representation of the data conversion apparatus according to a preferred embodiment of the invention. The system 10 includes a remote computer 12 having a dedicated enterprise manager 28, and a local computer 24 having a dedicated enterprise manager 36, as shown. Remote computer 12 has a data storage unit 26 that includes a first relational database for storing data used and generated by the first version of the selected program. The first relational database is constructed in a manner conventional to the art (as adapted in connection with the teachings below) and comprises, e.g., a "flat" arrangement of data items having a spreadsheet-like format. For example, the arrangement can have a table-like configuration using record structures as the table rows.

Figure 4:
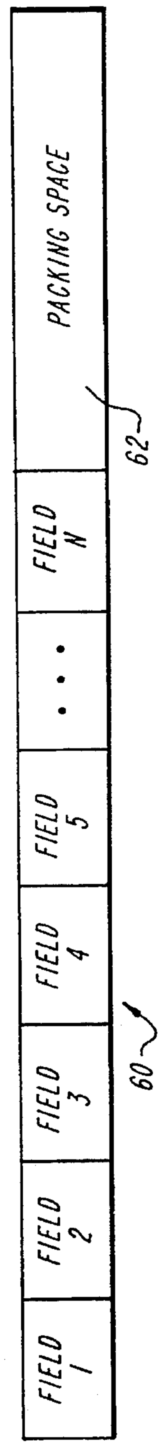
FIG. 4 depicts components of a record structure used in connection with a preferred data transfer process in an apparatus according to the invention.

Data records contained within the relational database are preferably transferred from the data store 26 to the dedicated enterprise manager 28 which prepares those records for transfer to the local computer system 24. For this purpose, the enterprise manager 28 includes a packing element 30 for converting each record 27 from data store 26 to a generic data transfer format. In a preferred embodiment, that conversion includes padding each record with zero's, blanks, or other filler data, thereby padding the record to a designated record length, e.g., 256 bytes. Such a packed record 60 is depicted in FIG. 4. The record 60 includes n fields, labeled FIELD 1, FIELD 2, . . . FIELD N, and further includes packing space 62. Those skilled in the art will of course appreciate that other conversions may include re-arrangement of fields within each data record, or collation of like data fields from all records.

Moreover, enterprise manager 28 transfers packed records 32, along with the signal 13 reflecting the name and version of the selected program, to the dedicated enterprise manager 36 of the local computer 24. That transfer is preferably performed electronically via network interconnect, bus or modem, but can also be accomplished via exchange of diskettes, tapes or other physical storage medium.

Illustrated local computer 24 includes a data storage unit 38, similar to the data storage unit 26 of the remote computer 12, for storing a second relational database containing a collection of data records in a format usable by that version of the selected program running in the second computer The local enterprise manager 36 receives signal 13 from remote enterprise manager 28 and uses the information presented to determine how to convert data in records 32 for storage in data store 38. As further shown in the illustration, a status signal 34 can be communicated between the remote manager 28 and the local manager 36 for purposes of exchanging information regarding the status of any given data transfer and conversion.

The local enterprise manager 36 includes a disassembler, or unpacker, element 40 for stripping from records 32 extraneous information (e.g., filler) to reduce those records to their fundamental components, or fields 42, as described above.

A conversion element or translator 44 translates each such field 42 into a format compatible with the version of the selected computer program resident on the local computer. The fields, once converted, are collated into records 46 and stored within the second relational database within data storage unit 38. The conversion of record 32 into a record 46 compatible with the second computer program version, can be more fully understood with reference to FIG. 3.

It will further be appreciated, that although FIG. 2 illustrates the local manager 36 as having the disassembler 40 and the translator 44, and the remote manager 28 as having the packer 30, each manager can include a packer 30, disassembler 40 and translator 44—thus, facilitating conversions in both directions.

Figure 3:
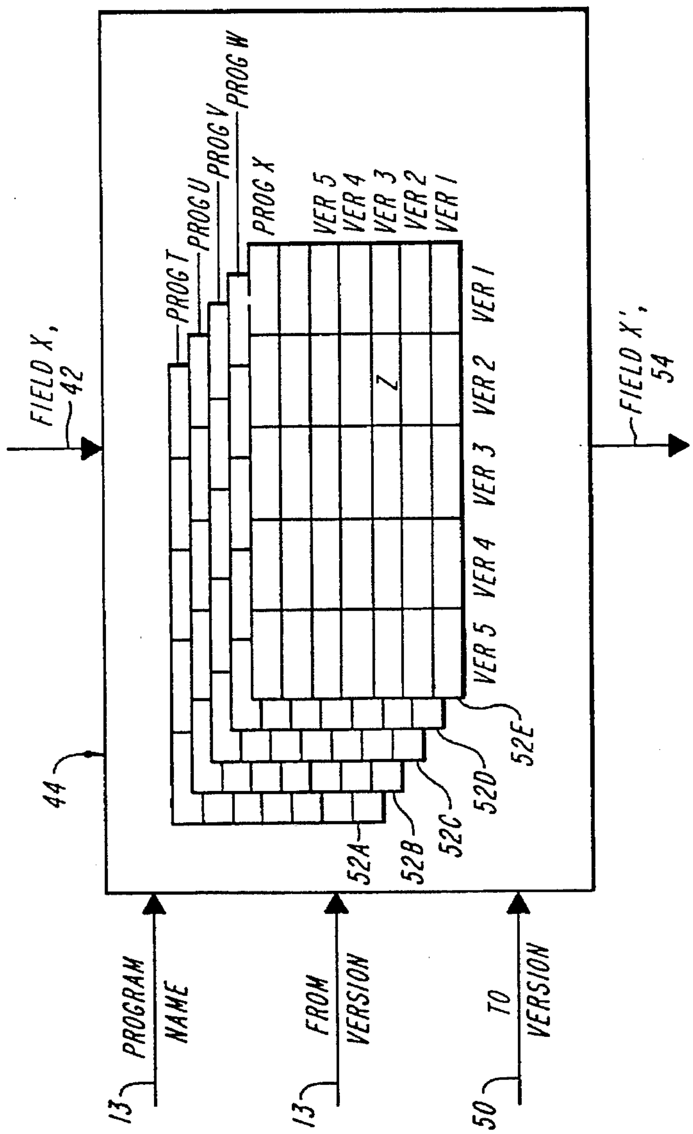
FIG. 3 depicts a still more detailed perspective of a preferred data translator of FIG. 2 according to a preferred embodiment of the invention.

FIG. 3 depicts the translator 44 of FIG. 2 according to a preferred embodiment of the invention. The translator 44 includes a collection of table elements 52A–52E. Each table corresponds to a selected program for which transferred data is to be converted and includes entries that are indexed by the FROM version signal 13 and the TO version signal 50. Each entry stores the name (or address) of a procedure-representative signal representative of a procedure that converts information stored within field 42 sent to and received by the disassembler 40 into information contained within field 54 that is compatible with the local version of the computer program. With respect to the example given above, where the FROM version signal 13 represents version 2.0 of a computer program and the TO version signal represents version 3.0, the location within a selected table element corresponds to table entry Z, as illustrated.

Referring to the drawing, entry Z preferably stores the name or address of a selected conversion subroutine for converting each field 42 into field 54. Execution of subroutines via identification of their respective software names or addresses is known in the art and need not be described here. Such a conversion subroutine may, for example, convert a French franc-based amount contained in a data field used by the first version of the program (on remote computer system 28) to a German deutschemark-based amount for use by the second version of the program (on the local computer system 24).

Figure 5:
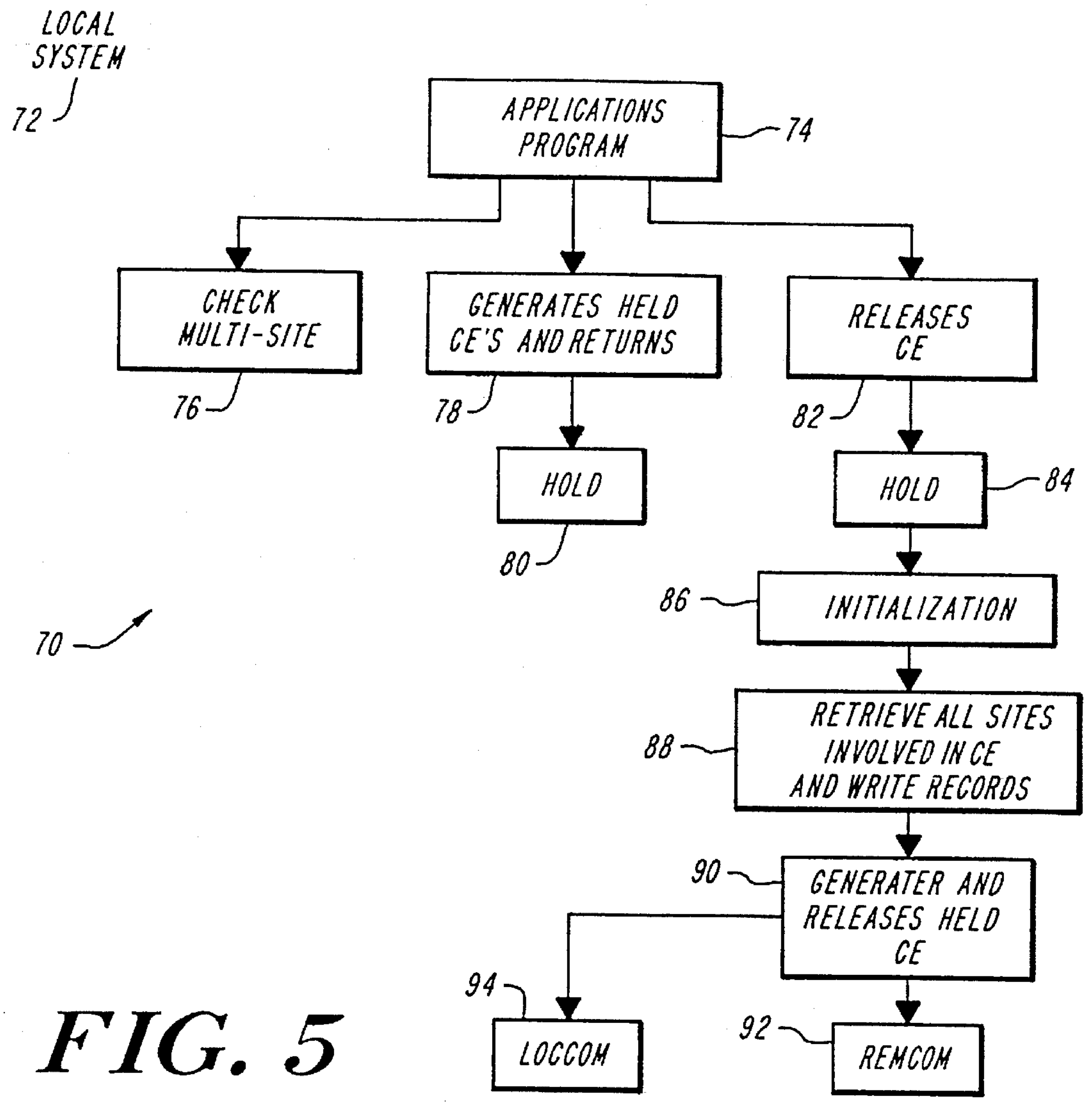
FIGS. 5 through 7 depict a flowchart of a preferred data conversion process according to the invention.
Figure 6:
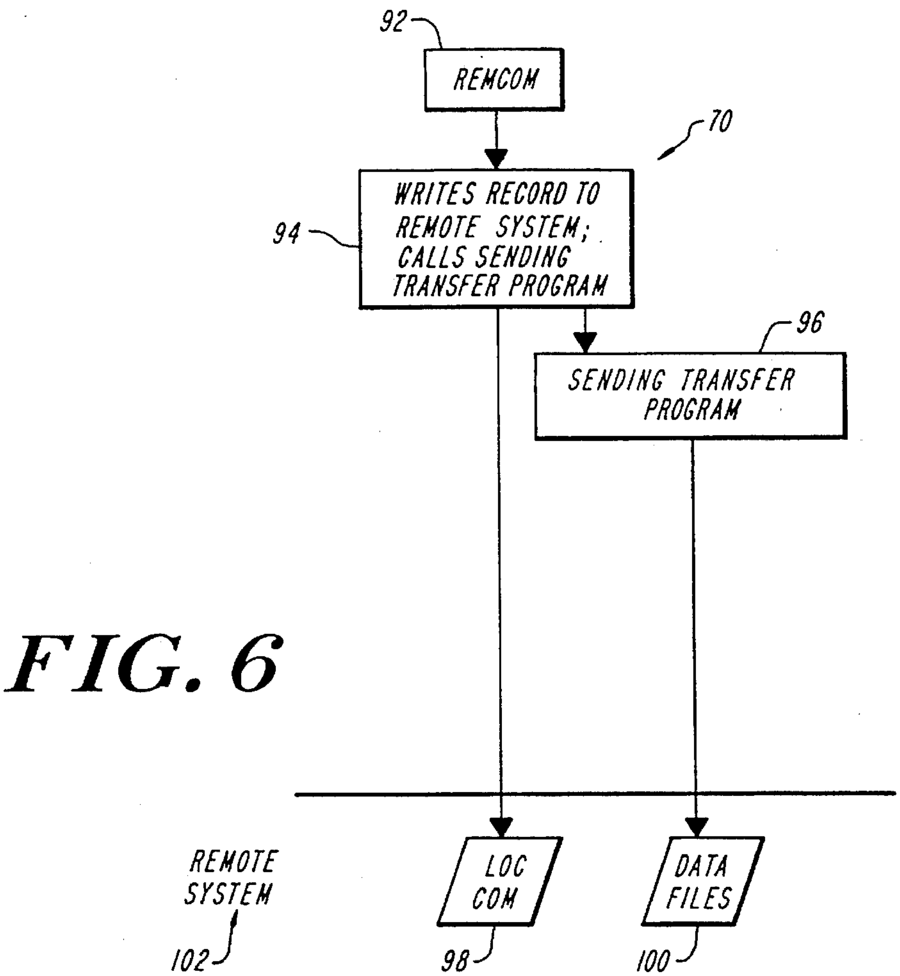
Figure 7:
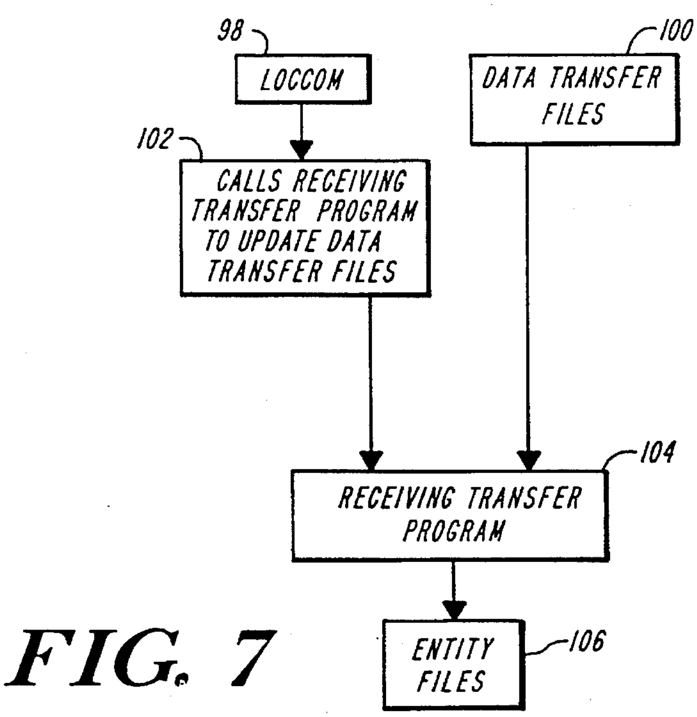

FIGS. 5, 6 and 7 are flowcharts showing the transfer of information between the local and remote computer systems (12, 24, FIG. 1), as well as the invocation of individual processor programs, by a preferred system for conversion of transferred data according to the invention.

Referring to FIG. 5, in step 74, applications program 72 executing on local system 72 performs several steps, including checking whether the application is "multi-site" 76, generating a communication entry (CE) signal 78, and releasing a held CE 82. In step 76, the local system processor invokes the application program 74 to determine whether the application needs to transfer data between "sites" (e.g., between local or remote databases). In one mode, if the application does not need to transfer data, the processor discontinues executing the applications program. However, if the processor determines that the application needs to transfer data, it generates a CE number (see step 78) and returns to the application program its identity. Step 80 stores the CE signal generated in step 78 pending identification of the associated data to be transferred. Once the processor identifies the data, the CE signal and the corresponding data are "tied" together, e.g., the application associates the generated CE number with the data.

With further reference to step 80, the local system 72 stores the generated CE signal in a general communications file (GENCOM). The general GENCOM file alerts the application that data is to be transferred from the local system 72 to another yet undesignated site. Thus, once the system identifies the specific site to which data is to be transferred, the system generates a specific CE corresponding to that site. For example, if the data transfer is to occur between remote databases, the system generates a remote communications CE (REMCOM) for that transfer. Conversely, if the data transfer is to occur between local databases, the system generates a local communications CE (LOCCOM). Although the illustrated flowcharts depict the transfer of data between a local and remote system, the illustrated steps are similarly applicable to the transfer of data between resident databases of a single system.

During the transfer of data to the remote system 102, the local system generates a REMCOM CE corresponding to the transfer of data to the remote site. The application attaches the CE to the data transferred between sites. However, the data transferred with the REMCOM CE is a copy of the data associated with the CE located in GENCOM, and not the original data associated with the GENCOM CE.

In step 82, the CE generated in step 78 is released via a call to GENCOM (see step 84). Then, in steps 86 and 88, the processing unit of the remote system processor calls a selected initialization program, which checks the various target systems located in the applications source history file to identify all the "sites" involved in the data transfer.

Further in accord with the above description, steps 86 through 90 create the CE's and mark or denote the data to be transferred with a corresponding transfer number, as described above. Step 88 then actuates step 90 by requesting step 90 to preferably write the CE's associated with the data to the local communications processor and from the remote communications processor. It will be appreciated that step 88 is program/FROM/TO signal specific, and that the step is synonymous with the data flow between the data storage unit 26 and the packer 30 of FIG. 2.

Once step 88 calls the data records, step 90 generates either a local or remote CE and stores the CE as "held" (see step 80) during the initial record call. The processor then creates a copy of the data and marks it with the appropriate CE number. Subsequently, the CE is released upon any subsequent call to the local processor. This sequence of steps ensures that the system locates and marks the appropriate data with the correct CE number, and that the data can be identified for transfer to the remote system.

Preferably, step 90 performs the foregoing call functions. First, the processor generates the remote CE and stores the CE as "held" (see step 80). Then, secondly, a subsequent call releases the held CE, signifying that the corresponding transfer data has been located and marked. In step 90, the system generates a LOCCOM or REMCOM record (see steps 92,94) depending upon whether data is being transferred between local databases or remote databases. Those of ordinary skill will also understand that since centralized distribution requires that the local processor generate only remote CE's, the source data files are at system-level and, thus, already exist locally.

FIG. 6 depicts a continuation of the flowchart of FIG. 5 detailing the processing steps performed on a REMCOM record. Steps 92–100 represent the transfer of data between the local and remote computers illustrated in FIGS. 1 and 2. Further, the steps preferably depend upon the program/FROM/TO signals 13,13,50. In step 94, the local system 72 processes the REMCOM record transferred from the data storage unit 26 to the packer 30, and writes a LOCCOM record to the remote system 102. The LOCCOM record sent by the local system 72 instructs the remote system to convert and upload the data. Additionally, step 94 invokes the sending transfer program 96 for transferring the LOCCOM record to a remote data transfer file 100, where it is preferably stored in separately allocated memory storage space.

The steps 102–106 of FIG. 7 illustrate the transfer and receipt of data by the remote system 102. The remote system 102, once the LOCCOM record is received, invokes the receiving transfer program 102 to update the data transfer files 100 into system or entity files 106. Those of ordinary skill will appreciate that this transfer corresponds to flow of data between the translator 44 and the data storage unit 38 of FIG. 2.

It will also be appreciated that although the present invention has been described with regard to the conversion of data transferred between two remote systems, the principles described herein are similarly applicable to the consolidation of data from multiple databases.

A still more complete understanding of the structure and operation of a preferred system according to the invention may be attained by reference to the software listings provided in the Appendices hereto. The software communication tools referred to in the listings can be any of several commercially available and commonly know such tools. Preferred such tools are designed by the assignee hereof. Those skilled in the art will appreciate that the listed programs are also used in conjunction with other software and hardware tools (e.g., operating systems and modems) commonly available and known to those of ordinary skill in the art.

The foregoing describes a preferred system for converting data for use by two or more versions of a computer program. Those skilled in the art will appreciate that the embodiment described above is by way of example only, and that other embodiments incorporating modifications thereto fall within the scope of the invention. Thus, as noted above, whereas the illustrated embodiment herein is directed to the conversion of data transferred between two versions of a given program, those teachings are equally applicable to the conversion of data transferred between any relational databases, or the like.

APPENDIX A

TO

UNITED STATES PATENT APPLICATION

FOR

IMPROVED METHOD AND APPARATUS FOR CONVERSION OF TRANSFERRED DIGITAL DATA by

Janice S. Pitt
John Lawton

---

The following constitute computer software listings comprising the design and code of a preferred system for conversion of transferred data according to the invention. These listing are © Marcam Corporation

```
;hi;        ** Trade Secret Information of Marcam **        05/28/93 **
;hx;;ql;

;id; This published, copyrighted work contains trade secret information
of Marcam corporation.  Use, transfer, disclosure, or copying without
its expressed written permission is strictly forbidden. ;ql;

$$APPDF$

;b;  $APPDF  Application Definition File Access Std Subroutine  ;ql;;r;

;id; 1. The Application Definition File Access Standard Subroutine
is used to find a record from the Application Definition file, APPDEF,
with the program name, from rel-mod level, and to rel-mod level passed
into this subroutine. If a record is found, the APPDEF record will be
retrieved and $$FAIL will be set to '0'. Otherwise, $$FAIL will be set
to '1'.  ;ql;

;id; This subroutine must be passed the program name, from rel-mod
level, and to rel-mod level. The source for this subroutine should
reside in MMDDSSRC, and should be put into the source of those programs
executing it via the /COPY function.  ;ql;

;id; The following is a list of those fields passed to and returned by
this subroutine: ;ql;

;id;        KPGM      8A      Application Program name (passed)   ;ql;
;id;        KFREL     5A      From rel-mod level (passed)         ;ql;
;id;        KTREL     5A      To rel-mod level (passed)           ;ql;
;id;        $$FAIL    1A      Error code (returned)               ;ql;

;id; 1. First, set the error code field ($$FAIL) to '0'.  It will be
loaded with '1' later by this subroutine if it fails to retrieve an
APPDEF record. ;ql;

;id; 2. Attempt to retrieve the APPDEF record for the passed key values
(KPGM/KFREL/KTREL). If such an APPDEF record does not exist, proceed to
step 3. ;ql;

;id; 3. Change the to rel-mod level to a multiple of 10 and check for
an APPDEF record with the original program name, the original from
rel-mod level, and this new to rel-mod level. If such an APPDEF record
still does not exist, proceed to step 4.  ;ql;

;id; 4. Try to find a record with the original program name and from
rel-mod level, but with a lower to rel-mod level. Keep reducing the to
rel-mod level by steps of 10 (mod levels) until the to rel-mod level
becomes ' - ' or until an APPDEF record is found. If an APPDEF record
still doesn't exist, proceed to step 5. ;ql;
```

;id; 5. Change the from rel-mod level to a multiple of 10 and check for an APPDEF record with the original program name, the original to rel-mod level, and this new from rel-mod level. If such an APPDEF record still does not exist, proceed to step 6. ;ql;

;id; 6. Try to find a record with the original program name and to rel-mod level, but with a lower from rel-mod level. Keep reducing the from rel-mod level by steps of 10 (mod levels) until the from rel-mod level becomes ' - ' or until an APPDEF record is found. If an APPDEF record still doesn't exist, proceed to step 7. ;ql;

;id; 7. If an APPDEF record still cannot be found, retrieve the APPDEF record with the original program name, but use the COMDEF default from rel-mod and to rel-mod levels. If such an APPDEF record still doesn't exist, set $$FAIL to '1' to indicate that this subroutine has failed to retrieve an APPDEF record for the given program name, from rel-mod level, and to rel-mod level. ;ql;

| | | | | |
|---|---|---|---|---|
| ;hi;B. File | Usage | | | ;ql; |
| ;id; | APPDEF | IF | Application Definition File | ;ql; |
| ;id; | COMDEF | IF | Communications Definitions File | ;ql; |

;ql;;hx;

$END$

```
5738PW1 V2R2M0  920615              SEU SOURCE LISTING                 05/28/93 14:07:17               PAGE    1

SOURCE FILE . . . . . . .   XLIB310/MMDDSSRC
MEMBER  . . . . . . . . .   $APPDF

SEQNBR*...+... 1 ...+... 2 ...+... 3 ...+... 4 ...+... 5 ...+... 6 ...+... 7 ...+... 8 ...+... 9 ...+... 0
  100      C*********  $APPDF SUBR  **********************  $APPDF SUBR  *                                08/07/91
  200      C*                                                             *                                08/07/91
  300      C*  The purpose of the $APPDF subroutine is to find the        *                                08/09/91
  400      C*  Application Definition File record.                        *                                08/09/91
  500      C*                                                             *                                08/09/91
  600      C*   1. The subroutine is passed the program name and the from *                                01/27/92
  700      C*        rel-mod level and the to rel-mod level.  These values *                               01/27/92
  800      C*        are used to access the APPDEF file.                  *                                01/27/92
  900      C*   2. Check for the original from/to rel-mod level           *                                01/27/92
 1000      C*   3. If the to mod level is not a multiple of 10, make it so *                               02/27/92
 1001      C*      Chain with the new to mod level                        *                                03/11/92
 1100      C*   4. If it does not exist, try to match the from rel-mod level                               02/27/92
 1200      C*      and a to rel-mod less than the original to a record    *                                01/27/92
 1300      C*   5. If the from mod lvl is not a multiple of 10, make it so *                               02/27/92
 1301      C*      Chain with the new from mod level                      *                                03/11/92
 1400      C*   6. If it does not exist, try to match the to rel-mod level *                               02/27/92
 1500      C*      and a from rel-mod less than the original.             *                                01/27/92
 1600      C*      (the to rel-mod must be returned to its original value) *                               01/27/92
 1700      C*   7. If still no record, check the COMDEF default from and  *                                02/27/92
 1800      C*      to rel mod level field.                                *                                01/27/92
 1900      C*   8. If no APPDEF record can be found at all return         *                                02/27/92
 2000      C*      an indicator ($$FAIL = 1) to the calling subroutine.   *                                01/27/92
 2100      C*                                                             *                                01/27/92
 2200      C**************************************************************                                 08/09/91
 2300      C*                                                             *                                08/09/91
 2400      C*                                                             *                                08/09/91
 2500      C*  Input fields:                                              *                                08/09/91
 2600      C*                KPGM   -  Application Program Name           *                                08/09/91
 2700      C*                KFREL  -  From release-modification level    *                                08/09/91
 2800      C*                KTREL     To release-modification level      *                                08/09/91
 2900      C*                                                             *                                08/09/91
 3000      C*                                                             *                                08/09/91
 3100      C*  Output fields:                                             *                                08/09/91
 3200      C*                $$FAIL  -  Indicator if failed               *                                08/09/91
 3300      C*                  '0' - No error                             *                                08/09/91
 3400      C*                  '1' - Application def record not found     *                                08/09/91
 3500      C*                                                             *                                08/09/91
 3600      C*                                                             *                                08/09/91
 3700      C*  The following files have to be defined in the calling     *                                08/09/91
 3800      C*  program:                                                   *                                08/09/91
 3900      C*                APPDEF     Application Definition File       *                                08/09/91
 4000      C*                COMDEF     Communication Definition File     *                                01/27/92
 4100      C*                                                             *                                08/09/91
 4200      C*  COMDEF has to have been accessed in $INZSR or $BEGSR       *                                01/27/92
 4300      C*                                                             *                                01/27/92
 4400      C*  The following data structure must be defined              *                                01/27/92
 4500      C* IQQRM        DS                                             *                                01/27/92
 4600      C* I                                          1    20QQREL     *                                01/27/92
 4700      C* I                                          4    50QQMOD     *                                01/27/92
 4800      C*                                                             *                                01/27/92
 4900      C*                                                             *                                08/09/91
 5000      C*  Prior definitions required by this subroutine:            *                                08/09/91
 5100      C*                                                             *                                08/09/91
```

```
 5738PW1 V2R2M0  920615              SEU SOURCE LISTING                    05/28/93 14:07:17          PAGE    2

SOURCE FILE . . . . . . .  XLIB310/MMDDSSRC
MEMBER  . . . . . . . . .  $APPDF

SEQNBR*...+... 1 ...+... 2 ...+... 3 ...+... 4 ...+... 5 ...+... 6 ...+... 7 ...+... 8 ...+... 9 ...+... 0
  5200      C*          *LIKE     DEFN FDPGM     KPGM                           *                                 01/27/92
  5300      C*          *LIKE     DEFN FDFREL    KFREL                          *                                 01/27/92
  5400      C*          *LIKE     DEFN FDTREL    KTREL                          *                                 01/27/92
  5500      C*                                                                  *                                 01/27/92
  5600      C*          KAPPDE    KLIST                                         *                                 08/09/91
  5700      C*                    KFLD           KPGM                           *                                 08/09/91
  5800      C*                    KFLD           KFREL                          *                                 08/09/91
  5900      C*                    KFLD           KTREL                          *                                 08/09/91
  6000      C*                                                                  *                                 08/09/91
  6100      C*                                                                  *                                 08/09/91
  6200      C*                                                                  *                                 08/09/91
  6300      C*****************************************************************                                   08/09/91
  6400      C*                                                                  *                                 08/09/91
  6500      C*   INDICATORS USED  :  98                                         *                                 08/09/91
  6600      C*                                                                  *                                 08/09/91
  6700      C*   EXECUTES         :  NONE                                       *                                 01/27/92
  6800      C*                                                                  *                                 08/09/91
  6900      C*****************************************************************                                   08/09/91
  7000      C*                                                                            SRCE3                   02/27/92
  7100      C           $APPDF    BEGSR                                                                           08/07/91
  7200      C*                                                                                                    02/20/92
  7300      C           *LIKE     DEFN *IN98     $$SAVE                                                           02/20/92
  7400      C                     MOVE *IN98     $$SAVE                                                           02/20/92
  7500      C*                                                                                                    02/20/92
  7600      C           *LIKE     DEFN QQMOD     $$DIV                                                            02/20/92
  7700      C           *LIKE     DEFN QQMOD     $$REM                                                            02/20/92
  7800      C*                                                                                                    08/07/91
  7900      C*   1. Save the to rel-mod level as it will be changed first                                         08/07/91
  8000      C*      and must be returned to its original value                                                    08/07/91
  8100      C*                                                                                                    08/07/91
  8200      C           *LIKE     DEFN FDTREL    $$TREL                                                           08/07/91
  8300      C                     MOVE KTREL     $$TREL                                                           08/07/91
  8400      C*                                                                                                    08/07/91
  8500      C*   2. Define the indicator that will return a failure to                                            08/07/91
  8600      C*      the calling program                                                                           08/07/91
  8700      C*                                                                                                    08/07/91
  8800      C                     MOVE '0'       $$FAIL  1                                                        08/07/91
  8900      C*                                                                                                    08/07/91
  9000      C*   3. Check for the original from/to rel-mod level                                                  01/27/92
  9100      C*                                                                                                    08/07/91
  9200      C           KAPPDE    CHAINAPPDEF               98                                                    08/07/91
  9300      C*                                                                                                    02/20/92
  9400      C*   4. If original not found, change the to mod level to                                             03/02/92
  9500      C*      a multiple of 10 and check for the new from rel-mod level                                     03/11/92
  9501      C*      and original to rel-mod level                                                                 03/11/92
  9600      C*                                                                                                    02/20/92
  9700      C           *IN98     IFEQ *ON                                                                        02/27/92
  9800      C           KTREL     ANDNE' - '                                                                      02/27/92
  9900      C           KTREL     ANDNE*BLANKS                                                                    02/27/92
 10000      C                     MOVE KTREL     QQRM                                                             02/20/92
 10100      C           QQMOD     DIV  10        $$DIV                                                            02/20/92
 10200      C                     MVR            $$REM                                                            02/20/92
 10300      C           $$REM     IFGT 0                                                                          02/20/92
```

```
5738PW1 V2R2M0  920615              SEU SOURCE LISTING                     05/28/93 14:07:17              PAGE    3

SOURCE FILE . . . . . . .   XLIB310/MMDDSSRC
MEMBER  . . . . . . . . .   $APPDF

SEQNBR*...+... 1 ...+... 2 ...+... 3 ...+... 4 ...+... 5 ...+... 6 ...+... 7 ...+... 8 ...+... 9 ...+... 0
10400      C                     SUB  $$REM     QQMOD                                                      02/20/92
10500      C                     MOVE QQRM      KTREL                                                      02/20/92
10600      C                     MOVE KTREL     $$TREL                                                     02/27/92
10601      C          KAPPDE     CHAINAPPDEF              98                                               03/11/92
10700      C                     ENDIF                               $$REM>0                               02/20/92
10800      C                     ENDIF                               *IN98=*ON                             02/20/92
10900      C*                                                                                              08/07/91
11000      C*  5. Then, try to match the from rel-mod level and a to                                       03/02/92
11100      C*     rel-mod less than the original to a record                                               03/02/92
11200      C*                                                                                              08/07/91
11300      C          *IN98      DOWEQ*ON                                                                  02/06/92
11400      C          KTREL      ANDNE'  -  '                                                              08/07/91
11500      C          KTREL      ANDNE*BLANKS                                                              02/27/92
11600      C*                                                                                              08/07/91
11700      C                     MOVE KTREL     QQRM                                                       08/07/91
11800      C          QQMOD      IFNE 0                                                                    02/20/92
11900      C                     SUB  10        QQMOD                                                      02/20/92
12000      C                     ELSE                                                                      08/07/91
12100      C          QQREL      IFNE 0                                                                    08/07/91
12200      C                     Z-ADD90        QQMOD                                                      08/07/91
12300      C                     SUB  1         QQREL                                                      08/07/91
12400      C                     ELSE                                                                      08/07/91
12500      C                     MOVE '  -  '   QQRM                                                       08/07/91
12600      C                     ENDIF                               QQREL<>0                              02/06/92
12700      C                     ENDIF                               QQMOD<>0                              02/06/92
12800      C                     MOVE QQRM      KTREL                                                      08/07/91
12900      C          KAPPDE     CHAINAPPDEF              98                                               02/20/92
13000      C*                                                                                              08/07/91
13100      C                     ENDDO                               DOW *IN98=*ON                         02/06/92
13101      C*                                                                                              03/11/92
13102      C*  6. Return the to rel-mod level to its original value or                                     03/11/92
13104      C*       original value adjusted to be a multiple of 10                                         03/11/92
13105      C*                                                                                              03/11/92
13106      C                     MOVE $$TREL    KTREL                                                      03/11/92
13200      C*                                                                                              02/20/92
13300      C*  7. If no match found for from rel-mod, change the                                           03/11/92
13400      C*     from mod level to a multiple of 10 and check for the                                     03/11/92
13401      C*     original to rel-mod level and new from rel-mod level                                     03/11/92
13500      C*                                                                                              02/20/92
13600      C          *IN98      IFEQ *ON                                                                  02/27/92
13700      C          KFREL      ANDNE'  -  '                                                              02/27/92
13800      C          KFREL      ANDNE*BLANKS                                                              02/27/92
13900      C                     MOVE KFREL     QQRM                                                       02/20/92
14000      C          QQMOD      DIV  10        $$DIV                                                      02/20/92
14100      C                     MVR            $$REM                                                      02/20/92
14200      C          $$REM      IFGT 0                                                                    02/20/92
14300      C                     SUB  $$REM     QQMOD                                                      02/20/92
14400      C                     MOVE QQRM      KFREL                                                      02/20/92
14401      C          KAPPDE     CHAINAPPDEF              98                                               03/11/92
14500      C                     ENDIF                               $$REM>0                               02/20/92
14600      C                     ENDIF                               *IN98=*ON                             02/20/92
14700      C*                                                                                              08/07/91
14800      C*  8. Then, try to match the to rel-mod level and a from                                       03/11/92
```

```
5738PW1 V2R2M0  920615              SEU SOURCE LISTING                 05/28/93 14:07:17          PAGE    4

SOURCE FILE . . . . . . .  XLIB310/MMDDSSRC
MEMBER  . . . . . . . . .  $APPDF

SEQNBR*...+... 1 ...+... 2 ...+... 3 ...+... 4 ...+... 5 ...+... 6 ...+... 7 ...+... 8 ...+... 9 ...+... 0
14900    C*     from rel-mod less than the original.                                       03/02/92
15400    C*                                                                                08/07/91
15500    C           *IN98     DOWEQ*ON                                                    02/06/92
15600    C           KFREL     ANDNE'  -  '                                                08/07/91
15700    C           KFREL     ANDNE*BLANKS                                                02/27/92
15800    C*                                                                                08/07/91
15900    C                     MOVE KFREL     QQRM                                         08/07/91
16000    C           QQMOD     IFNE 0                                                      02/20/92
16100    C                     SUB  10        QQMOD                                        02/20/92
16200    C                     ELSE                                                        08/07/91
16300    C           QQREL     IFNE 0                                                      08/07/91
16400    C                     Z-ADD99        QQMOD                                        08/07/91
16500    C                     SUB  1         QQREL                                        08/07/91
16600    C                     ELSE                                                        08/07/91
16700    C                     MOVE '  -  '   QQRM                                         08/07/91
16800    C                     ENDIF                             QQREL<>0                  02/06/92
16900    C                     ENDIF                             QQMOD<>0                  02/06/92
17000    C                     MOVE QQRM      KFREL                                        08/07/91
17100    C           KAPPDE    CHAINAPPDEF              98                                 02/20/92
17200    C*                                                                                08/07/91
17300    C                     ENDDO                             DOW *IN98=*ON             02/06/92
17400    C*                                                                                08/07/91
17500    C*   9. If still no record, check the COMDEF default from and   *                 03/11/92
17600    C*      to rel-mod level field.                                  *                01/27/92
17700    C*                                                                                08/07/91
17800    C           *IN98     IFEQ *ON                                                    02/06/92
17900    C                     MOVE CQDFFR    KFREL                                        01/27/92
18000    C                     MOVE CQDFTR    KTREL                                        01/27/92
18100    C           KAPPDR    CHAINAPPDEF              98                                 08/07/91
18200    C                     ENDIF                             *IN98=*ON                 02/06/92
18300    C*                                                                                08/07/91
18400    C*  10. If no APPDEF record can be found at all return                            03/11/92
18500    C*      an indicator ($$FAIL = 1) to the calling subroutine.                      08/07/91
18600    C*                                                                                08/07/91
18700    C           *IN98     IFEQ *ON                                                    02/06/92
18800    C                     MOVE '1'       $$FAIL                                       08/07/91
18900    C                     ENDIF                             *IN98=*ON                 02/06/92
19000    C*                                                                                02/20/92
19100    C                     MOVE $$SAVE    *IN98                                        02/20/92
19200    C*                                                                                08/07/91
19300    C                     ENDSR                                        SRCE3          08/07/91
19400    C*                                                                                01/27/92
19500    C***************************************************************                  01/27/92
19600    C*                                                             *                  01/27/92
19700    C*    END OF                                                   *                  01/27/92
19800    C*    Unit of $APPDF subroutine source member                  *                  01/28/92
19900    C*                                                             *                  01/27/92
20000    C***************************************************************                  01/27/92
20100    C*                                                             *                  01/27/92

                          * * * *  E N D  O F  S O U R C E  * * * *
```

$MMC000$

;b; MMC000 General Communications Processor Program ;ql;;r;

;hi;A. The General Communications Processor is a background function driven off of GENCOMDT, the permanent logical file over the General Communications Entry File (GENCOM). GENCOMDT provides a key change to date/time last maintenance and also selects only those records of status equal to '10' (immediate processing). Records may have been written to GENCOM by MMC080, the Communications Initiator Program, or by an external user program. Regardless of the source, this program processes the GENCOMDT record to initiate the communication. This program then calls the Initialization Program defined for the particular application, which writes record(s) to LOCCOM (Local Communications Entry File) and/or REMCOM (Remote Communications Entry File) for the specific communications entries corresponding to each GENCOM record. ;ql;;hx;

;id; 1. Process a loop to retrieve records from GENCOMDT. This is accomplished by reading through GENCOMDT. For each record retrieved, continue processing in step 2. End the program as described in step 2D(iii) when a shut down request is detected, for example, when the system shuts down or when the job is ended by using a controlled end job (ENDJOB) command. ;ql;

&int&

Design Note: Since the CL program has overridden GENCOM, specifying an end-of-file delay, there is no additional coding necessary within the RPG program to enable the background function.

Design Note: There is no guarantee that the program can detect a shut down request before the job is ended due to the end of file delay. As a result, the EMBKGD record may or may not get deleted, depending on whether the job is ended normally or abnormally. In any cases, the EMBKGD record will be deleted eventually either by this program or by MMM140.

Programmer Note: We were unable to use an open query file on a file overridden with the end-of-file delay parameter specified. The problem is that the OVRDBF (override data base file) command has many parameters. However, the OPNQRYF (open query file) will only recognize a few of the parameters (TOFILE, MBR, LVLCHK, WAITRCD, SEQONLY, INHWRT, SHARE); all the rest are ignored. Neither the compiler nor a program run will indicate this happened. We discovered the quirk because the file no longer functioned as we expected it to under the end-of-file delay function. The solution was a logical file with a select/omit line.

&end&

;id; 2. The logical file has selected only those communications entries with status 10 (immediate processing). There is no need to check the status here. ;ql;

;id; A. GENCOMDT records with status 10 are those that have been placed in GENCOM either by MMC080 or by some external program and have been "released for immediate processing." These are the general CE's that have not yet been assigned specific CE's. ;ql;

;id; B. Before continuing, check the CE # for this record. If it is '*INIT,' then this is the dummy record indicating that the last reset was performed on an empty file. This required us to enter a dummy record that will allow the reset to work.

;id; i. Check that the initialization is for this job number. The CE # will consist of the *INIT in position 1-6 of the CE # and the job number in position 10-15. The job number was passed by MMC000XJ. ;ql;

;id; ii. Since the initialization record is job specific and has already fulfilled its purpose, delete the record from GENCOMDT if the job number corresponds to this job. ;ql;

;id; iii. Return to step 1 to process the next record in the file. ;ql;

;id; C. Before continuing, check the CE # for this record. If it is '*RESET,' then this is the dummy record indicating that the pointer to this file should be reset to the beginning. ;ql;

;id; i. Check that the reset is for this job number. The CE # will consist of the *RESET in position 1-6 of the CE # and the job number in position 10-15. The job number was passed by MMC000XJ. ;ql;

;id; ii. Since the reset record is job specific, delete the record from GENCOMDT if the job number corresponds to this job. ;ql;

;id; iii. If the CE # is '*RESET,' perform a SETLL to reset the pointer to the beginning of GENCOMDT. ;ql;

;id; iv. If the SETLL failed, this indicates that there are no records in the file. Since the pointer is set at the end of the file on a failed SETLL the end-of-file delay is no longer in effect and the program will end. To handle this situation, the program will write an '*INIT' (initialization) record with a date and time of *LOVAL. The SETLL will then be performed again. Since a record was just written, the SETLL will work and the pointer is positioned at the beginning of the file again. ;ql;

;id; v. If the SETLL failed, add to the reset field in EMBKGD (BGRSET) and update the record. This field will keep track of how many failed resets were encountered. A failed reset is one where the reset brings the user to the beginning of an empty file. This field will be used at implementation and will be helpful in determining the frequency needed for the reset. ;ql;

;id; vi. Return to step 1 to read the next record. ;ql;

;id; D. Now check to see if this is the deactivation record, designated by a CE # of '*END.' . ;ql;

;id; i. Check that the deactivation record is for this job number. The CE # will consist of the *END in position 1-4 of the CE # and the job number in position 10-15. The job number of the current job was passed by MMC000XJ. ;ql;

;id; ii. Since the deactivation record is job specific, delete the record from GENCOMDT if the job number corresponds to this job. ;ql;

;id; iii. If the CE # is '*END,' then this program should end immediately, without processing any more GENCOM records. Prior to ending the program, delete the Enterprise Management Background File (EMBKGD) record found for 'MMC000XJ,' the user (passed from MMC000XJ) and the job number (passed from MMC000XJ). ;ql;

;id; 3. The record is not a reset or deactivation record. Retrieve the name of the initialization program from the Application Definition File (APPDEF). ;ql;

;id; A. Retrieve the APPDEF record for the application program name/from release-modification level in GENCOM. (There may be more than one APPDEF record for this combination with different to rel-mod levels, but use the first one found. The to rel-mod level doesn't matter because only the files in the requesting entity are used at this point.) If no record is found, attempt to retrieve a record for the last rel-mod level or the most recent previous rel-mod level. If still no record found, use the default from rel-mod from COMDEF and access APPDEF. ;ql;

;id; B. If no APPDEF record exists then no more processing can occur on this record, update the General Communications Entry file record with status '62' to indicate that the program failed trying to obtain an APPDEF record. Return to step 1 to process the next record. ;ql;

;id; C. Check to see if the originating entity exists in the Entity Definition file (ENTFIL). The originating entity is the first 10 characters of the general CE #. If the entity does not exist in ENTFIL, update the General CE status to '63' and return to step 1 to process the next record. ;ql;

;id; D. If the ENTFIL record is found in step 3C above, determine if the entity files library (EFFLIB) retrieved from the ENTFIL record exists by using a CHKOBJ CL command. If the entity files library does not exist, update the general CE status to '63' and return to step 1 to process the next record. ;ql;

```
;id; E. If the APPDEF and ENTFIL records exists and the entity
files library is found, update the GENCOM record with status '50'
(submitted for processing), so that it will not be accessible by
any other processors.  This step is necessary because of the
requirement that users be able to set up multiple processors.  We
must be sure that a given record will only be processed by one
processor. ;ql;

;id; F. Retrieve the name of the initialization program from the
Application Definition File (APPDEF).  Call the program with the
following PLIST. ;ql;

;id;    PMCINT   PLIST                                      ;ql;
;id;             PARM   PGRNO  15A    general CE #          ;ql;

;id; G. If the initialization program does not exist, call MMC030
to send a message to the EM background message queue saying that
the initialization program for this general CE does not exist. ;ql;

&int

Design note: We are not providing any recovery mechanism to the user if
the initialization program does not exist. The general CE status will
remain '50', thus it will not be picked up by any general
communications processors again even after the problem is fixed. The
user should cancel this general CE, and he/she has to create another CE
to perform the job again.

&end

;id; H. Return to step 1 to process the next record. ;ql;

;hi;B. File     Usage                                        ;ql;

;id;  APPDEF    IF    Application Definition File            ;ql;
;id;  COMDEF    IF    Communications Definition File         ;ql;
;id;  EMBKGD    UF    Enterprise Management Background File  ;ql;
;id;  ENTFIL    IF    Entity Definition File                 ;ql;
;id;  GENCOMDT  UF    Perm Logical of GENCOM by Dt/Tm Last Mt ;ql;

;ql;;hx;

$END$
```

```
 5738PW1 V2R2M0  920615             SEU SOURCE LISTING                        05/28/93 14:08:15          PAGE    1

SOURCE FILE . . . . . . .   XLIBEM/MRPGSRC
MEMBER  . . . . . . . . .   MMC000

SEQNBR*...+... 1 ...+... 2 ...+... 3 ...+... 4 ...+... 5 ...+... 6 ...+... 7 ...+... 8 ...+... 9 ...+... 0
  100      H*****************************************************************           07/22/91
  200      H*                                                               *           07/22/91
  300      H*          Release - 03           Mod Level - 10               *           06/26/92
  400      H*   THIS UNPUBLISHED COPYRIGHTED WORK CONTAINS TRADE SECRET     *           07/22/91
  500      H*   INFORMATION OF MARCAM CORPORATION.  USE, TRANSFER,          *           07/22/91
  600      H*   DISCLOSURE, OR COPYING WITHOUT ITS EXPRESSED WRITTEN        *           07/22/91
  700      H*   PERMISSION IS STRICTLY FORBIDDEN.                     1993  *           06/26/92
  800      H*                                                               *           07/22/91
  900      H*   MODULE:             Enterprise Management                   *           07/22/91
 1000      H*                                                               *           07/22/91
 1100      H*   PROGRAM NAME:       MMC000 - General Communications         *           07/22/91
 1200      H*                                Processor Program              *           07/22/91
 1300      H*                                                               *           07/22/91
 1400      H*   FUNCTION:           This program processes the General      *           07/22/91
 1500      H*                       Communication Entry File (GENCOM).      *           08/05/91
 1600      H*                                                               *           07/22/91
 1700      H*   CALLING PROGRAM:    MMC000XJ- XJ Procedure to open the      *           08/22/91
 1800      H*                                 logical file                  *           10/07/92
 1900      H*                                                               *           07/22/91
 2000      H*   CALLED PROGRAM:     Initialization program (from APPDEF)    *           08/05/91
 2100      H*                       MMC030  - Communications Message Sending*           10/19/92
 2200      H*                                 Program                       *           10/19/92
 2300      H*                                                               *           10/07/92
 2400      H*   /COPY INPUT:        NONE                                    *           10/14/92
 2500      H*                                                               *           07/22/91
 2600      H*   /COPY ROUTINES:     NONE                                    *           07/22/91
 2700      H*                                                               *           07/22/91
 2800      H*****************************************************************           07/22/91
 2900      H*              P R O G R A M   D E S C R I P T I O N            *           07/22/91
 3000      H*****************************************************************           07/22/91
 3100      H*                                                               *           07/22/91
 3200      H*  This program is the General Communications Processor.  It   *           07/29/91
 3300      H*  reads through the GENCOM file and calls the appropriate     *           07/29/91
 3400      H*  initialization program as defined in the Applications       *           07/29/91
 3500      H*  Definition file (APPDEF).  The GENCOM file was defined with *           01/13/92
 3600      H*  end of file delay.  Therefore, a deactivation record must   *           01/13/92
 3700      H*  be encountered to end the processor.  A reset record may    *           07/29/91
 3800      H*  be hit to reset the pointer.                                *           07/29/91
 3900      H*                                                               *           07/22/91
 4000      H*****************************************************************           07/22/91
 4100      F/SPACE 3                                                                    07/22/91
 4200      F*****************************************************************           07/22/91
 4300      F*          F U N C T I O N   O F   I N D I C A T O R S          *           07/22/91
 4400      F*****************************************************************           07/22/91
 4500      F*                                                               *           07/22/91
 4600      F*   98 - General Indicator                                      *           08/05/91
 4700      F*   99 - General Indicator                                      *           07/22/91
 4800      F*                                                               *           07/22/91
 4900      F*****************************************************************           07/22/91
 5000      F/SPACE 2                                                                    07/22/91
 5100      F*****************************************************************           07/22/91
 5200      F*                                                               *           07/22/91
 5300      F*                         FILE SPECIFICATIONS                   *           07/22/91
```

```
     5738PW1 V2R2M0  920615                SEU SOURCE LISTING                  05/28/93 14:08:15              PAGE    2

SOURCE FILE . . . . . . .  XLIBEM/MRPGSRC
MEMBER  . . . . . . . . .  MMC000

SEQNBR*...+... 1 ...+... 2 ...+... 3 ...+... 4 ...+... 5 ...+... 6 ...+... 7 ...+... 8 ...+... 9 ...+... 0
  5400      F*                                                                 *                         07/22/91
  5500      F*****************************************************************                          07/22/91
  5600      F*                                                                                           07/22/91
  5700      FAPPDEF  IF  E           K        DISK                                                       07/22/91
  5800      F/SPACE 2                                                                                    07/22/91
  5900      FCOMDEF  IF  E                    DISK                                                       02/05/92
  6000      F/SPACE 2                                                                                    02/05/92
  6100      FEMBKGD  UF  E           K        DISK                                                       07/22/91
  6200      F/SPACE 2                                                                                    07/29/91
  6300      FENTFIL  IF  E           K        DISK                                                       05/12/92
  6400      F/SPACE 2                                                                                    04/22/93
  6500      FGENCOM  UF  E           K        DISK                                                       04/22/93
  6600      F              FGENCOM                           KRENAMEFGENC01                              04/22/93
  6700      F/SPACE 2                                                                                    05/12/92
  6800      FGENCOMDTUF  E           K        DISK                        A                              08/09/91
  6900      F/SPACE 3                                                                                    07/22/91
  7000      E*****************************************************************                          07/22/91
  7100      E*                                                                *                          07/22/91
  7200      E*              A R R A Y     D E F I N I T I O N                 *                          07/22/91
  7300      E*                                                                *                          07/22/91
  7400      E*****************************************************************                          07/22/91
  7500      I*****************************************************************                          07/22/91
  7600      I*                                                                *                          07/22/91
  7700      I*                       INPUT SPECIFICATIONS                     *                          07/22/91
  7800      I*                                                                *                          07/22/91
  7900      I*****************************************************************                          07/22/91
  8000      I*                                                                                           07/26/91
  8100      I* Externally described data structure to define the parameter                               10/14/92
  8200      I*    list for the EM message sending program, MMC030                                        10/14/92
  8300      I*                                                                                           10/14/92
  8400      I$MC030     E DSDSMC030                                                                      10/14/92
  8500      I*                                                                                           10/14/92
  8600      IQQCENO       DS                                                                             07/26/91
  8700      I                                         1   9 QQTYPE                                       08/05/91
  8800      I                                        10  150QQJOBN                                       08/05/91
  8900      I*                                                                                           05/12/92
  9000      I* NAMED CONSTANTS                                                                           05/12/92
  9100      I*                                                                                           05/12/92
  9200      I               'CHKOBJ OBJ('        C          QQCMD1                                       05/12/92
  9300      I               ') OBJTYPE(*LIB)'    C          QQCMD2                                       05/12/92
  9400      I*                                                                                           10/07/92
  9500      I/SPACE 3                                                                                    07/22/91
  9600      C*****************************************************************                          07/22/91
  9700      C*                                                                *                          07/22/91
  9800      C*                         CALCULATION SPECS                      *                          07/22/91
  9900      C*                                                                *                          07/22/91
 10000      C*****************************************************************                          07/22/91
 10100      C*                                                                *                          07/22/91
 10200      C*****************************************************************                          07/22/91
 10300      C*                          M A I N L I N E                       *                          07/22/91
 10400      C*****************************************************************                          07/22/91
 10500      C*                                                                *                          07/22/91
 10600      C*   The MAINLINE is executed once.  It calls the subroutine      *                          01/27/92
```

```
5738PW1 V2R2M0  920615                SEU SOURCE LISTING                          05/28/93 14:08:15           PAGE    3

SOURCE FILE . . . . . . .  XLIBEM/MRPGSRC
MEMBER  . . . . . . . . .  MMC000

SEQNBR*...+... 1 ...+... 2 ...+... 3 ...+... 4 ...+... 5 ...+... 6 ...+... 7 ...+... 8 ...+... 9 ...+... 0
10700      C*   PROGEN to process GENCOM (the General Communications      *                 01/27/92
10800      C*   Entry File.).  The program ends when a 'deactivate'       *                 01/27/92
10900      C*   record is encountered in GENCOM.  The subroutine ENDPRO   *                 04/21/93
11000      C*   will perform any final processing and the program ends    *                 04/21/93
11100      C*   in the MAINLINE.                                          *     SRCE3       04/21/93
11200      C*                                                             *     SRCE3       04/22/93
11300      C**************************************************************      SRCE3       04/22/93
11400      C*                                                             *     SRCE3       04/22/93
11500      C*   INDICATORS USED  :  LR                                    *     SRCE3       04/22/93
11600      C*                                                             *     SRCE3       04/22/93
11700      C*   EXECUTES         :  ENDPRO  PROGEN                        *     SRCE3       04/22/93
11800      C*                                                             *     SRCE3       04/22/93
11900      C**************************************************************      SRCE3       04/22/93
12000      C*                                                                               04/22/93
12100      C           *ENTRY    PLIST                                                      07/25/91
12200      C                     PARM           $PJOBN                                      02/05/92
12300      C                     PARM           $PUSER                                      02/05/92
12400      C*                                                                               07/22/91
12500      C* Process the General Communications File                                       04/21/93
12600      C*                                                                               04/21/93
12700      C                     EXSR PROGEN                                                07/22/91
12800      C*                                                                               07/30/91
12900      C* Perform any necessary functions before ending                                 04/21/93
13000      C*                                                                               04/21/93
13100      C                     EXSR ENDPRO                                                04/21/93
13200      C*                                                                               04/21/93
13300      C                     SETON                     LR                               07/30/91
13400      C                     RETRN                                                      07/30/91
13500      C*                                                                               07/30/91
13600      C*                                                                               07/22/91
13700      C/SPACE 2                                                                        07/22/91
13800      C*********  *INZSR SUBR  *********************  *INZSR SUBR  *                   03/02/92
13900      C*                                                           *                   07/22/91
14000      C*  The purpose of the *INZSR subroutine is to perform the   *                   01/27/92
14100      C*  initial calculations that need to be done on the initial *                   01/27/92
14200      C*  call of the program                                      *     SRCE3         01/27/92
14300      C*                                                           *     SRCE3         04/22/93
14400      C*************************************************************      SRCE3         04/22/93
14500      C*                                                           *     SRCE3         04/22/93
14600      C*   INDICATORS USED  :  99                                  *     SRCE3         04/22/93
14700      C*                                                           *     SRCE3         04/22/93
14800      C*************************************************************      SRCE3         04/22/93
14900      C*                                                                               04/22/93
15000      C           *INZSR    BEGSR                                                      03/02/92
15100      C*                                                                               07/22/91
15200      C* Initialize the standard variables.                                            07/22/91
15300      C*                                                                               07/22/91
15400      C                     MOVEL'MMC000'  $PGM           Program Name                 01/28/92
15500      C                     MOVE 'M'       MODULE         Module                       01/28/92
15600      C*                                                                               05/12/92
15700      C* Set the length of the QCMDEXC string                                          05/12/92
15800      C*                                                                               05/12/92
15900      C                     Z-ADD36        QQLEN          Length                       05/12/92
```

```
  5738PW1 V2R2M0  920615            SEU SOURCE LISTING                    05/28/93 14:08:15          PAGE    4

SOURCE FILE . . . . . . .  XLIBEM/MRPGSRC
MEMBER  . . . . . . . . .  MMC000

SEQNBR*...+... 1 ...+... 2 ...+... 3 ...+... 4 ...+... 5 ...+... 6 ...+... 7 ...+... 8 ...+... 9 ...+... 0
16000      C*                                                                                  02/05/92
16100      C*  Retrieve record from COMDEF so that default 'from rel-mod                       02/05/92
16200      C*  level' can be accessed. It may be needed if attempts to re-                     02/05/92
16300      C*  trieve an APPDEF record with a specific appl/from rel-mod                       02/05/92
16400      C*  fail.                                                                           02/05/92
16500      C*                                                                                  02/05/92
16600      C          1         CHAINCOMDEF               99                                   07/22/91
16700      C*                                                                                  03/02/92
16800      C                    ENDSR                     *INZSR        SRCE3                  01/13/92
16900      C/SPACE 2                                                                           01/13/92
17000      C**********  $DEFSR SUBR  ***********************  $DEFSR SUBR  *                    01/13/92
17100      C*                                                             *                    01/27/92
17200      C*  The purpose of the $DEFSR subroutine is to define the      *                    01/27/92
17300      C*  program fields                                             *   SRCE3            04/22/93
17400      C*                                                             *   SRCE3            04/22/93
17500      C**************************************************************    SRCE3            04/22/93
17600      C*                                                             *   SRCE3            04/22/93
17700      C*   INDICATORS USED  :  NONE                                  *   SRCE3            04/22/93
17800      C*                                                             *   SRCE3            04/22/93
17900      C**************************************************************    SRCE3            04/22/93
18000      C*                                                                                  01/13/92
18100      C          $DEFSR    BEGSR                                                          01/13/92
18200      C*                                                                                  01/13/92
18300      C* Initializo the standard variables.                                               01/13/92
18400      C*                                                                                  01/28/92
18500      C                    MOVE *BLANKS  $PGM     8        Program Name                   01/28/92
18600      C                    MOVE *BLANKS  MODULE   1        Module                         04/22/93
18700      C                    MOVE *BLANKS  QQTEMP   1        Temporary var                  05/12/92
18800      C*                                                                                  05/12/92
18900      C                    MOVE *BLANKS  QQCMD   36        QCMDEXC command                05/12/92
19000      C                    Z-ADDO        QQLEN  155        Length                         05/12/92
19100      C*                                                                                  05/12/92
19200      C* *LIKE DEFN the program variables                                                 05/12/92
19300      C*                                                                                  05/12/92
19400      C          *LIKE     DEFN EFNME    QQENT             Originating Ent                01/13/92
19500      C*                                                                                  01/13/92
19600      C* Set up plist for calling the initialization program                              01/13/92
19700      C*                                                                                  01/13/92
19800      C          PMCINT    PLIST                                                          01/13/92
19900      C                    PARM          PGRNO             General CE #                   10/07/92
20000      C*                                                                                  10/07/92
20100      C* Set up plist for calling MMC030, the Communications Message                      10/07/92
20200      C*   Sending Program.                                                               10/07/92
20300      C*                                                                                  10/07/92
20400      C          PMC030    PLIST                                                          10/07/92
20500      C                    PARM          $MC030                                           01/13/92
20600      C*                                                                                  01/13/92
20700      C* *LIKE DEFN the klist variables                                                   01/13/92
20800      C*                                                                                  01/28/92
20900      C          *LIKE     DEFN FDPGM    KPGM              Application Pgm                01/28/92
21000      C          *LIKE     DEFN FDFREL   KFREL             Release Level                  01/28/92
21100      C          *LIKE     DEFN BGJOB    KJOB              Job Name                       01/28/92
21200      C          *LIKE     DEFN BGUSER   KUSER             User Profile                   01/28/92
```

```
5738PW1 V2R2M0  920615                SEU SOURCE LISTING                  05/28/93 14:08:15          PAGE    5

SOURCE FILE . . . . . . .   XLIBEM/MRPGSRC
MEMBER  . . . . . . . . .   MMC000

SEQNBR*...+... 1 ...+... 2 ...+... 3 ...+... 4 ...+... 5 ...+... 6 ...+... 7 ...+... 8 ...+... 9 ...+... 0
 21300     C              *LIKE     DEFN BGJOBN    KJOBN           Job Number                               01/28/92
 21400     C              *LIKE     DEFN BGJOBN    $PJOBN          Job Number                               02/05/92
 21500     C              *LIKE     DEFN BGUSER    $PUSER          User Profile                             02/05/92
 21600     C              *LIKE     DEFN ZCCENO    PGRNO           Genl CE #                                01/28/92
 21700     C*                                                                                               01/13/92
 21800     C* Set up Key list for retrieving the initialization program from                               01/13/92
 21900     C*     the Application Definition file (APPDEF) - partial key                                    01/13/92
 22000     C*                                                                                               01/13/92
 22100     C              KAPPD1    KLIST                                                                   01/13/92
 22200     C                        KFLD           KPGM                                                     01/13/92
 22300     C                        KFLD           KPREL                                                    01/13/92
 22400     C*                                                                                               01/13/92
 22500     C* Set up Key list for deleting a record in the background file                                 01/13/92
 22600     C*     (EMBKGD) for this processor.                                                              01/13/92
 22700     C*                                                                                               01/13/92
 22800     C              KEMBKG    KLIST                                                                   01/13/92
 22900     C                        KFLD           KJOB                                                     01/13/92
 23000     C                        KFLD           KUSER                                                    01/13/92
 23100     C                        KFLD           KJOBN                                                    01/13/92
 23200     C*                                                                                               01/13/92
 23300     C                        ENDSR                          $DEFSR          SRCE3                    01/13/92
 23400     C/SPACE 2                                                                                        07/25/91
 23500     C**********  ENDPRO SUBR  ***********************  ENDPRO SUBR  *                               07/25/91
 23600     C*                                                                  *                            07/25/91
 23700     C*  The ENDPRO subroutine ends the processor if a '*END'             *                            07/25/91
 23800     C*       request was hit or processing ended.                         *   SRCE3                  04/21/93
 23900     C*                                                                  *   SRCE3                    04/22/93
 24000     C*******************************************************************   SRCE3                     04/22/93
 24100     C*                                                                  *   SRCE3                    04/22/93
 24200     C*   INDICATORS USED   :  99                                        *   SRCE3                    04/22/93
 24300     C*                                                                  *   SRCE3                    04/22/93
 24400     C*   EXECUTED FROM     :  MAINLN                                    *   SRCE3                    04/22/93
 24500     C*                                                                      SRCE3                    04/22/93
 24600     C*******************************************************************   SRCE3                     04/22/93
 24700     C*                                                                                               07/25/91
 24800     C              ENDPRO    BEGSR                                                                   07/25/91
 24900     C*                                                                                               07/26/91
 25000     C* Delete the correct EM background file record (EMBKGD) for                                    07/26/91
 25100     C*     this job/user profile/job number.                                                         07/25/91
 25200     C*                                                                                               07/26/91
 25300     C                        MOVEL'MMC000XJ'KJOB                                                     02/05/92
 25400     C                        MOVEL$PUSER    KUSER                                                    02/05/92
 25500     C                        Z-ADD$PJOBN    KJOBN                                                    07/26/91
 25600     C*                                                                                               07/25/91
 25700     C              KEMBKG    CHAINEMBKGD                 99                                          01/13/92
 25800     C              *IN99     IFEQ *OFF                                                               07/25/91
 25900     C                        DELETEMBKGD                                                             07/25/91
 26000     C                        ENDIF                                  *IN99=*OFF                       04/22/93
 26100     C*                                                                                               04/22/93
 26200     C* Delete any Special records (*END, *RESET or *INIT) from the                                  04/22/93
 26300     C*   file for the specific job.  Because these begin with '*'                                    04/22/93
 26400     C*   the records will all appear at the beginning of the file                                    04/22/93
 26500     C*   so when a non-'*' entry is found, end the loop.                                             04/22/93
```

```
 5738PW1 V2R2M0  920615                 SEU SOURCE LISTING                         05/28/93 14:08:15                PAGE    6

SOURCE FILE . . . . . . .  XLIBEM/MRPGSRC
MEMBER  . . . . . . . . .  MMC000

SEQNBR*...+... 1 ...+... 2 ...+... 3 ...+... 4 ...+... 5 ...+... 6 ...+... 7 ...+... 8 ...+... 9 ...+... 0
26600      C*                                                                                          04/22/93
26700      C           *LOVAL    SETLLGENCOM                                                           04/22/93
26800      C           *IN99     DOUEQ*ON                                                              04/22/93
26900      C                     READ GENCOM                   99                                      04/22/93
27000      C           *IN99     IFEQ *OFF                                                             04/22/93
27100      C*                                                                                          04/22/93
27200      C*   Check for a special record                                                             04/22/93
27300      C*                                                                                          04/22/93
27400      C                     MOVE ZCCENO    QQCENO                                                 04/22/93
27500      C           QQJOBN    IFEQ $PJOBN                                                           04/22/93
27600      C           QQTYPE    IFEQ '*INIT'                                                          04/22/93
27700      C           QQTYPE    OREQ '*END'                                                           04/22/93
27800      C           QQTYPE    OREQ '*RESET'                                                         04/22/93
27900      C                     DELETFGENCO1                                                          04/22/93
28000      C                     ENDIF                          QQTYPE='*INIT'                         04/22/93
28100      C                     ENDIF                          QQJOBN=$PJOBN                          04/22/93
28200      C*                                                                                          04/22/93
28300      C*   Check if end of special records                                                        04/22/93
28400      C*                                                                                          04/22/93
28500      C           1         SUBSTQQTYPE:1  QQTEMP                                                 04/22/93
28600      C           QQTEMP    IFNE '*'                                                              04/22/93
28700      C                     UNLCKGENCOM                                                           04/22/93
28800      C                     LEAVE                                                                 04/22/93
28900      C                     ENDIF                          QQTEMP<>'*'                            04/22/93
29000      C*                                                                                          04/22/93
29100      C                     ENDIF                          *IN99=*OFF                             04/22/93
29200      C                     ENDDO                          DOU *IN99=*ON                          04/22/93
29300      C*                                                                                          07/25/91
29400      C                     ENDSR                          ENDPRO        SRCE3                    07/25/91
29500      C/SPACE 2                                                                                   07/22/91
29600      C*********  PROGEN SUBR  **********************  PROGEN SUBR  *                            07/22/91
29700      C*                                                              *                           07/22/91
29800      C*   The PROGEN subroutine processes the GENCOMDT file.         *                           07/30/91
29900      C*                                                              *    SRCE3                  04/22/93
30000      C***************************************************************     SRCE3                  04/22/93
30100      C*                                                              *    SRCE3                  04/22/93
30200      C*   INDICATORS USED  :  98  99                                 *    SRCE3                  04/22/93
30300      C*                                                              *    SRCE3                  04/22/93
30400      C*   EXECUTES         :  PRORCD  RSTPRO                         *    SRCE3                  04/22/93
30500      C*                                                              *    SRCE3                  04/22/93
30600      C*   EXECUTED FROM    :  MAINLN                                 *    SRCE3                  04/22/93
30700      C*                                                              *    SRCE3                  04/22/93
30800      C***************************************************************     SRCE3                  04/22/93
30900      C*                                                                   SRCE3                  04/22/93
31000      C           PROGEN    BEGSR                                                                 07/22/91
31100      C*                                                                                          07/22/91
31200      C           *IN99     DOWEQ*OFF                                                             01/13/92
31300      C*                                                                                          07/22/91
31400      C                     READ GENCOMDT                 99                                      07/30/91
31500      C*                                                                                          02/03/93
31600      C* If a shut down request is issued for this job, end                                       02/03/93
31700      C*    the processor.                                                                        02/03/93
31800      C*                                                                                          02/03/93
```

```
5738PW1 V2R2M0  920615            SEU SOURCE LISTING                    05/28/93 14:08:15            PAGE    7

SOURCE FILE . . . . . . .   XLIBEM/MRPGSRC
MEMBER  . . . . . . . . .   MMC000

SEQNBR*...+... 1 ...+... 2 ...+... 3 ...+... 4 ...+... 5 ...+... 6 ...+... 7 ...+... 8 ...+... 9 ...+... 0
31900      C                    SHTDN                     98                                                   02/03/93
32000      C          *IN98     IFEQ *ON                                                                       02/03/93
32100      C                    UNLCKGENCOMDT                                                                  04/30/93
32200      C                    LEAVE                                                                          04/21/93
32300      C                    ENDIF                          *IN98=*ON                                       02/03/93
32400      C*                                                                                                  02/03/93
32500      C          *IN99     IFEQ *OFF                                                                      01/13/92
32600      C*                                                                                                  07/26/91
32700      C* The CE # is a combination of *RESET or *END and the                                              10/07/92
32800      C*    job number if it is not a normal communications entry.                                        07/29/91
32900      C*    The variable QQCENO is a data structure which breaks                                          07/29/91
33000      C*    into QQTYPE(*RESET or *END) and QQJOBN(job number)                                            08/05/91
33100      C*                                                                                                  07/29/91
33200      C                    MOVE ZCCENO    QQCENO                                                          07/26/91
33300      C*                                                                                                  08/09/91
33400      C* Check the CE # to determine if this is an initialization                                         08/09/91
33500      C*   request.  Check if the record corresponds with this job.                                       08/09/91
33600      C*   Return to read another record.                                                                 08/09/91
33700      C*                                                                                                  08/09/91
33800      C          QQTYPE    IFEQ '*INIT'                                                                   08/09/91
33900      C          QQJOBN    IFEQ $PJOBN                                                                    02/05/92
34000      C                    DELETFGENCOM                                                                   08/09/91
34100      C                    ELSE                                                                           06/19/92
34200      C                    UNLCKGENCOMDT                                                                  06/19/92
34300      C                    ENDIF                          QQJOBN=$PJOBN                                   08/09/91
34400      C                    ITER                                                                           01/27/92
34500      C                    ENDIF                          QQTYPE='*INIT'                                  08/09/91
34600      C*                                                                                                  07/25/91
34700      C* Check the CE # to determine if this is a deactivate request                                      07/25/91
34800      C*    The deactivate request is job specific.  Check that the                                       08/09/91
34900      C*    request is for the current job.  Delete the deactivate                                        04/21/93
35000      C*    request so no other processors pick it up.  End the                                           04/21/93
35100      C*    program.  If it is not the current job, return to read                                        04/21/93
35200      C*    another record.                                                                               04/21/93
35300      C*                                                                                                  07/25/91
35400      C          QQTYPE    IFEQ '*END'                                                                    08/05/91
35500      C          QQJOBN    IFEQ $PJOBN                                                                    02/05/92
35600      C                    DELETFGENCOM                                                                   04/21/93
35700      C                    LEAVE                                                                          04/21/93
35800      C                    ELSE                                                                           06/19/92
35900      C                    UNLCKGENCOMDT                                                                  06/19/92
36000      C                    ENDIF                          QQJOBN=$PJOBN                                   08/09/91
36100      C                    ITER                                                                           01/27/92
36200      C                    ENDIF                          QQTYPE='*END'                                   08/09/91
36300      C*                                                                                                  07/22/91
36400      C* Check the CE # to determine if this is a reset request                                           07/22/91
36500      C*    The reset records are job specific - check that the                                           07/25/91
36600      C*    request is for the correct job.                                                               08/09/91
36700      C*                                                                                                  07/22/91
36800      C          QQTYPE    IFEQ '*RESET'                                                                  08/05/91
36900      C          QQJOBN    IFEQ $PJOBN                                                                    02/05/92
37000      C                    EXSR RSTPRO                                                                    07/25/91
37100      C                    ELSE                                                                           06/19/92
```

```
5738PW1 V2R2M0  920615              SEU SOURCE LISTING                        05/28/93 14:08:15          PAGE    8

SOURCE FILE . . . . . . .  XLIBEM/MRPGSRC
MEMBER  . . . . . . . . .  MMC000

SEQNBR*...+... 1 ...+... 2 ...+... 3 ...+... 4 ...+... 5 ...+... 6 ...+... 7 ...+... 8 ...+... 9 ...+... 0
37200      C                   UNLCKGENCOMDT                                                        06/19/92
37300      C                   ENDIF                         QQJOBN=$PJOBN                          08/09/91
37400      C                   ITER                                                                 01/27/92
37500      C                   ENDIF                         QQTYPE='*RESET'                        08/09/91
37600      C*                                                                                       07/22/91
37700      C* If the record is not a reset, initialization, or deactivation                         08/09/91
37800      C*   then process the record.                                                            08/09/91
37900      C*                                                                                       07/25/91
38000      C                   EXSR PRORCD                                                          07/25/91
38100      C*                                                                                       04/20/93
38200      C                   SETOF                   99                                           04/20/93
38300      C*                                                                                       07/22/91
38400      C                   ENDIF                         *IN99=*OFF                             08/09/91
38500      C                   ENDDO                         DOW *IN99=*OFF                         07/22/91
38600      C*                                                                                       07/22/91
38700      C                   ENDSR                         PROGEN        SRCE3                    08/09/91
38800      C/SPACE 2                                                                                07/23/91
38900      C*********  PRORCD SUBR  *********************  PRORCD SUBR  *                           07/25/91
39000      C*                                                           *                           07/23/91
39100      C*   The PRORCD subroutine processes the GENCOM record       *                           07/25/91
39200      C*                                                           *  SRCE3                    04/22/93
39300      C*************************************************************  SRCE3                    04/22/93
39400      C*                                                           *  SRCE3                    04/22/93
39500      C*   INDICATORS USED  :  98                                  *  SRCE3                    04/22/93
39600      C*                                                           *  SRCE3                    04/22/93
39700      C*   EXECUTED FROM    :  PROGEN                              *  SRCE3                    04/22/93
39800      C*                                                           *  SRCE3                    04/22/93
39900      C*************************************************************  SRCE3                    04/22/93
40000      C*                                                              SRCE3                    04/22/93
40100      C           PRORCD    BEGSR                                                              07/25/91
40200      C*                                                                                       05/12/92
40300      C                   DO                            DO ONCE                                05/12/92
40400      C*                                                                                       07/29/91
40500      C* Retrieve the APPDEF record for the application program                                07/29/91
40600      C*  name/from release-modification level from gencom                                     07/29/91
40700      C*  The APPDEF record will indicate the initialization program                           07/29/91
40800      C*  that must be called.  First check the current from                                   08/05/91
40900      C*  release-modification level.  If no record exists then find                           08/05/91
41000      C*  a prior release-modification level.                                                  08/05/91
41100      C*                                                                                       08/05/91
41200      C* Load the key fields: program name and from rel-mod level                              08/05/91
41300      C*                                                                                       07/23/91
41400      C                   MOVE ZCPGM     KPGM                                                  07/23/91
41500      C                   MOVE ZCFREL    KFREL                                                 07/23/91
41600      C*                                                                                       07/26/91
41700      C* Use the set lower limit code to determine if a record exists                          08/05/91
41800      C*  that matches the key (indicator 98 will be set on).                                  08/05/91
41900      C*                                                                                       07/29/91
42000      C           KAPPD1    SETLLAPPDEF                   98                                   08/05/91
42100      C*                                                                                       08/05/91
42200      C* If 98 is on the the SETLL is positioned before the record                             08/05/91
42300      C*   the matches the key. Read the record.                                               08/05/91
42400      C*                                                                                       08/05/91
```

```
5738PW1 V2R2M0  920615                SEU SOURCE LISTING                     05/28/93 14:08:15          PAGE    9

SOURCE FILE . . . . . . .   XLIBEM/MRPGSRC
MEMBER  . . . . . . . . .   MMC000

SEQNBR*...+... 1 ...+... 2 ...+... 3 ...+... 4 ...+... 5 ...+... 6 ...+... 7 ...+... 8 ...+... 9 ...+... 0
42500      C          *IN98     IFEQ *ON                                                        01/13/92
42600      C                    READ APPDEF                    98                               08/05/91
42700      C*                                                                                   08/05/91
42800      C* If 98 is off then the SETLL is positioned before the first                        08/05/91
42900      C*   record greater than the key.  Read previous with the                            08/05/91
43000      C*   program name to obtain the most recent from rel-mod.                            08/05/91
43100      C*                                                                                   08/05/91
43200      C                    ELSE                                                            08/05/91
43300      C          KPGM      REDPEAPPDEF                    98                               08/05/91
43400      C                    ENDIF                             *IN96=*ON                     08/05/91
43500      C*                                                                                   02/05/92
43600      C* After the reads, if a record was not found,  98 will be ON.                       02/05/92
43700      C* Get the default 'from rel-mod level' from COMDEF, and use it                      02/05/92
43800      C*  to retrieve an application description from APPDEF.                             02/05/92
43900      C*                                                                                   02/05/92
44000      C          *IN98     IFEQ *ON                                                        02/05/92
44100      C                    MOVE CQDFFR    KFREL                                            02/05/92
44200      C          KAPPD1    CHAINAPPDEF                 98                                  02/05/92
44300      C                    ENDIF                          *IN98=*ON                        02/05/92
44400      C*                                                                                   08/05/91
44500      C* After the reads, if a record was not obtained then 98 will                        08/05/91
44600      C*   be ON.  Update GENCOM with status 62 to indicate that the                       08/05/91
44700      C*   program failed trying to obtain an APPDEF record.                               08/05/91
44800      C*                                                                                   08/05/91
44900      C          *IN98     IFEQ *ON                                                        01/13/92
45000      C                    MOVE '62'      ZCSTAT                                           08/05/91
45100      C                    UPDATFGENCOM                                                    08/05/91
45200      C                    LEAVE                                                           05/12/92
45300      C                    ENDIF                          *IN98=*ON                        05/12/92
45400      C*                                                                                   05/12/92
45500      C* At this point, the Program obtained the correct APPDEF record.                    05/12/92
45600      C*                                                                                   05/12/92
45700      C* Check if the originating entity exists in the Entity                              05/14/92
45800      C*   File (ENTFIL).  The entity is the first 10 characters of                        05/12/92
45900      C*   the general CE #.  If the entity does not exist, set the                        05/12/92
46000      C*   status to '63' to indicate no ENTFIL record.                                    05/12/92
46100      C*                                                                                   05/12/92
46200      C                    MOVELZCCENO    QQENT                                            05/12/92
46300      C          QQENT     CHAINENTFIL                 98                                  05/12/92
46400      C          *IN98     IFEQ *ON                                                        05/12/92
46500      C                    MOVE '63'      ZCSTAT                                           05/12/92
46600      C                    UPDATFGENCOM                                                    05/12/92
46700      C                    LEAVE                                                           05/12/92
46800      C                    ENDIF                          *IN98=*ON                        05/12/92
46900      C*                                                                                   05/12/92
47000      C* If the originating entity can be found in ENTFIL, determine                       05/12/92
47100      C*   if the entity files library exists using CHKOBJ.                                05/12/92
47200      C* If the QCMDEXC fails, the CHKOBJ failed, set the status                           05/12/92
47300      C*   to '63' to indicate that the Files Library does not exist.                      05/12/92
47400      C*                                                                                   05/12/92
47500      C                    MOVE *BLANKS   QQCMD                                            07/02/92
47600      C          QQCMD1    CAT  EFFLIB    QQCMD           CHKOBJ OBJ(lib)                  05/12/92
47700      C          QQCMD     CAT  QQCMD2:0  QQCMD           OBJTYPE(*LIB)                    05/12/92
```

```
     5738PW1 V2R2M0  920615              SEU SOURCE LISTING                        05/28/93 14:08:15           PAGE   10

SOURCE FILE . . . . . . .  XLIBEM/MRPGSRC
MEMBER  . . . . . . . . .  MMC000

SEQNBR*...+... 1 ...+... 2 ...+... 3 ...+... 4 ...+... 5 ...+... 6 ...+... 7 ...+... 8 ...+... 9 ...+... 0
47800      C                    CALL 'QCMDEXC'          98                                            05/12/92
47900      C                    PARM           QQCMD                                                  05/12/92
48000      C                    PARM           QQLEN                                                  05/12/92
48100      C          *IN98     IFEQ *ON                                                              05/12/92
48200      C                    MOVE '63'      ZCSTAT                                                 05/12/92
48300      C                    UPDATFGENCOM                                                          05/12/92
48400      C                    LEAVE                                                                 05/12/92
48500      C                    ENDIF                           *IN98=*ON                             05/12/92
48600      C*                                                                                         07/26/91
48700      C* Else, change the status to 50 (submitted for processing) and                           08/05/91
48800      C*   call the initialization program found.                                                08/05/91
48900      C*                                                                                         08/05/91
49000      C                    MOVE '50'      ZCSTAT                                                 08/05/91
49100      C                    UPDATFGENCOM                                                          08/05/91
49200      C                    MOVE ZCCENO    PGRNO                                                  02/07/92
49300      C                    CALL FD1PGM    PMCINT       98                                        10/07/92
49400      C*                                                                                         10/07/92
49500      C* If the call fails (*IN98 is on), call MMC030 to send a message                         10/07/92
49600      C*   to the EH background message queue saying that the                                  10/07/92
49700      C*   initialization program does not exist.                                               10/07/92
49800      C*   Load $LIT1 with the literal sequence # for the name of                               10/28/92
49900      C*   the program that doesn't exist (the initialization pgm),                            10/28/92
50000      C*   and $LIT2 with the literal sequence # for the CE type                                10/28/92
50100      C*   ('General').                                                                          10/28/92
50200      C*                                                                                         10/07/92
50300      C          *IN98     IFEQ *ON                                                              10/07/92
50400      C                    MOVE MODULE    $MODCD                                                 10/07/92
50500      C                    MOVE '00469'   $ERRNO           Message #M00469                       10/07/92
50600      C                    MOVE ZCCENO    $CENUM           CE #                                  10/07/92
50700      C                    MOVE '00011'   $LIT1            'Init Program'                        10/07/92
50800      C                    MOVE '00017'   $LIT2            'General'                             10/07/92
50900      C                    CALL 'MMC030'  PMC030                                                 10/07/92
51000      C                    ENDIF                           *IN98=*ON                             10/07/92
51100      C*                                                                                         05/12/92
51200      C                    ENDDO                           DO                                    05/12/92
51300      C*                                                                                         07/23/91
51400      C                    ENDSR                           PRORCD          SRCE3                 07/23/91
51500      C/SPACE 2                                                                                  07/25/91
51600      C**********  RSTPRO SUBR  **********************  RSTPRO SUBR  *                           07/25/91
51700      C*                                                              *                          07/25/91
51800      C*   The RSTPRO subroutine resets the processor if a '*RESET'   *                          07/25/91
51900      C*        request was hit                                       *                          07/25/91
52000      C*                                                              *   SRCE3                  04/22/93
52100      C***************************************************************   SRCE3                  04/22/93
52200      C*                                                              *   SRCE3                  04/22/93
52300      C*   INDICATORS USED  :  98                                     *   SRCE3                  04/22/93
52400      C*                                                              *   SRCE3                  04/22/93
52500      C*   EXECUTED FROM    :  PROGEN                                 *   SRCE3                  04/22/93
52600      C*                                                              *   SRCE3                  04/22/93
52700      C***************************************************************   SRCE3                  04/22/93
52800      C*                                                                  SRCE3                  04/22/93
52900      C          RSTPRO    BEGSR                                                                 07/25/91
53000      C*                                                                                         07/25/91
```

```
5738PW1 V2R2M0  920615              SEU SOURCE LISTING                    05/28/93 14:08:15          PAGE   11

SOURCE FILE . . . . . . .  XLIBEM/MRPGSRC
MEMBER  . . . . . . . . .  MMC000

SEQNBR*...+... 1 ...+... 2 ...+... 3 ...+... 4 ...+... 5 ...+... 6 ...+... 7 ...+... 8 ...+... 9 ...+... 0
53100      C* Delete the deactivate request so no other processors pick                              07/25/91
53200      C*    it up                                                                               07/25/91
53300      C*                                                                                        07/25/91
53400      C                    DELETFGENCOM                                                         08/07/91
53500      C*                                                                                        07/25/91
53600      C* Reset the file                                                                         07/25/91
53700      C*                                                                                        07/25/91
53800      C           *LOVAL    SETLLGENCOMDT              98                                       08/09/91
53900      C*                                                                                        08/09/91
54000      C* If the reset fails, there are no records in the file                                   08/09/91
54100      C*   since this positions the pointer to the end of the                                   08/09/91
54200      C*   file, no more records will be read.  An initialization                               08/09/91
54300      C*   record must be written give the reset a record to                                    08/09/91
54400      C*   position on.                                                                         08/09/91
54500      C*                                                                                        08/09/91
54600      C           *IN98     IFEQ *ON                                                            01/13/92
54700      C                    CLEARFCENCOM                                                         08/09/91
54800      C                    MOVEL'*INIT'   ZCCENO                                                08/09/91
54900      C                    MOVE $PJOBN    ZCCENO                                                02/05/92
55000      C                    MOVE '10'      ZCSTAT                                                08/09/91
55100      C                    MOVE $PUSER    ZCUSER                                                02/05/92
55200      C                    WRITEFCENCOM                                                         08/09/91
55300      C           *LOVAL    SETLLGENCOMDT                                                       08/09/91
55400      C*                                                                                        08/22/91
55500      C* If the reset fails, update the EM Background file (EMBKGD)                             08/22/91
55600      C*    for this job/user profile/job number to indicate the                                08/22/91
55700      C*    number of failed resets.                                                            08/22/91
55800      C*                                                                                        08/22/91
55900      C                    MOVEL'MMC000XJ'KJOB                                                  08/22/91
56000      C                    MOVEL$PUSER    KUSER                                                 02/05/92
56100      C                    Z-ADD$PJOBN    KJOBN                                                 02/05/92
56200      C*                                                                                        08/22/91
56300      C           KEMBKG    CHAINEMBKGD                98                                       08/22/91
56400      C           *IN98     IFEQ *OFF                                                           01/13/92
56500      C                    ADD  1         BGRSET                                                08/22/91
56600      C                    UPDATFEMBKGD                                                         08/22/91
56700      C                    ENDIF                           *IN98=*OFF                           08/22/91
56800      C                    ENDIF                           *IN98=*ON                            08/09/91
56900      C*                                                                                        07/25/91
57000      C                    ENDSR                           RSTPRO         SRCE3                 07/25/91

                         * * * *   E N D   O F   S O U R C E   * * * *
```

```
$MMC020$

;b;  MMC020     Local Communications Processor Program      ;ql;;r;

;hi;A. The Local Communications Processor Program runs in background
off of LOCCOMDT, the logical view of the Local Communications Entry
File (LOCCOM) by date/time last maintenance.  New records may have been
written to this file or existing records may also have had their
statuses changed by various communications programs.  This program
submits the CL procedure or calls a transfer program to satisfy the
communications entry, then updates the LOCCOMDT record with the
appropriate status.  ;ql;;hx;

;id; 1. Process a loop to retrieve records from LOCCOMDT.  This is
accomplished by reading through LOCCOMDT with the READ operation.  For
each record retrieved, continue processing in step 2. End the program
as described in step 2D(iii) when a shut down request is detected, for
example, when the system shuts down or when the job is ended by using a
controlled end job (ENDJOB) command.  ;ql;

&int&

Design Note: Since the CL program has overridden LOCCOMDT, specifying
an end of file delay, there is no additional coding necessary within
the RPG program to enable the background function.

Design Note: There is no guarantee that the program can detect a shut
down request before the job is ended due to the end of file delay.  As
a result, the EMBKGD record may or may not get deleted, depending on
whether the job is ended normally or abnormally. In any cases, the
EMBKGD record will be deleted eventually either by this program or by
MMM140.

Programmer Note: We were unable to use an open query file on a file
overridden with the end-of-file delay parameter specified.  The problem
is that the OVRDBF (override data base file) command has many
parameters.  However, the OPNQRYF (open query file) will only recognize
a few of the parameters (TOFILE, MBR, LVLCHK, WAITRCD, SEQONLY, INHWRT,
SHARE); all the rest are ignored.  Neither the compiler nor a program
run will indicate this happened.  We discovered the quirk because the
file no longer functioned as we expected it to under the end-of-file
delay function.  The solution was a logical file with a select/omit
line.
&end&

;id; 2. The logical file has selected only those communications entries
status 15 and 16 (specific entries ready for immediate processing).
There is no need to check the status here. ;ql;

    ;id; A. LOCCOMDT records with status 15 are communications entries
    that were initiated on this system, while status 16 indicates those
    initiated on another system. ;ql;
```

;id; B. Before continuing, check the CE # for this record. If it is '*INIT,' then this is the dummy record indicating that the last reset was performed on an empty file. This required us to enter a dummy record that will allow the reset to work.

;id; i. Check that the initialization is for this job number. The CE # will consist of the *INIT in position 1-6 of the CE # and the job number in position 10-15. The job number was passed by MMC020XJ. ;ql;

;id; ii. Since the initialization record is job specific and has already fulfilled its purpose, delete the record from LOCCOMDT if the job number corresponds to this job. ;ql;

;id; iii. Return to step 1 to process the next record in the file. ;ql;

;id; C. Before continuing, check the CE # for this record. If it is '*RESET,' then this is the dummy record indicating that the pointer to this file should be reset to the beginning. ;ql;

;id; i. Check that the reset is for this job number. The CE # will consist of the *RESET in position 1-6 of the CE # and the job number in position 10-15. The job number was passed by MMC020XJ. ;ql;

;id; ii. Since the reset record is job specific, delete the record from LOCCOMDT if the job number corresponds to this job. ;ql;

;id; iii. If the CE # is '*RESET,' perform a SETLL to reset the pointer to the beginning of LOCCOMDT. ;ql;

;id; iv. If the SETLL failed, this indicates that there are no records in the file. Since the pointer is set at the end of the file on a failed SETLL the end-of-file delay is no longer in effect and the program will end. To handle this situation, the program will write an '*INIT' (initialization) record with a date and time of *LOVAL. The SETLL will then be performed again. Since a record was just written, the SETLL will work and the pointer is positioned at the beginning of the file again. ;ql;

;id; v. If the SETLL failed, add to the reset field in EMBKGD (BGRSET) and update the record. This field will keep track of how many failed resets were encountered. A failed reset is one where the reset brings the user to the beginning of an empty file. This field will be used at implementation and will be helpful in determining the frequency needed for the reset. ;ql;

;id; vi. Return to step 1 to process the next record. ;ql;

;id; D. Now check to see if this is the deactivation record, designated by a CE # of '*END.' . ;ql;

;id; i. Check that the deactivation record is for this job number. The CE # will consist of the *END in position 1-4 of the CE # and the job number in position 10-15. The job number of the current job was passed by MMC020XJ. ;ql;

;id; ii. Since the deactivation record is job specific, delete the record from LOCCOMDT if the job number corresponds to this job. ;ql;

;id; iii. If the CE # is '*END,' then this program should end immediately, without processing any more LOCCOM records. Prior to ending the program, delete the Enterprise Management Background File (EMBKGD) record found for 'MMC020XJ,' the user (passed from MMC020XJ) and the job number (passed from MMC020XJ). ;ql;

;id; 3. The record is not a reset or deactivation record. Therefore, process the record. ;ql;

&int&

Design Note: The appropriate distributed files must be copied from the requesting entity to the satisfying entity, prior to initiating the job in step 5. This should only be done if the entity for distribution is NOT the same as the requesting entity. If they are the same, they use the same files, so no distribution is necessary. (For example, if the ATP files are to be built in many entities, including the requesting entity, it is first necessary to send copies of the GPLDA Distribution File, GPDIST, to each system involved so that the job won't bomb. However, it is not necessary to send GPDIST to the requesting system, since it is already there.) It is also not necessary if the status of the LOCCOM record is 16 (initiated remotely); in this case, the data transfer files have already been loaded from the requesting system. (For example, say the GPDIST record and remote CE have been sent to a remote system, where the remote CE is now a local CE with status 16. The GPDIST record is already on that system, so it is not necessary to attempt to send it there again.) If either the entities are the same or the LOCCOM status is 16, skip the rest of the logic in step 3, and continue with step 4 or 5, depending on the type of application.

&end&

;id; A. Retrieve the APPDEF record for the application program name/from rel-mod level/to rel-mod level in LOCCOM. To obtain the correct Application Definition file record for this record call the $APPDF standard subroutine. ;ql;

;id; i. If $APPDF fails in locating the correct APPDEF record. Update LOCCOM with status '62' to indicate that the LOCCOM record could not be processed as no APPDEF record was found. Return to step 1 to read the next record. ;ql;

;id; B. If the LOCCOM applications type (ZLTYPE) is 'CD' (decentralized distribution) or 'CN' (consolidation), entity level files will be used. We have to check to see if the target entity (ZLENT) exists in the Entity Definition File (ENTFIL). If it doesn't exist, update the local CE status to '63' and return to step 1 to process the next record. If it exists, determine if the entity files library (EFFLIB) retrieved above from the ENTFIL record exists by using the CHKOBJ CL command. If the entity files library doesn't exist, update the local CE status to '63' and return to step 1 to process the next record. Otherwise, proceed to step 3C below. ;ql;

;id; C. Change the status from '15' to '55' or '16' to '56'. To indicate that the record is picked up by this processor. This is important in the case of multiple processors; each record should be accessed by only one processor. Update the LOCCOM file with the changed status. ;ql;

;id; D. If the LOCCOM application type is 'CD' (centralized distribution) or 'DD' (decentralized distribution), the sending transfer program should be called to distribute the appropriate file(s) for this application. Both centralized and decentralized distribution functions involve sending information to other systems to be updated there. ;ql;

;id; i. If the status is '55', then call the sending transfer program from APPDEF to load the data transfer files. This is not done for status '56' since this status indicates that the record originated in a REMCOM record. Therefore, the data transfer files have already been loaded. Load the following parameter list before calling the sending transfer program (from APPDEF). ;ql;

```
;id;   PMCSND   PLIST                                          ;ql;
;id;            PARM   PSEND   1A    'S' (send)                ;ql;
;id;            PARM   PCENO  15A    communications entry #    ;ql;
;id;            PARM   PRORL   1A    'L' (local)               ;ql;
;id;            PARM   PGNRC  10A    name of generic transf proc ;ql;
;id;            PARM   PERROR  1A    error code                ;ql;
```

;id; ii. If the sending transfer program does not exist, call MMC030 to send a message to the EM background message queue saying that the sending transfer program for this local CE does not exist. Return to step 1 to process the next record. ;ql;

&int

Design note: We are not providing any recovery mechanism to the user if the sending transfer program, the receiving transfer program, the resource extraction program, the GPLDA sending program, or the GPLDA reformatting program does not exist. The local CE status will remains '55' or '56', thus it will not be picked up by any local communications processors again even after the problem is fixed. The user should cancel this local CE, and he/she has to create another CE to perform the job again.

&end

;id; iii. For both status' ('55' and '56') call the receiving transfer program to bring the information assembled in the data transfer files to the appropriate entity files. Load the following parameter list before calling the receiving transfer program. The PELIB parameter should be loaded with the entity files library (EFFLIB) retrieved in step 3B above for 'DD' type applications, and it should be blank for 'CD' type applications. ;ql;

```
;id;   PMCRCV   PLIST                                          ;ql;
;id;            PARM   PCENO  15A   communications entry #     ;ql;
;id;            PARM   PELIB  10A   entity files library       ;ql;
```

;id; iv. If the receiving transfer program does not exist, call MMC030 to send a message to the EM background message queue saying that the receiving transfer program for this local CE does not exist. Return to step 1 to process the next record. ;ql;

;id; E. If the LOCCOM application type is 'CN' (consolidation), the next step is to submit the actual job queue procedure of the function retrieving the requested information. This involves executing the SBMJOB command, essentially passing as parameters the value of the application field in LOCCOMDT, along with the other usual parameters. This tells the job queue what program to submit, the processing option to pass, and what GPDIST record to retrieve. ;ql;

;id; i. First call the GPLDA sending transfer program for both requesting and non-requesting entities if the CE is initiated on the local system (status = '55'). Load the following parameter list: ;ql;

```
;id;   PMCSND   PLIST                                              ;ql;
;id;            PARM   PSEND   1A   'S' (send)                     ;ql;
;id;            PARM   PCENO  15A   communications entry #         ;ql;
;id;            PARM   PRORL   1A   'L' (local)                    ;ql;
;id;            PARM   PGNRC  10A   name of generic transf proc    ;ql;
;id;            PARM   PERROR  1A   error code                     ;ql;
```

;id; ii. If the GPLDA sending transfer program does not exist, call MMC030 to send a message to the EM background message queue saying that the GPLDA sending transfer program for this local CE does not exist. Return to step 1 to process the next record. ;ql;

;id; iii. Next, if the GPLDA sending transfer program was called successfully, call the GPLDA reformatting program if the CE is locally initiated (status '55') and if it is for a non-requesting entity (ZLENT not equal to ZLOREN) with the following parameters: ;ql;

```
;id;  PMCRCV  PLIST                                             ;ql;
;id;          PARM  PCENO  15A  communications entry #          ;ql;
;id;          PARM  PELIB  10A  entity files library            ;ql;
```

;id; iv. If the GPLDA reformatting program does not exist, call MMC030 to send a message to the EM background message queue saying that the GPLDA reformatting program for this local CE does not exist. Return to step 1 to process the next record. ;ql;

;id; v. Next, if both the GPLDA sending transfer program and the GPLDA reformatting program were called successfully, call the extraction program if the CE is locally initiated (status '55') and if it is for a non-requesting entity (ZLENT not equal to ZLOREN). The requesting entity already contains the extraction file, and remotely initiated CE's already have the data transfer file loaded by the requesting system's remote CE processor. The extraction program name is kept in APPDEF. If the extraction program name in APPDEF is blank, then it is not necessary to call the resource extraction program for this application. If the resource extraction program name is not blank, call the resource extraction program with the following parameters: ;ql;

```
;id;  PMCEXT  PLIST                                             ;ql;
;id;          PARM  PSEND   1A  'S' (send)                      ;ql;
;id;          PARM  PCENO  15A  communications entry #          ;ql;
;id;          PARM  PRORL   1A  'L' (local)                     ;ql;
;id;          PARM  PGNRC  10A  name of generic transf proc     ;ql;
;id;          PARM  PERROR  1A  error code                      ;ql;
```

;id; vi. If the resource extraction program does not exist, call MMC030 to send a message to the EM background message queue saying that the resource extraction program for this local CE does not exist. Return to step 1 to process the next record. ;ql;

;id; vii. If the CE is remotely initiated (status = '56'), call the GPLDA reformatting program to reformat the GPLDA sent from the originating entity and to load the GPLDA into GPDIST file in the entity files library in the target entity. Call the GPLDA reformatting program with the following parameters: ;ql;

```
;id;  PMCRCV  PLIST                                             ;ql;
;id;          PARM  PCENO  15A  communications entry #          ;ql;
;id;          PARM  PELIB  10A  entity files library            ;ql;
```

;id; viii. If the GPLDA reformatting program does not exist, call MMC030 to send a message to the EM background message queue saying that the GPLDA reformatting program for this local CE does not exist. Return to step 1 to process the next record. ;ql;

;id; ix. The job queue to which the job should be submitted should be retrieved from the Communications Definition File (COMDEF). If the status is '55', the job queue will be CQLSJQ, the local job queue for locally initiated CE #. If the status is '56', the job queue will be CQRMJQ, the remote job queue. ;ql;

;id; x. If the CE status is '56', check to see if a System cross-reference file (SYSXRF) record exists for the local system to the LOCCOM originating system (CQSYS/ZLORSY). If one exists, proceed to step (xi). Otherwise, update the CE status to '65' (CE not processed - no SYSXRF record found) and do not submit the job queue procedure. ;ql;

;id; xi. If the job is running in the requesting entity, pass the LOCCOM user profile (ZLUSER) into the user profile parameter in MMC022X. Otherwise, pass 'MARCAM' as the user profile parameter. This will be the user profile used when the job queue procedure is submitted by MMC022X. ;ql;

;id; xii. When submitting the job to the job queue, the entity files library will be added to the library list by MMC022X, so that the correct versions of the files will be used. Load the entity files library retrieved from ENTFIL in step 3B into the PELIB parameter for calling MMC022X. ;ql;

;id; xiii. Call MMC022X to submit the job. MMC022X has six parameters: the job name (Application program name from LOCCOM (ZLPGM) + 'XJ'), the job queue (see above) and the job number, the entity files library, the user profile, and the GPLDA key from LOCCOM. The program is passed the job name, job queue, GPLDA key and entity files library and returns the job number of the submitted job. ;ql;

;id; xiv. When control is returned from MMC022X, update the LOCCOM record with the job number, job name, job start time, job start date and user profile that submitted the job. MZM620X is called to retrieve the current system date in YMD format and the current system time to be loaded into the LOCCOM job start date and job start time fields. These fields will be used for informational purposes only. ;ql;

;hi;B. File Usage ;ql;

| | | | | |
|---|---|---|---|---|
| ;id; | APPDEF | IF | Application Definition File | ;ql; |
| ;id; | COMDEF | IF | Communication Definition File> | ;ql; |
| ;id; | EMBKGD | UF | Enterprise Management Background File | ;ql; |
| ;id; | ENTFIL | IF | Entity File | ;ql; |
| ;id; | LOCCOM | UF | Local Communications Entry File | ;ql; |
| ;id; | LOCCOMDT | UF | Logical View of LOCCOM by Dt/Tm Last Mt | ;ql; |
| ;id; | SYSXRF | IF | System Cross-Reference File | ;ql; |

;ql;;hx;

$END$

```
5738PW1 V2R2M0  920615              SEU SOURCE LISTING                05/28/93 14:08:24          PAGE    1

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
     H*************************************************************      07/22/91
     H*                                                            *      07/22/91
     H*         Release - 03          Mod Level - 10              *      06/26/92
     H*  THIS UNPUBLISHED COPYRIGHTED WORK CONTAINS TRADE SECRET  *      07/22/91
     H*  INFORMATION OF MARCAM CORPORATION.  USE, TRANSFER,       *      07/22/91
     H*  DISCLOSURE, OR COPYING WITHOUT ITS EXPRESSED WRITTEN     *      07/22/91
     H*  PERMISSION IS STRICTLY FORBIDDEN.                  1993  *      06/26/92
     H*                                                            *      07/22/91
     H*  MODULE:              Enterprise Management               *      07/22/91
     H*                                                            *      07/22/91
     H*  PROGRAM NAME:        MMC020 - Local Communications Processor *  07/29/91
     H*                                Program                     *      07/29/91
     H*                                                            *      07/22/91
     H*  FUNCTION:            This program processes the Local    *      07/29/91
     H*                       Communication Entry file (LOCCOM)   *      08/05/91
     H*                                                            *      07/22/91
     H*  CALLING PROGRAM:     MMC020XJ- XJ Procedure to open all  *      07/29/91
     H*                           logical,work and open query files *    07/22/91
     H*                                                            *      07/22/91
     H*  CALLED PROGRAM:      MMC022X - program to submit consolidated*  01/27/92
     H*                                 job queue procedure        *      01/27/92
     H*                       MMC030    Communications Message Sending*  10/07/92
     H*                                 Program                    *      10/07/92
     H*                       MZMG20X - Retrieve Current Date and Time*  09/28/92
     H*                                 Procedure                  *      09/28/92
     H*                       Sending Transfer Program            *      01/27/92
     H*                       Receiving Transfer Program          *      08/05/91
     H*                       GPLDA Sending Transfer Program      *      03/10/92
     H*                       GPLDA Reformatting Program          *      03/10/92
     H*                                                            *      10/07/92
     H*  /COPY INPUT:         NONE                                *      10/14/92
     H*                                                            *      07/22/91
     H*  /COPY ROUTINES:      $APPDF - Application Definition File *     01/27/92
     H*                           retrieval subroutine            *      01/27/92
     H*                                                            *      01/27/92
     H*************************************************************      07/22/91
     H*             P R O G R A M   D E S C R I P T I O N         *      07/22/91
     H*************************************************************      07/22/91
     H*                                                            *      07/22/91
     H* This program is the Local Communications Processor.  It   *      07/29/91
     H* reads through the LOCCOM file and calls the appropriate   *      01/27/92
     H* programs.  If the LOCCOM record is for a distribution     *      01/27/92
     H* (either centralized or decentralized) call the sending    *      01/27/92
     H* transfer program, if needed, and the receiving transfer   *      01/27/92
     H* program as defined in the Applications Definition File    *      01/27/92
     H* (APPDEF). If the LOCCOM record is for a consolidation, call *    01/27/92
     H* MMC022X to submit the appropriate procedure for the       *      01/27/92
     H* LOCCOM record.  The LOCCOM file was defined with the end  *      01/27/92
     H* of file delay.  Therefore, a deactivation record must be  *      01/27/92
     H* encountered to end the processor.  A reset record may be  *      01/27/92
     H* hit to reset the pointer.                                 *      01/27/92
     H*                                                            *      01/27/92
     H*************************************************************      07/22/91
```

```
     5738PW1 V2R2M0  920615              SEU SOURCE LISTING                         05/28/93 14:08:24              PAGE    2

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
 5400      F/SPACE 3                                                                                      07/22/91
 5500      F*****************************************************************                             07/22/91
 5600      F*          F U N C T I O N   O F   I N D I C A T O R S        *                             07/22/91
 5700      F*****************************************************************                             07/22/91
 5800      F*                                                                *                             07/22/91
 5900      F*   98 - General Indicator                                       *                             08/05/91
 6000      F*   99 - General Indicator                                       *                             07/22/91
 6100      F*                                                                *                             07/22/91
 6200      F*****************************************************************                             07/22/91
 6300      F/SPACE 2                                                                                      07/22/91
 6400      F*****************************************************************                             07/22/91
 6500      F*                                                                *                             07/22/91
 6600      F*                        FILE SPECIFICATIONS                     *                             07/22/91
 6700      F*                                                                *                             07/22/91
 6800      F*****************************************************************                             07/22/91
 6900      F*                                                                                             07/22/91
 7000      FAPPDEF  IF  E           K        DISK                                                         07/29/91
 7100      F/SPACE 2                                                                                      07/22/91
 7200      FCOMDEF  IF  E                    DISK                                                         08/01/91
 7300      F/SPACE 2                                                                                      08/01/91
 7400      FEMBRGD  IF  E           K        DISK                                                         07/22/91
 7500      F/SPACE 2                                                                                      08/07/91
 7600      FENTFIL  IF  E           K        DISK                                                         01/28/92
 7700      F/SPACE 2                                                                                      01/28/92
 7800      FLOCCOM  UF  E           K        DISK                                                         08/07/91
 7900      F            FLOCCOM                              KRENAMEQLOCCOM                               08/07/91
 8000      F/SPACE 2                                                                                      08/22/91
 8100      FLOCCOMDTUF  E           K        DISK                        A                                08/22/91
 8200      F/SPACE 2                                                                                      09/21/92
 8300      FSYSXRF  IF  E           K        DISK                                                         09/21/92
 8400      F/SPACE 3                                                                                      07/22/91
 8500      E*****************************************************************                             07/22/91
 8600      E*                                                                *                             07/22/91
 8700      E*               A R R A Y   D E F I N I T I O N                  *                             07/22/91
 8800      E*                                                                *                             07/22/91
 8900      E*****************************************************************                             07/22/91
 9000      I*****************************************************************                             07/22/91
 9100      I*                                                                *                             07/22/91
 9200      I*                      INPUT SPECIFICATIONS                      *                             07/22/91
 9300      I*                                                                *                             07/22/91
 9400      I*****************************************************************                             07/22/91
 9500      I*                                                                                             10/14/92
 9600      I* Externally described data structure to define the parameter                                10/14/92
 9700      I*    list for the EM message sending program, MMC030                                          10/14/92
 9800      I*                                                                                             10/14/92
 9900      I$MC030     E DSDSMC030                                                                        10/14/92
10000      I*                                                                                             07/26/91
10100      I* Data Structure to break down the Communications Entry Number                                01/27/92
10200      I*    which consists of the Number, *RESET, *INIT or *END and the                              01/27/92
10300      I*    job number                                                                               01/27/92
10400      I*                                                                                             01/27/92
10500      IQQCENO      DS                                                                                07/26/91
10600      I                                       1   9 QQTYPE                                           08/05/91
```

```
5738PW1 V2R2M0  920615              SEU SOURCE LISTING                          05/28/93 14:08:24          PAGE    3

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
10700      I                                        10  150QQJOBN                                                 08/05/91
10800      I*                                                                                                     01/27/92
10900      I* Data Structure to break down the release-modification level                                         01/27/92
11000      I*   field which looks similar to 04-00.                                                               01/27/92
11100      I*                                                                                                     01/27/92
11200      IQQRM        DS                                                                                        08/01/91
11300      I                                         1   20QQREL                                                  07/26/91
11400      I                                         4   50QQMOD                                                  07/26/91
11500      I*                                                                                                     05/12/92
11600      I* NAMED CONSTANTS                                                                                     05/12/92
11700      I*                                                                                                     05/12/92
11800      I               'CHKOBJ OBJ('        C          QQCMD1                                                 05/12/92
11900      I               ') OBJTYPE(*LIB)'    C          QQCMD2                                                 05/12/92
12000      I*                                                                                                     10/07/92
12100      I/SPACE 3                                                                                              07/22/91
12200      C*****************************************************************                                     07/22/91
12300      C*                                                              *                                      07/22/91
12400      C*                       CALCULATION SPECS                      *                                      07/22/91
12500      C*                                                              *                                      07/22/91
12600      C*****************************************************************                                     07/22/91
12700      C*                                                              *                                      07/22/91
12800      C*****************************************************************                                     07/22/91
12900      C*                      M A I N L I N E                         *                                      07/22/91
13000      C*****************************************************************                                     07/22/91
13100      C*                                                              *                                      07/22/91
13200      C*   The MAINLINE is executed once.  It calls the subroutine    *                                      01/27/92
13300      C*   PROLOC to process LOCCOM (the Local Communications File).  *                                      01/27/92
13400      C*   The program ends when a 'deactivate' record is encountered *                                      01/27/92
13500      C*   in LOCCOM.  The subroutine ENDPRO will perform any         *                                      04/21/93
13600      C*   final processing and the program ends in the MAINLINE.     *                                      04/21/93
13700      C*                                                              *    SRCE3                             05/20/93
13800      C*****************************************************************    SRCE3                             05/20/93
13900      C*                                                              *    SRCE3                             05/20/93
14000      C*   INDICATORS USED  :  LR                                     *    SRCE3                             05/20/93
14100      C*                                                              *    SRCE3                             05/20/93
14200      C*   EXECUTES         :  ENDPRO  PROLOC                         *    SRCE3                             05/20/93
14300      C*                                                              *    SRCE3                             05/20/93
14400      C*****************************************************************    SRCE3                             05/20/93
14500      C*                                                                   SRCE3                             05/20/93
14600      C           *ENTRY    PLIST                                                                            07/25/91
14700      C                     PARM           $PJOBN                                                            02/05/92
14800      C                     PARM           $PUSPF                                                            02/05/92
14900      C*                                                                                                     04/21/93
15000      C* Process the Local Communications File                                                               04/21/93
15100      C*                                                                                                     04/21/93
15200      C                     EXSR PROLOC                                                                      07/29/91
15300      C*                                                                                                     04/21/93
15400      C* Perform any necessary functions before ending                                                       04/21/93
15500      C*                                                                                                     04/21/93
15600      C                     EXSR ENDPRO                                                                      04/21/93
15700      C*                                                                                                     07/22/91
15800      C                     SETON                     LR                                                     07/30/91
15900      C                     RETRN                                                                            07/30/91
```

```
 5738PW1 V2R2M0  920615                 SEU SOURCE LISTING                        05/28/93 14:08:24            PAGE    4

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
            C*                                                                                      07/22/91
            C/SPACE 2                                                                               07/22/91
            C*********** *INZSR SUBR  ********************** *INZSR SUBR  *                         03/02/92
            C*                                                            *                         07/22/91
            C*  The purpose of the *INZSR subroutine is to perform the    *                         01/27/92
            C*  initial calculations that need to be done on the initial  *                         01/27/92
            C*  call of the program                                       *                         01/27/92
            C*                                                            *   SRCE3                 05/20/93
            C**************************************************************   SRCE3                 05/20/93
            C*                                                            *   SRCE3                 05/20/93
            C*   INDICATORS USED  :  99                                   *   SRCE3                 05/20/93
            C*                                                            *   SRCE3                 05/20/93
            C**************************************************************   SRCE3                 05/20/93
            C*                                                                SRCE3                 05/20/93
            C           *INZSR    BEGSR                                                             03/02/92
            C*                                                                                      07/22/91
            C* Initialize the standard variables.                                                   07/22/91
            C*                                                                                      07/22/91
            C                     MOVE 'M'       MODULE           Module                            10/07/92
            C                     MOVEL'MMC020'  $PGM             Program name                      10/07/92
            C*                                                                                      05/12/92
            C* Set the length of the QCMDEXC string                                                 05/12/92
            C*                                                                                      05/12/92
            C                     Z-ADD36        QQLEN            Length                            05/12/92
            C*                                                                                      08/01/91
            C* Access CMDEF to obtain the job queue information for                                 08/01/91
            C*   the submit job command for type 'Consolidated' LOCCOM                              08/01/91
            C*   local communications records.  This file has only one                              08/01/91
            C*   record therefore it needs to be read only once                                     08/01/91
            C*   (similar to the tailoring files)                                                   08/01/91
            C*                                                                                      08/01/91
            C           1         CHAINCOMDEF               99                                      08/01/91
            C*                                                                                      07/22/91
            C                     ENDSR                       *INZSR          SRCE3                 03/02/92
            C/SPACE 2                                                                               01/27/92
            C********** $DEFSR SUBR  ********************** $DEFSR SUBR  *                          01/27/92
            C*                                                            *                         01/27/92
            C*  The purpose of the $DEFSR subroutine is to define the     *                         01/27/92
            C*  program fields                                            *                         01/27/92
            C*                                                            *   SRCE3                 05/20/93
            C**************************************************************   SRCE3                 05/20/93
            C*                                                            *   SRCE3                 05/20/93
            C*   INDICATORS USED  :  NONE                                 *   SRCE3                 05/20/93
            C*                                                            *   SRCE3                 05/20/93
            C**************************************************************   SRCE3                 05/20/93
            C*                                                                SRCE3                 05/20/93
            C           $DEFSR    BEGSR                                                             01/27/92
            C*                                                                                      01/27/92
            C* Define the standard variables.                                                       01/27/92
            C*                                                                                      01/27/92
            C                     MOVE *BLANKS   MODULE  1        Module                            10/07/92
            C                     MOVE *BLANKS   $PGM    8        Program name                      10/07/92
            C                     MOVE *BLANKS   QQTEMP  1        Temporary Var                     04/22/93
```

```
5738PW1 V2R2M0  920615                SEU SOURCE LISTING                    05/28/93 14:08:24          PAGE    5

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
21300      C*                                                                                              05/12/92
21400      C                       MOVE *BLANKS   QQCMD  36          QCMDEXC command                       05/12/92
21500      C                       Z-ADDO         QQLEN  155         Length                                05/12/92
21600      C*                                                                                              05/12/92
21700      C* *LIKE DEFN the program variables                                                             05/12/92
21800      C*                                                                                              05/12/92
21900      C          *LIKE        DEFN EFFLIB    QQFLIB             Entity Files lib                      05/12/92
22000      C*                                                                                              01/27/92
22100      C* Set up plist for calling the sending transfer program                                        01/27/92
22200      C*    or the GPLDA sending transfer program                                                     03/10/92
22300      C*                                                                                              01/27/92
22400      C          PMCSND       PLIST                                                               01/27/92
22500      C                       PARM           PSEND  1           Indicate Send                         01/27/92
22600      C                       PARM           PCENO              Comm Entry #                          01/27/92
22700      C                       PARM           PRORL  1           Indicate Local                        01/27/92
22800      C                       PARM           PGNRC              Generic Transf                        01/27/92
22900      C                       PARM           PERROR 1           Error Code                            03/11/92
23000      C*                                                                                              01/27/92
23100      C* Set up plist for calling the receiving transfer program                                      01/27/92
23200      C*    or the GPLDA reformatting program                                                         03/10/92
23300      C*                                                                                              01/27/92
23400      C          PMCRCV       PLIST                                                               01/27/92
23500      C                       PARM           PCENO              Comm Entry #                          01/27/92
23600      C                       PARM           PELIB              Ent Files Library                     05/12/92
23700      C*                                                                                              02/05/92
23800      C* Set up plist for calling the resource extraction program                                     02/05/92
23900      C*                                                                                              02/05/92
24000      C          PMCEXT       PLIST                                                               02/05/92
24100      C                       PARM           PSEND              Indicate Send                         02/05/92
24200      C                       PARM           PCENO              Comm Entry #                          02/05/92
24300      C                       PARM           PRORL              Indicate Local                        02/05/92
24400      C                       PARM           PGNRC              Generic Transf                        02/05/92
24500      C                       PARM           PERROR             Error Code                            03/11/92
24600      C*                                                                                              01/27/92
24700      C* Set up plist for calling the submit job program (MMC022X)                                    01/27/92
24800      C*                                                                                              01/27/92
24900      C          PMC022       PLIST                                                               01/27/92
25000      C                       PARM           PJNAME             Job Name                              01/27/92
25100      C                       PARM           PJOBQ              Job queue                             01/27/92
25200      C                       PARM           PJOBD              Job Description                       04/21/93
25300      C                       PARM           PJOBN              Job Number                            01/27/92
25400      C                       PARM           PELIB              Entity Library                        01/28/92
25500      C                       PARM           PUSER              User Profile                          05/03/93
25600      C                       PARM           PGPKY              GPLDA Key                             05/03/93
25700      C*                                                                                              10/07/92
25800      C* Set up plist for calling MMC030, the Communications Message                                  10/07/92
25900      C*   Sending Program.                                                                           10/07/92
26000      C*                                                                                              10/07/92
26100      C          PMC030       PLIST                                                               10/07/92
26200      C                       PARM           $MC030                                               10/07/92
26300      C*                                                                                              09/28/92
26400      C* Set up plist for calling the retrieve date and time                                          09/28/92
26500      C*    procedure (MZM620X)                                                                       09/28/92
```

```
 5738PW1 V2R2M0  920615              SEU SOURCE LISTING               05/28/93 14:08:24         PAGE    6

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
      C*                                                                                    09/28/92
      C           PZM620    PLIST                                                           09/28/92
      C                     PARM           PDATE            Current Date                    09/28/92
      C                     PARM           PTIME            Current Time                    09/28/92
      C*                                                                                    01/27/92
      C* *LIKE DEFN the klist and &plist variables                                          04/20/93
      C*                                                                                    01/27/92
      C           *LIKE     DEFN BGJOBN    $PJOBN           Job Number                      09/21/92
      C           *LIKE     DEFN BGUSER    $PUSPF           User Profile                    09/21/92
      C           *LIKE     DEFN FDFREL    KFREL            From rel-mod lv                 01/28/92
      C           *LIKE     DEFN BGJOB     KJOB             Job Name                        09/21/92
      C           *LIKE     DEFN BGJOBN    KJOBN            Job Number                      09/21/92
      C           *LIKE     DEFN FXLSYS    KLSYS            Local System                    09/21/92
      C           *LIKE     DEFN FDPGM     KPGM             Application Pgm                 09/21/92
      C           *LIKE     DEFN FDRENT    KRENT            Remote Entity                   05/20/93
      C           *LIKE     DEFN FXRSYS    KRSYS            Remote System                   09/21/92
      C           *LIKE     DEFN FDTREL    KTREL            To rel-mod levl                 01/28/92
      C           *LIKE     DEFN BGUSER    KUSER            User Profile                    01/28/92
      C*                                                                                    09/21/92
      C* *LIKE DEFN the plist parameters                                                    09/21/92
      C*                                                                                    09/21/92
      C           *LIKE     DEFN ZLCENO    PCENO            Comm Entry #                    01/28/92
      C           *LIKE     DEFN ZLDATE    PDATE            Current Date                    09/28/92
      C           *LIKE     DEFN FFELIB    PELIB            Entity Library                  09/22/92
      C           *LIKE     DEFN FDGPGM    PGNRC            Generic Trans P                 01/28/92
      C           *LIKE     DEFN FDCPKY    PCPKY            CPPLN Key                       09/21/92
                  *LIKE     DEFN ZLJBNM    PJNAME           Job Name                        09/21/92
      C           *LIKE     DEFN ZLJBNO    PJOBN            Job Number                      01/27/92
      C           *LIKE     DEFN CQRESQ    PJOBQ            Job queue                       09/21/92
      C           *LIKE     DEFN CQJOBD    PJOBD            Job Description                 04/21/93
      C           *LIKE     DEFN ZLTMNT    PTIME            Current Time                    09/28/92
      C           *LIKE     DEFN ZLUSER    PUSER            User Profile                    05/03/93
      C*                                                                                    01/27/92
      C* Set up Key list for retrieving information from the                                01/27/92
      C*    the Application Definition file (APPDEF)                                        01/27/92
      C*                                                                                    01/27/92
      C           KAPPDE    KLIST                                                           01/27/92
      C                     KFLD           KPGM                                             01/27/92
      C                     KFLD           KFREL                                            01/27/92
      C                     KFLD           KTREL                                            01/27/92
      C*                                                                                    01/27/92
      C* Set up Key list for deleting a record in the background file                       01/27/92
      C*    (EMBKGD) for this processor.                                                    01/27/92
      C*                                                                                    01/27/92
      C           KEMBKG    KLIST                                                           01/27/92
      C                     KFLD           KJOB                                             01/27/92
      C                     KFLD           KUSER                                            01/27/92
      C                     KFLD           KJOBN                                            01/27/92
      C*                                                                                    01/27/92
      C* Set up Key list for accessing the system cross-reference file                      09/21/92
      C*    (SYSXRF).                                                                       09/21/92
      C*                                                                                    01/27/92
      C           KSYSXR    KLIST                                                           09/21/92
```

```
5738PW1 V2R2M0  920615              SEU SOURCE LISTING                    05/28/93 14:08:24          PAGE    7

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
31900      C                    KFLD           KLSYS                                                        09/21/92
32000      C                    KFLD           KRSYS                                                        09/21/92
32100      C                    KFLD           KRENT                                                        05/20/93
32200      C*                                                                                               09/21/92
32300      C                    ENDSR                                $DEFSR         SRCE3                   01/27/92
32400      C/SPACE 2                                                                                        08/07/91
32500      C/COPY MMDDSSRC,$APPDF                                                                           08/07/91
32600      C/SPACE 2                                                                                        08/01/91
32700      C*********** CONSOL SUBR  ********************** CONSOL SUBR  *                                 08/01/91
32800      C*                                                           *                                   08/01/91
32900      C*   The CONSOL subroutine processes the LOCCOM records of    *                                   08/01/91
33000      C*       type 'CN' consolidated.  The job queue procedure for *                                   01/27/92
33100      C*       the application which handles all sending of data is *                                   01/27/92
33200      C*       submitted by MMC022.                                 *                                   01/27/92
33300      C*   Consolidation involves gathering all the information from *                                  08/01/91
33400      C*       the selected entities to be used in a consolidated   *                                   08/01/91
33500      C*       report or inquiry.                                   *                                   08/01/91
33600      C*                                                            *  SRCE3                            05/20/93
33700      C*************************************************************  SRCE3                            05/20/93
33800      C*                                                            *  SRCE3                            05/20/93
33900      C*   INDICATORS USED  :  98                                   *  SRCE3                            05/20/93
34000      C*                                                            *  SRCE3                            05/20/93
34100      C*   EXECUTED FROM    :  PRORCD                               *  SRCE3                            05/20/93
34200      C*                                                            *  SRCE3                            05/20/93
34300      C*************************************************************  SRCE3                            05/20/93
34400      C*                                                               SRCE3                            05/20/93
34500      C          CONSOL    BEGSR                                                                   08/01/91
34600      C*                                                                                               09/21/92
34700      C* Do one time.                                                                                  09/21/92
34800      C*                                                                                               09/21/92
34900      C                    DO   1                                                                      09/21/92
35000      C*                                                                                               01/28/92
35100      C* For locally initiated LOCCOM record:                                                          07/01/92
35200      C*   - call the GPLDA sending transfer program to set up                                         07/01/92
35300      C*     the GPDIST records.                                                                       07/01/92
35400      C*                                                                                               07/01/92
35500      C          ZLSTAT    IFEQ '55'                                                                   07/01/92
35600      C*                                                                                               07/01/92
35700      C                    MOVE 'S'       PSEND                                                        01/28/92
35800      C                    MOVE ZLCENO    PCENO                                                        01/28/92
35900      C                    MOVE 'L'       PRORL                                                        01/28/92
36000      C                    MOVE FDGPGM    PGNRC                                                        03/11/92
36100      C                    MOVE '0'       PERROR                                                       03/11/92
36200      C                    CALL FDFPGM    PMCSND      98                                               10/07/92
36300      C*                                                                                               10/07/92
36400      C*   - if the call fails (*IN98 is on), call MMC030 to send                                      10/07/92
36500      C*     a message to the EM background message queue saying                                       10/07/92
36600      C*     that the GPLDA sending transfer program doesn't exist.                                    10/07/92
36700      C*     Load $LIT1 with the literal sequence # for the name of                                    10/28/92
36800      C*     the program that doesn't exist, and $LIT2 with the                                        10/28/92
36900      C*     literal sequence # for the CE type.                                                       10/28/92
37000      C*     Then leave the do loop to stop further processing.                                        10/07/92
37100      C*                                                                                               10/07/92
```

```
5738PW1 V2R2M0  920615                SEU SOURCE LISTING                    05/28/93 14:08:24        PAGE   8

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
37200      C           *IN98     IFEQ *ON                                                       10/07/92
37300      C                     MOVE MODULE   $MODCD                                           10/07/92
37400      C                     MOVE '00469'  $ERRNO          Message #M00469                  10/07/92
37500      C                     MOVE ZLCENO   $CENUM          CE #                             10/07/92
37600      C                     MOVE '00015'  $LIT1           'GPLDA and pgm'                  10/07/92
37700      C                     MOVE '00018'  $LIT2           'Local'                          10/07/92
37800      C                     CALL 'MMC030' PMC030                                           10/07/92
37900      C                     LEAVE                                                          10/07/92
38000      C                     ENDIF                         *IN98=*ON                        10/07/92
38100      C*                                                                                   05/20/93
38200      C           PERROR    IFNE 'U'                                                       05/20/93
38300      C                     LEAVE                                                          05/20/93
38400      C                     ENDIF                         PERROR='U'                       05/20/93
38500      C*                                                                                   03/10/92
38600      C*  - if the LOCCOM record is for a non-requesting entity,                           07/01/92
38700      C*    perform the following program calls to set up the                              07/01/92
38800      C*    GPDIST records and the resource extraction files.                              07/01/92
38900      C*    The information is not sent if the LOCCOM is for the                           07/01/92
39000      C*    requesting entity because they already reside there.                           07/01/92
39100      C*                                                                                   07/01/92
39200      C           ZLENT     IFNE ZLOREN                                                    07/01/92
39300      C*                                                                                   05/20/93
39400      C*     1. Call the GPLDA reformatting program to reformat the                        05/20/93
39500      C*        GPLDA to the target entity's format if the GPLDA                           05/20/93
39600      C*        sending program was called successfully.                                   05/20/93
39700      C*                                                                                   05/20/93
39800      C                     MOVE ZLCENO   PCENO                                            05/20/93
39900      C                     MOVE QQFLIB   PFLIB                                            05/20/93
40000      C                     CALL FDXFGM   PMCRCV      98                                   05/20/93
40100      C*                                                                                   05/20/93
40200      C*  - if the call fails (*IN98 is on), call MMC030 to send                           05/20/93
40300      C*    a message to the EM background message queue saying                            05/20/93
40400      C*    that the GPLDA reformatting program doesn't exist.                             05/20/93
40500      C*    Load $LIT1 with the literal sequence # for the name of                         05/20/93
40600      C*    the program that doesn't exist, and $LIT2 with the                             05/20/93
40700      C*    literal sequence # for the CE type.                                            05/20/93
40800      C*    Then leave the do loop to stop further processing.                             05/20/93
40900      C*                                                                                   05/20/93
41000      C           *IN98     IFEQ *ON                                                       05/20/93
41100      C                     MOVE MODULE   $MODCD                                           05/20/93
41200      C                     MOVE '00469'  $ERRNO          Message #M00469                  05/20/93
41300      C                     MOVE ZLCENO   $CENUM          CE #                             05/20/93
41400      C                     MOVE '00016'  $LIT1           'GPLDA refmt p'                  05/20/93
41500      C                     MOVE '00018'  $LIT2           'Local'                          05/20/93
41600      C                     CALL 'MMC030' PMC030                                           05/20/93
41700      C                     LEAVE                                                          05/20/93
41800      C                     ENDIF                         *IN98=*ON                        05/20/93
41900      C*                                                                                   07/01/92
42000      C*     2. Call the Resource extraction program if one exists                         05/20/93
42100      C*        and if the GPLDA was sent successfully.                                    09/04/92
42200      C*                                                                                   03/10/92
42300      C           FDEPGM    IFNE *BLANKS                                                   05/20/93
42400      C                     CALL FDEPGM   PMCEXT      98                                   10/07/92
```

```
5738PW1 V2R2M0  920615            SEU SOURCE LISTING            05/28/93 14:08:24          PAGE    9

SOURCE FILE . . . . . . .   XLIBEM/MRPGSRC
MEMBER  . . . . . . . . .   MMC020

SEQNBR*...+... 1 ...+... 2 ...+... 3 ...+... 4 ...+... 5 ...+... 6 ...+... 7 ...+... 8 ...+... 9 ...+... 0
     C*                                                                                  10/07/92
     C*  - If the call fails (*IN98 is on), call MMC030 to send                          10/07/92
     C*     a message to the EM background message queue saying                         10/07/92
     C*     that the Resource extraction program doesn't exist.                          10/07/92
     C*     Load $LIT1 with the literal sequence # for the name of                       10/28/92
     C*     the program that doesn't exist, and $LIT2 with the                           10/28/92
     C*     literal sequence # for the CE type.                                          10/28/92
     C*     Then leave the do loop to stop further processing.                           10/07/92
     C*                                                                                  10/07/92
     C           *IN98     IFEQ *ON                                                      10/07/92
     C                     MOVE MODULE    $MODCD                                         10/07/92
     C                     MOVE '00469'   $ERRNO           Message #M00469               10/07/92
     C                     MOVE ZLCENO    $CENUM           CE #                          10/07/92
     C                     MOVE '00012'   $LIT1            'Resc extr pgm'               10/07/92
     C                     MOVE '00019'   $LIT2            'Local'                       10/07/92
     C                     CALL 'MMC030'  PMC030                                         10/07/92
     C                     LEAVE                                                         10/07/92
     C                     ENDIF                           *IN98 =*ON                    10/07/92
     C*                                                                                  05/20/93
     C           PERROR    IFNE '0'                                                      05/20/93
     C                     LEAVE                                                         05/20/93
     C                     ENDIF                           PERROR='0'                    05/20/93
     C*                                                                                  10/07/92
     C                     ENDIF                           FDEPGM<>*BLANKS               05/20/93
     C*                                                                                  10/07/92
     C                     ENDIF                           ZLFNT<>ZLOREN                 01/28/92
     C*                                                                                  07/01/92
     C                     ENDIF                           ZLSTAT='55'                   07/01/92
     C*                                                                                  03/10/92
     C* If the local communication record was remotely initiated                         03/10/92
     C*  (status '56'), call the GPLDA reformatting program to reformat                  03/12/92
     C*  the GPLDA sent from the originating entity to the target                        03/12/92
     C*  entity's format                                                                 03/12/92
     C*                                                                                  03/10/92
     C           ZLSTAT    IFEQ '56'                                                     03/11/92
     C                     MOVE ZLCENO    PCENO                                          03/10/92
     C                     MOVE QQFLIB    PELIB                                          05/12/92
     C                     CALL FDXPGM    PMCRCV      98                                 10/07/92
     C*                                                                                  10/07/92
     C*  - If the call fails (*IN98 is on), call MMC030 to send                          10/07/92
     C*     a message to the EM background message queue saying                         10/07/92
     C*     that the GPLDA reformatting program doesn't exist.                           10/07/92
     C*     Load $LIT1 with the literal sequence # for the name of                       10/28/92
     C*     the program that doesn't exist, and $LIT2 with the                           10/28/92
     C*     literal sequence # for the CE type.                                          10/28/92
     C*     Then leave the do loop to stop further processing.                           10/07/92
     C*                                                                                  10/07/92
     C           *IN98     IFEQ *ON                                                      10/07/92
     C                     MOVE MODULE    $MODCD                                         10/07/92
     C                     MOVE '00469'   $ERRNO           Message #M00469               10/07/92
     C                     MOVE ZLCENO    $CENUM           CE #                          10/07/92
     C                     MOVE '00016'   $LIT1            'GPLDA refmt p'               10/07/92
     C                     MOVE '00018'   $LIT2            'Local'                       10/07/92
```

```
5738PW1 V2R2M0  920615              SEU SOURCE LISTING                     05/28/93 14:08:24          PAGE   10

SOURCE FILE . . . . . . .   XLIBEM/MRPGSRC
MEMBER  . . . . . . . . .   MMC020

SEQNBR*...+... 1 ...+... 2 ...+... 3 ...+... 4 ...+... 5 ...+... 6 ...+... 7 ...+... 8 ...+... 9 ...+... 0
47800      C                    CALL 'MMC030'  PMC030                                              10/07/92
47900      C                    LEAVE                                                              10/07/92
48000      C                    ENDIF                          *IN90=*ON                           10/07/92
48100      C*                                                                                      10/07/92
48200      C                    ENDIF                          ZLSTAT='56'                         03/10/92
48300      C*                                                                                      03/10/92
48400      C* When the LOCCOM record is of type 'CN' (consolidated) the                            03/10/92
48500      C*   program must submit the XJ to gather the information                               03/10/92
48600      C*   into the data transfer files. When all the information                             03/10/92
48700      C*   has been gathered, then the entity which requested the                             03/10/92
48800      C*   consolidated information will call the receiving                                   03/10/92
48900      C*   transfer program to gather all the DTFs to create the                              03/10/92
49000      C*   report or inquiry.                                                                 03/10/92
49100      C*                                                                                      08/01/91
49200      C* If the status is '55' then submit the application program                            08/07/91
49300      C*   procedure to the local job queue (CQLSJQ). If running in                           05/03/93
49400      C*   the requesting entity, submit the procedure under the user                         05/03/93
49500      C*   profile in LOCCOM. Otherwise, use MARCAM as the user profile.                      05/03/93
49600      C*                                                                                      08/01/91
49700      C          ZLSTAT    IFEQ '55'                                                          08/07/91
49800      C                    MOVE CQLSJQ    PJOBQ                                               08/06/91
49900      C                    MOVE CQJOBD    PJOBD                                               04/21/93
50000      C          ZLPGM     CAT  'XJ':0    PJNAME                                              08/07/91
50100      C                    MOVE ZLGPKY    PGPKY                                               02/05/92
50200      C                    MOVE QQFLIB    PELIB                                               05/12/92
50300      C          ZLENT     IFEQ ZLOREN                                                        05/03/93
50400      C                    MOVE ZLUSER    PUSER                                               05/03/93
50500      C                    ELSE                                                               05/03/93
50600      C                    MOVEL'MARCAM'  PUSER     P     Pad w/blanks                        05/03/93
50700      C                    ENDIF                          ZLENT=ZLOREN                        05/03/93
50800      C                    CALL 'MMC022X' PMC022                                              08/05/91
50900      C                    ENDIF                          ZLSTAT='55'                         08/01/91
51000      C*                                                                                      08/01/91
51100      C* If the status is '56':                                                               09/21/92
51200      C* - first check to see if a record exists for the local                                09/21/92
51300      C*   system/LOCCOM originating system. If it does not exist,                            09/21/92
51400      C*   update the CE status to '65' and leave the do loop so                              09/21/92
51500      C*   that the application program procedure will not be                                 09/21/92
51600      C*   submitted and the LOCCOM record won't be updated with                              09/21/92
51700      C*   the submitted job information.                                                     05/03/93
51800      C*                                                                                      08/01/91
51900      C          ZLSTAT    IFEQ '56'                                                          08/07/91
52000      C                    MOVE CQSYS     KLSYS                                               09/21/92
52100      C                    MOVE ZLORSY    KRSYS                                               09/21/92
52200      C                    MOVE *BLANKS   KRENT                                               05/20/93
52300      C          KSYSXR    CHAINSYSXRF               98                                       09/21/92
52400      C          *IN98     IFEQ *ON                                                           09/21/92
52500      C          ZLCENO    CHAINLOCCOM               98                                       09/21/92
52600      C          *IN98     IFEQ *OFF                                                          09/21/92
52700      C                    MOVE '65'      ZLSTAT                                              09/21/92
52800      C                    CALL 'MZM620X' PZM620          Get date & time                     09/28/92
52900      C                    Z-ADDPTIME     ZLTMMT                                              09/28/92
53000      C                    Z-ADDPDATE     ZLDTMT                                              09/28/92
```

```
5738PW1 V2R2M0  920615                SEU SOURCE LISTING                05/28/93 14:08:24            PAGE   11

SOURCE FILE . . . . . . .   XLIBEM/MRPGSRC
MEMBER  . . . . . . . . .   MMC020

SEQNBR*...+... 1 ...+... 2 ...+... 3 ...+... 4 ...+... 5 ...+... 6 ...+... 7 ...+... 8 ...+... 9 ...+... 0
53100      C                    UPDATQLOCCOM                                                          09/21/92
53200      C                    ENDIF                          *IN98=*OFF                             09/21/92
53300      C                    LEAVE                                                                 09/21/92
53400      C                    ENDIF                          *IN98=*ON                              09/21/92
53500      C*                                                                                         09/21/92
53600      C* - If a SYSXRF record exists, submit the application program                             09/21/92
53700      C*   procedure to the remote job queue (CQRSJQ). The procedure                             05/03/93
53800      C*   is submitted using the MARCAM user profile.                                           05/03/93
53900      C*                                                                                         09/21/92
54000      C                    MOVE CQRSJQ    PJOBQ                                                  08/06/91
54100      C                    MOVE CQJOBD    PJOBD                                                  04/21/93
54200      C          ZLJBSM    CAT  'XJ':0    PJNAME                                                 03/07/91
54300      C                    MOVE ZLGPKY    PGPKY                                                  02/05/92
54400      C                    MOVE QQFLIB    PELIB                                                  05/12/92
54500      C                    MOVEL'MARCAM'  PUSER       P       Pad w/blanks                       05/03/93
54600      C                    CALL 'MMC022'  PXC022                                                 09/05/91
54700      C                    ENDIF                          ZLSTAT='56'                            08/01/91
54800      C*                                                                                         08/01/91
54900      C* Read the LOCCOM record that is currently being processed by                             04/20/93
55000      C*   chaining with the communications entry number.                                        08/07/91
55100      C* Update the LOCCOM record with the submitted job information:                            08/07/91
55200      C*   Job #, Job name, Job start date, Job start time                                       08/07/91
55300      C*                                                                                         08/07/91
55400      C          ZLCENO    CHAINLOCCOM               98                                      09/21/92
55500      C          *IN98     IFEQ *OFF                                                             01/27/92
55600      C                    Z-ADDPJOBN     ZLJBNO                                                 08/07/91
55700      C                    MOVE PJNAME    ZLJBNM                                                 08/07/91
55800      C                    CALL 'MAMC20X' PZM520          Get date & time                        09/28/92
55900      C                    Z-ADDPTIME     ZLJBST                                                 09/28/92
56000      C                    Z-ADDPDATE     ZLJBSD                                                 09/28/92
56100      C                    MOVE $PUSPF    ZLUSER                                                 02/05/92
56200      C                    Z-ADDPTIME     ZLTMMT                                                 09/28/92
56300      C                    Z-ADDPDATE     ZLDTMT                                                 09/28/92
56400      C                    UPDATQLOCCOM                                                          08/07/91
56500      C                    ENDIF                          *IN98=*OFF                             08/07/91
56600      C*                                                                                         08/01/91
56700      C                    ENDDO                          DO 1                                   09/21/92
56800      C*                                                                                         09/21/92
56900      C                    ENDSR                          CONSOL         SRCE3                   08/01/91
57000      C/SPACE 2                                                                                  08/01/91
57100      C**********  DISTRB SUBR  **********************  DISTRB SUBR  *                           08/01/91
57200      C*                                                              *                          08/01/91
57300      C*   The DISTRB subroutine processes the LOCCOM records of      *                          08/01/91
57400      C*       type 'CD' or 'DD' - centralized and decentralized      *                          08/01/91
57500      C*       distribution.                                          *                          08/01/91
57600      C*   Distribution involves passing information to another       *                          08/01/91
57700      C*       entity, handled by the sending transfer program.  That *                          01/27/92
57800      C*       information may then need to be updated into the       *                          01/27/92
57900      C*       actual database files, handled by the receiving        *                          01/27/92
58000      C*       transfer program.                                      *                          01/27/92
58100      C*                                                              *  SRCE3                   05/20/93
58200      C****************************************************************  SRCE3                   05/20/93
58300      C*                                                              *  SRCE3                   05/20/93
```

5738PW1 V2R2M0 920615 SEU SOURCE LISTING 05/28/93 14:08:24 PAGE 12

```
SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
58400   C*  INDICATORS USED  :  98                                    *   SRCE3        05/20/93
58500   C*                                                            *   SRCE3        05/20/93
58600   C*  EXECUTED FROM    :  PRORCD                                *   SRCE3        05/20/93
58700   C*                                                            *   SRCE3        05/20/93
58800   C*************************************************************   SRCE3        05/20/93
58900   C*                                                                             08/01/91
59000   C           DISTRB    BEGSR                                                    08/01/91
59100   C*                                                                             08/07/91
59200   C* If the status of the LOCCOM record is '55', then call the                   08/01/91
59300   C*   sending transfer program to load the data transfer files.                 08/07/91
59400   C*   (status '56' indicates that the record originated in a                    08/01/91
59500   C*    REMCOM record therefore the data transfer files have                     08/01/91
59600   C*    already been loaded)                                                     04/01/92
59700   C*                                                                             04/01/92
59800   C* Load PERROR before determining if status is 55, because                     04/01/92
59900   C*    the receiving transfer is called if status is 55 and                     04/01/92
60000   C*    and only if PERROR is '0' (the sending transfer program                  04/01/92
60100   C*    may return with an error - the receiving transfer will not               04/01/92
60200   C*    be called).                                                              08/01/91
60300   C*                                                                             03/31/92
60400   C                     MOVE '0'       PERROR                                    03/31/92
60500   C*                                                                             08/07/91
60600   C           ZLSTAT    IFEQ '55'                                                08/01/91
60700   C                     MOVE 'S'       PSEND                                     08/01/91
60800   C                     MOVE ZLCENO    PCENO                                     08/01/91
60900   C                     MOVE 'L'       PHORL                                     08/01/91
61000   C                     MOVE ZLCPGM    PGNRC                                     08/07/91
61100   C*                                                                             10/07/92
61200   C                     CALL FDSPGM    PMCSND      98                            10/07/92
61300   C*                                                                             10/07/92
61400   C*   - If the call fails (*IN98 is on), call MMC030 to send                    10/07/92
61500   C*     a message to the EM background message queue saying                    10/07/92
61600   C*     that the sending transfer program doesn't exist.                        10/28/92
61700   C*     Load $LIT1 with the literal sequence # for the name of                  10/28/92
61800   C*     the program that doesn't exist, and $LIT2 with the                      10/28/92
61900   C*     literal sequence # for the CE type.                                     10/07/92
62000   C*                                                                             10/07/92
62100   C           *IN98     IFEQ *ON                                                 10/07/92
62200   C                     MOVE MODULE    $MODCD                                    10/07/92
62300   C                     MOVE '00469'   $ERRNO          Message #M00469           10/07/92
62400   C                     MOVE ZLCENO    $CENUM          CE #                      10/07/92
62500   C                     MOVE '00013'   $LIT1           'Send xfer pgm'           10/07/92
62600   C                     MOVE '00018'   $LIT2           'Local'                   10/07/92
62700   C                     CALL 'MMC030'  PMC030                                    10/07/92
62800   C                     ENDIF                          *IN98=*ON                 10/07/92
62900   C*                                                                             08/01/91
63000   C                     ENDIF                          ZLSTAT='55'               08/01/91
63100   C*                                                                             08/01/91
63200   C* Call the receiving transfer program to move the data from                   03/11/92
63300   C*   the data transfer files to the actual files as long as                    03/11/92
63400   C*   sending transfer completed normally.                                      08/01/91
63500   C*                                                                             03/11/92
63600   C           PERROR    IFEQ '0'
```

```
5738PW1 V2R2M0  920615                 SEU SOURCE LISTING                 05/28/93 14:08:24          PAGE   13

SOURCE FILE . . . . . . .   XLIBEM/MRPGSRC
MEMBER  . . . . . . . . .   MMC020

SEQNBR*...+... 1 ...+... 2 ...+... 3 ...+... 4 ...+... 5 ...+... 6 ...+... 7 ...+... 8 ...+... 9 ...+... 0
63700     C          *IN98     ANDEQ*OFF                                                              10/07/92
63800     C                    MOVE ZLCENO    PCENO                                                   08/01/91
63900     C                    MOVE QQFLIB    PELIB                                                   05/12/92
64000     C                    CALL FDRPGM    PMCRCV      98                                          10/07/92
64100     C*                                                                                          10/07/92
64200     C*    - if the call fails (*IN98 is on), call MMC030 to send                                10/07/92
64300     C*      a message to the EM background message queue saying                                 10/07/92
[illegible] C*    that the receiving transfer program doesn't exist.                                  10/07/92
64500     C*      Load $LIT1 with the literal sequence # for the name of                              10/28/92
[illegible] C*    the program that doesn't exist, and $LIT2 with the                                  10/28/92
64700     C*      literal sequence # for the CE type.                                                 10/28/92
64800     C*                                                                                          10/07/92
64900     C          *IN98     IFEQ *ON                                                               10/07/92
65000     C                    MOVE MODULE    $MODCD                                                  10/07/92
65100     C                    MOVE [illegible] $[illegible]       Message #M00169                    10/07/92
65200     C                    MOVE [illegible] $CENUM            [illegible]                         10/07/92
65300     C                    MOVE [illegible] $[illegible]      [illegible]                         10/07/92
65400     C                    MOVE [illegible] $LIT2             '[illegible]'                       10/07/92
65500     C                    CALL 'MMC030'  PMC030                                                  10/07/92
65600     C                    ENDIF                           *IN98=*ON                              10/07/92
65700     C*                                                                                          10/07/92
65800     C                    ENDIF                           PERROR='0'                             03/11/92
65900     C*                                                                                          08/01/91
66000     C                    ENDSR                           DISTRB         SRCE3                   01/28/92
66100     C/SPACE 2                                                                                   07/25/91
66200     C*********  ENDPRO SUBR  *************************  ENDPRO SUBR  *                         07/25/91
66300     C*                                                               *                          07/25/91
66400     C*   The ENDPRO subroutine ends the processor if a '*END'        *                          07/25/91
66500     C*       request was hit or processing ended.                    *                          04/21/93
66600     C*                                                               *  SRCE3                   05/20/93
66700     C*****************************************************************  SRCE3                   05/20/93
66800     C*                                                               *  SRCE3                   05/20/93
66900     C*   INDICATORS USED  :  99                                      *  SRCE3                   05/20/93
67000     C*                                                               *  SRCE3                   05/20/93
67100     C*   EXECUTED FROM    :  MAINLN                                  *  SRCE3                   05/20/93
67200     C*                                                               *  SRCE3                   05/20/93
67300     C*****************************************************************  SRCE3                   05/20/93
67400     C*                                                                  SRCE3                   05/20/93
67500     C          ENDPRO    BEGSR                                                                  07/25/91
67600     C*                                                                                          07/25/91
67700     C* Delete the correct EM background file record (EMBKGD) for                                07/26/91
67800     C*     this job/user profile/job number.                                                    07/26/91
67900     C*                                                                                          07/25/91
68000     C                    MOVEL'MMC020XJ'KJOB                                                    07/29/91
68100     C                    MOVEL$PUSPF    KUSER                                                   02/05/92
68200     C                    Z-ADD$PJOBN    KJOBN                                                   02/05/92
68300     C*                                                                                          07/26/91
68400     C          KEMBKG    CHAINEMBKGD               99                                           07/25/91
68500     C          *IN99     IFEQ *OFF                                                              01/27/92
68600     C                    DELETEMBKGD                                                            07/25/91
68700     C                    ENDIF                           *IN99=*OFF                             07/25/91
68800     C*                                                                                          04/22/93
68900     C* Delete any Special records (*END, *RESET or *INIT) from the                              04/22/93
```

```
5738PW1 V2R2M0  920615                    SEU SOURCE LISTING                    05/28/93 14:08:24          PAGE   14

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
69000      C*   file for the specific job.  Because these begin with '*'                          04/22/93
69100      C*   the records will all appear at the beginning of the file                          04/22/93
69200      C*   so when a non-'*' entry is found, end the loop.                                   04/22/93
69300      C*                                                                                     04/22/93
69400      C          *LOVAL    SETLLLOCCOM                                                       04/22/93
69500      C          *IN99     DOUEQ*ON                                                          04/22/93
69600      C                    READ LOCCOM                   99                                  04/22/93
69700      C          *IN99     IFEQ *OFF                                                         04/22/93
69800      C*                                                                                     04/22/93
69900      C*    Check for a special record                                                       04/22/93
70000      C*                                                                                     04/22/93
70100      C                    MOVE ZLCENO    QQCENO                                             04/22/93
70200      C          QQJOBN    IFEQ $PJOBN                                                       04/22/93
70300      C          QQTYPE    IFEQ '*INIT'                                                      04/22/93
70400      C          QQTYPE    OREQ '*END'                                                       04/22/93
70500      C          QQTYPE    OREQ '*RESET'                                                     04/22/93
70600      C                    DELET[illegible]                                                  04/22/93
70700      C                    ENDIF                               QQTYPE '*INIT'                04/22/93
70800      C                    ENDIF                               [illegible]=$PJOBN            04/22/93
70900      C*                                                                                     04/22/93
71000      C*     Check if end of special records                                                 04/22/93
71100      C*                                                                                     04/22/93
71200      C          1         SUBSTQQTYPE:1  QQTEMP                                             04/22/93
71300      C          QQTEMP    IFNE '*'                                                          04/22/93
71400      C                    UNLCKLOCCOM                                                       04/22/93
71500      C                    LEAVE                                                             04/22/93
71600      C                    ENDIF                               QQTEMP<>'*'                   04/22/93
71700      C*                                                                                     04/22/93
71800      C                    ENDIF                               *IN99 *OFF                    04/22/93
71900      C                    ENDDO                               DOU *IN99 *ON                 04/22/93
72000      C*                                                                                     07/25/91
72100      C*                                                                                     07/25/91
72200      C                    ENDSR                               ENDPRO         SRCE3          07/22/91
72300      C/SPACE 2                                                                              07/29/91
72400      C*********  PROLOC SUBR  **********************  PROLOC SUBR  *                        07/22/91
72500      C*                                                               *                     01/27/92
72600      C*  The PROLOC subroutine processes the LOCCOMDT file by         *                     01/27/92
72700      C*    determining if the record is an initialization, reset,     *                     01/27/92
72800      C*    end record, or normal LOCCOM record.                       *      SRCE3          05/20/93
72900      C*                                                               *      SRCE3          05/20/93
73000      C*****************************************************************      SRCE3          05/20/93
73100      C*                                                               *      SRCE3          05/20/93
73200      C*  INDICATORS USED  :  98  99                                   *      SRCE3          05/20/93
73300      C*                                                               *      SRCE3          05/20/93
73400      C*  EXECUTES         :  PRORCD  RSTPRO                           *      SRCE3          05/20/93
73500      C*                                                               *      SRCE3          05/20/93
73600      C*  EXECUTED FROM    :  MAINLN                                   *      SRCE3          05/20/93
73700      C*                                                               *      SRCE3          05/20/93
73800      C*****************************************************************      SRCE3          05/20/93
73900      C*                                                                                     07/29/91
74000      C          PROLOC    BEGSR                                                             07/22/91
74100      C*                                                                                     01/27/92
74200      C          *IN99     DOWEQ*OFF
```

```
5738PW1 V2R2M0  920615              SEU SOURCE LISTING                 05/28/93 14:08:24            PAGE   15

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
           C*                                                                                       07/22/91
           C                    READ LOCCOMDT                99                                     07/30/91
           C*                                                                                       02/03/93
           C* If a shut down request is issued for this job, end                                    02/03/93
           C*    the processor.                                                                     02/03/93
           C*                                                                                       02/03/93
           C                    SHTDN                    98                                         02/03/93
           C          *IN98     IFEQ *ON                                                            02/03/93
           C                    UNLCKLOCCOMDT                                                       04/30/93
           C                    LEAVE                                                               04/21/93
           C                    ENDIF                           *IN98=*ON                           02/03/93
           C*                                                                                       02/03/93
           C          *IN99     IFEQ *OFF                                                           01/27/92
           C*                                                                                       07/26/91
           C* The CE # is a combination of *RESET or *END and the job                               07/29/91
           C*    [illegible] normal communications [illegible]                                      07/29/91
           C*    The variable QQ[illegible] data structure which [illegible]                        07/29/91
           C*    into QQTYPE(*RESET or *END) and QQJOBN(job number)                                 08/05/91
           C*                                                                                       07/29/91
           C                    MOVE ZLCENO    QQCENO                                               07/29/91
           C*                                                                                       08/09/91
           C* Check the CE # to determine if this is an initialization                              08/09/91
           C*    request. Check if the record corresponds with this job.                            08/09/91
           C*    Return to read another record.                                                     08/09/91
           C*                                                                                       08/09/91
           C          QQTYPE    IFEQ '*INIT'                                                        08/09/91
                      QQJOBN    IFEQ $PJOBN                                                         02/05/92
           C                    DELETFLOCCOM                                                        08/09/91
           C                    ELSE                                                                06/19/92
           C                    UNLCKLOCCOMDT                                                       06/19/92
           C                    ENDIF                           QQJOBN=$PJOBN                       08/09/91
           C                    ITER                                                                01/27/92
           C                    ENDIF                           QQTYPE='*INIT'                      08/09/91
           C*                                                                                       08/09/91
           C* Check the CE # to determine if this is a deactivate request                           08/09/91
           C*    The deactivate request is job specific.  Check that the                            08/09/91
           C*    request is for the current job.  Delete the deactivate                             04/21/93
           C*    request so no other processors pick it up.  End the                                04/21/93
           C*    program.  If it is not the current job, return to read                             04/21/93
           C*    another record.                                                                    04/21/93
           C*                                                                                       08/09/91
           C          QQTYPE    IFEQ '*END'                                                         08/09/91
           C          QQJOBN    IFEQ $PJOBN                                                         02/05/92
           C                    DELETFLOCCOM                                                        04/21/93
           C                    LEAVE                                                               04/21/93
           C                    ELSE                                                                06/19/92
           C                    UNLCKLOCCOMDT                                                       06/19/92
           C                    ENDIF                           QQJOBN=$PJOBN                       08/09/91
           C                    ITER                                                                01/27/92
           C                    ENDIF                           QQTYPE='*END'                       08/09/91
           C*                                                                                       08/09/91
           C* Check the CE # to determine if this is a reset request                                08/09/91
           C*    The reset records are job specific - check that the                                08/09/91
```

```
5738PW1 V2R2M0  920615                    SEU SOURCE LISTING                    05/28/93 14:08:24          PAGE   16

SOURCE FILE . . . . . . .   XLIBEM/MRPGSRC
MEMBER  . . . . . . . . .   MMC020

SEQNBR*...+... 1 ...+... 2 ...+... 3 ...+... 4 ...+... 5 ...+... 6 ...+... 7 ...+... 8 ...+... 9 ...+... 0
79600       C*    request is for the correct job.                                                  08/09/91
79700       C*                                                                                     08/09/91
79800       C           QQTYPE    IFEQ '*RESET'                                                    08/09/91
79900       C           QQJOBN    IFEQ $PJOBN                                                      02/05/92
80000       C                     EXSR RSTPRO                                                      08/09/91
80100       C                     ELSE                                                             06/19/92
80200       C                     UNLCKLOCCOMDT                                                    06/19/92
80300       C                     ENDIF                          QQJOBN=$PJOBN                     08/09/91
80400       C                     ITER                                                             01/27/92
80500       C                     ENDIF                          QQTYPE='*RESET'                   08/09/91
80600       C*                                                                                     08/09/91
80700       C*    If the record is not a reset, initialization, or deactivation                    08/09/91
80800       C*    then process the record.                                                         08/09/91
80900       C*                                                                                     08/09/91
81000       C                     EXSR PRORCD                                                      08/09/91
81100       C*                                                                                     04/20/93
81200       C                     SETOF                    99                                      04/20/93
81300       C*                                                                                     07/22/91
81400       C                     ENDIF                          *IN99=*OFF                        07/22/91
81500       C                     ENDDO                          DOW *IN99=*OFF                    07/22/91
81600       C*                                                                                     07/22/91
81700       C                     ENDSR                          PROLOC        SRCE3               07/29/91
81800       C/SPACE 2                                                                              07/23/91
81900       C*********  PRORCD SUBR  *********************  PRORCD SUBR  *                          07/25/91
82000       C*                                                            *                         07/23/91
82100       C*   The PRORCD subroutine processes the LOCCOM record.         *                         01/27/92
82200       C*     First, update the record with the appropriate status.    *                         01/27/92
82300       C*     Second, process the record after determining if the      *                         01/27/92
82400       C*     record is for consolidation or distribution function.    *                         04/20/93
82500       C*                                                            *    SRCE3                05/20/93
82600       C**************************************************************    SRCE3                05/20/93
82700       C*                                                            *    SRCE3                05/20/93
82800       C*   INDICATORS USED  :  98                                   *    SRCE3                05/20/93
82900       C*                                                            *    SRCE3                05/20/93
83000       C*   EXECUTES         :  $APPDF  CONSOL  DISTRB               *    SRCE3                05/20/93
83100       C*                                                            *    SRCE3                05/20/93
83200       C*   EXECUTED FROM    :  PROLOC                               *    SRCE3                05/20/93
83300       C*                                                            *    SRCE3                05/20/93
83400       C**************************************************************    SRCE3                05/20/93
83500       C*                                                                 SRCE3                05/20/93
83600       C           PRORCD    BEGSR                                                            07/25/91
83700       C*                                                                                     05/12/92
83800       C                     DO                             Do Once                           05/12/92
83900       C*                                                                                     01/28/92
84000       C* Access APPDEF for the sending and receiving transfer program                        01/28/92
84100       C*   and the extraction program                                                        01/28/92
84200       C*                                                                                     01/28/92
84300       C                     MOVE ZLPGM     KPGM                                              01/28/92
84400       C                     MOVE ZLFREL    KFREL                                             01/28/92
84500       C                     MOVE ZLTREL    KTREL                                             01/28/92
84600       C*                                                                                     01/28/92
84700       C                     EXSR $APPDF                                                      01/28/92
84800       C*                                                                                     01/28/92
```

```
5738PW1 V2R2M0  920615              SEU SOURCE LISTING              05/28/93 14:08:24            PAGE   17

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
           C*  If APPDEF record cannot be found the status must be                                01/28/92
           C*    updated with '62' this would mean the LOCCOM record                              01/28/92
           C*    could not be processed as no APPDEF record was found                             01/28/92
           C*                                                                                     01/28/92
           C            $$FAIL    IFEQ '1'                                                        01/28/92
           C                      MOVE '62'      ZLSTAT                                           01/28/92
           C                      UPDATFLOCCOM                                                    01/28/92
           C                      LEAVE                                                           05/12/92
           C                      ENDIF                            $$FAIL='1'                     05/12/92
           C*                                                                                     05/12/92
           C* At this point the APPDEF record is valid, determine if                              05/12/92
           C*  a record exists for the target entity in ENTFIL.  This                             05/14/92
           C*  check is only done for Decentralized Distribution and                              05/14/92
           C*  Consolidated as these methods use entity level files.                              05/14/92
           C*                                                                                     05/12/92
           C            ZLTYPE    IFEQ 'DD'                                                       05/14/92
           C            ZLTYPE    OREQ 'CN'                                                       05/14/92
           C            ZLENT     CHAINENTFIL                98                                   07/22/92
           C            *IN98     IFEQ *ON                                                        07/22/92
           C                      MOVE '63'      ZLSTAT                                           05/12/92
           C                      UPDATFLOCCOM                                                    05/12/92
           C                      LEAVE                                                           05/12/92
           C                      ENDIF                            *IN98=*ON                      07/22/92
           C*                                                                                     05/12/92
           C*   Save the entity Files Library                                                     05/12/92
           C*                                                                                     05/12/92
           C                      MOVE EFFLIB    QQFLIB                                           05/12/92
           C*                                                                                     05/12/92
           C* If the target entity can be found in ENTFIL, determine                              05/14/92
           C*   if the entity files library exists using CHKOBJ.                                  05/12/92
           C* If the QCMDEXC fails, the CHKOBJ failed, set the status                              05/12/92
           C*   to '63' to indicate that the Files Library does not exist.                        05/12/92
           C*                                                                                     05/12/92
           C                      MOVE *BLANKS   QQCMD                                            07/02/92
           C            QQCMD1    CAT  EFFLIB    QQCMD             CHKOBJ OBJ(lib)                05/12/92
           C            QQCMD     CAT  QQCMD2:0  QQCMD             OBJTYPE(*LIB)                  05/12/92
           C                      CALL 'QCMDEXC'               98                                 07/22/92
           C                      PARM           QQCMD                                            05/12/92
           C                      PARM           QQLEN                                            05/12/92
           C            *IN98     IFEQ *ON                                                        07/22/92
           C                      MOVE '63'      ZLSTAT                                           05/12/92
           C                      UPDATFLOCCOM                                                    05/12/92
           C                      LEAVE                                                           05/12/92
           C                      ENDIF                            *IN98=*ON                      07/22/92
           C                      ENDIF                            ZLTYPE='DD'                    05/14/92
           C*                                                                                     05/14/92
           C* If Centralized distribution, load Entity file library with                          05/14/92
           C*   blanks for passing to the receiving transfer program.                             05/14/92
           C*                                                                                     05/14/92
           C            ZLTYPE    IFEQ 'CD'                                                       05/14/92
           C                      MOVE *BLANKS   QQFLIB                                           05/14/92
           C                      ENDIF                            ZLTYPE='CD'                    05/14/92
           C*                                                                                     05/12/92
```

```
     5738PW1 V2R2M0  920615                SEU SOURCE LISTING                         05/28/93 14:08:24              PAGE   18

SOURCE FILE . . . . . . .  XLIBEM/MRPGSRC
MEMBER  . . . . . . . . .  MMC020

SEQNBR*...+... 1 ...+... 2 ...+... 3 ...+... 4 ...+... 5 ...+... 6 ...+... 7 ...+... 8 ...+... 9 ...+... 0
90200        C* Else, Change status from '15' and '16' so no other processors                        05/12/92
90300        C*   pick up the record                                                                  07/31/91
90400        C*                                                                                       07/31/91
90500        C           ZLSTAT    IFEQ '15'                                                          07/31/91
90600        C                     MOVE '55'      ZLSTAT                                              07/31/91
90700        C                     ENDIF                             ZLSTAT='15'                      01/27/92
90800        C           ZLSTAT    IFEQ '16'                                                          01/27/92
90900        C                     MOVE '56'      ZLSTAT                                              07/31/91
91000        C                     ENDIF                             ZLSTAT='16'                      01/27/92
91100        C                     UPDATFLOCCOM                                                       07/31/91
91200        C*                                                                                       07/31/91
91300        C* If the type is a form of distribution (centralized or                                 08/01/91
91400        C*  de-centralized) then call DISTRB to process these                                    08/01/91
91500        C*  records by calling the sending and receiving transfer programs                       08/01/91
91600        C*                                                                                       08/01/91
91700        C           ZLTYPE    IFEQ 'CD'                                                          08/01/91
91800        C           ZLTYPE    OREQ 'DD'                                                          08/01/91
91900        C                     EXSR DISTRB                                                        08/01/91
92000        C                     ENDIF                             ZLTYPE='CD'                      08/01/91
92100        C*                                                                                       08/01/91
92200        C* If the type is consolidation then call CONSOL to process these                        08/01/91
92300        C*  records by calling the Application program job queue procedure                       08/01/91
92400        C*  (the XJ program).                                                                    08/01/91
92500        C*                                                                                       08/01/91
92600        C           ZLTYPE    IFEQ 'CN'                                                          08/01/91
92700        C                     EXSR CONSOL                                                        08/01/91
92800        C                     ENDIF                             ZLTYPE='CN'                      08/01/91
92900        C*                                                                                       01/28/92
93000        C                     ENDDO                             DO                               05/12/92
93100        C*                                                                                       07/23/91
93200        C                     ENDSR                             PRORCD         SRCE3             07/23/91
93300        C/SPACE 2                                                                                07/25/91
93400        C*********  RSTPRO SUBR  **********************  RSTPRO SUBR  *                          07/25/91
93500        C*                                                             *                         07/25/91
93600        C*   The RSTPRO subroutine resets the processor if a '*RESET'  *                         07/25/91
93700        C*       request was hit                                       *                         07/25/91
93800        C*                                                             *   SRCE3                 05/20/93
93900        C**************************************************************    SRCE3                 05/20/93
94000        C*                                                             *   SRCE3                 05/20/93
94100        C*   INDICATORS USED  :  98                                    *   SRCE3                 05/20/93
94200        C*                                                             *   SRCE3                 05/20/93
94300        C*   EXECUTED FROM    :  PROLOC                                *   SRCE3                 05/20/93
94400        C*                                                             *   SRCE3                 05/20/93
94500        C**************************************************************    SRCE3                 05/20/93
94600        C*                                                                 SRCE3                 05/20/93
94700        C           RSTPRO    BEGSR                                                              07/25/91
94800        C*                                                                                       07/25/91
94900        C* Delete the deactivate request so no other processors pick                             07/25/91
95000        C*    it up                                                                              07/25/91
95100        C*                                                                                       07/25/91
95200        C                     DELETFLOCCOM                                                       07/29/91
95300        C*                                                                                       07/25/91
95400        C* Reset the file                                                                        07/25/91
```

```
     5738PW1 V2R2M0  920615              SEU SOURCE LISTING                       05/28/93 14:08:24           PAGE   19

SOURCE FILE . . . . . . .   XLIBEM/MRPGSRC
MEMBER  . . . . . . . . .   MMC020

SEQNBR*...+... 1 ...+... 2 ...+... 3 ...+... 4 ...+... 5 ...+... 6 ...+... 7 ...+... 8 ...+... 9 ...+... 0
95500      C*                                                                                        07/25/91
95600      C           *LOVAL    SETLLLOCCOMDT             98                                        08/09/91
95700      C*                                                                                        07/30/91
95800      C*                                                                                        08/09/91
95900      C* If the reset fails, there are no records in the file                                   08/09/91
96000      C*   since this positions the pointer to the end of the                                   08/09/91
96100      C*   file, no more records will be read.  An initialization                               08/09/91
96200      C*   record must be written give the reset a record to                                    08/09/91
96300      C*   position on.                                                                         08/09/91
96400      C*                                                                                        08/09/91
96500      C           *IN98     IFEQ *ON                                                            01/27/92
96600      C                     CLEARFLOCCOM                                                        08/09/91
96700      C                     MOVEL'*INIT'   ZLCENO                                               08/09/91
96800      C                     MOVE $PJOBN    ZLCENO                                               02/05/92
96900      C                     MOVE '15'      ZLSTAT                                               08/09/91
97000      C                     MOVE $PUSPF    ZLUSER                                               02/05/92
97100      C                     WRITEFLOCCOM                                                        08/09/91
97200      C           *LOVAL    SETLLLOCCOMDT                                                       08/09/91
97300      C*                                                                                        08/22/91
97400      C* If the reset fails, update the EM Background file (EMBKGD)                             08/22/91
97500      C*    for this job/user profile/job number to indicate the                                08/22/91
97600      C*    number of failed resets.                                                            08/22/91
97700      C*                                                                                        08/22/91
97800      C                     MOVEL'MMC020XJ'KJOB                                                 08/22/91
97900      C                     MOVEL$PUSPF    KUSER                                                02/05/92
98000      C                     Z-ADD$PJOBN    KJOBN                                                02/05/92
98100      C*                                                                                        08/22/91
98200      C           KEMBKG    CHAINEMBKGD               98                                        08/22/91
98300      C           *IN98     IFEQ *OFF                                                           01/27/92
98400      C                     ADD  1         BGRSET                                               08/22/91
98500      C                     UPDATFEMBKGD                                                        08/22/91
98600      C                     ENDIF                             *IN98=*OFF                        08/22/91
98700      C*                                                                                        08/22/91
98800      C                     ENDIF                             *IN98=*ON                         08/09/91
98900      C*                                                                                        07/25/91
99000      C                     ENDSR                             RSTPRO        SRCE3               07/25/91

                    * * * *  E N D  O F  S O U R C E  * * * *
```

$MMC040$

;b; MMC040 Remote Communications Processor Program ;ql;;r;

;hi;A. The Remote Communications Processor Program runs in background off of REMCOMDT, the logical view of the Remote Communications Entry File (REMCOM) by date/time last maintenance. For each communications entry, it assigns the REMCOMDT record status 30 (waiting) so that this program can send it to the remote system to be satisfied at the tailored frequency. ;ql;;hx;

;id; The externally described file DSMCGNR will be used to create a data structure to act as a parameter to the Generic Transfer Procedure, capable of transferring fifteen files at a time to a remote system. The source for that file resides in MMDDSSRC. ;ql;

;id; The externally described data structure $ZU160 should be copied into the source for this program via /COPY. $ZU160 will be passed as a parameter to the Date Calculation Program, MZU160, which accepts an original date and time, along with modification information, and passes back a new date and time. That data structure resides in MZDDSSRC. ;ql;

;id; 1. Process a loop to retrieve records from REMCOMDT. This is accomplished by reading through REMCOMDT. For each record retrieved, continue processing in step 2. End the program as describe in step 2D(iii) below when a shut down request is detected, for example, when the system shuts down or when the job is ended by using a controlled end job (ENDJOB) command. ;ql;

&int&

Design Note: Since the CL program has overridden REMCOMDT, specifying an end-of-file delay, there is no additional coding necessary within the RPG program to enable the background function.

Design Note: There is no guarantee that the program can detect a shut down request before the job is ended due to the end of file delay. As a result, the EMBKGD record may or may not get deleted, depending on whether the job is ended normally or abnormally. In any cases, the EMBKGD record will be deleted eventually either by this program or by MMM140.

Programmer Note: We were unable to use an open query file on a file overridden with the end-of-file delay parameter specified. The problem is that the OVRDBF (override data base file) command has many parameters. However, the OPNQRYF (open query file) will only recognize a few of the parameters (TOFILE, MBR, LVLCHK, WAITRCD, SEQONLY, INHWRT, SHARE); all the rest are ignored. Neither the compiler nor a program run will indicate this happened. We discovered the quirk because the file no longer functioned as we expected it to under the end-of-file delay function. The solution was a logical file with a select/omit line.
Programmer Note: Before starting any processing, first be sure to initialize the work fields storing the Transmission Date and Time to the system date and time. They will be appropriately incremented later in the program.

&end&

;id; 2. The logical file has selected only those communications entries status 15 (specific entries ready for immediate processing). There is no need to check the status here. ;ql;

;id; A. REMCOMDT records with status 15 are communications entries that will be processed by this program. ;ql;

;id; B. Before continuing, check the CE # for this record. If it is '*INIT,' then this is the dummy record indicating that the last reset was performed on an empty file. The required us to enter a dummy record that will allow the reset to work.

;id; i. Check that the initialization is for this job number. The CE # will consist of the *INIT in position 1-6 of the CE # and the job number in position 10-15. The job number was passed by MMC040XJ. ;ql;

;id; ii. Since the initialization record is job specific and has already fulfilled its purpose, delete the record from REMCOMDT if the job number corresponds to this job. ;ql;

;id; iii. Return to step 1 to process the next record in the file. ;ql;

;id; C. Before continuing, check the CE # for this record. If it is '*RESET,' then this is the dummy record indicating that the pointer to this file should be reset to the beginning. ;ql;

;id; i. Check that the reset is for this job number. The CE # will consist of the *RESET in position 1-6 of the CE # and the job number in position 10-15. The job number was passed by MMC040XJ. ;ql;

;id; ii. Since the reset record is job specific, delete the record from REMCOMDT if the job number corresponds to this job. ;ql;

;id; iii. If the CE # is '*RESET,' perform a SETLL to reset the pointer to the beginning of REMCOMDT. ;ql;

;id; iv. If the SETLL failed, this indicates that there are no records in the file. Since the pointer is set at the end of the file on a failed SETLL the end-of-file delay is no longer in effect and the program will end. To handle this situation, the program will write an '*INIT' (initialization) record with a date and time of *LOVAL. The SETLL will then be performed again. Since a record was just written, the SETLL will work and the pointer is positioned at the beginning of the file again. ;ql;

;id; v. If the SETLL failed, add to the reset field in EMBKGD (BGRSET) and update the record. This field will keep track of how many failed resets were encountered. A failed reset is one where the reset brings the user to the beginning of an empty file. This field will be used at implementation and will be helpful in determining the frequency needed for the reset. ;ql;

;id; vi. Return to step 1 to process the next record. ;ql;

;id; D. Now check to see if this is the deactivation record, designated by a CE # of '*END.' . ;ql;

;id; i. Check that the deactivation record is for this job number. The CE # will consist of the *END in position 1-4 of the CE # and the job number in position 10-15. The job number of the current job was passed by MMC040XJ. ;ql;

;id; ii. Since the deactivation record is job specific, delete the record from REMCOMDT if the job number corresponds to this job. ;ql;

;id; iii. If the CE # is '*END,' then this program should end immediately, without processing any more REMCOM records. Prior to ending the program, delete the Enterprise Management Background File (EMBKGD) record found for 'MMC040XJ,' the user (passed from MMC040XJ) and the job number (passed from MMC040XJ). ;ql;

;id; 3. The record is not a reset or deactivation record. Therefore, mark the record that it is waiting to be sent (status '30') and check if the processor is ready to transmit the REMCOM records. ;ql;

;id; A. Update the REMCOM record to status '30' waiting to be sent. ;ql;

;id; B. Now, see if it is time to send the REMCOMDT entries marked with status 30 to their destinations. ;ql;

;id; i. The transmission date and time work fields for both high and low priority applications were set up at the beginning of the program. The first values are the current date and time (retrieved by calling MZM620X, the Retrieve Current Date and Time Procedure) plus the high or low transmission frequency from the Communications Definition (COMDEF) file. This establishes the first time the transmission will take place for applications for each priority. The next incrementation will occur as described below when this date/time is reached. ;ql;

;id; ii. Check the transmission date work field for high priority applications. If the current date is greater than that date, then it is time to transmit communications entries for high priority applications. ;ql;

```
     ;id; iii. If the dates are the same, check the times; if the
     current time is greater than or equal to the transmission
     time for high priority applications, then it is time to
     transmit.  ;ql;

     ;id; iv. When it is time to transmit CE's for high priority
     applications, increment the high priority transmission time
     work field by CQFRQH (the COMDEF frequency of transmissions
     for high priority applications) and continue processing with
     step 5.  To increment the high priority transmission time,
     call the Date Calculation Program, MZU160, with the data
     structure $ZU160 as the parameter.  The next high priority
     transmission date and time will be returned in $NWDT and
     $NWTM.  ;ql;

;id;   MZU160   PLIST                                           ;ql;
;id;            PARM   $ZU160                                   ;ql;

;id; Load $ORDT and ORTM with the transmission date/time work flds ;ql;
;id; Load $YEAR, $MNTH, $DAY, $HOUR, and $MIN with zero          ;ql;
;id; Load $SEC with the transmission frequency CQFRQH from COMDEF ;ql;
;id; Load $FORB with 'F' (forward).                              ;ql;
;id; $NWDT and $NWTM will be returned and must be loaded into the ;ql;
;id;     high priority transmission date and time work fields.   ;ql;

     ;id; v. Repeat steps (ii) to (iv) for low priority
     applications.  The low priority transmission date and time are
     checked. When it is time to transmit CE's for low priority
     applications, proceed to step 5. Then increment the low
     priority transmission time by the low priority transmission
     frequency CQFRQL from COMDEF.  ;ql;

     ;id; vi. If the current date is less than both the high and
     low priority transmission dates, or if the dates are the same
     but the current time is less than both transmission times,
     then return to step 1.  ;ql;

;id; 5. Process a loop to read through REMCOM and read all records
whose status was changed to '30'.  That is, these records are waiting
for transmission. ;ql;

   ;id; A. Read a REMCOM record with status '30'. ;ql;

   ;id; B. Access the Application Definition File (APPDEF) for the
   sending and generic transfer program names.  This is accomplished
   by loading the application program name, from release-modification
   and to release-modification from the REMCOM record to the key list
   for the file.  Call the standard subroutine $APPDF. ;ql;

      ;id; i. If the subroutine fails to find the APPDEF record,
      update the status of the REMCOM record to '62'.  This would
      mean that the REMCOM record could not be processed as no
      Application Definition File record could be found. Return to
      step 5A to read the next record with status '30'. ;ql;
```

;id; ii. Check the priority of the application, which is defined in the APPDEF record retrieved in step (i) above. If the priority matches the priority that is currently being processed, continue. Otherwise, we are not transmitting this CE yet. Return to step 5A to read the next record with status '30'. ;ql;

;id; iii. Find the SYSXRF record for the REMCOM originating system/target system (ZLORSY/ZLSYS). If such a record does not exist, update the status of the REMCOM record to '65'. This would mean that the REMCOM record could not be processed. Return to step 5A to read the next record with status '30'. ;ql;

;id; iv. If both the APPDEF and SYSXRF records are found, and the priority of the application is checked, update the status to '31' to indicate that the record was selected for transmission. Since multiple processors could be processing the status '30' records at the same time, we must ensure that each record is only picked up once. ;ql ;id; C. If the REMCOM application type is 'CD' (centralized distribution) or 'DD' (decentralized distribution) then the data transfer files must be loaded. ;ql;

;id; i. Then call the appropriate sending transfer program, passing the following parameters: ;ql;

```
;id;    PMCSND   PLIST                                          ;ql;
;id;             PARM    PSEND   1A    'S' (send)               ;ql;
;id;             PARM    PCENO   15A   communications entry #   ;ql;
;id;             PARM    PRORL   1A    'R' (remote)             ;ql;
;id;             PARM    PGNRC   10A   name of generic transf proc ;ql;
;id;             PARM    PERROR  1A    error code               ;ql;
```

;id; ii. If the sending transfer program does not exist, call MMC030 to send a message to the EM background message queue saying that the sending transfer program does not exist for this remote CE. Return to step 5A to read the next record with status '30'. ;ql;

;id; D. If the REMCOM application type is 'CM' (consolidation), then the GPLDA Sending Transfer Program must be called prior to sending the remote CE itself. This program puts the GPLDA and GPLDA2 into the appropriate format, based on the from and to rel-mod levels and application; it is necessary because the GPDIST record must reside in all entities where XJ procedures will be submitted. Also, call the Resource Extraction Program if there is one. ;ql;

;id; i. The name of the GPLDA Sending Transfer Program for sending the GPDIST record are contained in the APPDEF record that was retrieved. Call the GPLDA Sending Transfer Program after loading the following parameter list. ;ql;

```
;id;    PMCEXT   PLIST                                          ;ql;
```

```
;id;            PARM    PSEND   1A    'S' (send)                  ;ql;
;id;            PARM    PCENO   15A   communications entry #      ;ql;
;id;            PARM    PRORL   1A    'R' (remote)                ;ql;
;id;            PARM    PGNRC   10A   name of generic transf proc ;ql;
;id;            PARM    PERROR  1A    error code                  ;ql;
```

;id; ii. If the GPLDA sending transfer program does not exist, call MMC030 to send a message to the EM background message queue saying that the GPLDA sending transfer program does not exist for this remote CE. Return to step 5A to read the next record with status '30'. ;ql;

;id; iii. The name of the Resource Extraction Program is contained in the APPDEF record that was retrieved. If the name of the Resource Extraction Program is not blank, call the Resource Extraction Program using the same parameter list for the GPDLA sending transfer program above. If the program name is blank, then this application does not need to call the Resource Extraction Program. ;ql;

;id; iv. If the resource extraction program name is not blank, but the program specified in the APPDEF record does not exist, call MMC030 to send a message to the EM background message queue saying that the resource extraction program does not exist for this remote CE. Return to step 5A to read the next record with status '30'. ;ql;

&int

Design note: We have an exception here where recovery is possible after the user have fixed the problem, even though we do not provide any recovery mechanism when a program does not exist. After the GPLDA sending transfer program is called successfully, the CE status would have been updated to '48'. Thus even if the resource extraction program doesn't exist, a CE status of '48' allows the user to resend this CE. However, if the GPLDA sending transfer program or the sending transfer program does not exist, the CE status would got stuck at '31'. Since no other processor can pick up any CE with status '31', recovery is not possible in these cases.

&end

;id; E. If the call to the sending transfer program or the transfer of GPDIST was not successful, the status of the REMCOM record will have been changed by the sending transfer program, so that it will not be eligible for any more processing. Return to step 5A to read the next record. ;ql;

;id; F. For all three REMCOM application types with status of the communications entry now 31, now write the record to REMHLD. Load the fields as follows: ;ql;

;id; i. All REMCOM fields map as would be expected into the corresponding REMHLD fields, with the exception of the status.

The status should be '14', indicating that the CE was just sent from a remote system. ;ql;

;id; ii. A record is written to the Remote Communications Entry Holding File (REMHLD), which has the same file layout as the Local Communications File (LOCCOM). This is done because when the generic transfer procedure is called to actually send the remote CE to the appropriate system as a local CE, a CPYF will be performed. That CPYF can only succeed if the to and from files have the same buffer layout, as REMHLD and LOCCOM do. Prior to this, the GPDIST record should be sent to the remote system for consolidation applications, and the data file should be sent to the remote system for distribution applications. ;ql;

;id; G. Now that REMHLD has been loaded, call the generic transfer procedure to handle the sending of the REMHLD record to the remote system. ;ql;

;id; i. Get the name of the generic transfer procedure from APPDEF for sending Communications files for the application '*SYSTEM' by calling the standard subroutine $APPDF where the KPGM (program name key field) is equal to '*SYSTEM'. ;ql;

;id; ii. Load the appropriate fields in the data structure $MCGNR, passed as a parameter to the generic transfer procedure, as follows: ;ql;

```
;id;   PMCGNR   PLIST                                          ;ql;
;id;            PARM   $MCGNR                                  ;ql;
;id;            PARM   PERROR  1A     error code               ;ql;
;id;            PARM   PMSG    7A     CPF message #            ;ql;

;id; Clear the data structure as the data structure holds data for ;ql;
;id;   15 transactions.  We are only using the DS for one call     ;ql;
;id; Load $SVALA with the REMHLD CE #                              ;ql;
;id; Load $SFLA with 15 (length of selec value)                    ;ql;
;id; Load $SEND with 'S'                                           ;ql;
;id; Load $DORR with 'D'                                           ;ql;
;id; Load $LDEXT with 'Y'                                          ;ql;
;id; Load $TYPE with 'CE', designating a communications entry as   ;ql;
;id;     the type of transmission.                                 ;ql;
;id; Load $DORB with 'D', indicating that the REMHLD records       ;ql;
;id;      should be deleted after being successfully transmitted   ;ql;
;id; Load $RORL with 'R', designating a REMCOM record              ;ql;
;id; Load $WRTRS with 'N' (do not write response)                 ;ql;
;id; Load $CEF1  with 'ZLCENO'                                     ;ql;
;id; Load $SFLD1 with 'ZLCENO'                                     ;ql;
;id; Load $SCEF1 with 'REMHLD'                                     ;ql;
;id; Load $SCEL1 with the COMDEF field CQLIBR                      ;ql;
;id; Load $EXTF1 with 'EXREMH'                                     ;ql;
;id; Load $EXTL1 with the System X-Ref file (SYSXRF) field FXELIB  ;ql;
;id;     (retrieve the SYSXRF record for the REMCOM target system) ;ql;
;id; Load $TGTF1 with 'LOCCOM'                                     ;ql;
;id; Load $TGTL1 with the Cross-Reference field FXDLIB             ;ql;
```

```
&int&

Design Note:  Unlike other sending functions where we send chunks of
records to a remote system at a time, the function of sending an actual
communications entry is performed one record at a time.  Although this
seems sluggish initially, it is absolutely necessary to take this
approach, because if we send a group of CE's at a time, we lose the
tracking essential to each CE itself.  For each CE sent, it is
imperative that we track whether or not the information that must
precede the CE reached the other system, and if not, why.  Then, and
only then, may the CE be sent.  If we send chunks of CE's this control
is lost.

&end&


;hi;B. File     Usage                                              ;ql;

;id;    APPDEF    IF      Application Definition File               ;ql;
;id;    COMDEF    IF      Communications Definition File            ;ql;
;id;    EMBKCD    UF      Enterprise Management Background File     ;ql;
;id;    REMCOM    UF      Remote Communications Entry File          ;ql;
;id;    REMCOMDT  UF      Logical View of REMCOM by Dt/Tm Last Mt   ;ql;
;id;    REMCOM01  UF      Logical View of REMCOM with status '30'   ;ql;
;id;    REMHLD    UF      Remote Communications Entry Holding File  ;ql;
;id;    SYSXRF    IF      System Cross-Reference File               ;ql;

;ql;;hx;


$END$
```

```
5738PW1 V2R2M0  920615              SEU SOURCE LISTING                     05/28/93 14:08:35          PAGE    1

SOURCE FILE . . . . . . .   XLIBEM/MRPGSRC
MEMBER  . . . . . . . . .   MMC040

SEQNBR*...+... 1 ...+... 2 ...+... 3 ...+... 4 ...+... 5 ...+... 6 ...+... 7 ...+... 8 ...+... 9 ...+... 0
  100      H*****************************************************************          07/22/91
  200      H*                                                               *          07/22/91
  300      H*        Release - 03         Mod Level - 10                    *          06/26/92
  400      H*  THIS UNPUBLISHED COPYRIGHTED WORK CONTAINS TRADE SECRET      *          07/22/91
  500      H*  INFORMATION OF MARCAM CORPORATION.  USE, TRANSFER,           *          07/22/91
  600      H*  DISCLOSURE, OR COPYING WITHOUT ITS EXPRESSED WRITTEN         *          07/22/91
  700      H*  PERMISSION IS STRICTLY FORBIDDEN.                    1993    *          06/26/92
  800      H*                                                               *          07/22/91
  900      H*  MODULE:             Enterprise Management                    *          07/22/91
 1000      H*                                                               *          07/22/91
 1100      H*  PROGRAM NAME:       MMC040 - Remote Communications Processor*          08/09/91
 1200      H*                               Program                         *          07/29/91
 1300      H*                                                               *          07/22/91
 1400      H*  FUNCTION:           This program processes the Remote        *          08/09/91
 1500      H*                      Communication Entry file (REMCOM)        *          08/09/91
 1600      H*                                                               *          07/22/91
 1700      H*  CALLING PROGRAM:    MMC040XJ- XJ Procedure to open all       *          08/09/91
 1800      H*                         logical,work and open query files     *          07/22/91
 1900      H*                                                               *          07/22/91
 2000      H*  CALLED PROGRAM:     Generic Transfer Program                 *          02/05/92
 2100      H*                      GPLDA Sending Transfer Program           *          03/11/92
 2200      H*                      MMC030   - Communications Message Sending*          10/07/92
 2300      H*                                 Program                       *          10/07/92
 2400      H*                      MZM620X - Retrieve Current Date and Time*          09/28/92
 2500      H*                                 Procedure                     *          09/28/92
 2600      H*                      MZM700X - Reclaim Resources Procedure    *          08/17/92
 2700      H*                      MZU160   - Date Calculation Program      *          10/07/92
 2800      H*                      Sending Transfer Program                 *          01/27/92
 2900      H*                                                               *          07/22/91
 3000      H*   /COPY INPUT:       $ZU160 - Data Structure for MZU160       *          10/14/92
 3100      H*                                                               *          10/07/92
 3200      H*   /COPY ROUTINES:    $APPDF - Application Definition search   *          01/27/92
 3300      H*                                                               *          01/27/92
 3400      H*****************************************************************          07/22/91
 3500      H*              P R O G R A M   D E S C R I P T I O N            *          07/22/91
 3600      H*****************************************************************          07/22/91
 3700      H*                                                               *          07/22/91
 3800      H*  This program is the Remote Communications Processor. It      *          08/09/91
 3900      H*  reads through the REMCOM file and calls the appropriate      *          01/27/92
 4000      H*  programs.  The status of the REMCOM record is changed to     *          01/27/92
 4100      H*  put into a waiting status.  At the time intervals specified *          01/27/92
 4200      H*  in COMDEF, the remote communications records will be         *          01/27/92
 4300      H*  transmitted.    The REMCOM file was defined with the end     *          09/28/92
 4400      H*  of file delay.  Therefore, a deactivation record must be     *          01/27/92
 4500      H*  encountered to end the processor.  A reset record may be     *          01/27/92
 4600      H*  hit to reset the pointer.                                    *          01/27/92
 4700      H*                                                               *          07/22/91
 4800      H*****************************************************************          07/22/91
 4900      F/SPACE 3                                                                   07/22/91
 5000      F*****************************************************************          07/22/91
 5100      F*        F U N C T I O N   O F   I N D I C A T O R S            *          07/22/91
 5200      F*****************************************************************          07/22/91
 5300      F*                                                               *          07/22/91
```

```
     5738PW1 V2R2M0  920615                    SEU SOURCE LISTING                    05/28/93 14:08:35              PAGE    2

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
  5400      F*   98 - General Indicator                                      *                              08/05/91
  5500      F*   99 - General Indicator                                      *                              07/22/91
  5600      F*                                                               *                              07/22/91
  5700      F*****************************************************************                              07/22/91
  5800      F/SPACE 2                                                                                       07/22/91
  5900      F*****************************************************************                              07/22/91
  6000      F*                                                               *                              07/22/91
  6100      F*                     FILE SPECIFICATIONS                       *                              07/22/91
  6200      F*                                                               *                              07/22/91
  6300      F*****************************************************************                              07/22/91
  6400      F*                                                                                              07/22/91
  6500      FAPPDEF  IF  E           K        DISK                                                          07/29/91
  6600      F/SPACE 2                                                                                       07/22/91
  6700      FCOMDEF  IF  E                    DISK                                                          08/01/91
  6800      F/SPACE 2                                                                                       08/01/91
  6900      FEMBKGD  UF  E           K        DISK                                                          07/22/91
  7000      F/SPACE 2                                                                                       08/22/91
  7100      FREMCOM  UF  E           K        DISK                                                          04/22/93
  7200      F            FREMCOM                           KRENAMEFREMCO2                                   04/22/93
  7300      F/SPACE 2                                                                                       04/22/93
  7400      FREMCOMDTUF  E           K        DISK                     A                                    08/22/91
  7500      F/SPACE 2                                                                                       02/14/92
  7600      FREMCOM01UF  E           K        DISK                                                          02/14/92
  7700      F            FREMCOM                           KRENAMEFREMCO1                                   04/22/93
  7800      F/SPACE 2                                                                                       08/09/91
  7900      FREMHLD  UF  E           K        DISK                     A                                    08/28/91
  8000      F/SPACE 2                                                                                       08/09/91
  8100      FSYSXRF  IF  E           K        DISK                                                          01/27/92
  8200      F/SPACE 3                                                                                       07/22/91
  8300      E*****************************************************************                              07/22/91
  8400      E*                                                               *                              07/22/91
  8500      E*             A R R A Y    D E F I N I T I O N                  *                              07/22/91
  8600      E*                                                               *                              07/22/91
  8700      E*****************************************************************                              07/22/91
  8800      I*****************************************************************                              07/22/91
  8900      I*                                                               *                              07/22/91
  9000      I*                    INPUT SPECIFICATIONS                       *                              07/22/91
  9100      I*                                                               *                              07/22/91
  9200      I*****************************************************************                              07/22/91
  9300      I*                                                                                              07/26/91
  9400      I* Externally described data structure to define the parameter                                 01/27/92
  9500      I*   list for the generic transfer program                                                      01/27/92
  9600      I*                                                                                              01/27/92
  9700      IPMCGNR     E DSDSMCGNR                                                                         01/27/92
  9800      I*                                                                                              10/14/92
  9900      I* Externally described data structure to define the parameter                                 10/14/92
 10000      I*   list for the EM message sending program, MMC030                                            10/14/92
 10100      I*                                                                                              10/14/92
 10200      I$MC030     E DSDSMC030                                                                         10/14/92
 10300      I*                                                                                              01/27/92
 10400      I* Data Structure to break down the Communications Entry Number                                 01/27/92
 10500      I*   which consists of the Number, *RESET, *INIT or *END and the                                01/27/92
 10600      I*   job number                                                                                 01/27/92
```

```
    5738PW1 V2R2M0  920615              SEU SOURCE LISTING                     05/28/93 14:08:35              PAGE    3

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
10700     I*                                                                                              01/27/92
10800     IQQCENO      DS                                                                                 07/26/91
10900     I                                        1   9 QQTYPE                                           08/05/91
11000     I                                       10  150QQJOBN                                           08/05/91
11100     I*                                                                                              01/27/92
11200     I* Data Structure to break down the release-modification level                                  01/27/92
11300     I*   field which looks similar to 04-00.                                                        01/27/92
11400     I*                                                                                              01/27/92
11500     IQQRM        DS                                                                                 08/01/91
11600     I                                        1   20QQREL                                            07/26/91
11700     I                                        4   50QQMOD                                            07/26/91
11800     I*                                                                                              10/07/92
11900     I/COPY MZDDSSRC,$ZU160                                                                          01/27/92
12000     I/SPACE 3                                                                                       07/22/91
12100     C*************************************************************                                  07/22/91
12200     C*                                                           *                                  07/22/91
12300     C*                       CALCULATION SPECS                   *                                  07/22/91
12400     C*                                                           *                                  07/22/91
12500     C*************************************************************                                  07/22/91
12600     C*                                                           *                                  07/22/91
12700     C*************************************************************                                  07/22/91
12800     C*                       M A I N L I N E                     *                                  07/22/91
12900     C*************************************************************                                  07/22/91
13000     C*                                                           *                                  07/22/91
13100     C*   The MAINLINE is executed once.  It calls the subroutine *                                  01/27/92
13200     C*   PROREM to process REMCOM (the Remote Communications File). *                               01/27/92
13300     C*   The program ends when a 'deactivate' record is encountered *                               01/27/92
13400     C*   in REMCOM.  The subroutine ENDPRO will perform any      *                                  04/21/93
13500     C*   final processing and the program ends in the MAINLINE.  *     SRCE3                        04/21/93
13600     C*                                                           *     SRCE3                        04/22/93
13700     C*************************************************************     SRCE3                        04/22/93
13800     C*                                                           *     SRCE3                        04/22/93
13900     C*   INDICATORS USED  :  LR                                  *     SRCE3                        04/22/93
14000     C*                                                           *     SRCE3                        04/22/93
14100     C*   EXECUTES         :  ENDPRO  PROREM                      *     SRCE3                        04/22/93
14200     C*                                                           *     SRCE3                        04/22/93
14300     C*************************************************************     SRCE3                        04/22/93
14400     C*                                                                                              04/22/93
14500     C           *ENTRY    PLIST                                                                     07/25/91
14600     C                     PARM           $PJOBN                                                     02/05/92
14700     C                     PARM           $PUSPF                                                     02/05/92
14800     C*                                                                                              07/22/91
14900     C* Process the Remote Communications File                                                       04/21/93
15000     C*                                                                                              04/21/93
15100     C                     EXSR PROREM                                                               08/09/91
15200     C*                                                                                              04/21/93
15300     C* Perform any necessary functions before ending                                                04/21/93
15400     C*                                                                                              04/21/93
15500     C                     EXSR ENDPRO                                                               04/21/93
15600     C*                                                                                              04/21/93
15700     C                     SETON                     LR                                              07/22/91
15800     C                     RETRN                                                                     07/30/91
15900     C*                                                                                              07/30/91
                                                                                                          07/22/91
```

```
     5738PW1 V2R2M0  920615              SEU SOURCE LISTING                      05/28/93 14:08:35            PAGE    4

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
16000      C/SPACE 2                                                                                        07/22/91
16100      C********** *INZSR SUBR ********************** *INZSR SUBR  *                                    03/02/92
16200      C*                                                           *                                   07/22/91
16300      C*  The purpose of the *INZSR subroutine is to perform the   *                                   01/27/92
16400      C*  initial calculations that need to be done on the initial *                                   01/27/92
16500      C*  call of the program                                      *                                   01/27/92
16600      C*                                                           *   SRCE3                           04/22/93
16700      C*************************************************************   SRCE3                           04/22/93
16800      C*                                                           *   SRCE3                           04/22/93
16900      C*   INDICATORS USED  :  99                                  *   SRCE3                           04/22/93
17000      C*                                                           *   SRCE3                           04/22/93
17100      C*************************************************************   SRCE3                           04/22/93
17200      C*                                                               SRCE3                           04/22/93
17300      C           *INZSR    BEGSR                                                                      03/02/92
17400      C*                                                                                               07/22/91
17500      C* Initialize the standard variables.                                                            07/22/91
17600      C*                                                                                               07/22/91
17700      C                     MOVE 'M'       MODULE          Module                                      10/07/92
17800      C                     MOVEL'MMC040'  $PGM            Program Name                                01/27/92
17900      C*                                                                                               08/01/91
18000      C* Access COMDEF for communications definition constants.                                        08/09/91
18100      C*   This file has only one record.  Therefore, it needs to be                                   08/09/91
18200      C*   read only once (similar to the tailoring files)                                             08/09/91
18300      C*                                                                                               08/01/91
18400      C           1         CHAINCOMDEF              99                                                08/01/91
18500      C*                                                                                               08/09/91
18600      C* Set up the next time LOW priority transmission will take place                                08/20/92
18700      C*   by this processor by calling the data calculation program                                   08/20/92
18800      C*                                                                                               08/09/91
18900      C                     CALL 'MZM620X' PZM620          Get date & time                             09/28/92
19000      C                     Z-ADDPDATE     QQTDTL          Current Date                                09/28/92
19100      C                     Z-ADDPTIME     QQTIML          Current Time                                09/28/92
19200      C                     CLEAR$ZU160                                                                01/27/92
19300      C                     Z-ADDQQTDTL    $ORDT           Current Date                                08/20/92
19400      C                     Z-ADDQQTIML    $ORTM           Current Time                                08/20/92
19500      C                     Z-ADDCQFRQL    $SEC            Trans Frequency                             08/20/92
19600      C                     MOVE 'F'       $FORB           Calc Forward                                01/27/92
19700      C*                                                                                               08/09/91
19800      C                     CALL 'MZU160'                                                              09/25/91
19900      C                     PARM           $ZU160                                                      01/27/92
20000      C*                                                                                               08/09/91
20100      C                     Z-ADD$NWDT     QQTDTL          Next Date                                   08/20/92
20200      C                     Z-ADD$NWTM     QQTIML          Next Time                                   08/20/92
20300      C*                                                                                               08/22/91
20400      C* Set up the next time HIGH priority transmission will take place                               08/20/92
20500      C*   by this processor by calling the data calculation program                                   08/20/92
20600      C*                                                                                               08/20/92
20700      C                     CALL 'MZM620X' PZM620          Get date & time                             09/28/92
20800      C                     Z-ADDPDATE     QQTDTH          Current Date                                09/28/92
20900      C                     Z-ADDPTIME     QQTIMH          Current Time                                09/28/92
21000      C                     CLEAR$ZU160                                                                08/20/92
21100      C                     Z-ADDQQTDTH    $ORDT           Current Date                                08/20/92
21200      C                     Z-ADDQQTIMH    $ORTM           Current Time                                08/20/92
```

```
 5738PW1 V2R2M0  920615              SEU SOURCE LISTING                    05/28/93 14:08:35              PAGE    5

SOURCE FILE . . . . . . .   XLIBEM/MRPGSRC
MEMBER  . . . . . . . . .   MMC040

SEQNBR*...+... 1 ...+... 2 ...+... 3 ...+... 4 ...+... 5 ...+... 6 ...+... 7 ...+... 8 ...+... 9 ...+... 0        08/20/92
21300      C                     Z-ADDCQFRQH    $SEC             Trans Frequency                              08/20/92
21400      C                     MOVE 'F'       $FORB            Calc Forward                                 08/20/92
21500      C*                                                                                                 08/20/92
21600      C                     CALL 'MZU160'                                                                08/20/92
21700      C                     PARM           $ZU160                                                        08/20/92
21800      C*                                                                                                 08/20/92
21900      C                     Z-ADD$NWDT     QQTDTH           Next Date                                    08/20/92
22000      C                     Z-ADD$NWTM     QQTMH            Next Time                                    08/20/92
22100      C*                                                                                                 03/02/92
22200      C                     ENDSR                           *INZSR        SRCE3                          07/22/91
22300      C*                                                                                                 01/27/92
22400      C/SPACE 2                                                                                          01/27/92
22500      C**********  $DEFSR SUBR  **********************  $DEFSR SUBR  *                                   01/27/92
22600      C*                                                               *                                 01/27/92
22700      C*  The purpose of the $DEFSR subroutine is to define the        *                                 01/27/92
22800      C*  program fields                                               *     SRCE3                       04/22/93
22900      C*****************************************************************     SRCE3                       04/22/93
23000      C*****************************************************************     SRCE3                       04/22/93
23100      C*                                                               *     SRCE3                       04/22/93
23200      C*   INDICATORS USED  :  NONE                                    *     SRCE3                       04/22/93
23300      C*****************************************************************     SRCE3                       04/22/93
23400      C*****************************************************************     SRCE3                       04/22/93
23500      C*                                                                                                 01/27/92
23600      C            $DEFSR    BEGSR                                                                       01/27/92
23700      C*                                                                                                 01/27/92
23800      C* Define the standard variables.                                                                  01/27/92
23900      C*                                                                                                 10/07/92
24000      C                     MOVE *BLANKS   MODULE  1        Module                                       10/07/92
24100      C                     MOVE *BLANKS   $PGM    8        Program Name                                 02/13/92
24200      C                     MOVE *BLANKS   PERROR  1        Error Byte                                   04/22/93
24300      C                     MOVE *BLANKS   QQTEMP  1        Temporary Var                                01/27/92
24400      C*                                                                                                 01/27/92
24500      C* Set up plist for calling the sending transfer program                                           01/27/92
24600      C*                                                                                                 01/27/92
24700      C            PMCSND    PLIST                                                                       01/27/92
24800      C                     PARM           PSEND   1        Indicate Send                                01/27/92
24900      C                     PARM           PCENO            Comm Entry #                                 01/27/92
25000      C                     PARM           PRORL   1        Indicate Remote                              01/27/92
25100      C                     PARM           PGNRC            Generic Transf                               03/11/92
25200      C                     PARM           PERROR           Error Byte                                   02/05/92
25300      C*                                                                                                 02/05/92
25400      C* Set up plist for calling the resource extraction program                                        02/05/92
25500      C*                                                                                                 02/05/92
25600      C            PMCEXT    PLIST                                                                       02/05/92
25700      C                     PARM           PSEND            Indicate Send                                02/05/92
25800      C                     PARM           PCENO            Comm Entry #                                 02/05/92
25900      C                     PARM           PRORL            Indicate Remote                              02/05/92
26000      C                     PARM           PGNRC            Generic Transf                               03/11/92
26100      C                     PARM           PERROR           Error Byte                                   10/07/92
26200      C*                                                                                                 10/07/92
26300      C* Set up plist for calling MMC030, the Communications Message                                     10/07/92
26400      C*   Sending Program.                                                                              10/07/92
26500      C*
```

```
5738PW1 V2R2M0  920615              SEU SOURCE LISTING                    05/28/93 14:08:35          PAGE    6

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
     C           PMC030    PLIST                                                          10/07/92
     C                     PARM           $MC030                                          10/07/92
     C*                                                                                   09/28/92
     C* Set up plist for calling the retrieve date and time                               09/28/92
     C*    procedure (MZM620X)                                                            09/28/92
     C*                                                                                   09/28/92
     C           PZM620    PLIST                                                          09/28/92
     C                     PARM           PDATE            Current Date                   09/28/92
     C                     PARM           PTIME            Current Time                   09/28/92
     C*                                                                                   01/27/92
     C* *LIKE DEFN the work variables                                                     01/27/92
     C*                                                                                   01/27/92
     C*                                                   Low Priority                    08/20/92
     C           *LIKE     DEFN ZMENDT    QQTDTL           Transmit Date                  08/20/92
     C           *LIKE     DEFN ZMENTM    QQTTML           Transmit Time                  08/20/92
     C*                                                   High Priority                   08/20/92
     C           *LIKE     DEFN ZMENDT    QQTDTH           Transmit Date                  08/20/92
     C           *LIKE     DEFN ZMENTM    QQTTMH           Transmit Time                  08/20/92
     C*                                                                                   08/20/92
     C           *LIKE     DEFN FDPRTY    QQPRTY           PRORCD Priority                08/20/92
     C*                                                                                   01/27/92
     C* *LIKE DEFN the klist and plist variables                                          01/27/92
     C*                                                                                   01/27/92
     C           *LIKE     DEFN BGJOBN    $PJOBN           Job Number                     09/28/92
     C           *LIKE     DEFN BGUSER    $PUSPF           User Profile                   09/28/92
     C           *LIKE     DEFN FDFREL    KFREL            From rel-mod lv                01/28/92
     C           *LIKE     DEFN BGJOB     KJOB             Job Name                       09/28/92
     C           *LIKE     DEFN BGJOBN    KJOBN            Job Number                     09/28/92
     C           *LIKE     DEFN FXLSYS    KLSYS            Local System                   09/28/92
     C           *LIKE     DEFN FDPGM     KPGM             Program name                   09/28/92
     C           *LIKE     DEFN FXRENT    KRENT            Remote Entity                  09/28/92
     C           *LIKE     DEFN FXRSYS    KRSYS            Remote System                  09/28/92
     C           *LIKE     DEFN FDTREL    KTREL            To rel-mod levl                01/28/92
     C           *LIKE     DEFN BGUSER    KUSER            User Profile                   01/28/92
     C           *LIKE     DEFN ZMCENO    PCENO            Comm Entry #                   01/28/92
     C           *LIKE     DEFN ZMDTMT    PDATE            Current Date                   09/28/92
     C           *LIKE     DEFN FDGPGM    PGNRC            Generic Trans P                01/28/92
     C           *LIKE     DEFN ZMCPFM    PMSG             CPF message no                 09/28/92
     C           *LIKE     DEFN ZMTMMT    PTIME            Current Time                   09/28/92
     C*                                                                                   01/27/92
     C* Set up Key list for retrieving information from the                               01/27/92
     C*    the Application Definition file (APPDEF)                                       01/27/92
     C*                                                                                   01/27/92
     C           KAPPDE    KLIST                                                          01/27/92
     C                     KFLD           KPGM                                            01/27/92
     C                     KFLD           KFREL                                           01/27/92
     C                     KFLD           KTREL                                           01/27/92
     C*                                                                                   01/27/92
     C* Set up Key list for deleting a record in the background file                      01/27/92
     C*    (EMBKGD) for this processor.                                                   01/27/92
     C*                                                                                   01/27/92
     C           KEMBKG    KLIST                                                          01/27/92
     C                     KFLD           KJOB                                            01/27/92
```

```
5738PW1 V2R2M0  920615                SEU SOURCE LISTING                 05/28/93 14:08:35            PAGE    7

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
     C                    KFLD           KUSER                                          01/27/92
     C                    KFLD           KJOBN                                          01/27/92
     C*                                                                                 01/27/92
     C* Set up Key list for the SYSXRF file                                             01/27/92
     C*                                                                                 01/27/92
     C           KSYSXR    KLIST                                                        01/27/92
     C                    KFLD           KLSYS                                          01/27/92
     C                    KFLD           KRSYS                                          01/27/92
     C                    KFLD           KRENT                                          01/27/92
     C*                                                                                 01/27/92
     C                    ENDSR                          $DEFSR       SRCE3             01/27/92
     C*                                                                                 01/27/92
     C/SPACE 2                                                                          08/07/91
     C/COPY MMDDSSRC,$APPDF                                                             08/07/91
     C/SPACE 2                                                                          08/12/91
     C**********  CALGEN SUBR  **********************  CALGEN SUBR  *                  08/12/91
     C*                                                               *                 08/12/91
     C*   The CALGEN subroutine will call the generic transfer        *                 08/12/91
     C*       program after loading the data structure                *                 08/12/91
     C*                                                               *  SRCE3          04/22/93
     C****************************************************************  SRCE3          04/22/93
     C*                                                               *  SRCE3          04/22/93
     C*   INDICATORS USED   :  NONE                                   *  SRCE3          04/22/93
     C*                                                               *  SRCE3          04/22/93
     C*   EXECUTES          :  $APPDF                                 *  SRCE3          04/22/93
     C*                                                               *  SRCE3          04/22/93
     C*   EXECUTED FROM     :  PRORCD                                 *  SRCE3          04/22/93
     C*                                                               *  SRCE3          04/22/93
     C****************************************************************  SRCE3          04/22/93
     C*                                                                  SRCE3          04/22/93
     C           CALGEN    BEGSR                                                        08/12/91
     C*                                                                                 08/12/91
     C* Clear the data structure which will be used by the generic                      08/12/91
     C*   transfer program.  This needs to be done as the data                          08/12/91
     C*   structure will hold up to 15 programs and we are using                        01/27/92
     C*   only one for this application.                                                08/12/91
     C* After loading the DS, call the generic transfer program                         08/12/91
     C*                                                                                 08/12/91
     C                    CLEARPMCGNR                                                   01/27/92
     C                    MOVELZMCENO    $SVALA                                         02/20/92
     C                    MOVELZMCENO    $CENO                                          02/28/92
     C                    MOVE '15'      $SFLA                                          01/27/92
     C                    MOVE 'S'       $SEND                                          08/12/91
     C                    MOVE 'D'       $DORR                                          01/27/92
     C                    MOVE 'Y'       $LDEXT                                         08/12/91
     C                    MOVE 'CE'      $TYPE                                          01/27/92
     C                    MOVE 'D'       $DORB                                          01/27/92
     C                    MOVE 'R'       $RORL                                          01/27/92
     C                    MOVE 'N'       $WRTRS                                         01/27/92
     C                    MOVEL'ZLCENO'  $CEF1                                          03/06/92
     C                    MOVEL'ZLCENO'  $SFLD1                                         03/06/92
     C                    MOVEL'REMHLD'  $SCEF1                                         02/20/92
     C                    MOVELCQLIBR    $SCEL1                                         02/20/92
```

```
     5738PW1 V2R2M0  920615                SEU SOURCE LISTING                     05/28/93 14:08:35          PAGE    8

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
37200      C                     MOVEL'EXREMH'  $EXTF1                                                  02/20/92
37300      C                     MOVELFXELIB    $EXTL1                                                  02/20/92
37400      C                     MOVEL'LOCCOM'  $TGTF1                                                  02/20/92
37500      C                     MOVELFXDLIB    $TGTL1                                                  02/20/92
37600      C*                                                                                           08/12/91
37700      C* Chain to APPDEF with '*SYSTEM' for the supplied generic                                   01/27/92
37800      C*    record for sending system files.                                                       01/27/92
37900      C*                                                                                           08/12/91
38000      C                     MOVEL'*SYSTEM 'KPGM                                                    02/20/92
38100      C                     MOVE ZMFREL    KFREL                                                   08/12/91
38200      C                     MOVE ZMTREL    KTREL                                                   08/12/91
38300      C*                                                                                           08/12/91
38400      C                     EXSR $APPDF                                                            08/12/91
38500      C*                                                                                           08/12/91
38600      C                     CALL FDGPGM                                                            01/27/92
38700      C                     PARM           PMCGNR                                                  01/27/92
38800      C                     PARM           PERROR                                                  02/13/92
38900      C                     PARM           PMSG                                                    02/13/92
39000      C*                                                                                           08/12/91
39100      C                     ENDSR                          CALGEN       SRCE3                      08/12/91
39200      C/SPACE 2                                                                                    08/01/91
39300      C*********  CHKTIM SUBR  **********************  CHKTIM SUBR  *                              08/09/91
39400      C*                                                             *                             08/09/91
39500      C*   The CHKTIM subroutine checks the high and low priority    *                             09/28/92
39600      C*       transmission times against the current time.  If it   *                             09/28/92
39700      C*       is time to transmit, call PRORCD to process the remote *                             09/28/92
39800      C*       communication records that are ready to be processed; *                             09/28/92
39900      C*       either for high or low priority applications.         *                             09/28/92
40000      C*                                                             *  SRCE3                      04/22/93
40100      C***************************************************************  SRCE3                      04/22/93
40200      C*                                                             *  SRCE3                      04/22/93
40300      C*   INDICATORS USED  :  NONE                                  *  SRCE3                      04/22/93
40400      C*                                                             *  SRCE3                      04/22/93
40500      C*   EXECUTES         :  PRORCD                                *  SRCE3                      04/22/93
40600      C*                                                             *  SRCE3                      04/22/93
40700      C*   EXECUTED FROM    :  PROREM                                *  SRCE3                      04/22/93
40800      C*                                                             *  SRCE3                      04/22/93
40900      C***************************************************************  SRCE3                      04/22/93
41000      C*                                                                SRCE3                      04/22/93
41100      C           CHKTIM    BEGSR                                                              08/09/91
41200      C*                                                                                           08/09/91
41300      C* 1. CHECK HIGH PRIORITY                                                                    08/20/92
41400      C* Check the transmission date and time with the current date                                08/09/91
41500      C*    and time.  If the tranmission date/time is less than                                   08/09/91
41600      C*    the current date/time, then advance to the next transmission                           08/09/91
41700      C*    date/time.  Transmit the records by executing the subroutine                           08/09/91
41800      C*    PRORCD.                                                                                08/09/91
41900      C*                                                                                           08/09/91
42000      C                     CALL 'MZM620X' PZM620           Get date & time                        09/28/92
42100      C           QQTDTH    IFLT PDATE                                                             09/28/92
42200      C           QQTDTH    OREQ PDATE                                                             09/28/92
42300      C           QQTTMH    ANDLEPTIME                                                             09/28/92
42400      C                     CLEAR$ZU160                                                            01/27/92
```

```
 5738PW1 V2R2M0  920615                SEU SOURCE LISTING                        05/28/93 14:08:35           PAGE    9

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
           C                     Z-ADDQQTDTH    $ORDT          Last date                              08/20/92
           C                     Z-ADDQQTIMH    $ORTM          Last time                              08/20/92
           C                     Z-ADDCQFRQH    $SEC           Trans Frequency                        08/20/92
           C                     MOVE 'F'       $FORB          Calc Forward                           01/27/92
           C*                                                                                         08/09/91
           C* Call the date calculation program with the data                                         08/09/91
           C*    structure $ZU160                                                                     08/09/91
           C*                                                                                         08/09/91
           C                     CALL 'MZU160'                                                        09/25/91
           C                     PARM           $ZU160                                                01/27/92
           C*                                                                                         08/09/91
           C                     Z-ADD$NWDT     QQTDTH         Next Date                              08/20/92
           C                     Z-ADD$NWTM     QQTIMH         Next Time                              08/20/92
           C*                                                                                         08/09/91
           C* Call the subroutine to process the high priority records only                           08/20/92
           C*                                                                                         08/09/91
           C                     MOVE 'H'       QQPRTY                                                08/20/92
           C                     EXSR PRORCD                                                          08/09/91
           C*                                                                                         08/20/92
           C                     ENDIF                         QQTDTH<PDATE                           09/28/92
           C*                                                                                         08/20/92
           C* 2. CHECK LOW PRIORITY                                                                   08/20/92
           C* Check the transmission date and time with the current date                              08/20/92
           C*    and time.  If the tranmission date/time is less than                                 08/20/92
           C*    the current date/time, then advance to the next transmission                         08/20/92
           C*    date/time.  Transmit the records by executing the subroutine                         08/20/92
           C*    PRORCD.                                                                              08/20/92
           C*                                                                                         08/20/92
           C                     CALL 'MZM620X' PZM620         Get date & time                        09/28/92
           C           QQTDTL    IFLT PDATE                                                           09/28/92
           C           QQTDTL    OREQ PDATE                                                           09/28/92
           C           QQTIML    ANDLEPTIME                                                           09/28/92
           C                     CLEAR$ZU160                                                          08/20/92
           C                     Z-ADDQQTDTL    $ORDT          Last date                              08/20/92
           C                     Z-ADDQQTIML    $ORTM          Last time                              08/20/92
           C                     Z-ADDCQFRQL    $SEC           Trans Frequency                        08/20/92
           C                     MOVE 'F'       $FORB          Calc Forward                           08/20/92
           C*                                                                                         08/20/92
           C* Call the date calculation program with the data                                         08/20/92
           C*    structure $ZU160                                                                     08/20/92
           C*                                                                                         08/20/92
           C                     CALL 'MZU160'                                                        08/20/92
           C                     PARM           $ZU160                                                08/20/92
           C*                                                                                         08/20/92
           C                     Z-ADD$NWDT     QQTDTL         Next Date                              08/20/92
           C                     Z-ADD$NWTM     QQTIML         Next Time                              08/20/92
           C*                                                                                         08/20/92
           C* Call the subroutine to process the low priority records only                            08/20/92
           C*                                                                                         08/20/92
           C                     MOVE 'L'       QQPRTY                                                08/20/92
           C                     EXSR PRORCD                                                          08/20/92
           C*                                                                                         08/09/91
           C                     ENDIF                         QQTDTL<PDATE                           09/28/92
```

```
5738PW1 V2R2M0  920615                SEU SOURCE LISTING                      05/28/93 14:08:35              PAGE   10

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
          C*                                                                                            08/09/91
          C                   ENDSR                           CHKTIM        SRCE3                       08/09/91
          C/SPACE 2                                                                                     07/25/91
          C**********  ENDPRO SUBR  **********************  ENDPRO SUBR  *                              07/25/91
          C*                                                               *                            07/25/91
          C*   The ENDPRO subroutine ends the processor if a '*END'        *                            07/25/91
          C*       request was hit or processing ended.                    *                            04/21/93
          C*                                                               *   SRCE3                    04/22/93
          C*****************************************************************   SRCE3                    04/22/93
          C*                                                               *   SRCE3                    04/22/93
          C*   INDICATORS USED  :  99                                      *   SRCE3                    04/22/93
          C*                                                               *   SRCE3                    04/22/93
          C*   EXECUTED FROM    :  MAINLN                                  *   SRCE3                    04/22/93
          C*                                                               *   SRCE3                    04/22/93
          C*****************************************************************   SRCE3                    04/22/93
          C*                                                                   SRCE3                    04/22/93
          C         ENDPRO    BEGSR                                                                     07/25/91
          C*                                                                                            07/25/91
          C* Delete the correct EM background file record (EMBKGD) for                                  07/26/91
          C*     this job/user profile/job number.                                                      07/26/91
          C*                                                                                            07/25/91
          C                   MOVEL'MMC040XJ'KJOB                                                       08/09/91
          C                   MOVEL$PUSPF    KUSER                                                      02/05/92
          C                   Z-ADD$PJOBN    KJOBN                                                      02/05/92
          C*                                                                                            07/26/91
          C         KEMBKG    CHAINEMBKGD               99                                              07/25/91
          C         *IN99     IFEQ *OFF                                                                 01/27/92
          C                   DELETEMBKGD                                                               07/25/91
          C                   ENDIF                           *IN99=*OFF                                07/25/91
          C*                                                                                            04/22/93
          C* Delete any Special records (*END, *RESET or *INIT) from the                                04/22/93
          C*   file for the specific job.  Because these begin with '*'                                 04/22/93
          C*   the records will all appear at the beginning of the file                                 04/22/93
          C*   so when a non-'*' entry is found, end the loop.                                          04/22/93
          C*                                                                                            04/22/93
          C         *LOVAL    SETLLREMCOM                                                               04/22/93
          C         *IN99     DOUEQ*ON                                                                  04/22/93
          C                   READ REMCOM                   99                                          04/22/93
          C         *IN99     IFEQ *OFF                                                                 04/22/93
          C*                                                                                            04/22/93
          C*    Check for a special record                                                              04/22/93
          C*                                                                                            04/22/93
          C                   MOVE ZMCENO    QQCENO                                                     04/22/93
          C         QQJOBN    IFEQ $PJOBN                                                               04/22/93
          C         QQTYPE    IFEQ '*INIT'                                                              04/22/93
          C         QQTYPE    OREQ '*END'                                                               04/22/93
          C         QQTYPE    OREQ '*RESET'                                                             04/22/93
          C                   DELETREMCO2                                                               04/22/93
          C                   ENDIF                           QQTYPE='*INIT'                            04/22/93
          C                   ENDIF                           QQJOBN=$PJOBN                             04/22/93
          C*                                                                                            04/22/93
          C*     Check if end of special records                                                        04/22/93
          C*                                                                                            04/22/93
```

```
SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
       C           1         SUBSTQQTYPE:1  QQTEMP                                          04/22/93
       C           QQTEMP    IFNE '*'                                                       04/22/93
       C                     UNLCKREMCOM                                                    04/22/93
       C                     LEAVE                                                          04/22/93
       C                     ENDIF                          QQTEMP<>'*'                     04/22/93
       C*                                                                                   04/22/93
       C                     ENDIF                          *IN99=*OFF                      04/22/93
       C                     ENDDO                          DOU *IN99=*ON                   04/22/93
       C*                                                                                   07/25/91
       C                     ENDSR                          ENDPRO          SRCE3           07/25/91
       C/SPACE 2                                                                            07/23/91
       C*********** PRORCD SUBR  ********************** PRORCD SUBR  *                      07/25/91
       C*                                                            *                      07/23/91
       C*   The PRORCD subroutine processes the REMCOM record by     *                      01/27/92
       C*   reading all the records limited by the logical view.     *                      02/14/92
       C*   First, it checks each record to make sure the application *                     09/28/92
       C*   priority matches the priority being processed.  Then,    *                      09/28/92
       C*   if the record is for distribution, call the sending      *                      09/28/92
       C*   transfer program.  If the record is for consolidation,   *                      01/27/92
       C*   call the GPLDA formatting program and the extraction     *                      01/28/92
       C*   program.  If either of these programs completed          *                      01/28/92
       C*   successfully, call the generic transfer program for      *                      01/28/92
       C*   both function.                                           *                      01/28/92
       C*                                                            *      SRCE3           04/22/93
       C**************************************************************      SRCE3           04/22/93
       C*                                                            *      SRCE3           04/22/93
       C*   INDICATORS USED  :  98  99                               *      SRCE3           04/22/93
       C*                                                            *      SRCE3           04/22/93
       C*   EXECUTES         :  $APPDF  CALGEN  WRTREM               *      SRCE3           04/22/93
       C*                                                            *      SRCE3           04/22/93
       C*   EXECUTED FROM    :  CHKTIM                               *      SRCE3           04/22/93
       C*                                                            *      SRCE3           04/22/93
       C**************************************************************      SRCE3           04/22/93
       C*                                                                   SRCE3           04/22/93
       C           PRORCD    BEGSR                                                          07/25/91
       C*                                                                                   08/12/91
       C* Read all the REMCOM01 records of status '30' (these are the                       02/14/92
       C*   only records selected by this logical view).  These have                        02/14/92
       C*   all been read by the processor before.  They are                                02/14/92
       C*   picked up here when the transmission time is reached.                           08/12/91
       C*                                                                                   08/12/91
       C           *LOVAL    SETLLFREMCO1              99                                   04/22/93
       C*                                                                                   08/12/91
       C           *IN99     DOWEQ*OFF                                                      01/27/92
       C                     READ REMCOM01                 99                               02/14/92
       C           *IN99     IFEQ *OFF                                                      01/27/92
       C*                                                                                   08/09/91
       C* Access APPDEF for the sending and Generic transfer program                        08/13/91
       C*      and the GPLDA formatting program                                             08/13/91
       C*                                                                                   08/09/91
       C                     MOVE ZMPGM     KPGM                                            08/09/91
       C                     MOVE ZMFREL    KFREL                                           08/09/91
       C                     MOVE ZMTREL    KTREL                                           08/09/91
```

```
     5738PW1 V2R2M0  920615              SEU SOURCE LISTING                    05/28/93 14:08:35          PAGE   12

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
58400      C*                                                                                   08/09/91
58500      C                     EXSR $APPDF                                                    08/09/91
58600      C*                                                                                   08/09/91
58700      C*  If APPDEF record cannot be found the status must be                              08/09/91
58800      C*    updated with '62' this would mean the REMCOM record                            08/12/91
58900      C*    could not be processed as no APPDEF record was found                           08/09/91
59000      C*                                                                                   08/09/91
59100      C           $$FAIL    IFEQ '1'                                                       08/09/91
59200      C                     MOVE '62'      ZMSTAT                                          08/09/91
59300      C                     UPDATFREMCO1                                                   04/22/93
59400      C                     ITER                                                           01/27/92
59500      C                     ENDIF                          $$FAIL='1'                      01/27/92
59600      C*                                                                                   08/20/92
59700      C* Check the priority of the application.  If the priority matches                   08/20/92
59800      C*    the priority that is currently being processed, continue.                      09/28/92
59900      C*    Otherwise, return to the beginning of the loop to read the                     08/20/92
60000      C*    next record.  The priority that is being processed was set                     08/20/92
60100      C*    in CHKTIM subroutine.                                                          08/20/92
60200      C*                                                                                   08/20/92
60300      C           QQPRTY    IFNE FDPRTY                                                    08/20/92
60400      C                     UNLCKREMCOM01                                                  08/31/92
60500      C                     ITER                                                           08/20/92
60600      C                     ENDIF                          QQPRTY<>FDPRTY                  08/20/92
60700      C*                                                                                   01/27/92
60800      C* Chain to SYSXRF (System Cross-reference file) to obtain the                       01/27/92
60900      C*    library associated with the originating system/remote system                   01/27/92
61000      C*    of the REMCOM record.  If the access fails then transmission                   01/27/92
61100      C*    cannot occur.  Update the status.                                              01/27/92
61200      C*                                                                                   01/27/92
61300      C                     MOVE ZMORSY    KLSYS                                           01/27/92
61400      C                     MOVE ZMSYS     KRSYS                                           01/27/92
61500      C                     MOVE *BLANKS   KRENT                                           01/27/92
61600      C           KSYSXR    CHAINSYSXRF               98                                   01/27/92
61700      C           *IN98     IFEQ *ON                                                       01/27/92
61800      C                     MOVE '65'      ZMSTAT                                          01/27/92
61900      C                     UPDATFREMCO1                                                   04/22/93
62000      C                     ITER                                                           01/27/92
62100      C                     ENDIF                          *IN98=*ON                       01/27/92
62200      C*                                                                                   08/12/91
62300      C* If an APPDEF and SYSMST record was found, then update the                         01/27/92
62400      C*    REMCOM record with status '31' to indicate that the                            01/27/92
62500      C*    record was selected for transmission.                                          08/12/91
62600      C*                                                                                   08/12/91
62700      C                     MOVE '31'      ZMSTAT                                          08/12/91
62800      C                     UPDATFREMCO1                                                   04/22/93
62900      C*                                                                                   08/09/91
63000      C* Call the sending transfer program to load the data transfer                       08/09/91
63100      C*   files if type 'CD' or 'DD'                                                      08/09/91
63200      C*                                                                                   08/09/91
63300      C           ZMTYPE    IFEQ 'CD'                                                      08/09/91
63400      C           ZMTYPE    OREQ 'DD'                                                      08/09/91
63500      C                     MOVE 'S'       PSEND                                           08/09/91
63600      C                     MOVE ZMCENO    PCENO                                           08/09/91
```

```
5738PW1 V2R2M0  920615              SEU SOURCE LISTING                  05/28/93 14:08:35              PAGE   13

SOURCE FILE . . . . . . .   XLIBEM/MRPGSRC
MEMBER  . . . . . . . . .   MMC040

SEQNBR*...+... 1 ...+... 2 ...+... 3 ...+... 4 ...+... 5 ...+... 6 ...+... 7 ...+... 8 ...+... 9 ...+... 0
63700      C                    MOVE 'R'      PRORL                                                 08/09/91
63800      C                    MOVE FDGPGM   PGNRC                                                 08/09/91
63900      C                    MOVE '0'      PERROR                                                03/11/92
64000      C*                                                                                       08/09/91
64100      C                    CALL FDSPGM   PMCSND       98                                       10/07/92
64200      C*                                                                                       10/07/92
64300      C*   - if the call fails (*IN98 is on), call MMC030 to send                                  10/07/92
64400      C*     a message to the EM background message queue saying                                   10/07/92
64500      C*     that the sending transfer program doesn't exist.                                      10/07/92
64600      C*     Load $LIT1 with the literal sequence # for the name of                                10/28/92
64700      C*     the program that doesn't exist, and $LIT2 with the                                    10/28/92
64800      C*     literal sequence # for the CE type.                                                   10/28/92
64900      C*                                                                                       10/07/92
65000      C          *IN98     IFEQ *ON                                                            10/07/92
65100      C                    MOVE MODULE   $MODCD                                                10/07/92
65200      C                    MOVE '00469'  $ERRNO           Message #M00469                      10/07/92
65300      C                    MOVE ZMCENO   $CENUM           CE #                                 10/07/92
65400      C                    MOVE '00013'  $LIT1            'Snd xfer pgm'                       10/07/92
65500      C                    MOVE '00019'  $LIT2            'Remote'                             10/07/92
65600      C                    CALL 'MMC030' PMC030                                                10/07/92
65700      C                    ENDIF                          *IN98=*ON                            10/07/92
65800      C*                                                                                       10/07/92
65900      C                    ENDIF                          ZMTYPE='CD'                          08/09/91
66000      C*                                                                                       08/09/91
66100      C* If consolidated, call the GPLDA sending transfer program.  If                         03/12/92
66200      C*    the GPLDA is sent successfully, call the resource extraction                           03/12/92
66300      C*    program if there is one. (That is, if FDEPGM is not blank.)                            09/04/92
66400      C*                                                                                       08/09/91
66500      C          ZMTYPE    IFEQ 'CN'                                                           08/09/91
66600      C                    MOVE 'S'      PSEND                                                 08/09/91
66700      C                    MOVE ZMCENO   PCENO                                                 08/09/91
66800      C                    MOVE 'R'      PRORL                                                 08/09/91
66900      C                    MOVE FDGPGM   PGNRC                                                 08/09/91
67000      C                    MOVE '0'      PERROR                                                03/11/92
67100      C*                                                                                       08/09/91
67200      C                    CALL FDFPGM   PMCSND       98  GPLDA Snd/tran                       10/07/92
67300      C*                                                                                       10/07/92
67400      C*   - if the call fails (*IN98 is on), call MMC030 to send                                  10/07/92
67500      C*     a message to the EM background message queue saying                                   10/07/92
67600      C*     that the GPLDA sending transfer program doesn't exist.                                10/07/92
67700      C*                                                                                       10/07/92
67800      C          *IN98     IFEQ *ON                                                            10/07/92
67900      C                    MOVE MODULE   $MODCD                                                10/07/92
68000      C                    MOVE '00469'  $ERRNO           Message #M00469                      10/07/92
68100      C                    MOVE ZMCENO   $CENUM           CE #                                 10/07/92
68200      C                    MOVE '00015'  $LIT1            'GPLDA snd pgm'                      10/07/92
68300      C                    MOVE '00019'  $LIT2            'Remote'                             10/07/92
68400      C                    CALL 'MMC030' PMC030                                                10/07/92
68500      C                    ENDIF                          *IN98=*ON                            10/07/92
68600      C*                                                                                       10/07/92
68700      C*   - if the GPLDA is sent successfully, call the resource extraction                       10/07/92
68800      C*     extraction program is there is one. (That is, if FDEPGM is                            10/07/92
68900      C*     not blank.)                                                                           10/07/92
```

```
5738PW1 V2R2M0  920615                SEU SOURCE LISTING                          05/28/93 14:08:35              PAGE    14

SOURCE FILE . . . . . . .   XLIBEM/MRPGSRC
MEMBER  . . . . . . . . .   MMC040

SEQNBR*...+... 1 ...+... 2 ...+... 3 ...+... 4 ...+... 5 ...+... 6 ...+... 7 ...+... 8 ...+... 9 ...+... 0
69000      C*                                                                                         10/07/92
69100      C           PERROR    IFEQ '0'                                                             03/11/92
69200      C           *IN98     ANDEQ*OFF                                                            10/07/92
69300      C           FDEPGM    ANDNE*BLANKS                                                         09/04/92
69400      C                     CALL FDEPGM    PMCEXT       98 Extraction Pgm                        10/07/92
69500      C*                                                                                         10/07/92
69600      C*   - if the call fails (*IN98 is on), call MMC030 to send                                10/07/92
69700      C*     a message to the EM background message queue saying                                10/07/92
69800      C*     that the resource extraction program doesn't exist.                                 10/07/92
69900      C*     Load $LIT1 with the literal sequence # for the name of                              10/28/92
70000      C*     the program that doesn't exist, and $LIT2 with the                                  10/28/92
70100      C*     literal sequence # for the CE type.                                                 10/28/92
70200      C*                                                                                         10/07/92
70300      C           *IN98     IFEQ *ON                                                             10/07/92
70400      C                     MOVE MODULE    $MODCD                                                10/07/92
70500      C                     MOVE '00169'   $ERRNO            Message #M00469                     10/07/92
70600      C                     MOVE ZMCENO    $CENUM            CE #                                10/07/92
70700      C                     MOVE '00012'   $LIT1             'Resc extr pgm'                     10/07/92
70800      C                     MOVE '00019'   $LIT2             'Remote'                            10/07/92
70900      C                     CALL 'MMC030'  PMC030                                                10/07/92
71000      C                     ENDIF                            *IN98=*ON                           10/07/92
71100      C*                                                                                         10/08/92
71200      C                     ENDIF                            PERROR='0'                          10/08/92
71300      C*                                                                                         10/07/92
71400      C                     ENDIF                            ZMTYPE='CN'                         08/09/91
71500      C*                                                                                         08/09/91
71600      C* If the no error was found, then the previous programs were                              03/11/92
71700      C*   successful. Write a record to REMHLD and call the generic                             08/12/91
71800      C*   transfer program.                                                                     08/12/91
71900      C*                                                                                         08/12/91
72000      C           PERROR    IFEQ '0'                                                             03/11/92
72100      C           *IN98     ANDEQ*OFF                                                            10/08/92
72200      C                     EXSR WRTREM                                                          08/12/91
72300      C                     EXSR CALGEN                                                          08/12/91
72400      C                     ENDIF                            PERROR='0'                          08/12/91
72500      C*                                                                                         08/09/91
72600      C* After all the program calls have completed for the current                              02/26/92
72700      C*   record, call a program to close all the programs using                                02/26/92
72800      C*   the Reclaim Resource command (RCLRSC).                                                02/26/92
72900      C*                                                                                         02/26/92
73000      C                     CALL 'MZM700X'                                                       02/26/92
73100      C*                                                                                         02/26/92
73200      C                     SETOF                     99                                         04/20/93
73300      C*                                                                                         04/20/93
73400      C                     ENDIF                            *IN99=*OFF                          08/12/91
73500      C                     ENDDO                            DOW *IN99=*OFF                      08/12/91
73600      C*                                                                                         08/13/91
73700      C                     MOVE *OFF      *IN99                                                 01/27/92
73800      C*                                                                                         08/09/91
73900      C                     ENDSR                            PRORCD         SRCE3                08/12/91
74000      C/SPACE 2                                                                                  01/27/92
74100      C**********  PROREM SUBR  ***********************  PROREM SUBR  *                          01/27/92
74200      C*                                                              *                          01/27/92
```

```
5738PW1 V2R2M0  920615            SEU SOURCE LISTING                    05/28/93 14:08:35          PAGE   15

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
74300      C*   The PROREM subroutine processes the REMCOMDT file by          *                         01/27/92
74400      C*     determining if the record is an initialization, reset,      *                         01/27/92
74500      C*     end record, or normal REMCOM record.  A normal REMCOM       *                         01/27/92
74600      C*     record is set to a waiting status and will be processed     *                         01/27/92
74700      C*     at frequencies set in the COMDEF file.                       *                         01/27/92
74800      C*                                                                  *   SRCE3                 04/22/93
74900      C*******************************************************************   SRCE3                 04/22/93
75000      C*                                                                  *   SRCE3                 04/22/93
75100      C*   INDICATORS USED  :  98  99                                     *   SRCE3                 04/22/93
75200      C*                                                                  *   SRCE3                 04/22/93
75300      C*   EXECUTES         :  CHKTIM  RSTPRO                             *   SRCE3                 04/22/93
75400      C*                                                                  *   SRCE3                 04/22/93
75500      C*   EXECUTED FROM    :  MAINLN                                     *   SRCE3                 04/22/93
75600      C*                                                                  *   SRCE3                 04/22/93
75700      C*******************************************************************   SRCE3                 04/22/93
75800      C*                                                                      SRCE3                 04/22/93
75900      C           PROREM    BEGSR                                                                   01/27/92
76000      C*                                                                                            01/27/92
76100      C           *IN99     DOWEQ*OFF                                                               01/27/92
76200      C*                                                                                            06/18/92
76300      C* Check if it is time to transmit                                                            06/18/92
76400      C*                                                                                            06/18/92
76500      C                     EXSR CHKTIM                                                             06/18/92
76600      C*                                                                                            01/27/92
76700      C                     READ REMCOMDT                  99                                       01/27/92
76800      C*                                                                                            02/03/93
76900      C* If a shut down request is issued for this job, end                                         02/03/93
77000      C*    the processor.                                                                          02/03/93
77100      C*                                                                                            02/03/93
77200      C                     SHTDN                      98                                           02/03/93
77300      C           *IN98     IFEQ *ON                                                                02/03/93
77400      C                     UNLCKREMCOMDT                                                           04/30/93
77500      C                     LEAVE                                                                   04/21/93
77600      C                     ENDIF                               *IN98=*ON                           02/03/93
77700      C*                                                                                            02/03/93
77800      C           *IN99     IFEQ *OFF                                                               01/27/92
77900      C*                                                                                            01/27/92
78000      C* The CE # is a combination of *RESET or *END and the job                                    01/27/92
78100      C*    job number if it is not a normal communications entry.                                  01/27/92
78200      C*    The variable QQCENO is a data structure which breaks                                    01/27/92
78300      C*    into QQTYPE(*RESET or *END) and QQJOBN(job number)                                      01/27/92
78400      C*                                                                                            01/27/92
78500      C                     MOVE ZMCENO    QQCENO                                                   01/27/92
78600      C*                                                                                            01/27/92
78700      C* Check the CE # to determine if this is an initialization                                   01/27/92
78800      C*   request. Check if the record corresponds with this job.                                  01/27/92
78900      C*   Return to read another record.                                                           01/27/92
79000      C*                                                                                            01/27/92
79100      C           QQTYPE    IFEQ '*INIT'                                                            01/27/92
79200      C           QQJOBN    IFEQ $PJOBN                                                             02/05/92
79300      C                     DELETREMCOM                                                             01/27/92
79400      C                     ELSE                                                                    06/19/92
79500      C                     UNLCKREMCOMDT                                                           06/19/92
```

```
 5738PW1 V2R2M0  920615                SEU SOURCE LISTING                        05/28/93 14:08:35                PAGE   16

SOURCE FILE . . . . . . .   XLIBEM/MRPGSRC
MEMBER  . . . . . . . . .   MMC040

SEQNBR*...+... 1 ...+... 2 ...+... 3 ...+... 4 ...+... 5 ...+... 6 ...+... 7 ...+... 8 ...+... 9 ...+... 0
79600      C                    ENDIF                           QQJOBN=$PJOBN                          01/27/92
79700      C                    ITER                                                                   01/27/92
79800      C                    ENDIF                           QQTYPE='*INIT'                         01/27/92
79900      C*                                                                                          01/27/92
80000      C* Check the CE # to determine if this is a deactivate request                              01/27/92
80100      C*    The deactivate request is job specific.  Check that the                               01/27/92
80200      C*    request is for the current job.  Delete the deactivate                                04/21/93
80300      C*    request so no other processors pick it up.  End the                                   04/21/93
80400      C*    program.  If it is not the current job, return to read                                04/21/93
80500      C*    another record.                                                                       04/21/93
80600      C*                                                                                          01/27/92
80700      C          QQTYPE    IFEQ '*END'                                                            01/27/92
80800      C          QQJOBN    IFEQ $PJOBN                                                            02/05/92
80900      C                    DELETFREMCOM                                                           04/21/93
81000      C                    LEAVE                                                                  04/21/93
81100      C                    ELSE                                                                   06/19/92
81200      C                    UNLCKREMCOMDT                                                          06/19/92
81300      C                    ENDIF                           QQJOBN=$PJOBN                          01/27/92
81400      C                    ITER                                                                   01/27/92
81500      C                    ENDIF                           QQTYPE='*END'                          01/27/92
81600      C*                                                                                          01/27/92
81700      C* Check the CE # to determine if this is a reset request                                   01/27/92
81800      C*    The reset records are job specific - check that the                                   01/27/92
81900      C*    request is for the correct job.                                                       01/27/92
82000      C*                                                                                          01/27/92
82100      C          QQTYPE    IFEQ '*RESET'                                                          01/27/92
82200      C          QQJOBN    IFEQ $PJOBN                                                            02/05/92
82300      C                    EXSR RSTPRO                                                            01/27/92
82400      C                    ELSE                                                                   06/19/92
82500      C                    UNLCKREMCOMDT                                                          06/19/92
82600      C                    ENDIF                           QQJOBN=$PJOBN                          01/27/92
82700      C                    ITER                                                                   01/27/92
82800      C                    ENDIF                           QQTYPE='*RESET'                        01/27/92
82900      C*                                                                                          01/27/92
83000      C* If the record is not a reset, initialization, or deactivation                            01/27/92
83100      C*   then change status from '15' to '30' so no other processors                            01/27/92
83200      C*   pick up the record.  It also indicates that the                                        01/27/92
83300      C*   record is waiting to be sent.                                                          01/27/92
83400      C*                                                                                          01/27/92
83500      C          ZMCENO    DSPLY                                                                  05/27/93
83600      C                    MOVE '30'      ZMSTAT                                                  01/27/92
83700      C                    UPDATFREMCOM                                                           01/27/92
83800      C*                                                                                          04/20/93
83900      C                    SETOF                     99                                           04/20/93
84000      C*                                                                                          04/20/93
84100      C                    ENDIF                           *IN99=*OFF                             06/18/92
84200      C                    ENDDO                           DOW *IN99=*OFF                         01/27/92
84300      C*                                                                                          01/27/92
84400      C                    ENDSR                           PROREM         SRCE3                   01/27/92
84500      C/SPACE 2                                                                                   07/25/91
84600      C**********  RSTPRO SUBR  ***********************  RSTPRO SUBR  *                           07/25/91
84700      C*                                                              *                           07/25/91
84800      C*   The RSTPRO subroutine resets the processor if a '*RESET'   *                           07/25/91
```

```
SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
84900      C*      request was hit                                              *              07/25/91
85000      C*                                                                   *    SRCE3     04/22/93
85100      C********************************************************************    SRCE3     04/22/93
85200      C*                                                                   *    SRCE3     04/22/93
85300      C*   INDICATORS USED  :  98                                          *    SRCE3     04/22/93
85400      C*                                                                   *    SRCE3     04/22/93
85500      C*   EXECUTED FROM    :  PROREM                                      *    SRCE3     04/22/93
85600      C*                                                                   *    SRCE3     04/22/93
85700      C********************************************************************    SRCE3     04/22/93
85800      C*                                                                        SRCE3     04/22/93
85900      C           RSTPRO    BEGSR                                                         07/25/91
86000      C*                                                                                  07/25/91
86100      C* Delete the deactivate request so no other processors pick                        07/25/91
86200      C*    it up                                                                         07/25/91
86300      C*                                                                                  07/25/91
86400      C           ZMCENO    DSPLY                                                         05/27/93
86500      C           ZMDTMT    DSPLY                                                         05/27/93
86600      C           ZMTMMT    DSPLY                                                         05/27/93
86700      C                     DELETFREMCOM                                                  08/09/91
86800      C*                                                                                  07/25/91
86900      C* Reset the file                                                                   07/25/91
87000      C*                                                                                  07/25/91
87100      C           *LOVAL    SETLLREMCOMDT             98                                  08/09/91
87200      C*                                                                                  07/30/91
87300      C*                                                                                  08/09/91
87400      C* If the reset fails, there are no records in the file                             08/09/91
87500      C*   since this positions the pointer to the end of the                             08/09/91
87600      C*   file, no more records will be read.  An initialization                         08/09/91
87700      C*   record must be written to give the reset a record to                           08/09/91
87800      C*   position on.                                                                   08/09/91
87900      C*                                                                                  08/09/91
88000      C           *IN98     IFEQ *ON                                                      01/27/92
88100      C                     CLEARFREMCOM                                                  08/09/91
88200      C                     MOVEL'*INIT'   ZMCENO                                         08/09/91
88300      C                     MOVE $PJOBN    ZMCENO                                         02/05/92
88400      C                     MOVE '15'      ZMSTAT                                         08/09/91
88500      C                     MOVE $PUSPF    ZMUSER                                         02/05/92
88600      C           'INIT'    DSPLY                                                         05/27/93
88700      C                     WRITEFREMCOM                                                  08/09/91
88800      C           *LOVAL    SETLLREMCOMDT                                                 08/09/91
88900      C*                                                                                  08/22/91
89000      C* If the reset fails, update the EM Background file (EMBKGD)                       08/22/91
89100      C*    for this job/user profile/job number to indicate the                          08/22/91
89200      C*    number of failed resets.                                                      08/22/91
89300      C*                                                                                  08/22/91
89400      C                     MOVEL'MMC040XJ'KJOB                                           08/22/91
89500      C                     MOVEL$PUSPF    KUSER                                          02/05/92
89600      C                     Z-ADD$PJOBN    KJOBN                                          02/05/92
89700      C*                                                                                  08/22/91
89800      C           KEMBKG    CHAINEMBKGD               98                                  08/22/91
89900      C           *IN98     IFEQ *OFF                                                     01/27/92
90000      C                     ADD  1         BGRSET                                         08/22/91
90100      C                     UPDATFEMBKGD                                                  08/22/91
```

```
     5738PW1 V2R2M0  920615                SEU SOURCE LISTING                          05/28/93 14:08:35              PAGE   18

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
90200      C                    ENDIF                              *IN98=*OFF                                 08/22/91
90300      C*                                                                                                 08/22/91
90400      C                    ENDIF                              *IN98=*ON                                  08/09/91
90500      C*                                                                                                 07/25/91
90600      C                    ENDSR                              RSTPRO         SRCE3                       07/25/91
90700      C/SPACE 2                                                                                          08/12/91
90800      C*********  WRTREM SUBR  *********************  WRTREM SUBR  *                                     08/12/91
90900      C*                                                           *                                     08/12/91
91000      C*   The WRTREM subroutine writes a record to REMHLD for the    *                                  08/12/91
91100      C*       current record                                        *                                   08/12/91
91200      C*                                                           *   SRCE3                             04/22/93
91300      C*************************************************************   SRCE3                             04/22/93
91400      C*                                                           *   SRCE3                             04/22/93
91500      C*   INDICATORS USED  :  99                                  *   SRCE3                             04/22/93
91600      C*                                                           *   SRCE3                             04/22/93
91700      C*   EXECUTED FROM    :  PRORCD                              *   SRCE3                             04/22/93
91800      C*                                                           *   SRCE3                             04/22/93
91900      C*************************************************************   SRCE3                             04/22/93
92000      C*                                                               SRCE3                             04/22/93
92100      C           WRTREM    BEGSR                                                                        08/12/91
92200      C*                                                                                                 08/12/91
92300      C* Write a record to REMHLD                                                                        08/12/91
92400      C*                                                                                                 08/12/91
92500      C           ZMCENO    CHAINREMHLD                   99                                             08/28/91
92600      C                     MOVE ZMCENO    ZLCENO                                                        03/09/92
92700      C                     MOVE ZMENT     ZLENT                                                         03/09/92
92800      C                     MOVE ZMSYS     ZLSYS                                                         03/09/92
92900      C                     MOVE ZMGRNO    ZLGRNO                                                        03/09/92
93000      C                     MOVE ZMPGM     ZLPGM                                                         03/09/92
93100      C                     MOVE ZMTYPE    ZLTYPE                                                        03/09/92
93200      C                     MOVE ZMPROC    ZLPROC                                                        03/09/92
93300      C                     MOVE ZMGPKY    ZLGPKY                                                        03/09/92
93400      C                     MOVE '14'      ZLSTAT                                                        12/28/92
93500      C                     Z-ADDZMENDT    ZLENDT                                                        03/09/92
93600      C                     Z-ADDZMENTM    ZLENTM                                                        03/09/92
93700      C                     Z-ADD0         ZLJBNO                                                        03/09/92
93800      C                     MOVE *BLANKS   ZLJBNM                                                        03/09/92
93900      C                     Z-ADD0         ZLJBSD                                                        03/09/92
94000      C                     Z-ADD0         ZLJBST                                                        03/09/92
94100      C                     MOVE ZMUSER    ZLUSER                                                        03/09/92
94200      C                     MOVE ZMWKST    ZLWKST                                                        03/09/92
94300      C                     MOVE ZMORSY    ZLORSY                                                        03/09/92
94400      C                     MOVE ZMOREN    ZLOREN                                                        03/09/92
94500      C                     MOVE ZMFREL    ZLFREL                                                        03/09/92
94600      C                     MOVE ZMTREL    ZLTREL                                                        03/09/92
94700      C                     Z-ADD0         ZLSEND                                                        07/17/92
94800      C                     MOVE *BLANKS   ZLCPFM                                                        07/17/92
94900      C                     MOVE ZMDORR    ZLDORR                                                        03/09/92
95000      C                     CALL 'MZM620X' PZM620          Get date & time                               09/28/92
95100      C                     Z-ADDPDATE     ZLDTMT                                                        09/28/92
95200      C                     Z-ADDPTIME     ZLTMMT                                                        09/28/92
95300      C           *IN99     IFEQ *ON                                                                     01/27/92
95400      C                     WRITEFREMHLD                                                                 08/12/91
```

```
 5738PW1 V2R2M0  920615                SEU SOURCE LISTING                 05/28/93 14:08:35          PAGE   19

SOURCE FILE . . . . . . .  XLIBEM/MRPGSRC
MEMBER  . . . . . . . . .  MMC040

SEQNBR*...+... 1 ...+... 2 ...+... 3 ...+... 4 ...+... 5 ...+... 6 ...+... 7 ...+... 8 ...+... 9 ...+... 0
95500      C                    MOVE *OFF      *IN99                                                      01/27/92
95600      C                    ELSE                                                                      08/28/91
95700      C                    UPDATFREMHLD                                                              08/28/91
95800      C                    ENDIF                        *IN99=*ON                                    08/28/91
95900      C*                                                                                             08/12/91
96000      C                    ENDSR                        WRTREM        SRCE3                          08/12/91

                    * * * *  E N D  O F  S O U R C E  * * * *
```

```
;hi;        ** Trade Secret Information of Marcam **          05/28/93 **
;hx;;ql;

;id; This published, copyrighted work contains trade secret information
of Marcam corporation.  Use, transfer, disclosure, or copying without
its expressed written permission is strictly forbidden. ;ql;


$MMC160$

;b;  MMC160          Job Queue Controller Program               ;ql;;r;


;hi;A.  This program is called by the job queue procedures submitted by
MMC020, the Local Communications Processor, for consolidation
applications.  It determines, based on the residence of the requesting
entity and the satisfying entity, what steps that specific job queue
procedure should perform.  Possible steps are loading an entity file or
extract file, printing a report, sending a system message, sending an
extract file to another system, and bringing information sent from
other systems up to the entity-level files.  This program passes the
results back in the form of Y/N parameters representing each step.  It
also determines the names of the programs to transfer consolidated
information back to the requesting system, if an extract file is to be
sent.  ;ql;

;id; This program has to accept a parameter from the job queue
procedure, defining the communications entry number of the local
communications entry being processed.  This program also loads
additional parameters to pass back to the calling procedure, indicating
which steps to perform.  The PLIST should be as follows:  ;ql;

;id;   *ENTRY   PLIST                                               ;ql;
;id;            PARM  P$CENO  15A    communications entry #         ;ql;
;id;            PARM  P$ENTF   1A    load entity file & print rpt   ;ql;
;id;            PARM  P$SNDF   1A    send file to req system        ;ql;
;id;            PARM  P$SPGM  10A    sending transfer pgm name      ;ql;
;id;            PARM  P$RPGM  10A    receiving transfer pgm name    ;ql;
;id;            PARM  P$GPGM  10A    generic transfer proc name     ;ql;


;id; 1. The first step is to retrieve the LOCCOM record referenced by
the CE # passed to this program. ;ql;

;id; 2. If this is a locally initiated CE submitted for processing
(status 55), load the parameters as follows:  ;ql;

    ;id; a) Load P$SNDF (send extract file back to requesting system)
    with 'N'. ;ql;

    ;id; b) Load P$SPGM (sending transfer program name) with blank.
    ;ql;

    ;id; c) Load P$GPGM (generic transfer program name) with blank.
    ;ql;
```

;id; d) If the LOCCOM fields for entity (ZLENT) and originating entity (ZLOREN) are not the same, then this CE is being processed for in another entity within the same system, and the following parameters should be loaded: ;ql;

;id; P$ENTF (load entity file) = 'N' ;ql;

;id; P$RPGM (receiving transfer program name) = blank ;ql;

;id; e) If the LOCCOM fields for entity (ZLENT) and originating entity (ZLOREN) are the same, then this CE is being processed for the originating entity, and the following parameters should be loaded: ;ql;

;id; P$ENTF (load entity file) = 'Y' if the LOCCOM consolidate from requesting entity byte (ZLCNRQ) is 'Y'. Otherwise, load P$ENTF with 'E'. ;ql;

;id; Retrieve the GENCOM record for the local CE to retrieve the value of the multi-release byte (ZCMULT). In case when such a GENCOM record cannot be found, continue to process as if it exists with ZCMULT='Y'. ;ql;

;id; P$RPGM (receiving transfer program name) = loaded with 'MMC260' if the GENCOM multi-release byte is 'Y.' In this case, the XJ procedure will call MMC260, the Multi Receiving Transfer Controller, to call receiving transfer programs at the specific CE level, since there could be multiple release levels involved. ;ql;

;id; P$RPGM = obtained from the Application Definition File (APPDEF) if the GENCOM multi-release byte is 'N.' Since there is only one release level represented in the data transfer file(s), only one receiving transfer program is necessary to bring that information to the entity file(s). ;ql;

;id; i. To obtain the transfer program name from APPDEF, retrieve the APPDEF record for the application program name/from rel-mod level/to rel-mod level. The APPDEF record should be retrieved for ZLPGM/ZLFREL/ZLTREL in the manner described below using $APPDF. ;ql;

;id; - If no record is found, attempt to find a record for the same program/from rel-mod level but last to rel-mod level. Continue this process until a record is found or all records for the program/from rel-mod level have been exhausted. ;ql;

;id; - If no record was found above, try to find a record for the last available from rel-mod level but original to rel-mod level. If this is not found, continue this logic, dropping the from rel-mod levels but retaining the to rel-mod level, until a record is found or all records for the program/to rel-mod level have been exhausted. ;ql;

;id; - At this stage, it uses the COMDEF default from and to rel-mod levels to retrieve a record. ;ql;

```
        ;id; ii. For each APPDEF record, there are various
        communications programs assigned; the receiving transfer
        program name should be loaded into P$RPGM.  ;ql;

;id; 3. If the LOCCOM status is 56, then this is a local communications
entry initiated from a remote system submitted for processing on this
system, and so the following parameters should be loaded: ;ql;

    ;id; P$ENTF (load entity file) = 'N' ;ql;

    ;id; P$SNDF (send extract file back to requesting system) = 'Y'
    ;ql;

    ;id; P$SPGM (sending transfer program name) = obtained from the
    Application Definition File (APPDEF) ;ql;

    ;id; P$RPGM (receiving transfer program name) = blank ;ql;

    ;id; P$GPGM (generic transfer procedure name) = obtained from the
    Application Definition File (APPDEF) ;ql;

        ;id; i. Since the consolidated data is being sent from the
        satisfying system back to the requesting system, the from and
        to rel-mod levels must be reversed when retrieving the APPDEF
        record, in other words, the record for ZLPGM/ZLTREL/ZLFREL
        should be retrieved.  See the logic in step 2E(i) above for
        retrieving the record. ;ql;

        ;id; ii. For each APPDEF record, there are various
        communications programs assigned; the sending transfer program
        and generic transfer procedure names should be loaded into
        P$SPGM and P$GPGM, respectively.  ;ql;

;id; 4. Finally, check for the existence of the receiving or sending
transfer program retrieved from APPDEF by means of a 'CHKOBJ' CL
command. If the program does not exist, blank out the P$RPGM or the
P$SPGM parameter and call MMC030 to send a message to the EM background
message queue saying that the receiving or sending transfer program
does not exist. ;ql;


;hi;B. File     Usage                                              ;ql;

;id;   APPDEF    IF     Application Definition File                ;ql;
;id;   COMDEF    IF     Communications Definition File             ;ql;
;id;   GENCOM    IF     General Communications Entry File          ;ql;
;id;   LOCCOM    IF     Local Communications Entry File            ;ql;

;ql;;hx;

$END$
```

```
5738PW1 V2R2M0  920615                SEU SOURCE LISTING                 05/28/93 14:09:30            PAGE    1

SOURCE FILE . . . . . . .   XLIBEM/MRPGSRC
MEMBER  . . . . . . . . .   MMC160

SEQNBR*...+... 1 ...+... 2 ...+... 3 ...+... 4 ...+... 5 ...+... 6 ...+... 7 ...+... 8 ...+... 9 ...+... 0
     H****************************************************************                     12/27/91
     H*                                                              *                     12/27/91
     H*          Release - 03          Mod Level - 10                *                     06/26/92
     H*  THIS UNPUBLISHED COPYRIGHTED WORK CONTAINS TRADE SECRET     *                     12/27/91
     H*  INFORMATION OF MARCAM CORPORATION.  USE, TRANSFER,          *                     12/27/91
     H*  DISCLOSURE, OR COPYING WITHOUT ITS EXPRESSED WRITTEN        *                     12/27/91
     H*  PERMISSION IS STRICTLY FORBIDDEN.                   1993    *                     06/26/92
     H*                                                              *                     12/27/91
     H****************************************************************                     12/27/91
     H/SPACE 2                                                                             11/11/91
     H****************************************************************                     12/27/91
     H*                                                              *                     12/27/91
     H*  MODULE:              Enterprise Management                  *                     02/20/92
     H*                                                              *                     12/27/91
     H*  PROGRAM NAME:        MMC160 - Job Queue Controller Program  *                     03/05/92
     H*                                                              *                     12/27/91
     H*  FUNCTION:            Determines what steps that specific job *                    03/05/92
     H*                       queue procedure should perform.        *                     03/05/92
     H*                                                              *                     12/27/91
     H*  CALLING PROGRAM:  Job queue procedures submitted by MMC020, *                     03/05/92
     H*                       the Local Communications Processor     *                     03/05/92
     H*                                                              *                     12/27/91
     H*  CALLED PROGRAM:   None                                      *                     02/20/92
     H*                                                              *                     12/27/91
     H*  /COPY ROUTINES:   $APPDF - Application Definition Access    *                     03/16/92
     H*                             Subroutine                       *                     03/16/92
     H*                                                              *                     12/27/91
     H****************************************************************                     12/27/91
     H*             P R O G R A M   D E S C R I P T I O N            *                     03/12/92
     H****************************************************************                     12/27/91
     H*                                                              *                     12/27/91
     H*    This program determines, based on the residence of the    *                     03/05/92
     H*  requesting entity and the satisfying entity, what steps     *                     03/05/92
     H*  that specific job queue procedure should perform. Possible  *                     03/05/92
     H*  steps are loading an entity file or extract file, printing  *                     03/05/92
     H*  a report, sending a system message, sending an extract file *                     03/05/92
     H*  to another system, and bringing information sent from other *                     03/05/92
     H*  systems up to the entity-level files. It also determines    *                     03/05/92
     H*  the names of the programs to transfer consolidated          *                     03/05/92
     H*  information back to the requesting system if an extract     *                     03/05/92
     H*  file is to be sent.                                         *                     03/05/92
     H*                                                              *                     03/05/92
     H*    This program accepts a parameter containing the CE # of   *                     03/05/92
     H*  the Communications Entry being processed, and passes the    *                     03/05/92
     H*  result back parameters representing steps to be performed   *                     03/05/92
     H*  and the names of the programs that are need to perform the  *                     03/11/92
     H*  steps.                                                      *                     03/05/92
     H*                                                              *                     01/21/92
     H****************************************************************                     12/27/91
     F/SPACE 3                                                                             11/11/91
     F****************************************************************                     03/05/92
     F*        F U N C T I O N   O F   I N D I C A T O R S           *                     03/05/92
     F****************************************************************                     03/05/92
```

```
     5738PW1 V2R2M0  920615              SEU SOURCE LISTING                        05/28/93 14:09:30            PAGE    2

SOURCE FILE . . . . . . .  XLIBEM/MRPGSRC
MEMBER  . . . . . . . . .  MMC160

SEQNBR*...+... 1 ...+... 2 ...+... 3 ...+... 4 ...+... 5 ...+... 6 ...+... 7 ...+... 8 ...+... 9 ...+... 0
  5400      F*                                                            *                         03/05/92
  5500      F*   98 - General Purpose Indicator (used in /COPY $APPDF)    *                         03/06/92
  5600      F*   99 - General Purpose Indicator                           *                         03/05/92
  5700      F*   LR - Last Record Indicator                               *                         03/11/92
  5800      F*                                                            *                         03/05/92
  5900      F**************************************************************                         03/05/92
  6000      F/SPACE 2                                                                               03/05/92
  6100      F**************************************************************                         12/27/91
  6200      F*                                                            *                         12/27/91
  6300      F*                       FILE SPECIFICATIONS                  *                         12/27/91
  6400      F*                                                            *                         12/27/91
  6500      F**************************************************************                         12/27/91
  6600      F*                                                                                      12/27/91
  6700      F*   Applications Definition File                                                       03/05/92
  6800      F*                                                                                      12/27/91
  6900      FAPPDEF  IF  E           K        DISK                                                  03/05/92
  7000      F/SPACE 2                                                                               11/11/91
  7100      F*                                                                                      03/06/92
  7200      F*   Communications Definition File                                                     03/06/92
  7300      F*                                                                                      03/06/92
  7400      FCOMDEF  IF  E                    DISK                                                  03/06/92
  7500      F/SPACE 2                                                                               03/06/92
  7600      F*                                                                                      03/05/92
  7700      F*   General Communications Entry File                                                  03/05/92
  7800      F*                                                                                      03/05/92
  7900      FGENCOM  IF  E           K        DISK                                                  03/05/92
  8000      F/SPACE 2                                                                               03/05/92
  8100      F*                                                                                      12/27/91
  8200      F*   Local Communications Entry File                                                    12/27/91
  8300      F*                                                                                      12/27/91
  8400      FLOCCOM  IF  E           K        DISK                                                  03/05/92
  8500      F*                                                                                      03/06/92
  8600      F/SPACE 2                                                                               03/06/92
  8700      I**************************************************************                         03/06/92
  8800      I*                                                            *                         03/06/92
  8900      I*                      INPUT SPECIFICATIONS                  *                         03/06/92
  9000      I*                                                            *                         03/06/92
  9100      I**************************************************************                         03/06/92
  9200      I**************************************************************                         10/15/92
  9300      I*   Data Structure for CL command CHKOBJ called by QCMDEXC   *                         10/15/92
  9400      I**************************************************************                         10/15/92
  9500      I*                                                                                      10/15/92
  9600      I            DS                                                                         10/15/92
  9700      I                                        1  36 QQCMD                                    10/15/92
  9800      I I            'CHKOBJ OBJ('             1  11 D$1                                      10/15/92
  9900      I                                       12  21 D$PGM                                    10/15/92
 10000      I I            ') OBJTYPE(*PGM)'        22  36 D$2                                      10/15/92
 10100      I*                                                                                      10/15/92
 10200      I* Externally described data structure to define the parameter                         10/15/92
 10300      I*   list for the EM message sending program, MMC030                                    10/15/92
 10400      I*                                                                                      10/15/92
 10500      I$MC030    E DSDSMC030                                                                  10/15/92
 10600      I*                                                                                      10/15/92
```

```
     5738PW1 V2R2M0  920615                    SEU SOURCE LISTING                          05/28/93 14:09:30                 PAGE    3

SOURCE FILE . . . . . . .  XLIBEM/MRPGSRC
MEMBER  . . . . . . . . .  MMC160

SEQNBR*...+... 1 ...+... 2 ...+... 3 ...+... 4 ...+... 5 ...+... 6 ...+... 7 ...+... 8 ...+... 9 ...+... 0
10700      I*  Data Structure to break down the release-modification level                                  10/15/92
10800      I*    field which looks similar to 04-00. It is used in the                                      10/15/92
10900      I*     $APPDF /COPY subroutine.                                                                  10/15/92
11000      I*                                                                                               10/15/92
11100      IQQRM        DS                                                                                  10/15/92
11200      I                                         1   20QQREL                                            10/15/92
11300      I                                         4   50QQMOD                                            10/15/92
11400      I*                                                                                               10/15/92
11500      I/SPACE 3                                                                                        11/11/91
11600      C*************************************************************                                   12/27/91
11700      C*                                                           *                                   12/27/91
11800      C*                      CALCULATION SPECS                    *                                   12/27/91
11900      C*                                                           *                                   12/27/91
12000      C*************************************************************                                   12/27/91
12100      C*                                                           *                                   12/27/91
12200      C*************************************************************                                   12/27/91
12300      C*                      M A I N L I N E                      *                                   12/27/91
12400      C*************************************************************                                   12/27/91
12500      C*                                                           *                                   12/27/91
12600      C*   The MAINLINE is executed once.  It first loads the program *                                03/06/92
12700      C*   parameter P$CENO into a work field. Then it calls LDPARM  *                                 09/01/92
12800      C*   to load the parameters into their respective work fields.  *                                03/06/92
12900      C*                                                           *    SRCE3                          10/15/92
13000      C*************************************************************    SRCE3                          10/15/92
13100      C*                                                           *    SRCE3                          10/15/92
13200      C*   INDICATORS USED   :  LR                                 *    SRCE3                          10/15/92
13300      C*                                                           *    SRCE3                          10/15/92
13400      C*   EXECUTES          :  CHKOBJ  LDPARM                     *    SRCE3                          10/15/92
13500      C*                                                           *    SRCE3                          10/15/92
13600      C*************************************************************    SRCE3                          10/15/92
13700      C*                                                                SRCE3                          10/15/92
13800      C           *ENTRY    PLIST                                                                      03/05/92
13900      C                     PARM           P$CENO                                                      09/01/92
14000      C                     PARM           P$ENTF                                                      09/01/92
14100      C                     PARM           P$SNDF                                                      09/01/92
14200      C                     PARM           P$SPGM                                                      09/01/92
14300      C                     PARM           P$RPGM                                                      09/01/92
14400      C                     PARM           P$GPGM                                                      09/01/92
14500      C*                                                                                               03/05/92
14600      C*  Load P$CENO into its work field, QQCENO. The work field,                                     09/01/92
14700      C*  rather than the parameter itself, will be referred to                                        03/06/92
14800      C*  throughout the program to increase program efficiency.                                       03/06/92
14900      C*  Note that all other program parameters being passed are                                      03/06/92
15000      C*  not used, since they are loaded by this program and sent                                     03/16/92
15100      C*  back to the calling program.                                                                 03/16/92
15200      C*                                                                                               03/06/92
15300      C                     MOVE P$CENO    QQCENO                                                      09/01/92
15400      C*                                                                                               03/05/92
15500      C*  Call LDPARM to load the appropriate parameters into the                                      03/06/92
15600      C*  corresponding work fields.                                                                   03/06/92
15700      C*                                                                                               03/06/92
15800      C                     EXSR LDPARM                                                                03/05/92
15900      C*                                                                                               10/15/92
```

```
 5738PW1 V2R2M0  920615              SEU SOURCE LISTING                    05/28/93 14:09:30              PAGE    4

SOURCE FILE . . . . . . .  XLIBEM/MRPGSRC
MEMBER  . . . . . . . . .  MMC160

SEQNBR*...+... 1 ...+... 2 ...+... 3 ...+... 4 ...+... 5 ...+... 6 ...+... 7 ...+... 8 ...+... 9 ...+... 0
16000      C*  Call the CHKOBJ subroutine to check for the existence                                  10/15/92
16100      C*  of the receiving transfer program and the sending                                      10/15/92
16200      C*  transfer program.                                                                      10/15/92
16300      C*                                                                                         10/15/92
16400      C                     EXSR CHKOBJ                                                          10/15/92
16500      C*                                                                                         03/06/92
16600      C*  Load parameters from work fields to return their values                                03/06/92
16700      C*  to the calling program. Note that P$CENO is not loaded                                 09/01/92
16800      C*  since it is not changed by this program.                                               03/11/92
16900      C*                                                                                         03/06/92
17000      C                     MOVE QQENTF    P$ENTF                                                09/01/92
17100      C                     MOVE QQSNDF    P$SNDF                                                09/01/92
17200      C                     MOVE QQSPGM    P$SPGM                                                09/01/92
17300      C                     MOVE QQRPGM    P$RPGM                                                09/01/92
17400      C                     MOVE QQGPGM    P$GPGM                                                09/01/92
17500      C*                                                                                         12/27/91
17600      C*  End the program                                                                        12/27/91
17700      C*                                                                                         12/27/91
17800      C                     SETON                    LR                                          12/27/91
17900      C                     RETRN                                                                12/27/91
18000      C*                                                                                         12/27/91
18100      C/SPACE 2                                                                                  11/11/91
18200      C**********  *INZSR SUBR  **********************  *INZSR SUBR  *                           12/27/91
18300      C*                                                              *                          12/27/91
18400      C*   The *INZSR subroutine performs the following functions:    *                          12/27/91
18500      C*                                                              *                          12/27/91
18600      C*      1. Performs initial calculations that need to be done   *                          12/27/91
18700      C*         on the initial call of the program.                  *                          12/27/91
18800      C*                                                              *                          12/27/91
18900      C*  NOTE:  The *INZSR is executed during the *INIT phase of     *                          12/27/91
19000      C*         RPG execution.                                       *                          12/27/91
19100      C*                                                              *   SRCE3                  10/15/92
19200      C***************************************************************    SRCE3                  10/15/92
19300      C*                                                              *   SRCE3                  10/15/92
19400      C*   INDICATORS USED  :  99                                     *   SRCE3                  10/15/92
19500      C*                                                              *   SRCE3                  10/15/92
19600      C***************************************************************    SRCE3                  10/15/92
19700      C*                                                                  SRCE3                  10/15/92
19800      C           *INZSR    BEGSR                                                                12/27/91
19900      C*                                                                                         12/27/91
20000      C*  Define and initialize program variables                                                12/27/91
20100      C*                                                                                         12/27/91
20200      C                     MOVE 'M'       MODULE                                                12/27/91
20300      C                     MOVE 'MMC160   '$PGM                                                 03/05/92
20400      C*                                                                                         03/06/92
20500      C*  Access COMDEF for communications definition constants.                                 03/06/92
20600      C*  This file has only one record.  Therefore, it needs to be                              03/06/92
20700      C*  read only once (similar to the tailoring files). The                                   03/06/92
20800      C*  /COPY $APPDF subroutine requires that COMDEF be accessed                               03/06/92
20900      C*  for it to work.                                                                        03/06/92
21000      C*                                                                                         03/06/92
21100      C           1         CHAINCOMDEF              99                                          03/06/92
21200      C*                                                                                         10/15/92
```

```
5738PW1 V2R2M0  920615                SEU SOURCE LISTING                          05/28/93 14:09:30              PAGE    5

SOURCE FILE . . . . . . .  XLIBEM/MRPGSRC
MEMBER  . . . . . . . . .  MMC160

SEQNBR*...+... 1 ...+... 2 ...+... 3 ...+... 4 ...+... 5 ...+... 6 ...+... 7 ...+... 8 ...+... 9 ...+... 0
21300      C*  Load the length of the CHKOBJ CL command into QQLEN.                                        10/15/92
21400      C*                                                                                              10/15/92
21500      C                    Z-ADD36        QQLEN                                                       10/15/92
21600      C*                                                                                              12/27/91
21700      C                    ENDSR                             *INZSR        SRCE3                      12/27/91
21800      C*                                                                                              12/27/91
21900      C/SPACE 2                                                                                       11/11/91
22000      C*********  $DEFSR SUBR  *********************  $DEFSR SUBR  *                                  12/27/91
22100      C*                                                             *                                12/27/91
22200      C*  The $DEFSR subroutine performs the following functions:    *                                12/27/91
22300      C*                                                             *                                12/27/91
22400      C*    1. Defines program variables.  It is never executed.     *                                12/27/91
22500      C*                                                             *     SRCE3                      10/15/92
22600      C**************************************************************      SRCE3                      10/15/92
22700      C*                                                             *     SRCE3                      10/15/92
22800      C*   INDICATORS USED  :  NONE                                  *     SRCE3                      10/15/92
22900      C*                                                             *     SRCE3                      10/15/92
23000      C**************************************************************      SRCE3                      10/15/92
23100      C*                                                                   SRCE3                      10/15/92
23200      C           $DEFSR    BEGSR                                                                     12/27/91
23300      C*                                                                                              03/05/92
23400      C*  ***** Define program parameter *****                                                        03/05/92
23500      C*                                                                                              03/05/92
23600      C           *LIKE     DEFN ZLCENO    P$CENO          CE #                                       09/01/92
23700      C                     MOVE *BLANKS   P$ENTF  1       Load Ent file..                            09/01/92
23800      C                     MOVE *BLANKS   P$SNDF  1       Send to req sys                            09/01/92
23900      C           *LIKE     DEFN FDSPGM    P$SPGM          Send Pgm Name                              09/01/92
24000      C           *LIKE     DEFN FDRPGM    P$RPGM          Receiv Pgm name                            09/01/92
24100      C           *LIKE     DEFN FDGPGM    P$GPGM          Gen Trans Proc                             09/01/92
24200      C*                                                                                              03/05/92
24300      C*  ***** Define program variables *****                                                        03/05/92
24400      C*                                                                                              12/27/91
24500      C*  - MODULE is the Module code                                                                 03/06/92
24600      C*                                                                                              12/27/91
24700      C                     MOVE *BLANKS   MODULE  1                                                  12/27/91
24800      C*                                                                                              12/27/91
24900      C*  - $PGM is the Program name                                                                  03/06/92
25000      C*                                                                                              12/27/91
25100      C           *LIKE     DEFN FDPGM     $PGM                                                       03/16/92
25200      C*                                                                                              03/06/92
25300      C*  - Define work fields for program parameters                                                 03/11/92
25400      C*                                                                                              03/06/92
25500      C           *LIKE     DEFN P$CENO    QQCENO          CE #                                       09/01/92
25600      C           *LIKE     DEFN P$ENTF    QQENTF          Load Ent file..                            09/01/92
25700      C           *LIKE     DEFN P$SNDF    QQSNDF          Send to req sys                            09/01/92
25800      C           *LIKE     DEFN P$SPGM    QQSPGM          Send Pgm Name                              09/01/92
25900      C           *LIKE     DEFN P$RPGM    QQRPGM          Receiv Pgm name                            09/01/92
26000      C           *LIKE     DEFN P$GPGM    QQGPGM          Gen Trans Proc                             09/01/92
26100      C*                                                                                              10/15/92
26200      C*  ***** Define all other program variables *****                                              10/15/92
26300      C*                                                                                              10/15/92
26400      C*  - QQLEN is a parameter used in calling a CL command                                         10/15/92
26500      C*    by using CALL 'QCMDEXC' from within the RPG program.                                      10/15/92
```

```
     5738PW1 V2R2M0  920615                 SEU SOURCE LISTING                          05/28/93 14:09:30            PAGE    6

SOURCE FILE . . . . . . .  XLIBEM/MRPGSRC
MEMBER  . . . . . . . . .  MMC160

SEQNBR*...+... 1 ...+... 2 ...+... 3 ...+... 4 ...+... 5 ...+... 6 ...+... 7 ...+... 8 ...+... 9 ...+... 0
26600      C*    It stores the length of the CL command string and                               10/15/92
26700      C*    must be defined as (15,5).                                                      10/15/92
26800      C*                                                                                    10/15/92
26900      C                   Z-ADD0         QQLEN  155                                         10/15/92
27000      C*                                                                                    03/06/92
27100      C*  ***** Define key fields *****                                                     03/06/92
27200      C*                                                                                    03/06/92
27300      C*  - for APPDEF file                                                                 03/06/92
27400      C*                                                                                    03/06/92
27500      C          *LIKE    DEFN FDPGM     KPGM             Program name                      03/06/92
27600      C          *LIKE    DEFN FDFREL    KFREL            From rel-mod lv                   03/06/92
27700      C          *LIKE    DEFN FDTREL    KTREL            To rel-mod levl                   03/06/92
27800      C*                                                                                    03/06/92
27900      C*  ***** Define KLISTs *****                                                         03/06/92
28000      C*                                                                                    03/06/92
28100      C*  - for APPDEF file                                                                 03/06/92
28200      C*                                                                                    03/06/92
28300      C          KAPPDE    KLIST                                                            03/06/92
28400      C                    KFLD          KPGM             Program Name                      03/06/92
28500      C                    KFLD          KFREL            From Rel-Mod                      03/06/92
28600      C                    KFLD          KTREL            To Rel-Mod                        03/06/92
28700      C*                                                                                    10/15/92
28800      C*  ***** Define PLIST *****                                                          10/15/92
28900      C*                                                                                    10/15/92
29000      C*  - for MMC030                                                                      10/15/92
29100      C*                                                                                    10/15/92
29200      C          PMC030    PLIST                                                            10/15/92
29300      C                    PARM          $MC030                                             10/15/92
29400      C*                                                                                    12/27/91
29500      C                    ENDSR                          $DEFSR        SRCE3               12/27/91
29600      C*                                                                                    12/27/91
29700      C/SPACE 2                                                                             03/06/92
29800      C/COPY MMDDSSRC,$APPDF                                                                03/06/92
29900      C/SPACE 2                                                                             02/17/92
30000      C*********  CHKOBJ SUBR  ************************  CHKOBJ SUBR  *                      10/15/92
30100      C*                                                              *                     02/17/92
30200      C*   The CHKOBJ subroutine performs the following functions:    *                     10/15/92
30300      C*                                                              *                     02/17/92
30400      C*     1. Check to see if the sending and receiving transfer    *                     10/15/92
30500      C*        programs exist or not. If not, blank out the program  *                     10/15/92
30600      C*        name(s) and call MMC030 to send a message to the      *                     10/15/92
30700      C*        EMBKGDMSGQ.                                           *                     10/15/92
30800      C*                                                              *    SRCE3            10/15/92
30900      C****************************************************************    SRCE3            10/15/92
31000      C*                                                              *    SRCE3            10/15/92
31100      C*   INDICATORS USED  :  99                                     *    SRCE3            10/15/92
31200      C*                                                              *    SRCE3            10/15/92
31300      C*   EXECUTED FROM    :  MAINLN                                 *    SRCE3            10/15/92
31400      C*                                                              *    SRCE3            10/15/92
31500      C****************************************************************    SRCE3            10/15/92
31600      C*                                                                   SRCE3            10/15/92
31700      C          CHKOBJ    BEGSR                                                            10/15/92
31800      C*                                                                                    10/15/92
```

```
5738PW1 V2R2M0  920615                SEU SOURCE LISTING                        05/28/93 14:09:30              PAGE    7

SOURCE FILE . . . . . . .   XLIBEM/MRPGSRC
MEMBER  . . . . . . . . .   MMC160

SEQNBR*...+... 1 ...+... 2 ...+... 3 ...+... 4 ...+... 5 ...+... 6 ...+... 7 ...+... 8 ...+... 9 ...+... 0
31900      C*  If the receiving transfer program is not blank, check                                        10/15/92
32000      C*  for its existence.                                                                           10/15/92
32100      C*                                                                                               10/15/92
32200      C          QQRPGM    IFNE *BLANKS                                                                10/15/92
32300      C*                                                                                               10/15/92
32400      C                    MOVE *BLANKS   D$PGM                                                        10/15/92
32500      C                    MOVE QQRPGM    D$PGM                                                        10/15/92
32600      C                    CALL 'QCMDEXC'              99                                              10/15/92
32700      C                    PARM           QQCMD                                                        10/15/92
32800      C                    PARM           QQLEN                                                        10/15/92
32900      C*                                                                                               10/15/92
33000      C*  - If the receiving transfer program does not exist,                                          10/15/92
33100      C*    blank it out and call MMC030 to send a message to                                          10/15/92
33200      C*    EMBKGDMSGQ saying that the receiving transfer program                                      10/15/92
33300      C*    for this CE doesn't exist (message # M00469).                                              10/15/92
33301      C*    Load $LIT1 with the literal sequence # for the name of                                     10/28/92
33302      C*    the program that doesn't exist, and $LIT2 with the                                         10/28/92
33303      C*    literal sequence # for the CE type.                                                        10/28/92
33400      C*                                                                                               10/15/92
33500      C          *IN99     IFEQ *ON                                                                    10/15/92
33600      C                    MOVE *BLANKS   QQRPGM                                                       10/15/92
33700      C                    MOVE MODULE    $MODCD                                                       10/15/92
33800      C                    MOVE '00469'   $ERRNO              Message #M00469                          10/15/92
33900      C                    MOVE QQCENO    $CENUM              CE #                                     10/15/92
34000      C                    MOVE '00014'   $LIT1               'Recv xfer pgm'                          10/15/92
34100      C                    MOVE '00018'   $LIT2               'Local' CE                               10/15/92
34200      C                    CALL 'MMC030'  PMC030                                                       10/15/92
34300      C                    ENDIF                              *IN99=*ON                                10/15/92
34400      C*                                                                                               10/15/92
34500      C                    ENDIF                              QQRPGM<>*BLANKS                          10/15/92
34600      C*                                                                                               10/15/92
34700      C*  If the sending transfer program is not blank, check                                          10/15/92
34800      C*  for its existence.                                                                           10/15/92
34900      C*                                                                                               10/15/92
35000      C          QQSPGM    IFNE *BLANKS                                                                10/15/92
35100      C*                                                                                               10/15/92
35200      C                    MOVE *BLANKS   D$PGM                                                        10/15/92
35300      C                    MOVE QQSPGM    D$PGM                                                        10/15/92
35400      C                    CALL 'QCMDEXC'              99                                              10/15/92
35500      C                    PARM           QQCMD                                                        10/15/92
35600      C                    PARM           QQLEN                                                        10/15/92
35700      C*                                                                                               10/15/92
35800      C*  - If the sending transfer program does not exist,                                            10/15/92
35900      C*    blank it out and call MMC030 to send a message to                                          10/15/92
36000      C*    EMBKGDMSGQ saying that the sending transfer program                                        10/15/92
36100      C*    for this CE doesn't exist (message # M00469).                                              10/15/92
36101      C*    Load $LIT1 with the literal sequence # for the name of                                     10/28/92
36102      C*    the program that doesn't exist, and $LIT2 with the                                         10/28/92
36103      C*    literal sequence # for the CE type.                                                        10/28/92
36200      C*                                                                                               10/15/92
36300      C          *IN99     IFEQ *ON                                                                    10/15/92
36400      C                    MOVE *BLANKS   QQSPGM                                                       10/15/92
36500      C                    MOVE MODULE    $MODCD                                                       10/15/92
```

```
     5738PW1 V2R2M0  920615              SEU SOURCE LISTING                    05/28/93 14:09:30              PAGE    8

SOURCE FILE . . . . . . .   XLIBEM/MRPGSRC
MEMBER  . . . . . . . . .   MMC160

SEQNBR*...+... 1 ...+... 2 ...+... 3 ...+... 4 ...+... 5 ...+... 6 ...+... 7 ...+... 8 ...+... 9 ...+... 0
         C                     MOVE '00469'   $ERRNO          Message #M00469                                 10/15/92
         C                     MOVE QQCENO    $CENUM          CE #                                            10/15/92
         C                     MOVE '00013'   $LIT1           'Send xfer pgm'                                 10/15/92
         C                     MOVE '00018'   $LIT2           'Local' CE                                      10/15/92
         C                     CALL 'MMC030'  PMC030                                                          10/15/92
         C                     ENDIF                          *IN99=*ON                                       10/15/92
         C*                                                                                                   10/15/92
         C                     ENDIF                          QQSPGM<>*BLANKS                                 10/15/92
         C*                                                                                                   10/15/92
         C                     ENDSR                          CHKOBJ        SRCE3                             10/15/92
         C*                                                                                                   10/15/92
         C/SPACE 2                                                                                            10/15/92
         C*********  LDPARM SUBR  **********************  LDPARM SUBR  *                                     10/15/92
         C*                                                             *                                     10/15/92
         C*    The LDPARM subroutine performs the following functions:  *                                     10/15/92
         C*                                                             *                                     10/15/92
         C*     1. Load the appropriate values into work fields which   *                                     10/15/92
         C*        will later be loaded into the program parameters     *                                     10/15/92
         C*        and return to the calling program.                   *                                     10/15/92
         C*                                                             *   SRCE3                             10/15/92
         C***************************************************************   SRCE3                             10/15/92
         C*                                                             *   SRCE3                             10/15/92
         C*    INDICATORS USED  :  99                                   *   SRCE3                             10/15/92
         C*                                                             *   SRCE3                             10/15/92
         C*    EXECUTES         :  $APPDF  LDRPGM                       *   SRCE3                             10/15/92
         C*                                                             *   SRCE3                             10/15/92
         C*    EXECUTED FROM    :  MAINLN                               *   SRCE3                             10/15/92
         C*                                                             *   SRCE3                             10/15/92
         C***************************************************************   SRCE3                             10/15/92
         C*                                                                 SRCE3                             10/15/92
         C           LDPARM    BEGSR                                                                          10/15/92
         C*                                                                                                   03/05/92
         C*  Retrieve the LOCCOM record referenced by the CE # passed                                        03/05/92
         C*  to this program.                                                                                 03/05/92
         C*                                                                                                   03/05/92
         C           QQCENO    CHAINLOCCOM               99                                                   03/05/92
         C*                                                                                                   03/05/92
         C*  If the record exists:                                                                            03/05/92
         C*                                                                                                   03/05/92
         C           *IN99     IFEQ *OFF                                                                      03/05/92
         C*                                                                                                   03/05/92
         C*  1) If CE status is 55, then this CE is locally initiated.                                       03/06/92
         C*     Load the parameters as follows:                                                               03/06/92
         C*                                                                                                   03/06/92
         C           ZLSTAT    IFEQ '55'                                                                      03/06/92
         C*                                                                                                   03/05/92
         C*     - If this CE is initiated within the same entity,                                            03/06/92
         C*       load QQENTF with 'E' or 'Y' as follows:                                                    08/31/92
         C*       - if data from the requesting entity should be                                             08/31/92
         C*         included into the report (ZLCNRQ='Y'), load                                              08/31/92
         C*         QQENTF with 'Y'.                                                                          08/31/92
         C*       - if data from the requesting entity is not needed                                         08/31/92
         C*         in the report (ZLCNRQ<>'Y'), load QQENTF with 'E'.                                       12/01/92
```

```
     5738PWI V2R2M0  920615              SEU SOURCE LISTING                    05/28/93 14:09:30          PAGE    9

SOURCE FILE . . . . . . .  XLIBEM/MRPGSRC
MEMBER  . . . . . . . . .  MMC160

SEQNBR*...+... 1 ...+... 2 ...+... 3 ...+... 4 ...+... 5 ...+... 6 ...+... 7 ...+... 8 ...+... 9 ...+... 0
41900      C*                                                                                     03/05/92
42000      C          ZLENT     IFEQ ZLOREN                     Same entity                       08/31/92
42100      C          ZLCNRQ    IFEQ 'Y'                                                          08/31/92
42200      C                    MOVE 'Y'       QQENTF                                             03/05/92
42300      C                    ELSE                                                              08/31/92
42400      C                    MOVE 'E'       QQENTF                                             08/31/92
42500      C                    ENDIF                           ZLCNRQ='Y'                        08/31/92
42600      C                    EXSR LDRPGM                     load QQRPGM                       03/05/92
42700      C                    ENDIF                           ZLENT=ZLOREN                      03/12/92
42800      C*                                                                                     03/06/92
42900      C*     - If this CE is initiated in another entity within                              03/06/92
43000      C*       the same system, there is no need to upload data                              03/06/92
43100      C*       to this entity, and load QQENTF and QQRPGM                                    03/06/92
43200      C*       accordingly.                                                                  03/06/92
43300      C*                                                                                     03/06/92
43400      C          ZLENT     IFNE ZLOREN                     Diff entity                       03/12/92
43500      C                    MOVE 'N'       QQENTF                                             03/05/92
43600      C                    MOVE *BLANKS   QQRPGM                                             03/05/92
43700      C                    ENDIF                           ZLENT<>ZLOREN                     03/12/92
43800      C*                                                                                     03/06/92
43900      C*     - Load other parameters with 'N' or blank since                                 03/06/92
44000      C*       no data is needed to be sent to a remote system.                              03/06/92
44100      C*                                                                                     03/06/92
44200      C                    MOVE 'N'       QQSNDF                                             03/06/92
44300      C                    MOVE *BLANKS   QQSPGM                                             03/06/92
44400      C                    MOVE *BLANKS   QQGPGM                                             03/06/92
44500      C*                                                                                     03/06/92
44600      C                    ENDIF                           ZLSTAT='55'                       03/06/92
44700      C*                                                                                     03/06/92
44800      C*   2) If CE status is 56, then this CE is initiated remotely.                        03/06/92
44900      C*     Load the parameters as follows:                                                 03/06/92
45000      C*                                                                                     03/06/92
45100      C          ZLSTAT    IFEQ '56'                                                         03/06/92
45200      C*                                                                                     03/06/92
45300      C*     - load QQENTF and QQRPGM to indicate that no data                               03/06/92
45400      C*       is needed to upload to this entity.                                           03/06/92
45500      C*                                                                                     03/06/92
45600      C                    MOVE 'N'       QQENTF                                             03/06/92
45700      C                    MOVE *BLANKS   QQRPGM                                             03/06/92
45800      C*                                                                                     03/06/92
45900      C*     - load QQSNDF to 'Y' since we need to send data to                              03/06/92
46000      C*       another system, (which is the requesting system).                             03/06/92
46100      C*                                                                                     03/06/92
46200      C                    MOVE 'Y'       QQSNDF                                             03/06/92
46300      C*                                                                                     03/06/92
46400      C*     - Retrieve the program names for the sending and generic                        03/06/92
46500      C*       transfer procedures from APPDEF. Since we are sending                         03/06/92
46600      C*       data back to the requesting entity, the To and From                           03/06/92
46700      C*       rel-mod level must be reversed when retrieving the                            03/06/92
46800      C*       APPDEF record. However, QQSPGM and QQGPGM are only                             03/06/92
46900      C*       loaded an APPDEF record is retrieved successfully,                            03/06/92
47000      C*       ie, when $$FAIL='0'.                                                          03/06/92
47100      C*                                                                                     03/06/92
```

SOURCE FILE . . . . . . . XLIBEM/MRPGSRC
MEMBER . . . . . . . . . MMC160

```
SEQNBR*...+... 1 ...+... 2 ...+... 3 ...+... 4 ...+... 5 ...+... 6 ...+... 7 ...+... 8 ...+... 9 ...+... 0
     C                    MOVE ZLPGM     KPGM                                                       03/06/92
     C                    MOVE ZLTREL    KFREL                                                      03/06/92
     C                    MOVE ZLFREL    KTREL                                                      03/06/92
     C                    EXSR $APPDF                                                               03/06/92
     C*                                                                                             03/06/92
     C*    - $$FAIL has just been checked by MMC020 before submitting                               03/17/92
     C*      the job queue procedure that calls this program.                                       03/17/92
     C*      Therefore, $$FAIL should be '0'.                                                       03/18/92
     C*                                                                                             03/16/92
     C          $$FAIL    IFEQ '0'                                                                  03/06/92
     C                    MOVE FDSPGM    QQSPGM                                                     03/06/92
     C                    MOVE FDGPGM    QQGPCM                                                     03/06/92
     C                    ENDIF                          $$FAIL='0'                                 03/06/92
     C*                                                                                             03/06/92
     C                    ENDIF                          ZLSTAT='56'                                03/06/92
     C*                                                                                             02/17/92
     C                    ENDIF                          *IN99='OFF                                 03/06/92
     C*                                                                                             03/06/92
     C                    ENDSR                          LDPARM        SRCE3                        03/05/92
     C*                                                                                             02/17/92
     C/SPACE 2                                                                                      12/31/91
     C*********  LDRPGM SUBR  ************************  LDRPGM SUBR  *                              03/06/92
     C*                                                             *                              02/17/92
     C*   The LDRPGM subroutine performs the following functions:  *                              03/06/92
     C*                                                             *                              02/17/92
     C*     1. Load the appropriate receiving transfer program name *                              03/06/92
     C*        into QQRPGM when the local CE is initiated in the   *                              03/06/92
     C*        local entity.                                        *                              03/06/92
     C*                                                             *  SRCE3                        10/15/92
     C***************************************************************  SRCE3                        10/15/92
     C*                                                             *  SRCE3                        10/15/92
     C*   INDICATORS USED  :  99                                    *  SRCE3                        10/15/92
     C*                                                             *  SRCE3                        10/15/92
     C*   EXECUTES         :  $APPDF                                *  SRCE3                        10/15/92
     C*                                                             *  SRCE3                        10/15/92
     C*   EXECUTED FROM    :  LDPARM                                *  SRCE3                        10/15/92
     C*                                                             *  SRCE3                        10/15/92
     C***************************************************************  SRCE3                        10/15/92
     C*                                                                SRCE3                        10/15/92
     C          LDRPGM    BEGSR                                                                     03/06/92
     C*                                                                                             03/06/92
     C*  Retrieve the GENCOM record for this local CE. Such                                         03/06/92
     C*  GENCOM record should exists for this CE since this CE                                      03/06/92
     C*  is initiated in the local entity.                                                          03/06/92
     C*                                                                                             03/06/92
     C          ZLGRNO    CHAINGENCOM               99                                              03/06/92
     C*                                                                                             02/17/92
     C*  If the corresponding GENCOM record read indicates that                                     03/06/92
     C*  multiple release levels are involved (ZCMULT='Y'), load                                    03/06/92
     C*  'MMC260' as the receiving transfer program name. MMC260                                    03/06/92
     C*  will handle the calling of one receiving transfer program                                  03/06/92
     C*  for each rel-mod level.                                                                    03/06/92
     C*  In case the GENCOM record is not found, load MMC260 as the                                 03/16/92
```

```
5738PW1 V2R2M0  920615              SEU SOURCE LISTING                 05/28/93 14:09:30          PAGE   11

SOURCE FILE . . . . . . .  XLIBEM/MRPGSRC
MEMBER  . . . . . . . . .  MMC160

SEQNBR*...+... 1 ...+... 2 ...+... 3 ...+... 4 ...+... 5 ...+... 6 ...+... 7 ...+... 8 ...+... 9 ...+... 0
      C*  receiving transfer program name. Since we do not know                                   03/16/92
      C*  whether multiple release levels are involved in this case,                              03/16/92
      C*  it is safer to use MMC260 as the receiving transfer program,                            03/16/92
      C*  as it can handle both single and multiple release levels.                               03/17/92
      C*  It should be noted that the case that a GENCOM record                                   03/16/92
      C*  cannot be found should not happen. This is done simply                                  03/16/92
      C*  for safety reasons.                                                                     03/16/92
      C*                                                                                          03/06/92
      C          ZCMULT    IFEQ 'Y'                                                               03/06/92
      C          *IN99     OREQ *ON                                                               03/16/92
      C                    MOVEL'MMC260'  QQRPGM                                                  03/12/92
      C*                                                                                          03/06/92
      C*  Otherwise, if only one release level is involved, simply                                03/06/92
      C*  load the receiving transfer program name for this application                           03/06/92
      C*  program/from rel-mod level/to rel-mod level from the APPDEF                             03/06/92
      C*  file. However, QQRPGM is only loaded if an APPDEF record is                             03/06/92
      C*  retrieved successfully ($$FAIL='0').                                                    03/06/92
      C*                                                                                          03/06/92
      C                    ELSE                                                                   03/06/92
      C                    MOVE ZLPGM     KPGM                                                    03/06/92
      C                    MOVE ZLFREL    KFREL                                                   03/06/92
      C                    MOVE ZLTREL    KTREL                                                   03/06/92
      C                    EXSR $APPDF                                                            03/06/92
      C*                                                                                          03/16/92
      C*  $$FAIL has just been checked by MMC020 before submitting                                03/16/92
      C*  the job queue procedure that calls this program.                                        03/16/92
      C*  Therefore, $$FAIL should be '0'.                                                        03/18/92
      C*                                                                                          03/06/92
      C          $$FAIL    IFEQ '0'                                                               03/06/92
      C                    MOVE FDRPGM    QQRPGM                                                  03/06/92
      C                    ENDIF                          $$FAIL='0'                              03/06/92
      C*                                                                                          03/06/92
      C                    ENDIF                          ZCMULT='Y'                              03/06/92
      C*                                                                                          02/17/92
      C                    ENDSR                          LDRPGM        SRCE3                     03/06/92
      C*                                                                                          02/17/92

                    * * * *  E N D   O F   S O U R C E  * * * *
```

```
;hi;          ** Trade Secret Information of Marcam **          05/28/93 **
;hx;;ql;

;id; This published, copyrighted work contains trade secret information
of Marcam corporation.  Use, transfer, disclosure, or copying without
its expressed written permission is strictly forbidden. ;ql;


$MMC260$

;b;  MMC260     Multi Receiving Transfer Controller Program     ;ql;;r;


;r;;hi; A. The Multi Receiving Transfer Controller Program is called by
the job queue procedure for consolidation applications.  It handles the
calling of the receiving transfer programs at the specific CE level for
applications involving multiple release levels.  (If there were not
multiple release levels, then only one receiving transfer program is
called by the job queue procedure in place of this program.) This
program should retrieve the receiving transfer program from APPDEF and
call it for each specific CE for the general CE.  ;ql;

;id; The following is the PLIST used by this program: ;ql;

;id;   *ENTRY   PLIST                                        ;ql;
;id;            PARM   PGRNO  15A    general CE #            ;ql;
;id;            PARM   PCENO  15A    (N/A)                   ;ql;
;id;            PARM   PORIG   1A    (N/A)                   ;ql;

&int&

Design Note:  Note that PCENO and PORIG are included as parameters,
even though they are not used by this program.  They must be included
because the XJ procedure calls this program or the receiving transfer
program directly, using the same PLIST for both.  So all parameters
used by the receiving transfer program must be included here also.

&end&

;id; 1. The logical view of LOCCOM by general CE # (LOCCOMGC) should be
processed first, retrieving all records for the passed general CE #.
For each record found, the receiving transfer program for the
application/from rel-mod level/to rel-mod level must be retrieved from
APPDEF and called.  Use $APPDF for this retrieval.  ;ql;

    ;id; A. For each APPDEF record, there are various communications
    programs assigned; the receiving transfer program is the one that
    should be called, passing the following parameters: ;ql;

;id;   PMCRCV   PLIST                                        ;ql;
;id;            PARM   PGRNO  15A    Passed general CE #     ;ql;
;id;            PARM   PCENO  15A    specific CE # from LOCCOM  ;ql;
;id;            PARM   PORIG   1A    'M' (called from MMC260)   ;ql;
```

```
    ;id; B. If the call to the receiving transfer program failed
    because the receiving transfer program retrieved from APPDEF does
    not exist, call MMC030 to send a message to the EM background
    message queue saying that the receiving transfer program for this
    local CE does not exist. ;ql;

    ;id; C. It should not happen that no APPDEF record is found, since
    MMC020 has already verified that it exists in order to be able to
    submit the XJ procedure.  No checking necessary.  ;ql;

;id; 2. Next, the logical view of REMCOM by general CE # (REMCOMGC)
should be processed, retrieving all records for the passed general CE
#.  For each record found, the receiving transfer program for the
application/from rel-mod level/to rel-mod level must be retrieved from
APPDEF and called.  Use $APPDF for this retrieval.  ;ql;

    ;id;  A. Call the receiving transfer program retrieved from APPDEF,
    passing the following parameters:  ;ql;

;id;    PMCRCV    PLIST                                              ;ql;
;id;              PARM    PGRNO  15A    Passed general CE #          ;ql;
;id;              PARM    PCENO  15A    specific CE # from REMCOM    ;ql;
;id;              PARM    PORIG   1A    'M' (called from MMC260)     ;ql;

    ;id; B. If the call to the receiving transfer program failed
    because the receiving transfer program retrieved from APPDEF does
    not exist, call MMC030 to send a message to the EM background
    message queue saying that the receiving transfer program for this
    remote CE does not exist. ;ql;

    ;id; C. See 1C above. ;ql;


;hi;B. File Usage ;ql;

;id;    APPDEF     IF     Application Definition File              ;ql;
;id;    COMDEF     IF     Communications Definition File           ;ql;
;id;    LOCCOMGC   IF     Logical View of LOCCOM by General CE #   ;ql;
;id;    REMCOMGC   IF     Logical View of REMCOM by General CE #   ;ql;

;ql;;hx;

$END$
```

```
5738PW1 V2R2M0  920615                 SEU SOURCE LISTING                 05/28/93 14:09:39         PAGE    1

SOURCE FILE . . . . . . .  XLIBEM/MRPGSRC
MEMBER  . . . . . . . . .  MMC260

SEQNBR*...+... 1 ...+... 2 ...+... 3 ...+... 4 ...+... 5 ...+... 6 ...+... 7 ...+... 8 ...+... 9 ...+... 0
  100    H*****************************************************************          12/27/91
  200    H*                                                               *          12/27/91
  300    H*          Release - 03         Mod Level - 10                  *          06/26/92
  400    H*   THIS UNPUBLISHED COPYRIGHTED WORK CONTAINS TRADE SECRET     *          12/27/91
  500    H*   INFORMATION OF MARCAM CORPORATION.  USE, TRANSFER,          *          12/27/91
  600    H*   DISCLOSURE, OR COPYING WITHOUT ITS EXPRESSED WRITTEN        *          12/27/91
  700    H*   PERMISSION IS STRICTLY FORBIDDEN.                  1993     *          06/26/92
  800    H*                                                               *          12/27/91
  900    H*****************************************************************          12/27/91
 1000    H/SPACE 2                                                                   11/11/91
 1100    H*****************************************************************          12/27/91
 1200    H*                                                               *          12/27/91
 1300    H*   MODULE:              Enterprise Management                  *          02/20/92
 1400    H*                                                               *          12/27/91
 1500    H*   PROGRAM NAME:        MMC260  Multi Receiving Transfer       *          04/02/92
 1600    H*                                Controller Program             *          04/02/92
 1700    H*                                                               *          12/27/91
 1800    H*   FUNCTION:            Calls the Receiving Transfer Programs  *          04/03/92
 1900    H*                        for applications involving multiple    *          04/03/92
 2000    H*                        release levels.                        *          04/03/92
 2100    H*                                                               *          12/27/91
 2200    H*   CALLING PROGRAM:     Job Queue Procedures for Consolidation *          04/02/92
 2300    H*                          Applications.                        *          04/02/92
 2400    H*                                                               *          12/27/91
 2500    H*   CALLED PROGRAM:      Receiving Transfer Programs            *          04/02/92
 2600    H*                        MMC030  - Communications Message Sending *        10/15/92
 2700    H*                                  Program                      *          10/15/92
 2800    H*                                                               *          12/27/91
 2900    H*   /COPY ROUTINES:      $APPDF - Application Definition Access *          04/02/92
 3000    H*                                 Subroutine                    *          04/02/92
 3100    H*                                                               *          12/27/91
 3200    H*****************************************************************          12/27/91
 3300    H*                P R O G R A M   D E S C R I P T I O N          *          12/27/91
 3400    H*****************************************************************          12/27/91
 3500    H*                                                               *          12/27/91
 3600    H*     This program is called by the job queue procedure for     *          04/03/92
 3700    H*   consolidation applications. It handles the calling of the   *          04/03/92
 3800    H*   receiving transfer programs at the specific CE level for    *          04/03/92
 3900    H*   applications involving multiple release levels. For each    *          04/03/92
 4000    H*   local and remote CE for the general CE # being passed, this *          04/03/92
 4100    H*   program will retrieve the name of the receiving transfer    *          04/03/92
 4200    H*   program, and then it will be called.                        *          04/03/92
 4300    H*                                                               *          04/03/92
 4400    H*     This program ends from the MAINLINE and will set on LR    *          04/03/92
 4500    H*   when it ends.                                               *          04/03/92
 4600    H*                                                               *          01/21/92
 4700    H*****************************************************************          12/27/91
 4800    H/SPACE 3                                                                   04/03/92
 4900    F*****************************************************************          03/05/92
 5000    F*          F U N C T I O N   O F   I N D I C A T O R S          *          03/05/92
 5100    F*****************************************************************          03/05/92
 5200    F*                                                               *          03/05/92
 5300    F*   98 - General Purpose Indicator (used in /COPY $APPDF)       *          04/03/92
```

```
5738PW1 V2R2M0  920615                SEU SOURCE LISTING                  05/28/93 14:09:39            PAGE    2

SOURCE FILE . . . . . . .  XLIBEM/MRPGSRC
MEMBER  . . . . . . . . .  MMC260

SEQNBR*...+... 1 ...+... 2 ...+... 3 ...+... 4 ...+... 5 ...+... 6 ...+... 7 ...+... 8 ...+... 9 ...+... 0
 5400      F*   99 - General Purpose Indicator                               *                       03/05/92
 5500      F*   LR - Last Record indicator                                   *                       03/05/92
 5600      F*                                                                *                       03/05/92
 5700      F*****************************************************************                        03/05/92
 5800      F/SPACE 2                                                                                 03/05/92
 5900      F*****************************************************************                        12/27/91
 6000      F*                                                                *                       12/27/91
 6100      F*                        FILE SPECIFICATIONS                     *                       12/27/91
 6200      F*                                                                *                       12/27/91
 6300      F*****************************************************************                        12/27/91
 6400      F*                                                                                        04/02/92
 6500      F*   Applications Definition File                                                         04/02/92
 6600      F*                                                                                        04/02/92
 6700      FAPPDEF  IF  E           K        DISK                                                    04/02/92
 6800      F/SPACE 2                                                                                 04/02/92
 6900      F*                                                                                        04/03/92
 7000      F*   Communications Definition File                                                       04/03/92
 7100      F*                                                                                        04/03/92
 7200      FCOMDEF  IF  E                    DISK                                                    04/03/92
 7300      F/SPACE 2                                                                                 04/03/92
 7400      F*                                                                                        12/27/91
 7500      F*   Local Communications Entry File                                                      12/27/91
 7600      F*     - logical by General CE #                                                          02/17/92
 7700      F*                                                                                        12/27/91
 7800      FLOCCOMGCIF  E           K        DISK                                                    04/02/92
 7900      F/SPACE 2                                                                                 11/11/91
 8000      F*                                                                                        12/27/91
 8100      F*   Remote Communications Entry File                                                     02/17/92
 8200      F*     - logical by General CE #                                                          02/17/92
 8300      F*                                                                                        12/27/91
 8400      FREMCOMGCIF  E           K        DISK                                                    04/02/92
 8500      F/SPACE 3                                                                                 04/03/92
 8600      I*****************************************************************                        12/27/91
 8700      I*                                                                *                       12/27/91
 8800      I*                       INPUT SPECIFICATIONS                     *                       12/27/91
 8900      I*                                                                *                       12/27/91
 9000      I*****************************************************************                        12/27/91
 9100      I*                                                                                        10/15/92
 9200      I* Externally described data structure to define the parameter                            10/15/92
 9300      I*   list for the EM message sending program, MMC030                                      10/15/92
 9400      I*                                                                                        10/15/92
 9500      I$MC030    E DSDSMC030                                                                    10/15/92
 9600      I*                                                                                        04/03/92
 9700      I*  Data Structure to break down the release-modification level                           04/03/92
 9800      I*    field which looks similar to 04-00. It is used in the                               04/03/92
 9900      I*     $APPDF /COPY subroutine.                                                           04/03/92
10000      I*                                                                                        04/03/92
10100      IQQRM        DS                                                                           04/03/92
10200      I                                      1    20QQREL                                       04/03/92
10300      I                                      4    50QQMOD                                       04/03/92
10400      I*                                                                                        12/27/91
10500      I/SPACE 3                                                                                 11/11/91
10600      C*****************************************************************                        12/27/91
```

```
5738PW1 V2R2M0  920615                SEU SOURCE LISTING                    05/28/93 14:09:39            PAGE    3

SOURCE FILE . . . . . . .  XLIBEM/MRPGSRC
MEMBER  . . . . . . . . .  MMC260

SEQNBR*...+... 1 ...+... 2 ...+... 3 ...+... 4 ...+... 5 ...+... 6 ...+... 7 ...+... 8 ...+... 9 ...+... 0
      C*                                                                 *                        12/27/91
      C*                        CALCULATION SPECS                        *                        12/27/91
      C*                                                                 *                        12/27/91
      C*******************************************************************                        12/27/91
      C*                                                                 *                        12/27/91
      C*******************************************************************                        12/27/91
      C*                        M A I N L I N E                          *                        12/27/91
      C*******************************************************************                        12/27/91
      C*                                                                 *                        12/27/91
      C*   The MAINLINE is executed once.  It will call the RCVLOC       *                        04/03/92
      C*   and the RCVREM subroutines to retrieve all local and remote*                           04/03/92
      C*   CE's for the general CE being passed, and then call the       *                        04/03/92
      C*   appropriate receiving transfer program for each of them.      *                        04/03/92
      C*   The program ends from the MAINLINE.                           *                        04/03/92
      C*                                                                 *  SRCE3                 10/19/92
      C*******************************************************************  SRCE3                 10/19/92
      C*                                                                 *  SRCE3                 10/19/92
      C*   INDICATORS USED  :  LR                                        *  SRCE3                 10/19/92
      C*                                                                 *  SRCE3                 10/19/92
      C*   EXECUTES         :  RCVLOC  RCVREM                            *  SRCE3                 10/19/92
      C*                                                                 *  SRCE3                 10/19/92
      C*******************************************************************  SRCE3                 10/19/92
      C*                                                                    SRCE3                 10/19/92
      C           *ENTRY    PLIST                                                                 04/02/92
      C                     PARM           P$GRNO                                                 04/15/92
      C                     PARM           P$CENO                                                 04/15/92
      C                     PARM           P$ORIG                                                 04/15/92
      C*                                                                                          04/02/92
      C*  Load the only parameter that is used by this program,                                   04/03/92
      C*  P$GRNO, into a work field.                                                              04/15/92
      C*                                                                                          04/02/92
      C                     MOVE P$GRNO    QQGRNO                                                 04/15/92
      C*                                                                                          04/02/92
      C*  Call the RCVLOC and RCVREM subroutines to retrieve all                                  04/02/92
      C*  Local and Remote CE's for the general CE # passed in                                    04/02/92
      C*  the program parameter, and call the appropriate receiving                               04/02/92
      C*  transfer program for each specific CE retrieved.                                        04/02/92
      C*                                                                                          04/02/92
      C                     EXSR RCVLOC                                                           04/02/92
      C*                                                                                          04/15/92
      C                     EXSR RCVREM                                                           04/02/92
      C*                                                                                          12/27/91
      C*  End the program                                                                         12/27/91
      C*                                                                                          12/27/91
      C                     SETON                     LR                                          12/27/91
      C                     RETRN                                                                 12/27/91
      C*                                                                                          12/27/91
      C/SPACE 2                                                                                   11/11/91
      C**********  *INZSR SUBR  **********************  *INZSR SUBR  *                            12/27/91
      C*                                                                 *                        12/27/91
      C*   The *INZSR subroutine performs the following functions:       *                        12/27/91
      C*                                                                 *                        12/27/91
      C*     1. Performs initial calculations that need to be done       *                        12/27/91
```

```
     5738PW1 V2R2M0  920615              SEU SOURCE LISTING                   05/28/93 14:09:39             PAGE    4

SOURCE FILE . . . . . . .  XLIBEM/MRPGSRC
MEMBER  . . . . . . . . .  MMC260

SEQNBR*...+... 1 ...+... 2 ...+... 3 ...+... 4 ...+... 5 ...+... 6 ...+... 7 ...+... 8 ...+... 9 ...+... 0
          C*         on the initial call of the program.                  *                                12/27/91
          C*                                                              *                                12/27/91
          C*   NOTE:  The *INZSR is executed during the *INIT phase of    *                                12/27/91
          C*          RPG execution.                                      *                                12/27/91
          C*                                                              *   SRCE3                        10/19/92
          C***************************************************************   SRCE3                        10/19/92
          C*                                                              *   SRCE3                        10/19/92
          C*    INDICATORS USED  :  99                                    *   SRCE3                        10/19/92
          C*                                                              *   SRCE3                        10/19/92
          C***************************************************************   SRCE3                        10/19/92
          C*                                                                  SRCE3                        10/19/92
          C            *INZSR    BEGSR                                                                     12/27/91
          C*                                                                                               12/27/91
          C*   Define and initialize program variables                                                     12/27/91
          C*                                                                                               12/27/91
          C                      MOVE 'M'       MODULE                                                     12/27/91
          C                      MOVE 'MMC260   '$PGM                                                      04/15/92
          C*                                                                                               04/03/92
          C*   Access COMDEF for communications definition constants.                                     04/03/92
          C*   This file has only one record.  Therefore, it needs to be                                  04/03/92
          C*   read only once (similar to the tailoring files). The                                       04/03/92
          C*   /COPY $APPDP subroutine requires that COMDEF be accessed                                   04/03/92
          C*   for it to work.                                                                            04/03/92
          C*                                                                                               04/03/92
          C            1         CHAINCOMDEF               99                                              04/03/92
          C*                                                                                               12/27/91
          C                      ENDSR                          *INZSR        SRCE3                        12/27/91
          C*                                                                                               12/27/91
          C/SPACE 2                                                                                        11/11/91
          C**********  $DEFSR SUBR  **********************  $DEFSR SUBR  *                                12/27/91
          C*                                                              *                                12/27/91
          C*    The $DEFSR subroutine performs the following functions:   *                                12/27/91
          C*                                                              *                                12/27/91
          C*      1. Defines program variables.  It is never executed.    *                                12/27/91
          C*                                                              *   SRCE3                        10/19/92
          C***************************************************************   SRCE3                        10/19/92
          C*                                                              *   SRCE3                        10/19/92
          C*    INDICATORS USED  :  NONE                                  *   SRCE3                        10/19/92
          C*                                                              *   SRCE3                        10/19/92
          C***************************************************************   SRCE3                        10/19/92
          C*                                                                  SRCE3                        10/19/92
          C            $DEFSR    BEGSR                                                                     12/27/91
          C*                                                                                               04/03/92
          C*   ***** Define program parameters *****                                                       04/15/92
          C*                                                                                               04/03/92
          C            *LIKE     DEFN ZLGRNO    P$GRNO          General CE #                               04/15/92
          C            *LIKE     DEFN ZLCENO    P$CENO          Specific CE #                              04/15/92
          C                      MOVE *BLANKS   P$ORIG  1       Orig Program                               04/15/92
          C*                                                                                               04/03/92
          C*   ***** Define program variables *****                                                        04/03/92
          C*                                                                                               12/27/91
          C*   - MODULE is the Module code                                                                 02/07/92
          C*                                                                                               12/27/91
```

```
5738PW1 V2R2M0  920615                SEU SOURCE LISTING                 05/28/93 14:09:39                PAGE    5

SOURCE FILE . . . . . . .   XLIBEM/MRPGSRC
MEMBER  . . . . . . . . .   MMC260

SEQNBR*...+... 1 ...+... 2 ...+... 3 ...+... 4 ...+... 5 ...+... 6 ...+... 7 ...+... 8 ...+... 9 ...+... 0
21300      C                   MOVE *BLANKS   MODULE  1                                                  12/27/91
21400      C*                                                                                             12/27/91
21500      C*  - $PGM is the Program name                                                                 04/15/92
21600      C*                                                                                             12/27/91
21700      C                   MOVE *BLANKS   $PGM    8                                                  04/15/92
21800      C*                                                                                             04/02/92
21900      C*  - Work field for the General CE # passed in the program                                   04/02/92
22000      C*    parameter.                                                                               04/02/92
22100      C*                                                                                             04/02/92
22200      C          *LIKE    DEFN ZLGRNO    QQGRNO                                                      04/02/92
22300      C*                                                                                             04/03/92
22400      C*  ***** Define key fields *****                                                             04/03/92
22500      C*                                                                                             04/03/92
22600      C*  - for APPDEF file                                                                         04/03/92
22700      C*                                                                                             04/03/92
22800      C          *LIKE    DEFN FDPGM     KPGM              Program name                            04/03/92
22900      C          *LIKE    DEFN FDFREL    KFREL             From rel-mod lv                         04/03/92
23000      C          *LIKE    DEFN FDTREL    KTREL             To rel-mod levl                         04/03/92
23100      C*                                                                                             04/03/92
23200      C*  ***** Define parameter fields *****                                                       04/03/92
23300      C*                                                                                             04/03/92
23400      C*  - for the receiving transfer programs.                                                    04/03/92
23500      C*                                                                                             04/03/92
23600      C          *LIKE    DEFN ZLGRNO    PGRNO             General CE #                            04/03/92
23700      C          *LIKE    DEFN ZLCENO    PCENO             Specific CE #                           04/03/92
23800      C                   MOVE *BLANKS   PORIG   1         Orig Program                            04/03/92
23900      C*                                                                                             04/03/92
24000      C*  ***** Define KLISTs *****                                                                 04/03/92
24100      C*                                                                                             04/03/92
24200      C*  - for APPDEF file                                                                         04/03/92
24300      C*                                                                                             04/03/92
24400      C          KAPPDE   KLIST                                                                      04/03/92
24500      C                   KFLD           KPGM              Program Name                            04/03/92
24600      C                   KFLD           KFREL             From Rel-Mod                            04/03/92
24700      C                   KFLD           KTREL             To Rel-Mod                              04/03/92
24800      C*                                                                                             04/03/92
24900      C*  ***** Define parameter lists *****                                                        04/03/92
25000      C*                                                                                             04/03/92
25100      C*  - for the receiving transfer programs.                                                    04/03/92
25200      C*                                                                                             04/03/92
25300      C          PMCRCV   PLIST                                                                      04/03/92
25400      C                   PARM           PGRNO             General CE #                            04/15/92
25500      C                   PARM           PCENO             Specific CE #                           04/15/92
25600      C                   PARM           PORIG             Orig Program                            04/15/92
25700      C*                                                                                             10/15/92
25800      C*  - for MMC030                                                                              10/15/92
25900      C*                                                                                             10/15/92
26000      C          PMC030   PLIST                                                                      10/15/92
26100      C                   PARM           $MC030                                                      10/15/92
26200      C*                                                                                             12/27/91
26300      C                   ENDSR                            $DEFSR        SRCE3                      12/27/91
26400      C*                                                                                             12/27/91
26500      C/SPACE 2                                                                                      04/03/92
```

```
5738PW1 V2R2M0  920615                SEU SOURCE LISTING                    05/28/93 14:09:39              PAGE    6

SOURCE FILE . . . . . . .  XLIBEM/MRPGSRC
MEMBER  . . . . . . . . .  MMC260

SEQNBR*...+... 1 ...+... 2 ...+... 3 ...+... 4 ...+... 5 ...+... 6 ...+... 7 ...+... 8 ...+... 9 ...+... 0
     C/COPY MMDDSSRC,$APPDF                                                                          04/03/92
     C/SPACE 2                                                                                       02/17/92
     C********* RCVLOC SUBR  ************************  RCVLOC SUBR  *                                04/02/92
     C*                                                              *                               02/17/92
     C*  The RCVLOC subroutine performs the following functions:    *                               04/02/92
     C*                                                              *                               02/17/92
     C*    1. Retrieve all local CE's for the general CE being       *                               04/03/92
     C*       passed into this program, and then call the receiving *                               04/03/92
     C*       transfer program retrieved from the Applications      *                               04/03/92
     C*       Definition File, APPDEF.                              *                               04/03/92
     C*                                                              *     SRCE3                     10/19/92
     C***************************************************************     SRCE3                     10/19/92
     C*                                                              *     SRCE3                     10/19/92
     C*  INDICATORS USED  :  99                                      *     SRCE3                     10/19/92
     C*                                                              *     SRCE3                     10/19/92
     C*  EXECUTES         :  $APPDF                                  *     SRCE3                     10/19/92
     C*                                                              *     SRCE3                     10/19/92
     C*  EXECUTED FROM    :  MAINLN                                  *     SRCE3                     10/19/92
     C*                                                              *     SRCE3                     10/19/92
     C***************************************************************     SRCE3                     10/19/92
     C*                                                                    SRCE3                     10/19/92
     C           RCVLOC    BEGSR                                                                     04/02/92
     C*                                                                                              02/17/92
     C* Do loop reading all LOCCOM record for the general CE #                                       04/02/92
     C* being passed into this program.                                                              04/02/92
     C*                                                                                              02/17/92
     C           QQGRNO    SETLLLOCCOMGC                                                             04/02/92
     C           QQGRNO    READELOCCOMGC                 99                                          04/02/92
     C           *IN99     DOWEQ*OFF                                                                 02/17/92
     C*                                                                                              04/02/92
     C*  - Load the receiving transfer program name for this                                         04/06/92
     C*    application program/From rel-mod level/To rel-mod level                                   04/06/92
     C*    from the APPDEF file. The APPDEF record should be                                         04/15/92
     C*    retrieved successfully because MMC020 has already verified                                04/15/92
     C*    that an APPDEF record exists before it submits the XJ                                     04/15/92
     C*    procedure that calls this program.                                                        04/15/92
     C*                                                                                              04/02/92
     C                     MOVE ZLPGM     KPGM                                                       04/02/92
     C                     MOVE ZLFREL    KFREL                                                      04/02/92
     C                     MOVE ZLTREL    KTREL                                                      04/02/92
     C                     EXSR $APPDF                                                               04/02/92
     C*                                                                                              04/02/92
     C*  - If an APPDEF record is successfully retrieved,                                            04/15/92
     C*    call the Receiving Transfer Program that has just                                         04/15/92
     C*    been retrieved from the APPDEF record. Note that                                          04/15/92
     C*    even though the APPDEF record should be retreived                                         04/15/92
     C*    successfully, we still check $$FAIL before calling                                        04/15/92
     C*    the receiving transfer program for safety reasons.                                        04/15/92
     C*                                                                                              04/02/92
     C           $$FAIL    IFEQ '0'                                                                  04/15/92
     C*                                                                                              04/15/92
     C                     MOVE QQGRNO    PGRNO                                                      04/03/92
     C                     MOVE ZLCENO    PCENO                                                      04/03/92
```

```
     5738PW1 V2R2M0  920615              SEU SOURCE LISTING                       05/28/93 14:09:39              PAGE    7

SOURCE FILE . . . . . . .  XLIBEM/MRPGSRC
MEMBER  . . . . . . . . .  MMC260

SEQNBR*...+... 1 ...+... 2 ...+... 3 ...+... 4 ...+... 5 ...+... 6 ...+... 7 ...+... 8 ...+... 9 ...+... 0
31900      C                     MOVE 'M'       PORIG                                                           04/03/92
32000      C*                                                                                                   04/02/92
32100      C                     CALL FDRPGM    PMCRCV       99                                                 10/15/92
32200      C*                                                                                                   10/15/92
32300      C*  - If the call fails (*IN99 is on), call MMC030 to send                                           10/15/92
32400      C*    a message to the EM background message queue saying                                           10/15/92
32500      C*    that the receiving transfer program doesn't exist.                                             10/15/92
32501      C*    Load $LIT1 with the literal sequence # for the name of                                         10/28/92
32502      C*    the program that doesn't exist, and $LIT2 with the                                             10/28/92
32503      C*    literal sequence # for the CE type.                                                            10/28/92
32600      C*                                                                                                   10/15/92
32700      C           *IN99     IFEQ *ON                                                                       10/15/92
32800      C                     MOVE MODULE    $MODCD                                                          10/15/92
32900      C                     MOVE '00459'   $ERRNO             Message #M00469                              10/15/92
33000      C                     MOVE ZLCENO    $CENUM             CE #                                         10/15/92
33100      C                     MOVE '00014'   $LIT1              'Recv xfer pgm'                              10/15/92
33200      C                     MOVE '00018'   $LIT2              'Local' CE                                   10/15/92
33300      C                     CALL 'MMC030'  PMC030                                                          10/15/92
33400      C                     ENDIF                             *IN99=*ON                                    10/15/92
33500      C*                                                                                                   04/15/92
33600      C                     ENDIF                             $$FAIL='0'                                   04/15/92
33700      C*                                                                                                   02/17/92
33800      C*  - Read the next LOCCOM record for this General CE #                                              02/17/92
33900      C*                                                                                                   02/17/92
34000      C           QQGRNO    READELOCCOMGC                 99                                               04/03/92
34100      C*                                                                                                   02/17/92
34200      C                     ENDDO                             *IN99=*OFF                                   02/17/92
34300      C*                                                                                                   02/17/92
34400      C                     ENDSR                             RCVLOC          SRCE3                        04/02/92
34500      C*                                                                                                   02/17/92
34600      C/SPACE 2                                                                                            12/31/91
34700      C*********  RCVREM SUBR  ***********************  RCVREM SUBR  *                                     04/02/92
34800      C*                                                             *                                     02/17/92
34900      C*   The RCVREM subroutine performs the following functions:   *                                     04/02/92
35000      C*                                                             *                                     02/17/92
35100      C*     1. Retrieve all remote CE's for the general CE being    *                                     04/03/92
35200      C*        passed into this program, and then call the receiving *                                    04/03/92
35300      C*        transfer program retrieved from the Applications     *                                     04/03/92
35400      C*        Definition File, APPDEF.                             *                                     04/03/92
35500      C*                                                             *    SRCE3                            10/19/92
35600      C***************************************************************    SRCE3                            10/19/92
35700      C*                                                             *    SRCE3                            10/19/92
35800      C*   INDICATORS USED  :  99                                    *    SRCE3                            10/19/92
35900      C*                                                             *    SRCE3                            10/19/92
36000      C*   EXECUTES         :  $APPDF                                *    SRCE3                            10/19/92
36100      C*                                                             *    SRCE3                            10/19/92
36200      C*   EXECUTED FROM    :  MAINLN                                *    SRCE3                            10/19/92
36300      C*                                                             *    SRCE3                            10/19/92
36400      C***************************************************************    SRCE3                            10/19/92
36500      C*                                                                  SRCE3                            10/19/92
36600      C           RCVREM    BEGSR                                                                          04/02/92
36700      C*                                                                                                   02/17/92
36800      C*  Do loop reading all REMCOM record for the general CE #                                               04/02/92
```

```
 5738PW1 V2R2M0  920615                 SEU SOURCE LISTING                    05/28/93 14:09:39           PAGE    8

SOURCE FILE . . . . . . .  XLIBEM/MRPGSRC
MEMBER  . . . . . . . . .  MMC260

SEQNBR*...+... 1 ...+... 2 ...+... 3 ...+... 4 ...+... 5 ...+... 6 ...+... 7 ...+... 8 ...+... 9 ...+... 0
36900      C*  being passed into this program.                                              04/02/92
37000      C*                                                                               02/17/92
37100      C          QQGRNO    SETLLREMCOMGC                                                04/02/92
37200      C          QQGRNO    READEREMCOMGC                  99                            04/02/92
37300      C          *IN99     DOWEQ*OFF                                                    02/17/92
37400      C*                                                                               04/02/92
37500      C*  - Load the receiving transfer program name for this                          04/15/92
37600      C*    application program/From rel-mod level/To rel-mod level                    04/15/92
37700      C*    from the APPDEF file. The APPDEF record should be                          04/15/92
37800      C*    retrieved successfully because MMC020 has already verified                 04/15/92
37900      C*    that an APPDEF record exists before it submits the XJ                      04/15/92
38000      C*    procedure that calls this program.                                         04/15/92
38100      C*                                                                               04/02/92
38200      C                    MOVE ZMFGM     KFGM                                         04/02/92
38300      C                    MOVE ZMFREL    KFREL                                        04/02/92
38400      C                    MOVE ZMTREL    KTREL                                        04/02/92
38500      C                    EXSR $APPDF                                                 04/02/92
38600      C*                                                                               04/15/92
38700      C*  - If an APPDEF record is successfully retrieved,                             04/15/92
38800      C*    call the Receiving Transfor Program that has just                          04/15/92
38900      C*    been retrieved from the APPDEF record. Note that                           04/15/92
39000      C*    even though the APPDEF record should be retreived                          04/15/92
39100      C*    successfully, we still check $$FAIL before calling                         04/15/92
39200      C*    the receiving transfer program for safety reasons.                         04/15/92
39300      C*                                                                               04/15/92
39400      C          $$FAIL    IFEQ '0'                                                     04/15/92
39500      C*                                                                               04/15/92
39600      C                    MOVE QQGRNO    PGRNO                                        04/15/92
39700      C                    MOVE ZMCENO    PCENO                                        04/15/92
39800      C                    MOVE 'M'       PORIG                                        04/15/92
39900      C*                                                                               04/15/92
40000      C                    CALL FDRPGM    PMCRCV       99                              10/15/92
40100      C*                                                                               10/15/92
40200      C*  - If the call fails (*IN99 is on), call MMC030 to send                       10/15/92
40300      C*    a message to the EM background message queue saying                        10/15/92
40400      C*    that the receiving transfer program doesn't exist.                         10/15/92
40401      C*    Load $LIT1 with the literal sequence # for the name of                     10/28/92
40402      C*    the program that doesn't exist, and $LIT2 with the                         10/28/92
40403      C*    literal sequence # for the CE type.                                        10/28/92
40500      C*                                                                               10/15/92
40600      C          *IN99     IFEQ *ON                                                     10/15/92
40700      C                    MOVE MODULE    $MODCD                                       10/15/92
40800      C                    MOVE '00469'   $ERRNO            Message #M00469            10/15/92
40900      C                    MOVE ZMCENO    $CENUM            CE #                       10/15/92
41000      C                    MOVE '00014'   $LIT1             'Recv xfer pgm'            10/15/92
41100      C                    MOVE '00019'   $LIT2             'Remote' CE                10/15/92
41200      C                    CALL 'MMC030'  PMC030                                       10/15/92
41300      C                    ENDIF                            *IN99=*ON                  10/15/92
41400      C*                                                                               04/15/92
41500      C                    ENDIF                            $$FAIL='0'                 04/15/92
41600      C*                                                                               02/17/92
41700      C*  - Read the next REMCOM record for this General CE #                          02/17/92
41800      C*                                                                               02/17/92
```

```
     5738PW1 V2R2M0  920615              SEU SOURCE LISTING                      05/28/93 14:09:39           PAGE    9

SOURCE FILE . . . . . . .   XLIBEM/MRPGSRC
MEMBER  . . . . . . . . .   MMC260

SEQNBR*...+... 1 ...+... 2 ...+... 3 ...+... 4 ...+... 5 ...+... 6 ...+... 7 ...+... 8 ...+... 9 ...+... 0
41900       C          QQGRNO    READEREMCOMGC               99                                              04/03/92
42000       C*                                                                                               02/17/92
42100       C                    ENDDO                        *IN99=*OFF                                     02/17/92
42200       C*                                                                                               02/17/92
42300       C                    ENDSR                        RCVREM         SRCE3                           04/02/92
42400       C*                                                                                               02/17/92

                   * * * *  E N D   O F   S O U R C E  * * * *
```

APPENDIX B

TO

UNITED STATES PATENT APPLICATION

FOR

IMPROVED METHOD AND APPARATUS FOR CONVERSION OF TRANSFERRED DIGITAL DATA by

Janice S. Pitt
John Lawton

---

The following constitute software listings of an exemplary system for conversion of transferred data according to invention. Those listings pertain to the flowcharts of Figures 5 through 7 as follows: the discussion of the software program MMU360 pertains to step 74 of Figure 5; the discussion of NEWORD & RTVTGS from the program MMU360 pertains to step 76; the discussion of subroutines NEWORD & RTVGCE from the program MMU360 pertains to step 78; the discussion of subroutine PRCORD from MMU360 pertains to step 82; the discussion of the program MMC460 pertains to steps 86, 88 and 90; the discussion of the program MMC040 pertains to steps 92 and 94; the discussion of the program MMC462 pertains to step 96; the discussion of program MMC020 pertains to steps 98 and 102; the discussion of program MMC020 pertains to step 102; and the discussion of program MMC464 pertains to step 104.

The materials attached as Appendix B are

© Marcam Corporation

```
6/01/93    11.27.09     INDENT LISTING    Program MMU360     Source File MRPGSRC     Library XLIB310          Page   1
                                                                                         NEWORD
*MAIN  104100      C/SPACE 3
*MAIN  104200      C*********  NEWORD SUBR  **********************  NEWORD SUBR  *        NEWORD
*MAIN  104300      C*                                                            *        NEWORD
*MAIN  104400      C*  The NEWORD subroutine performs the following functions:   *        NEWORD
*MAIN  104500      C*    1. Performs all processing for new order numbers        *        NEWORD
*MAIN  104600      C*                                                            *  SRCE3 NEWORD
*MAIN  104700      C**************************************************************  SRCE3 NEWORD
*MAIN  104800      C*                                                            *  SRCE3 NEWORD
*MAIN  104900      C*  INDICATORS USED  :  99                                    *  SRCE3 NEWORD
*MAIN  105000      C*                                                            *  SRCE3 NEWORD
*MAIN  105100      C*  EXECUTES         :  CHKORD  LSTRCD  OFCHCM  RTVGCE        *  SRCE3 NEWORD
*MAIN  105200      C*                      RTVTGS                                *  SRCE3 NEWORD
*MAIN  105300      C*                                                            *  SRCE3 NEWORD
*MAIN  105400      C*  EXECUTED FROM    :  DELETE  PRCORD  REMADS  REMATR        *  SRCE3 NEWORD
*MAIN  105500      C*                      REMCHG  REMCOM  REMCUS  REMDET        *  SRCE3 NEWORD
*MAIN  105600      C*                      REMDIS  REMPRM                        *  SRCE3 NEWORD
*MAIN  105700      C*                                                            *  SRCE3 NEWORD
*MAIN  105800      C**************************************************************  SRCE3 NEWORD
*MAIN  105900      C*                                                               SRCE3 NEWORD
NEWORD 106000      C          NEWORD    BEGSR                                             NEWORD
NEWORD 106100      C*                                                                     NEWORD
NEWORD 106200      C*  Initialize the flag which indicates there is an error while        NEWORD
NEWORD 106300      C*  processing the new order number.                                   NEWORD
NEWORD 106400      C*                                                                     NEWORD
NEWORD 106500      C                        CLEARQQEROR                                   NEWORD
NEWORD 106600      C*                                                                     NEWORD
NEWORD 106700      C*  Set up a DO loop for easy exit in case of error.                   NEWORD
NEWORD 106800      C*                                                                     NEWORD
NEWORD 106900      C                        DO                                            NEWORD
NEWORD 107000      C*                       (                                               NEWORD
NEWORD 107100      C*  Perform some proce(  ssing on the previous order number.             NEWORD
NEWORD 107200      C*                    (                                                  NEWORD
NEWORD 107300      C*  Since a new order (  is being processed, if there was at least       NEWORD
NEWORD 107400      C*  one target site fo(  r the previous order, then release the          NEWORD
NEWORD 107500      C*  General CE #.  Thi(  s is only done if not processing Order          NEWORD
NEWORD 107600      C*  Master or Customer(   Attribute Override records.                    NEWORD
NEWORD 107700      C*                    (                                                  NEWORD
NEWORD 107800      C          QQTYPE     (  IFNE '0'                                        NEWORD
NEWORD 107900      C          QQTYPE     (  (  ANDNE'2'                                       NEWORD
NEWORD 108000      C                     (  (  EXSR LSTRCD                                  NEWORD
NEWORD 108100      C                     (  ENDIF                            QQTYPE<>'0'    NEWORD
NEWORD 108200      C*                    (                                                  NEWORD
NEWORD 108300      C*  Save the new Order(   Number to be processed, depending on the       NEWORD
NEWORD 108400      C*  QQTYPE flag sent t(  o this subroutine.                              NEWORD
NEWORD 108500      C*                    (                                                  NEWORD
NEWORD 108600      C                     (  SELEC                                           NEWORD
NEWORD 108700      C*                    (  (                                                 NEWORD
NEWORD 108800      C          QQTYPE     (  (  WHEQ '0'                                       NEWORD
NEWORD 108900      C                     (  (  MOVE OMORDN     QQORDN                         NEWORD
NEWORD 109000      C          QQTYPE     (  (  WHEQ '1'                                       NEWORD
NEWORD 109100      C                     (  (  MOVE OAORDN     QQORDN                         NEWORD
NEWORD 109200      C          QQTYPE     (  (  WHEQ '2'                                       NEWORD
NEWORD 109300      C                     (  (  MOVE OUORDN     QQORDN                         NEWORD
NEWORD 109400      C          QQTYPE     (  (  WHEQ '3'                                       NEWORD
NEWORD 109500      C                     (  (  MOVE ODORDN     QQORDN                         NEWORD
NEWORD 109600      C          QQTYPE     (  (  WHEQ '4'                                       NEWORD
NEWORD 109700      C                     (  (  MOVE ORORDN     QQORDN                         NEWORD
NEWORD 109800      C          QQTYPE     (  (  WHEQ '5'
```

```
  6/01/93     11.27.09       INDENT LISTING     Program MMU360       Source File MRPGSRC      Library XLIB310          Page   2

NEWORD 109900     C                         ( (  MOVE OGORDN     QQORDN                          NEWORD
NEWORD 110000     C             QQTYPE      ( (  WHEQ '6'                                        NEWORD
NEWORD 110100     C                         ( (  MOVE OCORDN     QQORDN                          NEWORD
NEWORD 110200     C             QQTYPE      ( (  WHEQ '7'                                        NEWORD
NEWORD 110300     C                         ( (  MOVE OIORDN     QQORDN                          NEWORD
NEWORD 110400     C             QQTYPE      ( (  WHEQ '8'                                        NEWORD
NEWORD 110500     C                         ( (  MOVE ONORDN     QQORDN                          NEWORD
NEWORD 110600     C             QQTYPE      ( (  WHEQ '9'                                        NEWORD
NEWORD 110700     C                         ( (  MOVE OOORDN     QQORDN                          NEWORD
NEWORD 110800     C*                        ( (                                                  NEWORD
NEWORD 110900     C                         ( ENDSL                            SELEC             NEWORD
NEWORD 111000     C*                        (                                                    NEWORD
NEWORD 111100     C*  Initialize the fla(  g indicating an Order Master Transmission            NEWORD
NEWORD 111200     C*  File record has be(  en written for the order.                            NEWORD
NEWORD 111300     C*                    (                                                        NEWORD
NEWORD 111400     C                     (  CLEARQQMSTR                                           NEWORD
NEWORD 111500     C*                    (                                                        NEWORD
NEWORD 111600     C*  Initialize the fla(  g indicating whether all possible Order              NEWORD
NEWORD 111700     C*  Master Transmissio(  n File records have been written for the             NEWORD
NEWORD 111800     C*  order.            (                                                        NEWORD
NEWORD 111900     C*                    (                                                        NEWORD
NEWORD 112000     C                     (  CLEARQQALL                                            NEWORD
NEWORD 112100     C*                    (                                                        NEWORD
NEWORD 112200     C*  Initialize the fla(  g indicating all remaining records for an            NEWORD
NEWORD 112300     C*  order number have (  been processed.                                      NEWORD
NEWORD 112400     C*                    (                                                        NEWORD
NEWORD 112500     C                     (  CLEARQQPROC                                           NEWORD
NEWORD 112600     C*                    (                                                        NEWORD
NEWORD 112700     C*  Initialize the fla(  g indicating all additional transmission             NEWORD
NEWORD 112800     C*  file records have (  been written for an order number.                    NEWORD
NEWORD 112900     C*                    (                                                        NEWORD
NEWORD 113000     C                     (  CLEARQQWRTN                                           NEWORD
NEWORD 113100     C*                    (                                                        NEWORD
NEWORD 113200     C*  Check if the order(   is being maintained by another user.  If            NEWORD
NEWORD 113300     C*  it's in use, then (  skip this order and retrieve the next one.           NEWORD
NEWORD 113400     C*                    (                                                        NEWORD
NEWORD 113500     C                     (  CLEARQQUSED                                           NEWORD
NEWORD 113600     C                     (  EXSR CHKORD                                           NEWORD
NEWORD 113700     C          QQUSED     (  IFEQ 'Y'                                              NEWORD
NEWORD 113800     C                     (  (  MOVE 'Y'      QQEROR                               NEWORD
NEWORD 113900     C                     (  (  LEAVE                                              NEWORD
NEWORD 114000     C                     (  ENDIF                          QQUSED='Y'             NEWORD
NEWORD 114100     C*                    (                                                        NEWORD
NEWORD 114200     C*  Retrieve a General(   CE #.  If there's an error then remove the          NEWORD
NEWORD 114300     C*  order from the Ord(  er Conflict Control File and process the             NEWORD
NEWORD 114400     C*  next order.       (                                                        NEWORD
NEWORD 114500     C*                    (                                                        NEWORD
NEWORD 114600     C                     (  EXSR RTVGCE                                           NEWORD
NEWORD 114700     C          PERRCD     (  IFEQ '1'                                              NEWORD
NEWORD 114800     C          PERRCD     (  (  OREQ '2'                                           NEWORD
NEWORD 114900     C          QQORDN     (  (  DELETFORDFIL           99                          NEWORD
NEWORD 115000     C                     (  (  MOVE *OFF     *IN99                                NEWORD
NEWORD 115100     C                     (  (  MOVE 'Y'      QQEROR                               NEWORD
NEWORD 115200     C                     (  (  LEAVE                                              NEWORD
NEWORD 115300     C                     (  ENDIF                          PERRCD='1'             NEWORD
NEWORD 115400     C*                    (                                                        NEWORD
NEWORD 115500     C*  Set the flag to in(  dicate whether or not an order is being              NEWORD
NEWORD 115600     C*  cancelled.  If an (  Order Master record with a status of '99' is         NEWORD
```

```
 6/01/93    11.27.09      INDENT LISTING     Program MMU360      Source File MRPGSRC      Library XLIB310            Page    3

NEWORD 115700      C*  being processed, t(  hen the order is being cancelled.                          NEWORD
NEWORD 115800      C*  Otherwise it is no(  t being cancelled.                                         NEWORD
NEWORD 115900      C*                    (                                                             NEWORD
NEWORD 116000      C           QQTYPE    (  IFEQ '0'                                                   NEWORD
NEWORD 116100      C           OMSTAT    (  (  ANDEQ'99'                                                  NEWORD
NEWORD 116200      C                     (  (  MOVE 'Y'       QQCNLO                                      NEWORD
NEWORD 116300      C                     (  ELSE                                                       NEWORD
NEWORD 116400      C                     (  (  MOVE 'N'       QQCNLO                                      NEWORD
NEWORD 116500      C                     (  ENDIF                              QQTYPE='0'              NEWORD
NEWORD 116600      C*                    (                                                             NEWORD
NEWORD 116700      C*  Initialize the fla(  g which indicates whether or not a resource                NEWORD
NEWORD 116800      C*  is being cancelled(  .                                                          NEWORD
NEWORD 116900      C*                    (                                                             NEWORD
NEWORD 117000      C                     (  MOVE 'N'       QQCNLR                                      NEWORD
NEWORD 117100      C*                    (                                                             NEWORD
NEWORD 117200      C*  If an Order Detail(   or an Order Promotion record is being                     NEWORD
NEWORD 117300      C*  processed then lea(  ve the loop since the processing below is                  NEWORD
NEWORD 117400      C*  not necessary.    (                                                             NEWORD
NEWORD 117500      C*                    (                                                             NEWORD
NEWORD 117600      C           QQTYPE    (  IFEQ '3'                                                   NEWORD
NEWORD 117700      C           QQTYPE    (  (  OREQ '8'                                                   NEWORD
NEWORD 117800      C                     (  (  LEAVE                                                      NEWORD
NEWORD 117900      C                     (  ENDIF                              QQTYPE='3'              NEWORD
NEWORD 118000      C*                    (                                                             NEWORD
NEWORD 118100      C*  If the record bein(  g processed is a charge or a comment, check                NEWORD
NEWORD 118200      C*  if this is a charg(  e/comment which may have been added at the                 NEWORD
NEWORD 118300      C*  OFS and is being s(  ent back to the OTS.  If so, then do not                   NEWORD
NEWORD 118400      C*  continue with the (  processing of this charge/comment since the                NEWORD
NEWORD 118500      C*  processing only ap(  plies to a charge/comment being sent from                  NEWORD
NEWORD 118600      C*  the OTS to the OFS(  .                                                          NEWORD
NEWORD 118700      C*                    (                                                             NEWORD
NEWORD 118800      C           QQTYPE    (  IFEQ '5'                                                   NEWORD
NEWORD 118900      C           QQTYPE    (  (  OREQ '6'                                                   NEWORD
NEWORD 119000      C                     (  (  EXSR OFCHCM                                                NEWORD
NEWORD 119100      C           QQOFSC    (  (  IFEQ 'Y'                                                   NEWORD
NEWORD 119200      C                     (  (  (  MOVE 'Y'       QQEROR                                      NEWORD
NEWORD 119300      C                     (  (  (  LEAVE                                                      NEWORD
NEWORD 119400      C                     (  (  ENDIF                              QQOFSC='Y'              NEWORD
NEWORD 119500      C                     (  ENDIF                              QQTYPE='5'              NEWORD
NEWORD 119600      C*                    (                                                             NEWORD
NEWORD 119700      C*  Retrieve all targe(  t sites for the order.                                     NEWORD
NEWORD 119800      C*                    (                                                             NEWORD
NEWORD 119900      C                     (  EXSR RTVTGS                                                NEWORD
NEWORD 120000      C*                    (                                                             NEWORD
NEWORD 120100      C                    ENDDO                          DO                          NEWORD
NEWORD 120200      C*                                                                                  NEWORD
NEWORD 120300      C*                                                                                  NEWORD
NEWORD 120400      C                    ENDSR                          NEWORD            SRCE3 NEWORD
NEWORD 207900      C/SPACE 3                                                                     PRCORD
NEWORD 208000      C**********  PRCORD SUBR  ***********************  PRCORD SUBR  *              PRCORD
NEWORD 208100      C*                                                             *              PRCORD
NEWORD 208200      C*   The PRCORD subroutine performs the following functions:   *              PRCORD
NEWORD 208300      C*     1. Processes through all orders which need to be sent to *             PRCORD
NEWORD 208400      C*        a remote site                                        *              PRCORD
NEWORD 208500      C*     2. Calls MMC140 to release the General CE # to start    *              PRCORD
NEWORD 208600      C*        the communications process for the sending of the    *              PRCORD
NEWORD 208700      C*        order                                                *              PRCORD
NEWORD 208800      C*                                                             *        SRCE3 PRCORD
```

```
6/01/93    11.27.09    INDENT LISTING    Program MMU360    Source File MRPGSRC    Library XLIB310    Page  4

NEWORD 208900  C***************************************************************  SRCE3 PRCORD
NEWORD 209000  C*                                                             *  SRCE3 PRCORD
NEWORD 209100  C*  INDICATORS USED  :  99                                     *  SRCE3 PRCORD
NEWORD 209200  C*                                                             *  SRCE3 PRCORD
NEWORD 209300  C*  EXECUTES         :  LSTRCD  NEWORD  PRCADS  PRCATR         *  SRCE3 PRCORD
NEWORD 209400  C*                      PRCCHG  PRCCOM  PRCCUS  PRCDET         *  SRCE3 PRCORD
NEWORD 209500  C*                      PRCDE2  PRCDIS  WRMSTR                 *  SRCE3 PRCORD
NEWORD 209600  C*                                                             *  SRCE3 PRCORD
NEWORD 209700  C*  EXECUTED FROM    :  PROCES                                 *  SRCE3 PRCORD
NEWORD 209800  C*                                                             *  SRCE3 PRCORD
NEWORD 209900  C***************************************************************  SRCE3 PRCORD
NEWORD 210000  C*                                                                      PRCORD
PRCORD 210100  C          PRCORD    BEGSR                                              PRCORD
PRCORD 210200  C*                                                                      PRCORD
PRCORD 210300  C*  Process a loop until all orders have been sent to their target        PRCORD
PRCORD 210400  C*  sites.                                                                PRCORD
PRCORD 210500  C*                                                                      PRCORD
PRCORD 210600  C*  Start processing at the beginning of the file.                        PRCORD
PRCORD 210700  C*                                                                      PRCORD
PRCORD 210800  C          *LOVAL    SETLLORDMST                                        PRCORD
PRCORD 210900  C*                                                                      PRCORD
PRCORD 211000  C          *IN99     DOUEQ*ON                                           PRCORD
PRCORD 211100  C*                   (                                                     PRCORD
PRCORD 211200  C                    (  CLEARQQUSED                                        PRCORD
PRCORD 211300  C                    (  CLEARQQORDN                                        PRCORD
PRCORD 211400  C*                   (                                                     PRCORD
PRCORD 211500  C*  Retrieve the order(    to be sent.                                     PRCORD
PRCORD 211600  C*                   (                                                     PRCORD
PRCORD 211700  C                    (  READ ORDMST                  99                    PRCORD
PRCORD 211800  C*                   (                                                     PRCORD
PRCORD 211900  C          *IN99     (  IFEQ *OFF                                          PRCORD
PRCORD 212000  C*                   (  (                                                     PRCORD
PRCORD 212100  C*  Perform some initi(  (  al processing on the order number.  Set the      PRCORD
PRCORD 212200  C*  QQTYPE flag to ind(  (  icate a master record is being processed.        PRCORD
PRCORD 212300  C*                   (  (                                                     PRCORD
PRCORD 212400  C                    (  (  MOVE '0'      QQTYPE                               PRCORD
PRCORD 212500  C                    (  (  EXSR NEWORD                                        PRCORD
PRCORD 212600  C          QQEROR    (  (  IFEQ 'Y'                                              PRCORD
PRCORD 212700  C                    (  (  (  ITER                                            PRCORD
PRCORD 212800  C                    (  (  ENDIF                          QQEROR='Y'          PRCORD
PRCORD 212900  C*                   (  (                                                     PRCORD
PRCORD 213000  C*  If there is at lea(  (  at one target site for the order then            PRCORD
PRCORD 213100  C*  continue.        (  (                                                     PRCORD
PRCORD 213200  C*                   (  (                                                     PRCORD
PRCORD 213300  C          QQELMT    (  (  IFNE 0                                                PRCORD
PRCORD 213400  C*                   (  (  (                                                     PRCORD
PRCORD 213500  C*  Since the total or(  (  (  der amounts will be sent as 0, save the           PRCORD
PRCORD 213600  C*  original values to(  (  (   be restored after the transmission records     PRCORD
PRCORD 213700  C*  are written.     (  (  (                                                     PRCORD
PRCORD 213800  C*                   (  (  (                                                     PRCORD
PRCORD 213900  C                    (  (  (  Z-ADDOMHAMT    QQHAMT                              PRCORD
PRCORD 214000  C                    (  (  (  Z-ADDOMPAMT    QQPAMT                              PRCORD
PRCORD 214100  C*                   (  (  (                                                     PRCORD
PRCORD 214200  C*  Since several file(  (  (  s apply to both the order level and the          PRCORD
PRCORD 214300  C*  resource level, in(  (  (  itialize the flag which indicates whether to     PRCORD
PRCORD 214400  C*  process Order leve(  (  (  l or Resource level information.                 PRCORD
PRCORD 214500  C*                   (  (  (                                                     PRCORD
PRCORD 214600  C                    (  (  (  MOVE '1'      QQLEVL                               PRCORD
```

```
6/01/93    11.27.09        INDENT LISTING    Program MMU360      Source File MRPGSRC      Library XLIB310          Page    5

PRCORD 214700      C*                 (  (  (                                                    PRCORD
PRCORD 214800      C*  Write all Order Ma(  (  (  ster Transmission records for the order.          PRCORD
PRCORD 214900      C*                 (  (  (                                                    PRCORD
PRCORD 215000      C                  (  (  (  MOVE 'N'       QQBLNK                             PRCORD
PRCORD 215100      C                  (  (  (  EXSR WRMSTR                                       PRCORD
PRCORD 215200      C                  (  (  (  MOVE *OFF      *IN99                              PRCORD
PRCORD 215300      C*                 (  (  (                                                    PRCORD
PRCORD 215400      C*  Restore the total (  (  (  order amount fields.                           PRCORD
PRCORD 215500      C*                 (  (  (                                                    PRCORD
PRCORD 215600      C                  (  (  (  Z-ADDQQHAMT    OMHAMT                             PRCORD
PRCORD 215700      C                  (  (  (  Z-ADDQQPAMT    OMPAMT                             PRCORD
PRCORD 215800      C*                 (  (  (                                                    PRCORD
PRCORD 215900      C                  (  (  ENDIF                          QQELMT<>0           PRCORD
PRCORD 216000      C*                 (  (                                                       PRCORD
PRCORD 216100      C*  Since the order ha(  (  s now been processed, set the 'Needs-to-be-      PRCORD
PRCORD 216200      C*  sent' byte to 'N',(  (   and update the Order Master record.             PRCORD
PRCORD 216300      C*                 (  (                                                       PRCORD
PRCORD 216400      C                  (  (  MOVE 'N'       OMSEND                               PRCORD
PRCORD 216500      C                  (  (  UPDATFORDMST                                        PRCORD
PRCORD 216600      C*                 (  (                                                       PRCORD
PRCORD 216700      C*  If this order has (  (  been cancelled then remove the order from        PRCORD
PRCORD 216800      C*  the Order Conflict(  (   Control File.                                   PRCORD
PRCORD 216900      C*                 (  (                                                       PRCORD
PRCORD 217000      C          OMSTAT  (  (  IFEQ '99'                                           PRCORD
PRCORD 217100      C                  (  (  (  EXSR LSTRCD                                      PRCORD
PRCORD 217200      C                  (  (  (  ITER                                             PRCORD
PRCORD 217300      C                  (  (  ENDIF                          OMSTAT='99'         PRCORD
PRCORD 217400      C*                 (  (                                                       PRCORD
PRCORD 217500      C*  If there is at lea(  (  at one target site for the order then           PRCORD
PRCORD 217600      C*  continue by loadin(  (  g the transmission files for all other          PRCORD
PRCORD 217700      C*  records.           (  (                                                   PRCORD
PRCORD 217800      C*                 (  (                                                       PRCORD
PRCORD 217900      C          QQELMT  (  (  IFNE 0                                              PRCORD
PRCORD 218000      C*                 (  (  (                                                    PRCORD
PRCORD 218100      C*  Load the key field(  (  (  s which will be used in several subroutines.  PRCORD
PRCORD 218200      C*                 (  (  (                                                    PRCORD
PRCORD 218300      C                  (  (  (  MOVE QQORDN    KORDN                              PRCORD
PRCORD 218400      C                  (  (  (  CLEARKRESR                                        PRCORD
PRCORD 218500      C                  (  (  (  CLEARKRELN                                        PRCORD
PRCORD 218600      C*                 (  (  (                                                    PRCORD
PRCORD 218700      C*  Process all Order (  (  (  Address overrides for the order.               PRCORD
PRCORD 218800      C*                 (  (  (                                                    PRCORD
PRCORD 218900      C                  (  (  (  EXSR PRCADS                                       PRCORD
PRCORD 219000      C*                 (  (  (                                                    PRCORD
PRCORD 219100      C*  Process any Custom(  (  (  er override for the order.                     PRCORD
PRCORD 219200      C*                 (  (  (                                                    PRCORD
PRCORD 219300      C                  (  (  (  EXSR PRCCUS                                       PRCORD
PRCORD 219400      C*                 (  (  (                                                    PRCORD
PRCORD 219500      C*  Process any Attrib(  (  (  ute override for the order.                    PRCORD
PRCORD 219600      C*                 (  (  (                                                    PRCORD
PRCORD 219700      C                  (  (  (  EXSR PRCATR                                       PRCORD
PRCORD 219800      C*                 (  (  (                                                    PRCORD
PRCORD 219900      C*  Process all Charge(  (  (  s for the order.                               PRCORD
PRCORD 220000      C*                 (  (  (                                                    PRCORD
PRCORD 220100      C                  (  (  (  EXSR PRCCHG                                       PRCORD
PRCORD 220200      C*                 (  (  (                                                    PRCORD
PRCORD 220300      C*  Process all Commen(  (  (  ts for the order.                              PRCORD
PRCORD 220400      C*                 (  (  (                                                    PRCORD
```

```
6/01/93    11.27.09    INDENT LISTING    Program MMU360    Source File MRPGSRC    Library XLIB310    Page  6

PRCORD 220500   C*  First process all (  (  (  header text.                                        PRCORD
PRCORD 220600   C*                    (  (  (                                                      PRCORD
PRCORD 220700   C                     (  (  (  MOVE '1'      KCMTP                                 PRCORD
PRCORD 220800   C                     (  (  (  EXSR PRCCOM                                         PRCORD
PRCORD 220900   C*                    (  (  (                                                      PRCORD
PRCORD 221000   C*  Next process all t(  (  (  railer text.                                        PRCORD
PRCORD 221100   C*                    (  (  (                                                      PRCORD
PRCORD 221200   C                     (  (  (  MOVE '2'      KCMTP                                 PRCORD
PRCORD 221300   C                     (  (  (  EXSR PRCCOM                                         PRCORD
PRCORD 221400   C*                    (  (  (                                                      PRCORD
PRCORD 221500   C*  Process all Discou(  (  (  nts for the order.                                  PRCORD
PRCORD 221600   C*                    (  (  (                                                      PRCORD
PRCORD 221700   C                     (  (  (  EXSR PRCDIS                                         PRCORD
PRCORD 221800   C*                    (  (  (                                                      PRCORD
PRCORD 221900   C*  Now process all De(  (  (  tail level records for the order.                   PRCORD
PRCORD 222000   C*                    (  (  (                                                      PRCORD
PRCORD 222100   C                     (  (  (  EXSR PRCDET                                         PRCORD
PRCORD 222200   C*                    (  (  (                                                      PRCORD
PRCORD 222300   C*  Finally, process a(  (  (  ll remaining information for this order             PRCORD
PRCORD 222400   C*  number (i.e. any d(  (  (  etail level overrides which are not attached        PRCORD
PRCORD 222500   C*  to a particular Or(  (  (  der Detail line).                                   PRCORD
PRCORD 222600   C*                    (  (  (                                                      PRCORD
PRCORD 222700   C                     (  (  (  MOVE '3'      QQLEVL                                PRCORD
PRCORD 222800   C*                    (  (  (                                                      PRCORD
PRCORD 222900   C*  Set up the key fie(  (  (  ld information.                                     PRCORD
PRCORD 223000   C*                    (  (  (                                                      PRCORD
PRCORD 223100   C                     (  (  (  MOVE ODORDN   KORDN                                 PRCORD
PRCORD 223200   C                     (  (  (  CLEARKRESR                                          PRCORD
PRCORD 223300   C                     (  (  (  CLEARKRELN                                          PRCORD
PRCORD 223400   C*                    (  (  (                                                      PRCORD
PRCORD 223500   C                     (  (  (  EXSR PRCDE2                                         PRCORD
PRCORD 223600   C*                    (  (  (                                                      PRCORD
PRCORD 223700   C                     (  (  ENDIF                           QQELMT<>0           PRCORD
PRCORD 223800   C*                    (  (                                                      PRCORD
PRCORD 223900   C*  Release the Genera(  (  1 CE # if the Order Master Transmission             PRCORD
PRCORD 224000   C*  record was written(  (  .                                                   PRCORD
PRCORD 224100   C*                    (  (                                                      PRCORD
PRCORD 224200   C                     (  (  EXSR LSTRCD                  *IN99=*OFF          PRCORD
PRCORD 224300   C                     (  ENDIF                                               PRCORD
PRCORD 224400   C*                    (                                                   PRCORD
PRCORD 224500   C                     ENDDO                           DOU *IN99=*ON       PRCORD
PRCORD 224600   C*                                                                        PRCORD
PRCORD 224700   C*                                                                        PRCORD
PRCORD 224800   C                     ENDSR                           PRCORD       SRCE3 PRCORD
PRCORD 394300   C/SPACE 3                                                                 RTVGCE
PRCORD 394400   C*********  RTVGCE SUBR  **********************  RTVGCE SUBR  *           RTVGCE
PRCORD 394500   C*                                                           *           RTVGCE
PRCORD 394600   C*   The RTVGCE subroutine performs the following functions:  *           RTVGCE
PRCORD 394700   C*     1. Calls MMC080 to retrieve a General CE #              *           RTVGCE
PRCORD 394800   C*                                                           *     SRCE3 RTVGCE
PRCORD 394900   C*************************************************************     SRCE3 RTVGCE
PRCORD 395000   C*                                                           *     SRCE3 RTVGCE
PRCORD 395100   C*   INDICATORS USED  :  NONE                                  *     SRCE3 RTVGCE
PRCORD 395200   C*                                                           *     SRCE3 RTVGCE
PRCORD 395300   C*   EXECUTED FROM    :  NEWORD                                *     SRCE3 RTVGCE
PRCORD 395400   C*                                                           *     SRCE3 RTVGCE
PRCORD 395500   C*************************************************************     SRCE3 RTVGCE
PRCORD 395600   C*                                                                 SRCE3 RTVGCE
```

```
   6/01/93    11.27.09      INDENT LISTING    Program MMU360      Source File MRPGSRC     Library XLIB310          Page    7

RTVGCE 395700     C          RTVGCE    BEGSR                                                        RTVGCE
RTVGCE 395800     C*                                                                                RTVGCE
RTVGCE 395900     C*  Call MMC080 to retrieve a General CE #.                                       RTVGCE
RTVGCE 396000     C*                                                                                RTVGCE
RTVGCE 396100     C                        CALL 'MMC080'  PMC080                                    RTVGCE
RTVGCE 396200     C*                                                                                RTVGCE
RTVGCE 396300     C*  If there is no error returned then load the General CE # into                RTVGCE
RTVGCE 396400     C*  a work save field.  In addition, save the current date and                    RTVGCE
RTVGCE 396500     C*  time in work fields to be loaded into the transmission files.                 RTVGCE
RTVGCE 396600     C*                                                                                RTVGCE
RTVGCE 396700     C          PERRCD    IFEQ '0'                                                        RTVGCE
RTVGCE 396800     C                    (  MOVE PCENO     QQCENO                                        RTVGCE
RTVGCE 396900     C                    (  TIME           QQBOTH                                        RTVGCE
RTVGCE 397000     C                    (  MOVE $USER     PUSER                                         RTVGCE
RTVGCE 397100     C                    (  MOVE '3'       PTYPE                                         RTVGCE
RTVGCE 397200     C                    (  Z-ADDQQDATE    PREFOR                                        RTVGCE
RTVGCE 397300     C                    (  CALL 'MZM100'  DATLST                                        RTVGCE
RTVGCE 397400     C                    (  Z-ADDPAFTER    QQDATE                                     RTVGCE
RTVGCE 397500     C                    ENDIF                           PERRCD='0'                   RTVGCE
RTVGCE 397600     C*                                                                                RTVGCE
RTVGCE 397700     C*  If MMC080 did not write a General CE # because an APPDEF                      RTVGCE
RTVGCE 397800     C*  record cannot be found (PERRCD = '1'), call MMC030 to send a                  RTVGCE
RTVGCE 397900     C*  message to the EM background message queue saying that this                   RTVGCE
RTVGCE 398000     C*  program (MMU360) cannot start communications to send the order                RTVGCE
RTVGCE 398100     C*  transmission files to any remote sites because an APPDEF                      RTVGCE
RTVGCE 398200     C*  record cannot be found (message # M00561).                                    RTVGCE
RTVGCE 398300     C*  NOTE:  Since there are many different order transmission                      RTVGCE
RTVGCE 398400     C*         files, and an OMSTRN record must be sent with every                    RTVGCE
RTVGCE 398500     C*         CE #, then the $FILE parameter will simply be loaded                   RTVGCE
RTVGCE 398600     C*         with OMSTRN.                                                           RTVGCE
RTVGCE 398700     C*                                                                                RTVGCE
RTVGCE 398800     C          PERRCD    IFEQ '1'                                                        RTVGCE
RTVGCE 398900     C                    (  CLEAR$MC030                                                  RTVGCE
RTVGCE 399000     C                    (  MOVE MODULE    $MODCD                                        RTVGCE
RTVGCE 399100     C                    (  MOVE '00561'   $ERRNO          Message #M00561               RTVGCE
RTVGCE 399200     C                    (  MOVEL'MMU360'  $PGMN           Program Name                  RTVGCE
RTVGCE 399300     C                    (  MOVEL'OMSTRN'  $FILE           File Name                     RTVGCE
RTVGCE 399400     C                    (  CALL 'MMC030'  PMC030                                     RTVGCE
RTVGCE 399500     C                    ENDIF                           PERRCD='1'                   RTVGCE
RTVGCE 399600     C*                                                                                RTVGCE
RTVGCE 399700     C*                                                                                RTVGCE
RTVGCE 399800     C*  If MMC080 did not write a General CE # because a SYSSIT record                RTVGCE
RTVGCE 399900     C*  cannot be found for the current entity (PERRCD = '2'), call                   RTVGCE
RTVGCE 400000     C*  MMC030 to send a message to the EM background message queue                   RTVGCE
RTVGCE 400100     C*  saying that this program (MMU360) cannot start communications                 RTVGCE
RTVGCE 400200     C*  to send the order transmission files to any remote sites                      RTVGCE
RTVGCE 400300     C*  because a SYSSIT record cannot be found (message # M00562).                   RTVGCE
RTVGCE 400400     C*  NOTE:  Since there are many different order transmission                      RTVGCE
RTVGCE 400500     C*         files, and an OMSTRN record must be sent with every                    RTVGCE
RTVGCE 400600     C*         CE #, then the $FILE parameter will simply be loaded                   RTVGCE
RTVGCE 400700     C*         with OMSTRN.                                                           RTVGCE
RTVGCE 400800     C*                                                                                RTVGCE
RTVGCE 400900     C          PERRCD    IFEQ '2'                                                        RTVGCE
RTVGCE 401000     C                    (  CLEAR$MC030                                                  RTVGCE
RTVGCE 401100     C                    (  MOVE MODULE    $MODCD                                        RTVGCE
RTVGCE 401200     C                    (  MOVE '00562'   $ERRNO          Message #M00562               RTVGCE
RTVGCE 401300     C                    (  MOVEL'MMU360'  $PGMN           Program Name                  RTVGCE
RTVGCE 401400     C                    (  MOVEL'OMSTRN'  $FILE           File Name                     RTVGCE
```

```
   6/01/93     11.27.09        INDENT LISTING      Program MMU360       Source File MRPGSRC      Library XLIB310          Page    8
                                                                                                      RTVGCE
RTVGCE 401500       C                   {  CALL 'MMC030'  PMC030                                    RTVGCE
RTVGCE 401600       C                   ENDIF                            PERRCD='2'                 RTVGCE
RTVGCE 401700       C*                                                                              RTVGCE
RTVGCE 401800       C*                                                                              RTVGCE
RTVGCE 401900       C                   ENDSR                            RTVGCE            SRCE3 RTVGCE
RTVGCE 402000       C/SPACE 3                                                                       RTVTGS
RTVGCE 402100       C**********  RTVTGS SUBR  **********************  RTVTGS SUBR  *              RTVTGS
RTVGCE 402200       C*                                                                 *            RTVTGS
RTVGCE 402300       C*   The RTVTGS subroutine performs the following functions:      *            RTVTGS
RTVGCE 402400       C*     1. Retrieves all target sites for an order and loads all  *            RTVTGS
RTVGCE 402500       C*        sites to an array                                        *            RTVTGS
RTVGCE 402600       C*                                                                 *      SRCE3 RTVTGS
RTVGCE 402700       C*****************************************************************      SRCE3 RTVTGS
RTVGCE 402800       C*                                                                 *      SRCE3 RTVTGS
RTVGCE 402900       C*   INDICATORS USED  :  99                                        *      SRCE3 RTVTGS
RTVGCE 403000       C*                                                                 *      SRCE3 RTVTGS
RTVGCE 403100       C*   EXECUTES         :  NEWTGS                                    *      SRCE3 RTVTGS
RTVGCE 403200       C*                                                                 *      SRCE3 RTVTGS
RTVGCE 403300       C*   EXECUTED FROM    :  NEWORD  REMDET                            *      SRCE3 RTVTGS
RTVGCE 403400       C*                                                                 *      SRCE3 RTVTGS
RTVGCE 403500       C*****************************************************************      SRCE3 RTVTGS
RTVGCE 403600       C*                                                                      SRCE3 RTVTGS
RTVTGS 403700       C          RTVTGS    BEGSR                                                  RTVTGS
RTVTGS 403800       C*                                                                          RTVTGS
RTVTGS 403900       C*  Initialize the variables.                                               RTVTGS
RTVTGS 404000       C*                                                                          RTVTGS
RTVTGS 404100       C                    CLEARTGS                                               RTVTGS
RTVTGS 404200       C                    CLEARACT                                               RTVTGS
RTVTGS 404300       C                    CLEARQQELMT                                            RTVTGS
RTVTGS 404400       C                    Z-ADDQQARAY    X                                       RTVTGS
RTVTGS 404500       C                    MOVE 'Y'       QQFRST                                  RTVTGS
RTVTGS 404600       C                    MOVE 'N'       QQADD                                   RTVTGS
RTVTGS 404700       C*                                                                          RTVTGS
RTVTGS 404800       C*  If the order is not being cancelled:                                    RTVTGS
RTVTGS 404900       C*                                                                          RTVTGS
RTVTGS 405000       C          QQCNLO    IFEQ 'N'                                                 RTVTGS
RTVTGS 405100       C*                   (                                                        RTVTGS
RTVTGS 405200       C*  Retrieve all targe(  t sites for the order.                               RTVTGS
RTVTGS 405300       C*                   (                                                        RTVTGS
RTVTGS 405400       C          QQORDN    (  SETLLORDDETOE                                         RTVTGS
RTVTGS 405500       C*                   (                                                        RTVTGS
RTVTGS 405600       C          *IN99     (  DOUEQ*ON                                                 RTVTGS
RTVTGS 405700       C          QQORDN    (  (  READEORDDETOE               99                        RTVTGS
RTVTGS 405800       C          *IN99     (  (  IFEQ *OFF                                                 RTVTGS
RTVTGS 405900       C*                   (  (  (                                                         RTVTGS
RTVTGS 406000       C*  Check if the targe(  (  (  t site for the detail line already exists in          RTVTGS
RTVTGS 406100       C*  the array.  If it (  (  (  does, then read the next detail line.                 RTVTGS
RTVTGS 406200       C*                   (  (  (                                                         RTVTGS
RTVTGS 406300       C                    (  (  (  Z-ADDX         Y                                       RTVTGS
RTVTGS 406400       C          ODOFEN    (  (  (  LOKUPTGS,Y                  99                         RTVTGS
RTVTGS 406500       C*                   (  (  (                                                         RTVTGS
RTVTGS 406600       C          *IN99     (  (  (  IFEQ *ON                                                  RTVTGS
RTVTGS 406700       C          ACT,Y     (  (  (  (  IFEQ 'A'                                                  RTVTGS
RTVTGS 406800       C          ODACTN    (  (  (  (  (  ANDEQ'C'                                               RTVTGS
RTVTGS 406900       C                    (  (  (  (  (  MOVE 'C'     ACT,Y            ACT,Y='A'             RTVTGS
RTVTGS 407000       C                    (  (  (  (  ENDIF                                                  RTVTGS
RTVTGS 407100       C                    (  (  (  (  MOVE *OFF      *IN99                                   RTVTGS
RTVTGS 407200       C                    (  (  (  (  ITER                                                   RTVTGS
```

```
  6/01/93    11.27.09       INDENT LISTING      Program MMU360       Source File MRPGSRC      Library XLIB310            Page    9
RTVTGS 407300      C                     (  (  (  ENDIF                          *IN99=*ON             RTVTGS
RTVTGS 407400      C*                    (  (  (                                                       RTVTGS
RTVTGS 407500      C*  If the target site(  (  (   does not already exist in the array then            RTVTGS
RTVTGS 407600      C*  load it to the arr(  (  (  ay.                                                  RTVTGS
RTVTGS 407700      C*                    (  (  (                                                       RTVTGS
RTVTGS 407800      C           QQFRST    (  (  (  IFEQ 'Y'                                             RTVTGS
RTVTGS 407900      C                     (  (  (  (  MOVE 'N'       QQFRST                                RTVTGS
RTVTGS 408000      C                     (  (  (  ELSE                                                 RTVTGS
RTVTGS 408100      C                     (  (  (  (  SUB  1         X                                     RTVTGS
RTVTGS 408200      C                     (  (  (  ENDIF                          QQFRST='Y'            RTVTGS
RTVTGS 408300      C*                    (  (  (                                                       RTVTGS
RTVTGS 408400      C                     (  (  (  MOVE ODOFEN    TGS,X                                 RTVTGS
RTVTGS 408500      C*                    (  (  (                                                       RTVTGS
RTVTGS 408600      C*  It is only necessa(  (  (  ry to save the action codes of those records         RTVTGS
RTVTGS 408700      C*  which must be sent(  (  (   to a remote site.                                   RTVTGS
RTVTGS 408800      C*  NOTE:  Since COPTR(  (  (  N records are processed first and sent on a          RTVTGS
RTVTGS 408900      C*         different C(  (  (  E # from the rest of a given order number,           RTVTGS
RTVTGS 409000      C*         it is not n(  (  (  ecessary to save the action codes for COPTRN         RTVTGS
RTVTGS 409100      C*         records.   (  (  (                                                       RTVTGS
RTVTGS 409200      C*                    (  (  (                                                       RTVTGS
RTVTGS 409300      C           ODSEND    (  (  (  IFEQ 'Y'                                             RTVTGS
RTVTGS 409400      C           QQTYPE    (  (  (  (  ANDNE'9'                                             RTVTGS
RTVTGS 409500      C                     (  (  (  (  MOVE ODACTN    ACT,X                                 RTVTGS
RTVTGS 409600      C                     (  (  (  ENDIF                          ODSEND='Y'            RTVTGS
RTVTGS 409700      C*                    (  (  (                                                       RTVTGS
RTVTGS 409800      C                     (  (  (  Z-ADDX         QQELMT                                RTVTGS
RTVTGS 409900      C*                    (  (  (                                                       RTVTGS
RTVTGS 410000      C                     (  (  ENDIF                          *IN99=*OFF           RTVTGS
RTVTGS 410100      C*                    (  (                                                      RTVTGS
RTVTGS 410200      C                     (  ENDDO                          DOU *IN99=*ON        RTVTGS
RTVTGS 410300      C*                    (                                                     RTVTGS
RTVTGS 410400      C*  Set the flag if th(  ere is at least one line to be added (i.e.         RTVTGS
RTVTGS 410500      C*  there is at least (  one new target site for the order).                RTVTGS
RTVTGS 410600      C*                    (                                                     RTVTGS
RTVTGS 410700      C           QQELMT    (  IFNE 0                                             RTVTGS
RTVTGS 410800      C                     (  (  Z-ADDQQELMT    Y                                    RTVTGS
RTVTGS 410900      C           'A'       (  (  LOKUPACT,Y                   99                     RTVTGS
RTVTGS 411000      C*                    (  (                                                      RTVTGS
RTVTGS 411100      C           *IN99     (  (  IFEQ *ON                                            RTVTGS
RTVTGS 411200      C                     (  (  (  MOVE 'Y'       QQADD                                 RTVTGS
RTVTGS 411300      C*                    (  (  (                                                       RTVTGS
RTVTGS 411400      C*  Since there is at (  (  (  least one new target site for the order,             RTVTGS
RTVTGS 411500      C*  load the transmiss(  (  (  ion files with all override records whose            RTVTGS
RTVTGS 411600      C*  'Needs to be Sent'(  (  (   byte is not 'Y' (i.e. those records which           RTVTGS
RTVTGS 411700      C*  will not show up i(  (  (  n the open query file).                              RTVTGS
RTVTGS 411800      C*                    (  (  (                                                       RTVTGS
RTVTGS 411900      C                     (  (  (  EXSR NEWTGS                                          RTVTGS
RTVTGS 412000      C                     (  (  ENDIF                          *IN99=*ON            RTVTGS
RTVTGS 412100      C                     (  ENDIF                          QQELMT<>0            RTVTGS
RTVTGS 412200      C*                    (                                                     RTVTGS
RTVTGS 412300      C                     ENDIF                          QQCNLO='N'          RTVTGS
RTVTGS 412400      C*                                                                       RTVTGS
RTVTGS 412500      C*                                                                       RTVTGS
RTVTGS 412600      C*  If the order is being cancelled:                                     RTVTGS
RTVTGS 412700      C*                                                                       RTVTGS
RTVTGS 412800      C           QQCNLO    IFEQ 'Y'                                           RTVTGS
RTVTGS 412900      C*                    (                                                     RTVTGS
RTVTGS 413000      C*  Retrieve all targe(  t sites for the order.                             RTVTGS
```

```
   6/01/93    11.27.09      INDENT LISTING     Program MMU360       Source File MRPGSRC      Library XLIB310            Page   10

RTVTGS 413100      C*                  (                                                          RTVTGS
RTVTGS 413200      C        QQORDN     (  SETLLORDDET01                                           RTVTGS
RTVTGS 413300      C*                  (                                                          RTVTGS
RTVTGS 413400      C        *IN99      (  DOUEQ*ON                                                RTVTGS
RTVTGS 413500      C        QQORDN     (  (  READEORDDET01              99                          RTVTGS
RTVTGS 413600      C        *IN99      (  (  IFEQ *OFF                                              RTVTGS
RTVTGS 413700      C        ODOFEN     (  (  (  ANDNE*BLANKS                                          RTVTGS
RTVTGS 413800      C        ODOFEN     (  (  (  ANDNEODOTEN                                           RTVTGS
RTVTGS 413900      C*                  (  (  (                                                        RTVTGS
RTVTGS 414000      C*  Check if the targe(  (  (  t site for the detail line already exists in         RTVTGS
RTVTGS 414100      C*  the array.  If it (  (  (  does, then read the next detail line.                RTVTGS
RTVTGS 414200      C*                  (  (  (                                                        RTVTGS
RTVTGS 414300      C                   (  (  (  Z-ADDX         Y                                      RTVTGS
RTVTGS 414400      C        ODOFEN     (  (  (  LOKUPTGS,Y                 99                         RTVTGS
RTVTGS 414500      C*                  (  (  (                                                        RTVTGS
RTVTGS 414600      C        *IN99      (  (  (  IFEQ *ON                                              RTVTGS
RTVTGS 414700      C                   (  (  (  (  MOVE *OFF      *IN99                                 RTVTGS
RTVTGS 414800      C                   (  (  (  (  ITER                                                 RTVTGS
RTVTGS 414900      C                   (  (  (  ENDIF                      *IN99=*ON                  RTVTGS
RTVTGS 415000      C*                  (  (  (                                                        RTVTGS
RTVTGS 415100      C*  If the target site(  (  (   does not already exist in the array then           RTVTGS
RTVTGS 415200      C*  load it to the arr(  (  (  ay.                                                 RTVTGS
RTVTGS 415300      C*                  (  (  (                                                        RTVTGS
RTVTGS 415400      C        QQFRST     (  (  (  IFEQ 'Y'                                              RTVTGS
RTVTGS 415500      C                   (  (  (  (  MOVE 'N'       QQFRST                                RTVTGS
RTVTGS 415600      C                   (  (  (  ELSE                                                  RTVTGS
RTVTGS 415700      C                   (  (  (  (  SUB  1         X                                     RTVTGS
RTVTGS 415800      C                   (  (  (  ENDIF                      QQFRST='Y'                 RTVTGS
RTVTGS 415900      C*                  (  (  (                                                        RTVTGS
RTVTGS 416000      C                   (  (  (  MOVE ODOFEN    TGS,X                                  RTVTGS
RTVTGS 416100      C                   (  (  (  Z-ADDX         QQELMT                                 RTVTGS
RTVTGS 416200      C*                  (  (  (                                                        RTVTGS
RTVTGS 416300      C                   (  (  ENDIF                    *IN99=*OFF                    RTVTGS
RTVTGS 416400      C                   (  ENDDO                    DOU *IN99=*ON                    RTVTGS
RTVTGS 416500      C*                  (                                                          RTVTGS
RTVTGS 416600      C                   ENDIF                     QQCNLO='Y'                     RTVTGS
RTVTGS 416700      C*                                                                           RTVTGS
RTVTGS 416800      C*                                                                           RTVTGS
RTVTGS 416900      C                   ENDSR                     RTVTGS          SRCE3 RTVTGS
```

```
5738PW1 V2R2M0  920615           SEU SOURCE LISTING                06/01/93 11:49:10          PAGE    1

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
     H*****************************************************************                    01/08/93
     H*                                                               *                    01/08/93
     H*            Release - 03         Mod Level - 10                *                    01/08/93
     H*   THIS UNPUBLISHED COPYRIGHTED WORK CONTAINS TRADE SECRET     *                    01/08/93
     H*   INFORMATION OF MARCAM CORPORATION.  USE, TRANSFER,          *                    01/08/93
     H*   DISCLOSURE, OR COPYING WITHOUT ITS EXPRESSED WRITTEN        *                    01/08/93
     H*   PERMISSION IS STRICTLY FORBIDDEN.                    1993   *                    01/08/93
     H*                                                               *                    01/08/93
     H*   MODULE:            Enterprise Management                    *                    01/08/93
     H*                                                               *                    01/08/93
     H*   PROGRAM NAME:      MMC460 - Customer Order Files            *                    01/08/93
     H*                               Initialization Program          *                    01/08/93
     H*                                                               *                    01/08/93
     H*   FUNCTION:          Determines which entities are involved   *                    03/23/93
     H*                      in this General Communications Entry.    *                    01/08/93
     H*                      Updates the Order Transmission Files     *                    01/08/93
     H*                      with specific CE#s for a given general   *                    01/08/93
     H*                      CE#.                                     *                    01/08/93
     H*                                                               *                    01/08/93
     H*   CALLING PROGRAM:   MMC000 - General Communications Entry    *                    01/08/93
     H*                               Processor                       *                    01/08/93
     H*                                                               *                    01/08/93
     H*   CALLED PROGRAM:    MMC200 - Write Specific Communications   *                    01/08/93
     H*                                Entry Program                  *                    01/08/93
     H*                                                               *                    01/08/93
     H*   /COPY CODE:        NONE                                     *                    01/08/93
     H*                                                               *                    01/08/93
     H*****************************************************************                    01/08/93
     H*               P R O G R A M   D E S C R I P T I O N           *                    01/08/93
     H*****************************************************************                    01/08/93
     H*                                                               *                    01/08/93
     H*  This program is the Customer Order Files Initialization      *                    04/16/93
     H*  program.   The program determines which entites              *                    04/16/93
     H*  are involved in the general CE, calls MMC200 to              *                    04/16/93
     H*  write a specific CE for each individual entity involved,     *                    04/16/93
     H*  and then marks all general CE records in O??TRN with         *                    01/08/93
     H*  specific CE#s received from MMC200.  (Each entity            *                    04/16/93
     H*  of general CE gets marked with one specific CE.)             *                    04/16/93
     H*  The program ends from mainline.                              *                    01/08/93
     H*                                                               *                    01/08/93
     H*****************************************************************                    01/08/93
     H/SPACE 3                                                                             01/08/93
     F*****************************************************************                    01/25/93
     F*          F U N C T I O N   O F   I N D I C A T O R S          *                    01/08/93
     F*****************************************************************                    01/08/93
     F*                                                               *                    01/08/93
     F*   98 - General Indicator                                      *                    01/08/93
     F*   99 - General Indicator                                      *                    01/08/93
     F*                                                               *                    01/08/93
     F*****************************************************************                    01/08/93
     F/SPACE 2                                                                             01/08/93
     F*****************************************************************                    01/08/93
     F*                                                               *                    01/08/93
```

```
     5738PW1 V2R2M0  920615               SEU SOURCE LISTING                 06/01/93 11:49:10                PAGE    2

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
 5400      F*                      FILE SPECIFICATIONS                          *                                 01/08/93
 5500      F*                                                                   *                                 01/08/93
 5600      F*****************************************************************                                    01/08/93
 5700      F*                                                                                                     01/08/93
 5800      FCOMDEF  IF  E                  DISK                                                                   01/11/93
 5900      F/SPACE 2                                                                                              01/08/93
 6000      FCOPTRNOEUF  E           K      DISK                                UC                                 03/23/93
 6100      F/SPACE 2                                                                                              01/16/93
 6200      FENTFIL  IF  E           K      DISK                                                                   03/23/93
 6300      F/SPACE 2                                                                                              03/23/93
 6400      FGENCOM  UF  E           K      DISK                                                                   03/23/93
 6500      F/SPACE 2                                                                                              03/23/93
 6600      FOADTRNOEUF  E           K      DISK                                UC                                 03/23/93
 6700      F/SPACE 2                                                                                              01/12/93
 6800      FOATTRNOEUF  E           K      DISK                                UC                                 03/23/93
 6900      F/SPACE 2                                                                                              01/12/93
 7000      FOCHTRNOEUF  E           K      DISK                                UC                                 03/23/93
 7100      F/SPACE 2                                                                                              01/12/93
 7200      FOCMTRNOEUF  E           K      DISK                                UC                                 03/23/93
 7300      F/SPACE 2                                                                                              01/12/93
 7400      FOCSTRNOEUF  E           K      DISK                                UC                                 03/23/93
 7500      F/SPACE 2                                                                                              01/12/93
 7600      FODSTRNOEUF  E           K      DISK                                UC                                 03/23/93
 7700      F/SPACE 2                                                                                              01/12/93
 7800      FODTTRNOEUF  E           K      DISK                                UC                                 03/23/93
 7900      F/SPACE 2                                                                                              01/12/93
 8000      FOMSTRNGCUF  E           K      DISK                                UC                                 03/23/93
 8100      F/SPACE 2                                                                                              01/12/93
 8200      FOPMTRNOEUF  E           K      DISK                                UC                                 03/23/93
 8300      F/SPACE 2                                                                                              01/12/93
 8400      FSYSSITENIF  E           K      DISK                                                                   01/12/93
 8500      F/SPACE 3                                                                                              01/08/93
 8600      I*****************************************************************                                    03/23/93
 8700      I*                                                                   *                                 03/23/93
 8800      I*                      INPUT SPECIFICATIONS                         *                                 03/23/93
 8900      I*                                                                   *                                 03/23/93
 9000      I*****************************************************************                                    03/23/93
 9100      I*   Data Structure for CL command OVRDBF called by QCMDEXC.                                           03/23/93
 9200      I*                                                                                                     03/23/93
 9300      I            DS                                                                                        03/23/93
 9400      I                                         1  53 QQOVR                                                  03/23/93
 9500      I I            'OVRDBF FILE('             1  12 D$1                                                    03/23/93
 9600      I                                        13  22 QQFFIL                                                 03/23/93
 9700      I I            ') TOFILE('               23  31 D$2                                                    03/23/93
 9800      I                                        32  52 QQTFIL                                                 03/23/93
 9900      I I            ')'                       53  53 D$3                                                    03/23/93
10000      I*                                                                                                     03/23/93
10100      C*****************************************************************                                    01/11/93
10200      C*                                                                   *                                 01/11/93
10300      C*                      CALCULATION SPECS                            *                                 01/11/93
10400      C*                                                                   *                                 01/11/93
10500      C*****************************************************************                                    01/11/93
10600      C*                                                                   *                                 01/11/93
```

```
5738PW1 V2R2M0  920615                SEU SOURCE LISTING                    06/01/93 11:49:10              PAGE    3

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
      C****************************************************************                             01/11/93
      C*                        M A I N L I N E                       *                             01/11/93
      C****************************************************************                             01/11/93
      C*                                                              *                             01/11/93
      C*   The MAINLINE is executed once.  It defines a PLIST with    *                             01/11/93
      C*   one parameter.  OVRTRF subroutine is executed to override  *                             03/23/93
      C*   the transmission files to the Entity Files Library.        *                             03/23/93
      C*   PROCES subroutine is executed to process OMSTRNGC          *                             03/23/93
      C*   records with the general CE# equal to the CE# passed       *                             03/23/93
      C*   as a parameter.                                            *                             04/16/93
      C*   Then, the program does a SETON LR and ends from mainline.  *                             01/11/93
      C*                                                              *   SRCE3                     03/24/93
      C****************************************************************   SRCE3                     03/24/93
      C*                                                              *   SRCE3                     03/24/93
      C*   INDICATORS USED  :  LR                                     *   SRCE3                     03/24/93
      C*                                                              *   SRCE3                     03/24/93
      C*   EXECUTES         :  OVRTRF  PROCES                         *   SRCE3                     04/16/93
      C*                                                              *   SRCE3                     03/24/93
      C****************************************************************   SRCE3                     03/24/93
      C*                                                                  SRCE3                     03/24/93
      C*   This Parameter List is used to receive the general CE #.                                 03/24/93
      C*                                                                                            03/24/93
      C           *ENTRY    PLIST                                                                   01/11/93
      C                     PARM           P$CENO                                                   01/11/93
      C*                                                                                            01/12/93
      C                     MOVE P$CENO    QQCENO                                                   01/12/93
      C*                                                                                            01/11/93
      C*   Execute OVRTRF to override transmission files to the                                     03/23/93
      C*   Entity Files Library.                                                                    04/16/93
      C*                                                                                            03/23/93
      C                     EXSR OVRTRF                                                             03/23/93
      C*                                                                                            03/23/93
      C*  Process the files if no error occured in file overrides.                                  03/23/93
      C*                                                                                            03/23/93
      C           QQFAIL    IFEQ 'N'                                                                03/23/93
      C                     EXSR PROCES                                                             01/11/93
      C                     ENDIF                               QQFAIL='N'                          03/23/93
      C*                                                                                            04/16/93
      C*  Note: the files will be closed and the overrides will                                     04/16/93
      C*        terminate when LR is SETON, so closing and                                          04/16/93
      C*        deletions are not performed.                                                        04/16/93
      C*                                                                                            04/16/93
      C*                                                                                            01/11/93
      C                     SETON                     LR                                            01/11/93
      C                     RETRN                                                                   01/11/93
      C*                                                                                            01/11/93
      C/SPACE 2                                                                                     01/11/93
      C**********  *INZSR SUBR  ***********************  *INZSR SUBR  *                             01/11/93
      C*                                                              *                             01/11/93
      C*   The *INZSR subroutine performs the following functions:    *                             01/11/93
      C*                                                              *                             01/11/93
      C*     1. Performs initial calculations that need to be done    *                             01/11/93
      C*        on the initial call of the program.                   *                             01/11/93
```

```
     5738PW1 V2R2M0  920615                SEU SOURCE LISTING                        06/01/93 11:49:10              PAGE    4

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
16000      C*                                                             *                        01/11/93
16100      C*  NOTE:  The *INZSR is executed during the *INIT phase of    *                        01/11/93
16200      C*         RPG execution.                                      *                        01/11/93
16300      C*                                                             *    SRCE3               03/24/93
16400      C**************************************************************     SRCE3               03/24/93
16500      C*                                                             *    SRCE3               03/24/93
16600      C*   INDICATORS USED  :  99                                    *    SRCE3               03/24/93
16700      C*                                                             *    SRCE3               03/24/93
16800      C**************************************************************     SRCE3               03/24/93
16900      C*                                                                  SRCE3               03/24/93
17000      C          *INZSR    BEGSR                                                              01/11/93
17100      C*                                                                                      01/11/93
17200      C*  Define and initialize program variables                                             01/11/93
17300      C*                                                                                      01/11/93
17400      C                    MOVE 'M'       MODULE                                              01/11/93
17500      C                    MOVEL'MMC460'  $PGM             Program name                       01/11/93
17600      C*                                                                                      01/12/93
17700      C                    MOVE 'N'       QQFAIL           ENTFIL FLAG                        03/26/93
17800      C*                                                                                      03/26/93
17900      C*   Retrieve the current system from COMDEF.                                           01/12/93
18000      C*                                                                                      01/12/93
18100      C          1         CHAINCOMDEF               99                                       01/12/93
18200      C*                                                                                      01/11/93
18300      C                    ENDSR                       *INZSR         SRCE3                   01/11/93
18400      C*                                                                                      01/11/93
18500      C/SPACE 2                                                                               01/11/93
18600      C**********  $DEFSR SUBR  **********************  $DEFSR SUBR  *                        01/11/93
18700      C*                                                             *                        01/11/93
18800      C*   The $DEFSR subroutine performs the following functions:   *                        01/11/93
18900      C*                                                             *                        01/11/93
19000      C*     1. Defines program variables.  It is never executed.    *                        01/11/93
19100      C*                                                             *    SRCE3               03/24/93
19200      C**************************************************************     SRCE3               03/24/93
19300      C*                                                             *    SRCE3               03/24/93
19400      C*   INDICATORS USED  :  NONE                                  *    SRCE3               03/24/93
19500      C*                                                             *    SRCE3               03/24/93
19600      C**************************************************************     SRCE3               03/24/93
19700      C*                                                                  SRCE3               03/24/93
19800      C          $DEFSR    BEGSR                                                              01/11/93
19900      C*                                                                                      01/11/93
20000      C*  Define program variables:                                                           01/11/93
20100      C*                                                                                      01/11/93
20200      C                    MOVE *BLANKS   $PGM    8        Program name                       01/11/93
20300      C                    MOVE *BLANKS   MODULE  1        MODULE                             01/11/93
20400      C*                                                                                      01/11/93
20500      C*  Parameters used in *ENTRY list and in a call to MMC200.                             01/11/93
20600      C*                                                                                      01/11/93
20700      C                    MOVE *BLANKS   PACTON  1        Action code                        01/11/93
20800      C                    MOVE *BLANKS   PRORL   1        Remote/local                       01/11/93
20900      C                    MOVE *BLANKS   PHOLD   1        Hold records                       01/11/93
21000      C*                                                                                      03/23/93
21100      C          *LIKE     DEFN OMCENO    P$CENO           Gen CE#                            01/12/93
21200      C          *LIKE     DEFN OMCENO    PGRNO            Gen CE#                            01/12/93
```

```
        5738PW1 V2R2M0  920615                SEU SOURCE LISTING                    06/01/93 11:49:10              PAGE    5

   SOURCE FILE . . . . . . .  XLIBEM/MRPGSRC
   MEMBER  . . . . . . . . .  MMC460

   SEQNBR*...+... 1 ...+... 2 ...+... 3 ...+... 4 ...+... 5 ...+... 6 ...+... 7 ...+... 8 ...+... 9 ...+... 0
   21300      C          *LIKE     DEFN OMCENO    PSPCE            Specif CE#                                 01/12/93
   21400      C          *LIKE     DEFN EJSYS     PSYS             Dist system                                01/12/93
   21500      C          *LIKE     DEFN OMTGEN    PENT             Entity                                     01/12/93
   21600      C*                                                                                              03/23/93
   21700      C*  Program temporary fields.                                                                   03/23/93
   21800      C*                                                                                              03/23/93
   21900      C                    MOVE *BLANKS   QQFAIL  1        ENTFIL flag                                03/26/93
   22000      C                    MOVE *BLANKS   QQHLD   8        File hold                                  03/23/93
   22100      C          *LIKE     DEFN OMCENO    QQCENO           Gen CE#                                    03/23/93
   22200      C          *LIKE     DEFN EFNME     QQOREN           Entity                                     03/23/93
   22300      C*                                                                                              03/23/93
   22400      C*  QQLEN is used by 'QCMDEXC'.  It stores the length                                           03/23/93
   22500      C*  of the CL command string and must be defined as (15,5).                                     03/23/93
   22600      C*                                                                                              03/23/93
   22700      C                    Z-ADD0         QQLEN  155                                                  03/23/93
   22800      C*                                                                                              01/11/93
   22900      C*  Define key fields used in KORDEN and KCOPTR key lists.                                      01/16/93
   23000      C*                                                                                              01/11/93
   23100      C          *LIKE     DEFN OMCENO    KCENO            General CE#                                01/16/93
   23200      C          *LIKE     DEFN OMORDN    KORDN            Order#                                     01/12/93
   23300      C          *LIKE     DEFN OMTGEN    KTENT            Targt Ent                                  01/12/93
   23400      C*                                                                                              01/11/93
   23500      C* PLIST used when MMC200 is called.                                                            01/11/93
   23600      C*                                                                                              01/11/93
   23700      C          PMC200    PLIST                                                                      01/11/93
   23800      C                    PARM           PGRMO                                                       01/11/93
   23900      C                    PARM           PACTON                                                      01/11/93
   24000      C                    PARM           PHOLD                                                       01/11/93
   24100      C                    PARM           PRORL                                                       01/11/93
   24200      C                    PARM           PENT                                                        01/11/93
   24300      C                    PARM           PSYS                                                        01/11/93
   24400      C                    PARM           PSPCE                                                       01/11/93
   24500      C*                                                                                              01/11/93
   24600      C*                                                                                              01/11/93
   24700      C* Set up Key list for retrieving records from the logical view                                 01/16/93
   24800      C*   by General CE#/Target entity over General COP Transmission                                 01/16/93
   24900      C*   File (COPTRN).                                                                             01/16/93
   25000      C*                                                                                              01/12/93
   25100      C          KCOPTR    KLIST                                                                      01/16/93
   25200      C                    KFLD           KCENO                                                       01/16/93
   25300      C                    KFLD           KTENT                                                       01/12/93
   25400      C*                                                                                              01/11/93
   25500      C*                                                                                              01/16/93
   25600      C* Set up Key list for retrieving information from the logical                                  01/16/93
   25700      C*   view by Order#/Target entity over various Customer Order                                   01/16/93
   25800      C*   files.                                                                                     01/16/93
   25900      C*                                                                                              01/16/93
   26000      C          KORDEN    KLIST                                                                      01/16/93
   26100      C                    KFLD           KORDN                                                       01/16/93
   26200      C                    KFLD           KTENT                                                       01/16/93
   26300      C*                                                                                              01/16/93
   26400      C*                                                                                              01/11/93
   26500      C                    ENDSR                           $DEFSR         SRCE3                       01/11/93
```

```
5738PW1 V2R2M0  920615              SEU SOURCE LISTING              06/01/93 11:49:10          PAGE    6

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
           C*                                                                                    01/11/93
           C/SPACE 2                                                                             03/23/93
           C*********  OVRTRF SUBR  ************************  OVRTRF SUBR  *                      03/23/93
           C*                                                              *                      03/23/93
           C*   The OVRTRF subroutine performs the following functions:    *                      03/23/93
           C*                                                              *                      03/23/93
           C*     1. Executes QCMDEXC to override the COP transmission     *                      03/23/93
           C*        files to the entity files library.                    *                      03/23/93
           C*     2. Opens the files for use in the program.               *                      03/23/93
           C*                                                              *  SRCE3               03/24/93
           C****************************************************************  SRCE3               03/24/93
           C*                                                              *  SRCE3               03/24/93
           C*   INDICATORS USED  :  99                                     *  SRCE3               03/24/93
           C*                                                              *  SRCE3               03/24/93
           C*   EXECUTED FROM    :  MAINLN                                 *  SRCE3               03/24/93
           C*                                                              *  SRCE3               03/24/93
           C****************************************************************  SRCE3               03/24/93
           C*                                                                 SRCE3               03/24/93
           C          OVRTRF    BEGSR                                                             03/23/93
           C*                                                                                    03/23/93
           C*                                                                                    03/23/93
           C*  Identify the originating entity name from CE# (the                                03/23/93
           C*  entity name is in the first 10 characters of the CE#)                             03/23/93
           C*                                                                                    03/23/93
           C                    MOVELQQCENO    QQOREN                                            03/23/93
           C*                                                                                    03/23/93
           C*  Retrieve the ENTFIL record for the originating                                    03/23/93
           C*  entity to obtain the entity files library name.                                   03/23/93
           C*  If it fails to retrive the record in ENTFIL,                                      03/23/93
           C*  set QQFAIL to 'Y' and leave the subroutine.                                       03/23/93
           C*                                                                                    03/23/93
           C          QQOREN    CHAINENTFIL                 99                                   03/23/93
           C*                                                                                    03/23/93
           C          *IN99     IFEQ *ON                                                         03/23/93
           C                    MOVE 'Y'       QQFAIL                                            03/23/93
           C*                                                                                    03/23/93
           C                    ELSE                                                             03/23/93
           C*                                                                                    03/23/93
           C*                                                                                    03/23/93
           C*  Override COPTRNOE - COP Transmission File to                                      04/16/93
           C*  the entity files library.                                                         03/23/93
           C*                                                                                    03/23/93
           C                    MOVEL'COPTRNOE'QQFFIL    P       Pad blanks                      03/23/93
           C          EFFLIB    CAT  '/':0     QQTFIL    P       Pad blanks                      03/23/93
           C                    MOVEL'COPTRNOE'QQHLD     P       Pad blanks                      03/23/93
           C          QQTFIL    CAT  QQHLD:0   QQTFIL                                            03/23/93
           C                    Z-ADD53        QQLEN                                             03/23/93
           C                    CALL 'QCMDEXC'                                                   03/23/93
           C                    PARM           QQOVR                                             03/23/93
           C                    PARM           QQLEN                                             03/23/93
           C*                                                                                    03/23/93
           C*                                                                                    03/23/93
           C*  Override OADTRNOE - Order Address Override Transmission                           03/25/93
```

```
     5738PW1 V2R2M0  920615              SEU SOURCE LISTING                06/01/93 11:49:10          PAGE    7

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
          C*  File to the entity files library.                                                  03/23/93
          C*                                                                                     03/23/93
          C                     MOVEL'OADTRNOE'QQFFIL    P      Pad blanks                       03/25/93
          C          EFFLIB     CAT  '/':0     QQTFIL    P      Pad blanks                       03/23/93
          C                     MOVEL'OADTRNOE'QQHLD     P      Pad blanks                       03/25/93
          C          QQTFIL     CAT  QQHLD:0   QQTFIL                                            03/23/93
          C                     Z-ADD53        QQLEN                                             03/23/93
          C                     CALL 'QCMDEXC'                                                   03/23/93
          C                     PARM           QQOVR                                             03/23/93
          C                     PARM           QQLEN                                             03/23/93
          C*                                                                                     03/23/93
          C*                                                                                     03/23/93
          C*  Override OATTRNOE - Order Attribute Override                                        03/23/93
          C*  Transmission File to the entity files library.                                     03/23/93
          C*                                                                                     03/23/93
          C                     MOVEL'OATTRNOE'QQFFIL    P      Pad blanks                       03/23/93
          C          EFFLIB     CAT  '/':0     QQTFIL    P      Pad blanks                       03/23/93
          C                     MOVEL'OATTRNOE'QQHLD     P      Pad blanks                       03/23/93
          C          QQTFIL     CAT  QQHLD:0   QQTFIL                                            03/23/93
          C                     Z-ADD53        QQLEN                                             03/23/93
          C                     CALL 'QCMDEXC'                                                   03/23/93
          C                     PARM           QQOVR                                             03/23/93
          C                     PARM           QQLEN                                             03/23/93
          C*                                                                                     03/23/93
          C*                                                                                     03/23/93
          C*  Override OCHTRNOE - Order Charge Transmission File                                  03/23/93
          C*  to the entity files library.                                                       03/23/93
          C*                                                                                     03/23/93
          C                     MOVEL'OCHTRNOE'QQFFIL    P      Pad blanks                       03/23/93
          C          EFFLIB     CAT  '/':0     QQTFIL    P      Pad blanks                       03/23/93
          C                     MOVEL'OCHTRNOE'QQHLD     P      Pad blanks                       03/23/93
          C          QQTFIL     CAT  QQHLD:0   QQTFIL                                            03/23/93
          C                     Z-ADD53        QQLEN                                             03/23/93
          C                     CALL 'QCMDEXC'                                                   03/23/93
          C                     PARM           QQOVR                                             03/23/93
          C                     PARM           QQLEN                                             03/23/93
          C*                                                                                     03/23/93
          C*                                                                                     03/23/93
          C*  Override OCMTRNOE - Order Comment Transmission File                                 03/23/93
          C*  to the entity files library.                                                       03/23/93
          C*                                                                                     03/23/93
          C                     MOVEL'OCMTRNOE'QQFFIL    P      Pad blanks                       03/23/93
          C          EFFLIB     CAT  '/':0     QQTFIL    P      Pad blanks                       03/23/93
          C                     MOVEL'OCMTRNOE'QQHLD     P      Pad blanks                       03/23/93
          C          QQTFIL     CAT  QQHLD:0   QQTFIL                                            03/23/93
          C                     Z-ADD53        QQLEN                                             03/23/93
          C                     CALL 'QCMDEXC'                                                   03/23/93
          C                     PARM           QQOVR                                             03/23/93
          C                     PARM           QQLEN                                             03/23/93
          C*                                                                                     03/23/93
          C*                                                                                     03/23/93
          C*  Override OCSTRNOE - Customer Attribute Override                                     03/23/93
          C*  Transmission File to the entity files library.                                     03/23/93
```

```
5738PW1 V2R2M0  920615                SEU SOURCE LISTING                    06/01/93 11:49:10              PAGE    8

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
37200      C*                                                                                            03/23/93
37300      C                   MOVEL'OCSTRNOE'QQFFIL    P      Pad blanks                                03/23/93
37400      C         EFFLIB    CAT  '/':0     QQTFIL    P      Pad blanks                                03/23/93
37500      C                   MOVEL'OCSTRNOE'QQHLD     P      Pad blanks                                03/23/93
37600      C         QQTFIL    CAT  QQHLD:0   QQTFIL                                                     03/23/93
37700      C                   Z-ADD53        QQLEN                                                      03/23/93
37800      C                   CALL 'QCMDEXC'                                                            03/23/93
37900      C                   PARM           QQOVR                                                      03/23/93
38000      C                   PARM           QQLEN                                                      03/23/93
38100      C*                                                                                            03/23/93
38200      C*                                                                                            03/23/93
38300      C*  Override ODSTRNOE - Order Discount Transmission File                                       03/23/93
38400      C*  to the entity files library.                                                              03/23/93
38500      C*                                                                                            03/23/93
38600      C                   MOVEL'ODSTRNOE'QQFFIL    P      Pad blanks                                03/23/93
38700      C         EFFLIB    CAT  '/':0     QQTFIL    P      Pad blanks                                03/23/93
38800      C                   MOVEL'ODSTRNOE'QQHLD     P      Pad blanks                                03/23/93
38900      C         QQTFIL    CAT  QQHLD:0   QQTFIL                                                     03/23/93
39000      C                   Z-ADD53        QQLEN                                                      03/23/93
39100      C                   CALL 'QCMDEXC'                                                            03/23/93
39200      C                   PARM           QQOVR                                                      03/23/93
39300      C                   PARM           QQLEN                                                      03/23/93
39400      C*                                                                                            03/23/93
39500      C*                                                                                            03/23/93
39600      C*  Override ODTTRNOE - Order Detail Transmission File                                         03/23/93
39700      C*  to the entity files library.                                                              03/23/93
39800      C*                                                                                            03/23/93
39900      C                   MOVEL'ODTTRNOE'QQFFIL    P      Pad blanks                                03/23/93
40000      C         EFFLIB    CAT  '/':0     QQTFIL    P      Pad blanks                                03/23/93
40100      C                   MOVEL'ODTTRNOE'QQHLD     P      Pad blanks                                03/23/93
40200      C         QQTFIL    CAT  QQHLD:0   QQTFIL                                                     03/23/93
40300      C                   Z-ADD53        QQLEN                                                      03/23/93
40400      C                   CALL 'QCMDEXC'                                                            03/23/93
40500      C                   PARM           QQOVR                                                      03/23/93
40600      C                   PARM           QQLEN                                                      03/23/93
40700      C*                                                                                            03/23/93
40800      C*                                                                                            03/23/93
40900      C*  Override ODSTRNOE - Order Master Transmission File                                         03/23/93
41000      C*  to the entity files library.                                                              03/23/93
41100      C*                                                                                            03/23/93
41200      C                   MOVEL'OMSTRNGC'QQFFIL    P      Pad blanks                                03/23/93
41300      C         EFFLIB    CAT  '/':0     QQTFIL    P      Pad blanks                                03/23/93
41400      C                   MOVEL'OMSTRNGC'QQHLD     P      Pad blanks                                03/23/93
41500      C         QQTFIL    CAT  QQHLD:0   QQTFIL                                                     03/23/93
41600      C                   Z-ADD53        QQLEN                                                      03/23/93
41700      C                   CALL 'QCMDEXC'                                                            03/23/93
41800      C                   PARM           QQOVR                                                      03/23/93
41900      C                   PARM           QQLEN                                                      03/23/93
42000      C*                                                                                            03/23/93
42100      C*                                                                                            03/23/93
42200      C*  Override OPMTRNOE - Order Promotion Transmission File                                      03/23/93
42300      C*  to the entity files library.                                                              03/23/93
42400      C*                                                                                            03/23/93
```

```
     5738PW1 V2R2M0  920615               SEU SOURCE LISTING                        06/01/93 11:49:10           PAGE    9

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
42500      C                    MOVEL'OPMTRNOE'QQFFIL    P     Pad blanks                             03/23/93
42600      C          EFFLIB    CAT  '/':0     QQTFIL    P     Pad blanks                             03/23/93
42700      C                    MOVEL'OPMTRNOE'QQHLD     P     Pad blanks                             03/23/93
42800      C          QQTFIL    CAT  QQHLD:0   QQTFIL                                                 03/23/93
42900      C                    Z-ADD53        QQLEN                                                  03/23/93
43000      C                    CALL 'QCMDEXC'                                                        03/23/93
43100      C                    PARM           QQOVR                                                  03/23/93
43200      C                    PARM           QQLEN                                                  03/23/93
43300      C*                                                                                         03/23/93
43400      C*  Open the transmission files for use.                                                   03/23/93
43500      C*                                                                                         03/23/93
43600      C                    OPEN COPTRNOE                                                         03/23/93
43700      C                    OPEN OADTRNOE                                                         03/23/93
43800      C                    OPEN OATTRNOE                                                         03/23/93
43900      C                    OPEN OCHTRNOE                                                         03/23/93
44000      C                    OPEN OCMTRNOE                                                         03/23/93
44100      C                    OPEN OCSTRNOE                                                         03/23/93
44200      C                    OPEN ODSTRNOE                                                         03/23/93
44300      C                    OPEN ODTTRNOE                                                         03/23/93
44400      C                    OPEN OMSTRNGC                                                         03/23/93
44500      C                    OPEN OPMTRNOE                                                         03/23/93
44600      C*                                                                                         03/23/93
44700      C                    ENDIF                      *IN99=*ON                                  03/23/93
44800      C*                                                                                         03/23/93
44900      C                    ENDSR                      OVRTRF          SRCE3                      03/23/93
45000      C*                                                                                         03/23/93
45100      C/SPACE 2                                                                                  01/11/93
45200      C**********  PROCES SUBR  **********************  PROCES SUBR  *                           01/11/93
45300      C*                                                              *                          01/11/93
45400      C*   The PROCES subroutine retrieves records from OMSTRNGC      *                          01/11/93
45500      C*   with the CE# passed to this program. For each target       *                          04/16/93
45600      C*   entity MMC200 is called to write a specific CE.            *                          04/16/93
45700      C*   All records of general CE and processed target             *                          04/16/93
45800      C*   entity in OMSTRNGC are updated with specific CE (that      *                          04/16/93
45900      C*   replaces the general CE).  MMC200 is called again after    *                          01/11/93
46000      C*   this to release the CE that was just written.              *                          04/16/93
46100      C*                                                              *  SRCE3                   03/24/93
46200      C****************************************************************  SRCE3                   03/24/93
46300      C*                                                              *  SRCE3                   03/24/93
46400      C*   INDICATORS USED  :  98  99                                 *  SRCE3                   03/24/93
46500      C*                                                              *  SRCE3                   03/24/93
46600      C*   EXECUTES         :  UPDSCE                                 *  SRCE3                   03/24/93
46700      C*                                                              *  SRCE3                   03/24/93
46800      C*   EXECUTED FROM    :  MAINLN                                 *  SRCE3                   03/24/93
46900      C*                                                              *  SRCE3                   03/24/93
47000      C****************************************************************  SRCE3                   03/24/93
47100      C*                                                                 SRCE3                   03/24/93
47200      C          PROCES    BEGSR                                                                 01/11/93
47300      C*                                                                                         01/11/93
47400      C*  CHAIN to the OMSTRNGC file with the CE# passed as parameter                            01/11/93
47500      C*  to get the first target entity for the general CE#.                                    04/16/93
47600      C*                                                                                         01/11/93
47700      C          QQCENO    CHAINOMSTRNGC           N99    NO LOCK                                02/09/93
```

```
5738PW1 V2R2M0  920615                    SEU SOURCE LISTING                    06/01/93 11:49:10            PAGE   10

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
     C*                                                                                  01/11/93
     C*  If no record is found in OMSTRN for the general CE#, then                       01/11/93
     C*  set the status of GENCOM record to '80', since there is                         01/11/93
     C*  nothing else to distribute.                                                     01/11/93
     C*                                                                                  01/11/93
     C          *IN99     IFEQ *ON                                                       01/11/93
     C          QQCENO    CHAINGENCOM               98                                   01/12/93
     C          *IN98     IFEQ *OFF                                                      01/11/93
     C                    MOVE '80'      ZCSTAT                                          01/11/93
     C                    UPDATFGENCOM                                                   01/11/93
     C                    ENDIF                             *IN98=*OFF                   01/11/93
     C                    ENDIF                             *IN99=*ON                    01/11/93
     C*                                                                                  01/11/93
     C*  For each target entity in OMSTRN under CE# passed compare                       02/02/93
     C*  the current system in COMDEF to the resedent system found                       02/02/93
     C*  in SYSSIT for that entity.  If the two systems are                              04/16/93
     C*  the same then this is a local CE, otherwise, it is a                            04/16/93
     C*  remote CE.  Load PRORL accordingly and call MMC200 to                           04/16/93
     C*  write the specific CE.  Action code PACTON = 'W' specifies                      04/16/93
     C*  a write.  After the records are marked in OMSTRN with the                       01/11/93
     C*  specific CE#, MMC200 is called again to release the CE                          01/11/93
     C*  that was just written.                                                          01/11/93
     C*                                                                                  01/11/93
     C          *IN99     DOWEQ*OFF                                                      01/11/93
     C*                                                                                  01/11/93
     C          OMTGEN    CHAINSYSSITEN             99                                   01/12/93
     C          *IN99     IFEQ *OFF                                                      01/11/93
     C*                                                                                  01/11/93
     C          EJSYS     IFEQ CQSYS                                                     01/11/93
     C                    MOVE 'L'       PRORL                                           01/11/93
     C                    ELSE                                                           01/11/93
     C                    MOVE 'R'       PRORL                                           01/11/93
     C                    ENDIF                             EJSYS=CQSYS                  01/11/93
     C*                                                                                  01/11/93
     C                    MOVE 'W'       PACTON                                          01/11/93
     C                    MOVE 'Y'       PHOLD                                           01/11/93
     C                    MOVE QQCENO    PGRNO                                           01/16/93
     C                    MOVE EJSYS     PSYS                                            01/11/93
     C                    MOVE OMTGEN    PENT                                            01/11/93
     C                    CALL 'MMC200'  PMC200                                          01/11/93
     C*                                                                                  01/11/93
     C*  MMC200 returns the specific CE# for the entity-to-entity                        01/11/93
     C*  distribution.  That CE# is used to update OMSTRN file - the                     01/11/93
     C*  general CE# is replaced by the specific CE#.                                    01/11/93
     C*                                                                                  01/11/93
     C                    EXSR UPDSCE                                                    01/11/93
     C*                                                                                  01/11/93
     C*                                                                                  01/11/93
     C*  After records with this entity have been all marked by the                      01/11/93
     C*  same specific CE#, call MMC200 again to release the CE.                         01/11/93
     C*  PACTON = 'R' signifies a release.  (Reload other parameters                     01/11/93
     C*  again.)                                                                         01/11/93
     C*                                                                                  01/11/93
```

```
5738PW1 V2R2M0  920615                SEU SOURCE LISTING                  06/01/93 11:49:10              PAGE   11

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
      C          EJSYS     IFEQ CQSYS                                                   01/11/93
      C                    MOVE 'L'       PRORL                                         01/11/93
      C                    ELSE                                                         01/11/93
      C                    MOVE 'R'       PRORL                                         01/11/93
      C                    ENDIF                            EJSYS=CQSYS                 01/11/93
      C*                                                                                04/16/93
      C                    MOVE 'R'       PACTON                                        04/16/93
      C*                                                                                01/11/93
      C                    MOVE 'N'       PHOLD                                         01/11/93
      C                    MOVE QQCENO    PGRNO                                         01/16/93
      C                    MOVE EJSYS     PSYS                                          01/11/93
      C                    MOVE OMTGEN    PENT                                          01/11/93
      C                    CALL 'MMC200'  PMC200                                        01/11/93
      C*                                                                                01/11/93
      C                    ENDIF                            *IN99=*OFF                  01/11/93
      C*                                                                                01/11/93
      C*  Retrieve the next General CE#/Target entity and                               04/16/93
      C*  return to the beginning of the DO loop to process it.                         01/11/93
      C*  Because general CE# has been changed to a specific CE#                        01/11/93
      C*  in processed records, the unprocessed records still have                      01/11/93
      C*  the general CE# as their key.                                                 01/11/93
      C*                                                                                01/11/93
      C          QQCENO    READEOMSTRNGC             N    99NO LOCK                     02/09/93
      C                    ENDDO                            DOW *IN99=*OFF              01/11/93
      C*                                                                                01/11/93
      C                    ENDSR                            PROCES        SRCE3         01/11/93
      C*                                                                                01/11/93
      C/SPACE 2                                                                         02/09/93
      C**********  UPDSCE SUBR  **********************  UPDSCE SUBR  *                  02/09/93
      C*                                                               *                02/09/93
      C*   The UPDSCE subroutine updates records in various Customer  *                 02/09/93
      C*   Order files for the order#/target entity, marking the      *                 02/09/93
      C*   records with the specific CE# received from MMC200.        *                 02/09/93
      C*                                                               *  SRCE3         03/24/93
      C****************************************************************  SRCE3         03/24/93
      C*                                                               *  SRCE3         03/24/93
      C*   INDICATORS USED  :  98  99                                  *  SRCE3         03/24/93
      C*                                                               *  SRCE3         03/24/93
      C*   EXECUTED FROM    :  PROCES                                  *  SRCE3         03/24/93
      C*                                                               *  SRCE3         03/24/93
      C****************************************************************  SRCE3         03/24/93
      C*                                                                  SRCE3         03/24/93
      C          UPDSCE    BEGSR                                                        02/09/93
      C*                                                                                02/09/93
      C*  PSPCE contains the specific CE# for the entity-to-entity                      02/09/93
      C*  distribution returned by MMC200.  Use it to update general CE#.               02/09/93
      C*  First update with specific CE# order master file OMSTRN.                      02/09/93
      C*                                                                                02/09/93
      C          QQCENO    CHAINOMSTRNGC             99                                 02/09/93
      C                    MOVE PSPCE     OMCENO                                        02/09/93
      C                    UPDATFOMSTRN                                                 02/09/93
      C                    SETOF                     99                                 02/09/93
      C*                                                                                02/09/93
```

```
5738PW1 V2R2M0  920615            SEU SOURCE LISTING                    06/01/93 11:49:10              PAGE   12

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
58400      C*                                                                                   02/09/93
58500      C*  Mark all the other records involved in this order in                             02/09/93
58600      C*  the other Customer Order files.  All the relative records                        02/09/93
58700      C*  have the target entity equal to the target entity for the                        02/09/93
58800      C*  order.                                                                           02/09/93
58900      C*                                                                                   02/09/93
59000      C*  Load the keys with order number and target entity; these                         02/09/93
59100      C*  same keys are used for all files bellow.                                         02/09/93
59200      C*                                                                                   02/09/93
59300      C                     MOVE OMORDN    KORDN                                           02/09/93
59400      C                     MOVE OMTGEN    KTENT                                           02/09/93
59500      C*                                                                                   02/09/93
59600      C*  For each file bellow access the logical view by order#/                          02/09/93
59700      C*  target entity and if records matching OMSTRN record exist,                       02/09/93
59800      C*  then mark them with the specific CE# just generated.                             04/26/93
59900      C*  NOTE:  Only records with a blank CE# should be updated.                          02/09/93
60000      C*                                                                                   02/09/93
60100      C*  Order Address Override Transmission File.                                        02/09/93
60200      C*                                                                                   02/09/93
60300      C           KORDEN    CHAINOADTRNOE             98                                   02/09/93
60400      C           *IN98     DOWEQ*OFF                                                      02/09/93
60500      C           OACENO    IFEQ QQCENO                                                    04/27/93
60600      C                     MOVE PSPCE     OACENO                                          02/09/93
60700      C                     UPDATFOADTRN                                                   02/09/93
60800      C                     ENDIF                           OACENO=QQCENO                  04/27/93
60900      C           KORDEN    READEOADTRNOE                98                                02/09/93
61000      C                     ENDDO                           DOW *IN98=*OFF                 02/09/93
61100      C*                                                                                   02/09/93
61200      C*  Order Attributes Override Transmission File.                                     02/09/93
61300      C*                                                                                   02/09/93
61400      C           KORDEN    CHAINOATTRNOE             98                                   02/09/93
61500      C           *IN98     DOWEQ*OFF                                                      02/09/93
61600      C           ORCENO    IFEQ QQCENO                                                    04/27/93
61700      C                     MOVE PSPCE     ORCENO                                          02/09/93
61800      C                     UPDATFOATTRN                                                   02/09/93
61900      C                     ENDIF                           ORCENO=QQCENO                  04/27/93
62000      C           KORDEN    READEOATTRNOE                98                                02/09/93
62100      C                     ENDDO                           DOW *IN98=*OFF                 02/09/93
62200      C*                                                                                   02/09/93
62300      C*  Order Charge Transmission File.                                                  02/09/93
62400      C*                                                                                   02/09/93
62500      C           KORDEN    CHAINOCHTRNOE             98                                   02/09/93
62600      C           *IN98     DOWEQ*OFF                                                      02/09/93
62700      C           OGCENO    IFEQ QQCENO                                                    04/27/93
62800      C                     MOVE PSPCE     OGCENO                                          02/09/93
62900      C                     UPDATFOCHTRN                                                   02/09/93
63000      C                     ENDIF                           OGCENO=QQCENO                  04/27/93
63100      C           KORDEN    READEOCHTRNOE                98                                02/09/93
63200      C                     ENDDO                           DOW *IN98=*OFF                 02/09/93
63300      C*                                                                                   02/09/93
63400      C*  Order Comment Transmission File.                                                 02/09/93
63500      C*                                                                                   02/09/93
63600      C           KORDEN    CHAINOCMTRNOE             98                                   02/09/93
```

```
     5738PW1 V2R2M0  920615              SEU SOURCE LISTING                    06/01/93 11:49:10          PAGE   13

SOURCE FILE . . . . . . .   XLIBEM/MRPGSRC
MEMBER  . . . . . . . . .   MMC460

SEQNBR*...+... 1 ...+... 2 ...+... 3 ...+... 4 ...+... 5 ...+... 6 ...+... 7 ...+... 8 ...+... 9 ...+... 0
63700        C           *IN98     DOWEQ*OFF                                                          02/09/93
63800        C           OCCENO    IFEQ QQCENO                                                        04/27/93
63900        C                     MOVE PSPCE     OCCENO                                              02/09/93
64000        C                     UPDATFOCMTRN                                                       02/09/93
64100        C                     ENDIF                           OCCENO=QQCENO                      04/27/93
64200        C           KORDEN    READEOCMTRNOE                 98                                   02/09/93
64300        C                     ENDDO                           DOW *IN98=*OFF                     02/09/93
64400        C*                                                                                       02/09/93
64500        C*  Customer Attributes Transmission File.                                               02/09/93
64600        C*                                                                                       02/09/93
64700        C           KORDEN    CHAINOCSTRNOE             98                                       02/09/93
64800        C           *IN98     DOWEQ*OFF                                                          02/09/93
64900        C           OUCENO    IFEQ QQCENO                                                        04/27/93
65000        C                     MOVE PSPCE     OUCENO                                              02/09/93
65100        C                     UPDATFOCSTRN                                                       02/09/93
65200        C                     ENDIF                           OUCENO=QQCENO                      04/27/93
65300        C           KORDEN    READEOCSTRNOE                 98                                   02/09/93
65400        C                     ENDDO                           DOW *IN98=*OFF                     02/09/93
65500        C*                                                                                       02/09/93
65600        C*  Order Discount Transmission File.                                                    02/09/93
65700        C*                                                                                       02/09/93
65800        C           KORDEN    CHAINODSTRNOE             98                                       02/09/93
65900        C           *IN98     DOWEQ*OFF                                                          02/09/93
66000        C           OICENO    IFEQ QQCENO                                                        04/27/93
66100        C                     MOVE PSPCE     OICENO                                              02/09/93
66200        C                     UPDATFODSTRN                                                       02/09/93
66300        C                     ENDIF                           OICENO=QQCENO                      04/27/93
66400        C           KORDEN    READEODSTRNOE                 98                                   02/09/93
66500        C                     ENDDO                           DOW *IN98=*OFF                     02/09/93
66600        C*                                                                                       02/09/93
66700        C*  Order Detail Transmission File.                                                      02/09/93
66800        C*                                                                                       02/09/93
66900        C           KORDEN    CHAINODTTRNOE             98                                       02/09/93
67000        C           *IN98     DOWEQ*OFF                                                          02/09/93
67100        C           ODCENO    IFEQ QQCENO                                                        04/27/93
67200        C                     MOVE PSPCE     ODCENO                                              02/09/93
67300        C                     UPDATFODTTRN                                                       02/09/93
67400        C                     ENDIF                           ODCENO=QQCENO                      04/27/93
67500        C           KORDEN    READEODTTRNOE                 98                                   02/09/93
67600        C                     ENDDO                           DOW *IN98=*OFF                     02/09/93
67700        C*                                                                                       02/09/93
67800        C*  Order Promotion Transmission File.                                                   02/09/93
67900        C*                                                                                       02/09/93
68000        C           KORDEN    CHAINOPMTRNOE             98                                       02/09/93
68100        C           *IN98     DOWEQ*OFF                                                          02/09/93
68200        C           ONCENO    IFEQ QQCENO                                                        04/27/93
68300        C                     MOVE PSPCE     ONCENO                                              02/09/93
68400        C                     UPDATFOPMTRN                                                       02/09/93
68500        C                     ENDIF                           ONCENO=QQCENO                      04/27/93
68600        C           KORDEN    READEOPMTRNOE                 98                                   02/09/93
68700        C                     ENDDO                           DOW *IN98=*OFF                     02/09/93
68800        C*                                                                                       02/09/93
68900        C*  Generic COP Transmission File.                                                       02/09/93
```

```
     5738PW1 V2R2M0  920615              SEU SOURCE LISTING                   06/01/93 11:49:10            PAGE   14

SOURCE FILE . . . . . . .  XLIBEM/MRPGSRC
MEMBER  . . . . . . . . .  MMC460

SEQNBR*...+... 1 ...+... 2 ...+... 3 ...+... 4 ...+... 5 ...+... 6 ...+... 7 ...+... 8 ...+... 9 ...+... 0
69000      C*                                                                                     02/09/93
69100      C           KORDEN    CHAINCOPTRNOE             98                                     02/09/93
69200      C           *IN98     DOWEQ*OFF                                                        02/09/93
69300      C           OOCENO    IFEQ QQCENO                                                      04/27/93
69400      C                     MOVE PSPCE     OOCENO                                            02/09/93
69500      C                     UPDATFCOPTRN                                                     03/24/93
69600      C                     ENDIF                          OOCENO=QQCENO                     04/27/93
69700      C           KORDEN    READECOPTRNOE               98                                   02/09/93
69800      C                     ENDDO                          DOW *IN98=*OFF                    02/09/93
69900      C*                                                                                     02/09/93
70000      C*                                                                                     02/09/93
70100      C                     ENDSR                          UPDSCE        SRCE3               02/09/93
70200      C*                                                                                     02/09/93

                         * * * *  E N D  O F  S O U R C E  * * * *
```

```
5738PW1 V2R2M0  920615              SEU SOURCE LISTING                    06/01/93 11:50:05           PAGE    1

SOURCE FILE . . . . . . .   XLIBEM/MRPGSRC
MEMBER  . . . . . . . . .   MMC462

SEQNBR*...+... 1 ...+... 2 ...+... 3 ...+... 4 ...+... 5 ...+... 6 ...+... 7 ...+... 8 ...+... 9 ...+... 0
     H***************************************************************                          01/10/92
     H*                                                             *                          01/10/92
     H*           Release - 03          Mod Level - 10              *                          06/26/92
     H*  THIS UNPUBLISHED COPYRIGHTED WORK CONTAINS TRADE SECRET    *                          01/10/92
     H*  INFORMATION OF MARCAM CORPORATION.  USE, TRANSFER,         *                          01/10/92
     H*  DISCLOSURE, OR COPYING WITHOUT ITS EXPRESSED WRITTEN       *                          01/10/92
     H*  PERMISSION IS STRICTLY FORBIDDEN.                  1993    *                          06/26/92
     H*                                                             *                          01/10/92
     H*  MODULE:              Enterprise Management                 *                          01/10/92
     H*                                                             *                          01/10/92
     H*  PROGRAM NAME:        MMC462 - Customer Order Files         *                          01/11/93
     H*                                Sending Transfer Program     *                          01/10/92
     H*                                                             *                          01/10/92
     H*  FUNCTION:            Performs a send for a Remote CE by    *                          01/14/92
     H*                       calling the generic transfer procedure. *                        01/14/92
     H*                       Loads Data Transfer Files for Local CE. *                        01/16/93
     H*                                                             *                          01/16/93
     H*  CALLING PROGRAM:     MMC010 - Generic Data Deleteion Program *                        04/16/93
     H*                       MMC020 - Local Communications Entry   *                          04/16/93
     H*                                Processor                    *                          01/16/93
     H*                       MMC040 - Remote Communications Entry  *                          01/16/93
     H*                                Processor                    *                          01/10/92
     H*                       MMC100 - Communications Resending Pgm *                          02/11/92
     H*                       MZM620X - Current Date and Time       *                          04/06/93
     H*                                 Retrieval Program           *                          04/06/93
     H*                                                             *                          01/10/92
     H*  CALLED PROGRAM:      Generic Transfer Procedure.           *                          02/11/92
     H*                                                             *                          01/10/92
     H*  /COPY CODE:          NONE                                  *                          01/16/92
     H*                                                             *                          01/10/92
     H***************************************************************                          01/10/92
     H*              P R O G R A M   D E S C R I P T I O N          *                          01/10/92
     H***************************************************************                          01/10/92
     H*                                                             *                          01/10/92
     H* This program is the Customer Order Files Sending Transfer   *                          01/16/93
     H* Program.  It determines what kind of transmission this is.  *                          01/17/92
     H* If it is a remote transmission it initiates the sending.    *                          01/17/92
     H* To initiate the sending DSMCGNR External Data Structure is  *                          01/15/92
     H* loaded with information for transmission.  The generic      *                          01/15/92
     H* transfer procedure is then called with Data Structure       *                          01/15/92
     H* passed as a parameter.                                      *                          01/15/92
     H* If it is a local transmission the program loads the Data    *                          01/16/93
     H* Transfer Files with data from Transmission Files.           *                          01/16/93
     H* The program ends from mainline.                             *                          01/10/92
     H*                                                             *                          01/10/92
     H***************************************************************                          01/10/92
     H/SPACE 3                                                                                 01/10/92
     F***************************************************************                          01/10/92
     F*         F U N C T I O N   O F   I N D I C A T O R S         *                          01/10/92
     F***************************************************************                          01/10/92
     F*                                                             *                          01/10/92
     F*  99 - General Indicator                                     *                          01/10/92
     F*                                                             *                          01/10/92
```

```
     5738PW1 V2R2M0  920615                SEU SOURCE LISTING                        06/01/93 11:50:05              PAGE    2

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
 5400      F*****************************************************************                          01/10/92
 5500      F/SPACE 2                                                                                   01/10/92
 5600      F*****************************************************************                          01/10/92
 5700      F*                                                               *                          01/10/92
 5800      F*                      FILE SPECIFICATIONS                      *                          01/10/92
 5900      F*                                                               *                          01/10/92
 6000      F*****************************************************************                          01/10/92
 6100      F*                                                                                          01/10/92
 6200      FCOMDEF  IF  E                   DISK                                                       01/10/92
 6300      F/SPACE 2                                                                                   01/10/92
 6400      FENTFIL  IF  E           K       DISK                                                       01/25/93
 6500      F/SPACE 2                                                                                   01/25/93
 6600      FLOCCOM  UF  E           K       DISK                                                       04/06/93
 6700      F/SPACE 2                                                                                   01/25/93
 6800      FREMCOM  UF  E           K       DISK                                                       02/11/92
 6900      F/SPACE 2                                                                                   01/10/92
 7000      FSYSXRF  IF  E           K       DISK                                                       01/15/92
 7100      F/SPACE 3                                                                                   01/10/92
 7200      I*****************************************************************                          01/10/92
 7300      I*                                                               *                          01/10/92
 7400      I*                     INPUT SPECIFICATIONS                      *                          01/10/92
 7500      I*                                                               *                          01/10/92
 7600      I*****************************************************************                          01/10/92
 7700      I*                                                                                          01/18/93
 7800      I*  Define a data structure to build CPYF command:                                          01/18/93
 7900      I*                                                                                          01/18/93
 8000      I            DS                                                                             01/18/93
 8100      I                                      1 133 QQCPYF                                         04/06/93
 8200      I I              'CPYF FROMFILE('      1  14 D$1                                            01/18/93
 8300      I                                     15  31 D$FFLB                                         01/25/93
 8400      I I              ') TOFILE('          32  40 D$2                                            01/18/93
 8500      I                                     41  57 D$TFLB                                         01/25/93
 8600      I I              ') MBROPT(*ADD)'     58  71 D$3                                            01/18/93
 8700      I I              ' INCREL((*IF '      72  84 D$4                                            04/06/93
 8800      I                                     85  90 D$CEF                                          04/06/93
 8900      I I              ' *EQ '''            91  96 D$5                                            04/06/93
 9000      I                                     97 111 D$VAL                                          04/06/93
 9100      I I              ''')) FMTOPT-       112 133 D$6                                            04/06/93
 9200      I                '(*MAP *DROP)'                                                             04/06/93
 9300      I*                                                                                          01/18/93
 9400      I*                                                                                          01/18/93
 9500      I*  Declare externally defined data structure $MCGNR                                        01/16/92
 9600      I*                                                                                          01/16/92
 9700      I$MCGNR    E DSDSMCGNR                                                                      01/15/92
 9800      I*                                                                                          01/15/92
 9900      C*****************************************************************                          01/10/92
10000      C*                                                               *                          01/10/92
10100      C*                      CALCULATION SPECS                        *                          01/10/92
10200      C*                                                               *                          01/10/92
10300      C*****************************************************************                          01/10/92
10400      C*                                                               *                          01/10/92
10500      C*****************************************************************                          01/10/92
10600      C*                      M A I N L I N E                          *                          01/10/92
```

```
 5738PW1 V2R2M0  920615              SEU SOURCE LISTING                 06/01/93 11:50:05          PAGE    3

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
10700      C*****************************************************************                          01/10/92
10800      C*                                                               *                          01/10/92
10900      C*  The MAINLINE is executed once.  It defines a PLIST with      *                          01/10/92
11000      C*  five parameters.   *INZSR is automatically executed after    *                          01/16/93
11100      C*  PLIST is received and performs initialization.               *                          01/15/92
11200      C*  If this is a remote transmission, then PSEND subroutine      *                          01/15/92
11300      C*  is executed to initiate sending.                             *                          01/15/92
11400      C*  If this is a local transmission, then LTRAN subroutine       *                          01/16/93
11500      C*  is executed to transfer records locally to Data Transfer     *                          01/16/93
11600      C*  Then LR is seton and the program ends from mainline.         *                          10/27/92
11700      C*  This Parameter List is used to receive the send/resend byte,                            10/12/92
11800      C*  the specific CE#, the remote/local byte, and the generic                                10/12/92
11900      C*  transfer procedure name; the error code is passed back to                               10/12/92
12000      C*  the calling program.                                                                    10/12/92
12100      C*                                                                                          10/12/92
12200      C*                                                               *    SRCE3                 04/06/93
12300      C*****************************************************************    SRCE3                 04/06/93
12400      C*                                                               *    SRCE3                 04/06/93
12500      C*   INDICATORS USED  :  LR  99                                  *    SRCE3                 04/06/93
12600      C*                                                               *    SRCE3                 04/06/93
12700      C*   EXECUTES         :  LTRAN   RSEND                           *    SRCE3                 04/06/93
12800      C*                                                               *    SRCE3                 04/06/93
12900      C*****************************************************************    SRCE3                 04/06/93
13000      C*                                                                    SRCE3                 04/06/93
13100      C           *ENTRY    PLIST                                                                 01/10/92
13200      C                     PARM           P$SEND                                                 09/11/92
13300      C                     PARM           P$CENO                                                 09/11/92
13400      C                     PARM           P$RORL                                                 09/11/92
13500      C                     PARM           P$GNRC                                                 09/11/92
13600      C                     PARM           P$ERR                                                  09/11/92
13700      C*                                                                                          01/10/92
13800      C* If this is a remote transmission, then initiate sending                                  01/15/92
13900      C* procedure.                                                      on                       01/16/93
14000      C*                                                                                          01/15/92
14100      C           P$RORL    IFEQ 'R'                                                              09/11/92
14200      C           P$CENO    CHAINREMCOM              N99    NO LOCK                               01/12/93
14300      C           *IN99     IFEQ *OFF                                                             01/12/93
14400      C                     EXSR RSEND                                                            01/12/93
14500      C                     ENDIF                           *IN99=*OFF                            01/12/93
14600      C                     ENDIF                           P$RORL='R'                            01/12/93
14700      C*                                                                                          01/12/93
14800      C*                                                                                          01/16/93
14900      C* If this is a local transmission, then execute LTRAN to copy                              01/16/93
15000      C* relevant records from Transmission Files to DT Files.           on                       01/16/93
15100      C*                                                                                          01/12/93
15200      C           P$RORL    IFEQ 'L'                                                              01/12/93
15300      C           P$CENO    CHAINLOCCOM              N99    No lock                               04/06/93
15400      C           *IN99     IFEQ *OFF                                                             01/12/93
15500      C                     EXSR LTRAN                                                            01/12/93
15600      C                     ENDIF                           *IN99=*OFF                            01/12/93
15700      C                     ENDIF                           P$RORL='L'                            01/12/93
15800      C*                                                                                          01/10/92
15900      C                     SETON                    LR                                           01/10/92
```

```
5738PW1 V2R2M0  920615                SEU SOURCE LISTING                        06/01/93 11:50:05          PAGE    4

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
16000      C                    RETRN                                                                        01/10/92
16100      C/SPACE 2                                                                                         01/14/92
16200      C*********  $DEFSR SUBR  **********************  $DEFSR SUBR  *                                  01/14/92
16300      C*                                                             *                                  01/14/92
16400      C*  The $DEFSR subroutine performs the following functions:    *                                  01/14/92
16500      C*                                                             *                                  01/14/92
16600      C*    1. Defines program variables.  It is never executed.     *                                  01/14/92
16700      C*                                                             *    SRCE3                         04/06/93
16800      C**************************************************************    SRCE3                         04/06/93
16900      C*                                                             *    SRCE3                         04/06/93
17000      C*  INDICATORS USED  :  NONE                                   *    SRCE3                         04/06/93
17100      C*                                                             *    SRCE3                         04/06/93
17200      C**************************************************************    SRCE3                         04/06/93
17300      C*                                                                 SRCE3                         04/06/93
17400      C           $DEFSR    BEGSR                                                                   01/14/92
17500      C*                                                                                                01/14/92
17600      C*  Define program variables:                                                                     01/14/92
17700      C*                                                                                                03/18/92
17800      C                     MOVE *BLANKS   $PGM    8        Program name                                03/18/92
17900      C                     MOVE *BLANKS   MODULE  1        MODULE                                      03/18/92
18000      C*                                                                                                03/18/92
18100      C*  Parameters used in PLISTs.                                                                    02/02/93
18200      C*                                                                                                01/14/92
18300      C                     MOVE *BLANKS   P$GNRC 10        Gen Transf pgm                              10/27/92
18400      C                     MOVE *BLANKS   P$ERR   1        Commun error                                10/27/92
18500      C*                                                                                                02/02/93
18600      C           *LIKE     DEFN ZLDTMT    PDATE            Current Date                                04/06/93
18700      C           *LIKE     DEFN CQLIBR    PLIB             Library                                     02/02/93
18800      C           *LIKE     DEFN ZLTMMT    PTIME            Current Time                                04/06/93
18900      C           *LIKE     DEFN ZMCENO    P$CENO           CE#                                         10/27/92
19000      C           *LIKE     DEFN $RORL     P$RORL           Remote/local                                10/27/92
19100      C           *LIKE     DEFN $SEND     P$SEND           Send/resend                                 10/27/92
19200      C*                                                                                                01/14/92
19300      C*   Define key fields used in KSYSXR key list.                                                   01/16/92
19400      C*                                                                                                01/14/92
19500      C           *LIKE     DEFN CQSYS     KLSYS            Local system                                10/27/92
19600      C           *LIKE     DEFN CQSYS     KTSYS            Target syst                                 10/27/92
19700      C*                                                                                                01/14/92
19800      C*   Define parameter for call to generic transfer procedure.                                     02/11/92
19900      C*                                                                                                02/11/92
20000      C           *LIKE     DEFN ZMCPFM    PMSG             Error msg                                   10/27/92
20100      C*                                                                                                01/25/93
20200      C*  QQLEN is a parameter used in calling a CL command                                             01/25/93
20300      C*    by using CALL 'QCMDEXC' from within the RPG program.                                        01/25/93
20400      C*                                                                                                01/25/93
20500      C                     Z-ADDO         QQLEN  155                                                   01/25/93
20600      C*                                                                                                04/06/93
20700      C                     MOVE *BLANKS   QQFAIL  1        Copy file flag                              04/06/93
20800      C*                                                                                                02/11/92
20900      C*   PLIST used when generic transfer procedure is called.                                        02/11/92
21000      C*                                                                                                01/14/92
21100      C           PMC010    PLIST                                                                   02/02/93
21200      C                     PARM           PLIB                                                     02/02/93
```

```
 5738PW1 V2R2M0  920615                SEU SOURCE LISTING                        06/01/93 11:50:05              PAGE    5

SOURCE FILE . . . . . . .   XLIBEM/MRPGSRC
MEMBER  . . . . . . . . .   MMC462

SEQNBR*...+... 1 ...+... 2 ...+... 3 ...+... 4 ...+... 5 ...+... 6 ...+... 7 ...+... 8 ...+... 9 ...+... 0
         C                     PARM           PFILE  10                                                 02/02/93
         C                     PARM           PFLD    6                                                 02/02/93
         C                     PARM           PVALU  15                                                 02/02/93
         C                     PARM           PERR    1                                                 02/02/93
         C*                                                                                             02/02/93
         C*   PLIST used when Generic Data Deletion Program is called.                                  02/02/93
         C*                                                                                             02/02/93
         C           PGNRTR    PLIST                                                                    02/02/93
         C                     PARM           $MCGNR                                                    02/02/93
         C                     PARM           PERROR  1                                                 02/02/93
         C                     PARM           PMSG                                                      02/02/93
         C*                                                                                             04/06/93
         C*   PLIST used when MZM620X is called.                                                        04/06/93
         C*                                                                                             04/06/93
         C           PZM620    PLIST                                                                    04/06/93
         C                     PARM           PDATE            Current Date                             04/06/93
         C                     PARM           PTIME            Current Time                             04/06/93
         C*                                                                                             01/14/92
         C*                                                                                             01/14/92
         C*  Set up Key list for retrieving information from the                                        01/16/92
         C*    System Cross-Reference File (SYSXRF).                                                    01/16/92
         C*                                                                                             01/14/92
         C           KSYSXR    KLIST                                                                    01/16/92
         C                     KFLD           KLSYS                                                     01/16/92
         C                     KFLD           KTSYS                                                     01/16/92
         C*                                                                                             01/14/92
         C*                                                                                             01/14/92
         C                     ENDSR                           $DEFSR          SRCE3                    01/14/92
         C*                                                                                             01/14/92
         C/SPACE 2                                                                                      01/15/92
         C*********  *INZSR SUBR  **********************  *INZSR SUBR  *                               01/15/92
         C*                                                             *                               01/15/92
         C*   The *INZSR subroutine performs the following functions:   *                               01/15/92
         C*                                                             *                               01/15/92
         C*     1. Performs initial calculations that need to be done  *                               01/15/92
         C*          on the initial call of the program.               *                               01/15/92
         C*                                                             *                               01/15/92
         C*  NOTE:  The *INZSR is executed during the *INIT phase of   *                               01/15/92
         C*          RPG execution.                                     *                               01/15/92
         C*                                                             *  SRCE3                        04/06/93
         C***************************************************************  SRCE3                        04/06/93
         C*                                                             *  SRCE3                        04/06/93
         C*   INDICATORS USED  :  99                                    *  SRCE3                        04/06/93
         C*                                                             *  SRCE3                        04/06/93
         C***************************************************************  SRCE3                        04/06/93
         C*                                                                SRCE3                        04/06/93
         C           *INZSR    BEGSR                                                                    01/15/92
         C*   Initialize program variables:                                                             03/18/92
         C*                                                                                             03/18/92
         C                     MOVE 'M'       MODULE                                                    03/18/92
         C                     MOVEL'MMC462'  $PGM             Program name                             01/12/93
         C*                                                                                             01/15/92
         C*   Retrieve the communications system library from COMDEF.                                   01/16/92
```

```
     5738PW1 V2R2M0  920615                SEU SOURCE LISTING                        06/01/93 11:50:05              PAGE    6

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
           C*                                                                                  01/16/92
           C           1         CHAINCOMDEF              99                                   01/15/92
           C*                                                                                  01/15/92
           C*                                                                                  01/15/92
           C                     ENDSR                              *INZSR         SRCE3       01/15/92
           C/SPACE 2                                                                           01/16/93
           C********** LTRAN  SUBR ********************** LTRAN  SUBR *                        01/16/93
           C*                                                         *                        01/16/93
           C*   The LTRAN  copies all records for the local CE# passed *                       04/16/93
           C*   from the Transmission Files in the Entity Files Library *                      04/16/93
           C*   to the Data Transfer Files in the Communication File  *                        04/16/93
           C*   Library.  It also performs clean up of potentially    *        SRCE3           04/16/93
           C*   duplicate records in the Data Transfer Files before   *        SRCE3           04/16/93
           C*   records are copied there.                             *        SRCE3           04/16/93
           C*                                                         *        SRCE3           04/16/93
           C***************************************************************    SRCE3           04/06/93
           C*                                                         *        SRCE3           04/06/93
           C*   INDICATORS USED  :  99                                *        SRCE3           04/06/93
           C*                                                         *        SRCE3           04/06/93
           C*   EXECUTES         :  LTRANP                            *        SRCE3           04/06/93
           C*                                                         *        SRCE3           04/06/93
           C*   EXECUTED FROM    :  MAINLN                            *        SRCE3           04/06/93
           C*                                                         *        SRCE3           04/06/93
           C***************************************************************    SRCE3           04/06/93
           C*                                                                  SRCE3           04/06/93
           C           LTRAN     BEGSR                                                         01/16/93
           C*                                                                                  04/06/93
           C*  Initialize QQFAIL to 'N'. It will be set to 'Y' if an                           04/06/93
           C*  error occurs.                                                                   04/06/93
           C*                                                                                  04/06/93
           C                     MOVE 'N'       QQFAIL                                         04/06/93
           C*                                                                                  04/06/93
           C*  Do loop to control the flow of the program.                                     04/06/93
           C*                                                                                  04/06/93
           C                     DO                                                            04/06/93
           C*                                                                                  02/02/93
           C*  Retrieve the Entity Definition File.                                            04/06/93
           C*                                                                                  01/18/93
           C           ZLOREN    CHAINENTFIL              99                                   01/18/93
           C*                                                                                  04/06/93
           C*  If the LOCCOM originating entity is not defined, set                            04/06/93
           C*  QQFAIL to 'Y' and leave the do loop.                                            04/06/93
           C*                                                                                  04/06/93
           C           *IN99     IFEQ *ON                                                      04/06/93
           C                     MOVE 'Y'       QQFAIL                                         04/06/93
           C                     LEAVE                                                         04/06/93
           C                     ENDIF                             *IN99=*ON                   04/06/93
           C*                                                                                  01/18/93
           C*  The following values stay the same for all CPYFs, so                            01/18/93
           C*  only load them once:                                                            01/18/93
           C*  Load the local CE# passed to this program as a search value.                    01/18/93
           C*  Load the length of the CPYF command into QQLEN.                                 01/18/93
           C*                                                                                  01/18/93
```

```
 5738PW1 V2R2M0  920615                  SEU SOURCE LISTING                        06/01/93 11:50:05                PAGE    7

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
31900      C                    MOVE P$CENO    D$VAL                                                          01/25/93
32000      C                    Z-ADD133       QQLEN                                                          04/06/93
32100      C*                                                                                                 01/18/93
32200      C*  Before copying any data into Data Transfer File, clear it                                      02/02/93
32300      C*  of any records for the processed CE#.                                                          02/02/93
32400      C*                                                                                                 02/02/93
32500      C*  Call program MMC010 to delete all records for the processed                                    02/02/93
32600      C*  CE# in the Data Transfer File DTODET in the Communications                                     02/02/93
32700      C*  Files Library.                                                                                 02/02/93
32800      C*                                                                                                 02/02/93
32900      C                    MOVE CQLIBR    PLIB                                                           02/02/93
33000      C                    MOVEL'DTODET'  PFILE     P      Pad blanks                                    04/06/93
33100      C                    MOVEL'ODCENO'  PFLD      P      Pad blanks                                    04/06/93
33200      C                    MOVE P$CENO    PVALU                                                          02/02/93
33300      C                    MOVE *BLANKS   PERR                                                           02/02/93
33400      C*                                                                                                 02/02/93
33500      C                    CALL 'MMC010'  PMC010                                                         02/02/93
33600      C*                                                                                                 02/02/93
33700      C*  Copy Order Detail Transmission File ODTTRN.                                                    01/18/93
33800      C*                                                                                                 01/18/93
33900      C          EFFLIB    CAT  '/':0     D$FFLB    P      Pad blanks                                    04/06/93
34000      C          D$FFLB    CAT  'ODTTRN':0D$FFLB           From file                                     04/06/93
34100      C          CQLIBR    CAT  '/':0     D$TFLB    P      Pad blanks                                    04/06/93
34200      C          D$TFLB    CAT  'DTODET':0D$TFLB           To file                                       01/25/93
34300      C                    MOVE 'ODCENO'  D$CEF            CE# field                                     01/25/93
34400      C*                                                                                                 01/18/93
34500      C                    CALL 'QCMDEXC'             99                                                 04/06/93
34600      C                    PARM           QQCPYF                                                         01/18/93
34700      C                    PARM           QQLEN                                                          01/18/93
34800      C*                                                                                                 04/06/93
34900      C          *IN99     IFEQ *ON                                                                      04/06/93
35000      C                    MOVE 'Y'       QQFAIL                                                         04/06/93
35100      C                    LEAVE                                                                         04/06/93
35200      C                    ENDIF                           *IN99=*ON                                     04/06/93
35300      C*                                                                                                 03/03/93
35400      C*                                                                                                 04/06/93
35500      C*  Call program MMC010 to delete all records for the processed                                    03/03/93
35600      C*  CE# in the Data Transfer File DTOMST in the Communications                                     03/03/93
35700      C*  Files Library.                                                                                 03/03/93
35800      C*                                                                                                 03/03/93
35900      C                    MOVE CQLIBR    PLIB                                                           03/03/93
36000      C                    MOVEL'DTOMST'  PFILE     P      Pad blanks                                    04/06/93
36100      C                    MOVEL'OMCENO'  PFLD      P      Pad blanks                                    04/06/93
36200      C                    MOVE P$CENO    PVALU                                                          03/03/93
36300      C                    MOVE *BLANKS   PERR                                                           03/03/93
36400      C*                                                                                                 03/03/93
36500      C                    CALL 'MMC010'  PMC010                                                         03/03/93
36600      C*                                                                                                 03/03/93
36700      C*  Copy Order Master Transmission File OMSTRN.                                                    03/03/93
36800      C*                                                                                                 03/03/93
36900      C          EFFLIB    CAT  '/':0     D$FFLB    P      Pad blanks                                    04/06/93
37000      C          D$FFLB    CAT  'OMSTRN':0D$FFLB           From file                                     04/06/93
37100      C          CQLIBR    CAT  '/':0     D$TFLB    P      Pad blanks                                    04/06/93
```

```
 5738PW1 V2R2M0  920615                  SEU SOURCE LISTING                        06/01/93 11:50:05              PAGE    8

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
37200      C          D$TFLB    CAT  'DTOMST':0D$TFLB          To file                                     03/03/93
37300      C                    MOVE 'OMCENO'  D$CEF           CE# field                                   03/03/93
37400      C*                                                                                              03/03/93
37500      C                    CALL 'QCMDEXC'             99                                              04/06/93
37600      C                    PARM           QQCPYF                                                      04/06/93
37700      C                    PARM           QQLEN                                                       04/06/93
37800      C*                                                                                              04/06/93
37900      C          *IN99     IFEQ *ON                                                                   04/06/93
38000      C                    MOVE 'Y'       QQFAIL                                                      04/06/93
38100      C                    LEAVE                                                                      04/06/93
38200      C                    ENDIF                          *IN99=*ON                                   04/06/93
38300      C*                                                                                              03/03/93
38400      C*                                                                                              03/03/93
38500      C*   Call program MMC010 to delete all records for the processed                                03/03/93
38600      C*   CE# in the Data Transfer File DTOCHT in the Communications                                 04/06/93
38700      C*   Files Library.                                                                             03/03/93
38800      C*                                                                                              03/03/93
38900      C                    MOVE CQLIBR    PLIB                                                        03/03/93
39000      C                    MOVEL'DTOCHT'  PFILE      P    Pad blanks                                  04/06/93
39100      C                    MOVEL'OGCENO'  PFLD       P    Pad blanks                                  04/06/93
39200      C                    MOVE P$CENO    PVALU                                                       03/03/93
39300      C                    MOVE *BLANKS   PERR                                                        03/03/93
39400      C*                                                                                              03/03/93
39500      C                    CALL 'MMC010'  PMC010                                                      03/03/93
39600      C*                                                                                              03/03/93
39700      C*   Copy Order Change Transmission File OCHTRN.                                                03/03/93
39800      C*                                                                                              03/03/93
39900      C          EFFLIB    CAT  '/':0     D$FFLB     P    Pad blanks                                  04/06/93
40000      C          D$FFLB    CAT  'OCHTRN':0D$FFLB          From file                                   04/06/93
40100      C          CQLIBR    CAT  '/':0     D$TFLB     P    Pad blanks                                  04/06/93
40200      C          D$TFLB    CAT  'DTOCHT':0D$TFLB          To file                                     04/06/93
40300      C                    MOVE 'OGCENO'  D$CEF           CE# field                                   03/03/93
40400      C*                                                                                              03/03/93
40500      C                    CALL 'QCMDEXC'             99                                              04/06/93
40600      C                    PARM           QQCPYF                                                      04/06/93
40700      C                    PARM           QQLEN                                                       04/06/93
40800      C*                                                                                              04/06/93
40900      C          *IN99     IFEQ *ON                                                                   04/06/93
41000      C                    MOVE 'Y'       QQFAIL                                                      04/06/93
41100      C                    LEAVE                                                                      04/06/93
41200      C                    ENDIF                          *IN99=*ON                                   04/06/93
41300      C*                                                                                              03/03/93
41400      C*                                                                                              03/24/93
41500      C*   Call program MMC010 to delete all records for the processed                                03/24/93
41600      C*   CE# in the Data Transfer File DTODST in the Communications                                 04/06/93
41700      C*   Files Library.                                                                             03/24/93
41800      C*                                                                                              03/24/93
41900      C                    MOVE CQLIBR    PLIB                                                        03/24/93
42000      C                    MOVEL'DTODST'  PFILE      P    Pad blanks                                  04/06/93
42100      C                    MOVEL'OICENO'  PFLD       P    Pad blanks                                  04/06/93
42200      C                    MOVE P$CENO    PVALU                                                       03/24/93
42300      C                    MOVE *BLANKS   PERR                                                        03/24/93
42400      C*                                                                                              03/24/93
```

```
     5738PW1 V2R2M0  920615                  SEU SOURCE LISTING                    06/01/93 11:50:05          PAGE    9

SOURCE FILE . . . . . . .   XLIBEM/MRPGSRC
MEMBER  . . . . . . . . .   MMC462

SEQNBR*...+... 1 ...+... 2 ...+... 3 ...+... 4 ...+... 5 ...+... 6 ...+... 7 ...+... 8 ...+... 9 ...+... 0
42500      C                    CALL 'MMC010'  PMC010                                             03/24/93
42600      C*                                                                                     03/24/93
42700      C*  Copy Order Discount Transmission File ODSTRN.                                      03/24/93
42800      C*                                                                                     03/24/93
42900      C           EFFLIB    CAT  '/':0     D$FFLB    P      Pad blanks                       04/06/93
43000      C           D$FFLB    CAT  'ODSTRN':OD$FFLB           From file                        04/06/93
43100      C           CQLIBR    CAT  '/':0     D$TFLB    P      Pad blanks                       04/06/93
43200      C           D$TFLB    CAT  'DTODST':OD$TFLB           To file                          04/06/93
43300      C                     MOVE 'OICENO'  D$CEF            CE# field                        03/24/93
43400      C*                                                                                     03/24/93
43500      C                     CALL 'QCMDEXC'           99                                      04/06/93
43600      C                     PARM           QQCPYF                                            04/06/93
43700      C                     PARM           QQLEN                                             04/06/93
43800      C*                                                                                     04/06/93
43900      C           *IN99     IFEQ *ON                                                         04/06/93
44000      C                     MOVE 'Y'       QQFAIL                                            04/06/93
44100      C                     LEAVE                                                            04/06/93
44200      C                     ENDIF                           *IN99=*ON                        04/06/93
44300      C*                                                                                     03/24/93
44400      C*                                                                                     03/24/93
44500      C*  Call program MMC010 to delete all records for the processed                        03/24/93
44600      C*  CE# in the Data Transfer File DTOCMT in the Communications                         04/06/93
44700      C*  Files Library.                                                                     03/24/93
44800      C*                                                                                     03/24/93
44900      C                     MOVE CQLIBR    PLIB                                              03/24/93
45000      C                     MOVEL'DTOCMT'  PFILE     P      Pad blanks                       04/06/93
45100      C                     MOVEL'OCCENO'  PFLD      P      Pad blanks                       04/06/93
45200      C                     MOVE P$CENO    PVALU                                             03/24/93
45300      C                     MOVE *BLANKS   PERR                                              03/24/93
45400      C*                                                                                     03/24/93
45500      C                     CALL 'MMC010'  PMC010                                            03/24/93
45600      C*                                                                                     03/24/93
45700      C*  Copy Order Comment Transmission File OCMTRN.                                       03/24/93
45800      C*                                                                                     03/24/93
45900      C           EFFLIB    CAT  '/':0     D$FFLB    P      Pad blanks                       04/06/93
46000      C           D$FFLB    CAT  'OCMTRN':OD$FFLB           From file                        04/06/93
46100      C           CQLIBR    CAT  '/':0     D$TFLB    P      Pad blanks                       04/06/93
46200      C           D$TFLB    CAT  'DTOCMT':OD$TFLB           To file                          04/06/93
46300      C                     MOVE 'OCCENO'  D$CEF            CE# field                        03/24/93
46400      C*                                                                                     03/24/93
46500      C                     CALL 'QCMDEXC'           99                                      04/06/93
46600      C                     PARM           QQCPYF                                            04/06/93
46700      C                     PARM           QQLEN                                             04/06/93
46800      C*                                                                                     04/06/93
46900      C           *IN99     IFEQ *ON                                                         04/06/93
47000      C                     MOVE 'Y'       QQFAIL                                            04/06/93
47100      C                     LEAVE                                                            04/06/93
47200      C                     ENDIF                           *IN99=*ON                        04/06/93
47300      C*                                                                                     03/24/93
47400      C*                                                                                     03/24/93
47500      C*  Call program MMC010 to delete all records for the processed                        03/24/93
47600      C*  CE# in the Data Transfer File DTOATT in the Communications                         04/06/93
47700      C*  Files Library.                                                                     03/24/93
```

```
5738PW1 V2R2M0  920615                 SEU SOURCE LISTING                    06/01/93 11:50:05            PAGE   10

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
47800     C*                                                                                          03/24/93
47900     C                     MOVE CQLIBR    PLIB                                                   03/24/93
48000     C                     MOVEL'DTOATT'  PFILE     P      Pad blanks                            04/06/93
48100     C                     MOVEL'ORCENO'  PFLD      P      Pad blanks                            04/06/93
48200     C                     MOVE P$CENO    PVALU                                                  03/24/93
48300     C                     MOVE *BLANKS   PERR                                                   03/24/93
48400     C*                                                                                          03/24/93
48500     C                     CALL 'MMC010'  PMC010                                                 03/24/93
48600     C*                                                                                          03/24/93
48700     C* Copy Order Attribute Override Transmission File OATTRN.                                  03/24/93
48800     C*                                                                                          03/24/93
48900     C           EFFLIB    CAT  '/':0     D$FFLB    P      Pad blanks                            04/06/93
49000     C           D$FFLB    CAT  'OATTRN':OD$FFLB           From file                             04/06/93
49100     C           CQLIBR    CAT  '/':0     D$TFLB    P      Pad blanks                            04/06/93
49200     C           D$TFLB    CAT  'DTOATT':OD$TFLB           To file                               04/06/93
49300     C                     MOVE 'ORCENO'  D$CEF            CE# field                             03/24/93
49400     C*                                                                                          03/24/93
49500     C                     CALL 'QCMDEXC'            99                                          04/06/93
49600     C                     PARM           QQCPYF                                                 04/06/93
49700     C                     PARM           QQLEN                                                  04/06/93
49800     C*                                                                                          04/06/93
49900     C           *IN99     IFEQ *ON                                                              04/06/93
50000     C                     MOVE 'Y'       QQFAIL                                                 04/06/93
50100     C                     LEAVE                                                                 04/06/93
50200     C                     ENDIF                           *IN99=*ON                             04/06/93
50300     C*                                                                                          03/24/93
50400     C*                                                                                          03/24/93
50500     C* Call program MMC010 to delete all records for the processed                              03/24/93
50600     C* CE# in the Data Transfer File DTOADT in the Communications                               04/06/93
50700     C* Files Library.                                                                           03/24/93
50800     C*                                                                                          03/24/93
50900     C                     MOVE CQLIBR    PLIB                                                   03/24/93
51000     C                     MOVEL'DTOADT'  PFILE     P      Pad blanks                            04/06/93
51100     C                     MOVEL'OACENO'  PFLD      P      Pad blanks                            04/06/93
51200     C                     MOVE P$CENO    PVALU                                                  03/24/93
51300     C                     MOVE *BLANKS   PERR                                                   03/24/93
51400     C*                                                                                          03/24/93
51500     C                     CALL 'MMC010'  PMC010                                                 03/24/93
51600     C*                                                                                          03/24/93
51700     C* Copy Order Address Override Transmission File OADTRN.                                    03/24/93
51800     C*                                                                                          03/24/93
51900     C           EFFLIB    CAT  '/':0     D$FFLB    P      Pad blanks                            04/06/93
52000     C           D$FFLB    CAT  'OADTRN':OD$FFLB           From file                             04/06/93
52100     C           CQLIBR    CAT  '/':0     D$TFLB    P      Pad blanks                            04/06/93
52200     C           D$TFLB    CAT  'DTOADT':OD$TFLB           To file                               04/06/93
52300     C                     MOVE 'OACENO'  D$CEF            CE# field                             03/24/93
52400     C*                                                                                          03/24/93
52500     C                     CALL 'QCMDEXC'            99                                          04/06/93
52600     C                     PARM           QQCPYF                                                 04/06/93
52700     C                     PARM           QQLEN                                                  04/06/93
52800     C*                                                                                          04/06/93
52900     C           *IN99     IFEQ *ON                                                              04/06/93
53000     C                     MOVE 'Y'       QQFAIL                                                 04/06/93
```

```
5738PW1 V2R2M0  920615                SEU SOURCE LISTING                    06/01/93 11:50:05            PAGE   11

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
      C                    LEAVE                                                                 04/06/93
      C                    ENDIF                           *IN99=*ON                             04/06/93
      C*                                                                                         03/24/93
      C*                                                                                         03/24/93
      C*  Call program MMC010 to delete all records for the processed                            03/24/93
      C*  CE# in the Data Transfer File DTOCST in the Communications                             04/06/93
      C*  Files Library.                                                                         03/24/93
      C*                                                                                         03/24/93
      C                    MOVE CQLIBR    PLIB                                                   03/24/93
      C                    MOVEL'DTOCST'  PFILE     P      Pad blanks                            04/06/93
      C                    MOVEL'OUCENO'  PFLD      P      Pad blanks                            04/06/93
      C                    MOVE P$CENO    PVALU                                                  03/24/93
      C                    MOVE *BLANKS   PERR                                                   03/24/93
      C*                                                                                         03/24/93
      C                    CALL 'MMC010'  PMC010                                                 03/24/93
      C*                                                                                         03/24/93
      C*  Copy Customer Attribute Override Transmission File OCSTRN.                             03/24/93
      C*                                                                                         03/24/93
      C           EFFLIB   CAT  '/':0     D$FFLB    P      Pad blanks                            04/06/93
      C           D$FFLB   CAT  'OCSTRN':0D$FFLB           From file                             04/06/93
      C           CQLIBR   CAT  '/':0     D$TFLB    P      Pad blanks                            04/06/93
      C           D$TFLB   CAT  'DTOCST':0D$TFLB           To file                               04/06/93
      C                    MOVE 'OUCENO'  D$CEF            CE# field                             03/24/93
      C*                                                                                         03/24/93
      C                    CALL 'QCMDEXC'           99                                           04/06/93
      C                    PARM           QQCPYF                                                 04/06/93
      C                    PARM           QQLEN                                                  04/06/93
      C*                                                                                         04/06/93
      C           *IN99    IFEQ *ON                                                              04/06/93
      C                    MOVE 'Y'       QQFAIL                                                 04/06/93
      C                    LEAVE                                                                 04/06/93
      C                    ENDIF                           *IN99=*ON                             04/06/93
      C*                                                                                         03/24/93
      C*                                                                                         03/24/93
      C*  Call program MMC010 to delete all records for the processed                            03/24/93
      C*  CE# in the Data Transfer File DTOPMT in the Communications                             04/06/93
      C*  Files Library.                                                                         03/24/93
      C*                                                                                         03/24/93
      C                    MOVE CQLIBR    PLIB                                                   03/24/93
      C                    MOVEL'DTOPMT'  PFILE     P      Pad blanks                            04/06/93
      C                    MOVEL'ONCENO'  PFLD      P      Pad blanks                            04/06/93
      C                    MOVE P$CENO    PVALU                                                  03/24/93
      C                    MOVE *BLANKS   PERR                                                   03/24/93
      C*                                                                                         03/24/93
      C                    CALL 'MMC010'  PMC010                                                 03/24/93
      C*                                                                                         03/24/93
      C*  Copy Order Promotion Transmission File OPMTRN.                                         03/24/93
      C*                                                                                         03/24/93
      C           EFFLIB   CAT  '/':0     D$FFLB    P      Pad blanks                            04/06/93
      C           D$FFLB   CAT  'OPMTRN':0D$FFLB           From file                             04/06/93
      C           CQLIBR   CAT  '/':0     D$TFLB    P      Pad blanks                            04/06/93
      C           D$TFLB   CAT  'DTOPMT':0D$TFLB           To file                               04/06/93
      C                    MOVE 'ONCENO'  D$CEF            CE# field                             03/24/93
```

```
5738PW1 V2R2M0  920615                SEU SOURCE LISTING                       06/01/93 11:50:05              PAGE   12

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
      C*                                                                                     03/24/93
      C                     CALL 'QCMDEXC'              99                                  04/06/93
      C                     PARM           QQCPYF                                           04/06/93
      C                     PARM           QQLEN                                            04/06/93
      C*                                                                                     04/06/93
      C          *IN99      IFEQ *ON                                                         04/06/93
      C                     MOVE 'Y'       QQFAIL                                           04/06/93
      C                     LEAVE                                                           04/06/93
      C                     ENDIF                           *IN99=*ON                       04/06/93
      C*                                                                                     03/24/93
      C*                                                                                     03/24/93
      C*  Call program MMC010 to delete all records for the processed                       03/24/93
      C*  CE# in the Data Transfer File DTCOPT in the Communications                        03/24/93
      C*  Files Library.                                                                    03/24/93
      C*                                                                                     03/24/93
      C                     MOVE CQLIBR    PLIB                                             03/24/93
      C                     MOVEL'DTCOPT'  PFILE     P      Pad blanks                      04/06/93
      C                     MOVEL'OOCENO'  PFLD      P      Pad blanks                      04/06/93
      C                     MOVE P$CENO    PVALU                                            03/24/93
      C                     MOVE *BLANKS   PERR                                             03/24/93
      C*                                                                                     03/24/93
      C                     CALL 'MMC010'  PMC010                                           03/24/93
      C*                                                                                     03/24/93
      C*  Copy Generic COP Transmission File COPTRN.                                        03/24/93
      C*                                                                                     03/24/93
      C          EFFLIB     CAT  '/':0     D$FFLB    P      Pad blanks                      04/06/93
      C          D$FFLB     CAT  'COPTRN':0D$FFLB           From file                       04/06/93
      C          CQLIBR     CAT  '/':0     D$TFLB    P      Pad blanks                      04/06/93
      C          D$TFLB     CAT  'DTCOPT':0D$TFLB           To file                         03/24/93
      C                     MOVE 'OOCENO'  D$CEF            CE# field                       03/24/93
      C*                                                                                     03/24/93
      C                     CALL 'QCMDEXC'              99                                  04/06/93
      C                     PARM           QQCPYF                                           04/06/93
      C                     PARM           QQLEN                                            04/06/93
      C*                                                                                     04/06/93
      C          *IN99      IFEQ *ON                                                         04/06/93
      C                     MOVE 'Y'       QQFAIL                                           04/06/93
      C                     LEAVE                                                           04/06/93
      C                     ENDIF                           *IN99=*ON                       04/06/93
      C*                                                                                     03/24/93
      C*                                                                                     04/06/93
      C                     ENDDO                           Do once                         04/06/93
      C*                                                                                     04/06/93
      C*  If QQFAIL is set to 'Y', it means that there was an                               04/06/93
      C*  error in copying records to the data transfer file.                               04/06/93
      C*  Update the local CE status to '42' and set P$ERR to                               04/06/93
      C*  '2' to indicate an error has occurred.                                            04/06/93
      C*                                                                                     04/06/93
      C          QQFAIL     IFEQ 'Y'                                                         04/06/93
      C                     MOVE '2'       P$ERR                                            04/06/93
      C          P$CENO     CHAINLOCCOM               99                                    04/06/93
      C          *IN99      IFEQ *OFF                                                        04/06/93
      C                     MOVE '42'      ZLSTAT                                           04/06/93
```

```
5738PW1 V2R2M0  920615              SEU SOURCE LISTING                    06/01/93 11:50:05          PAGE   13

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
     C                     CALL 'MZM620X' PZM620          Get date & time                          04/06/93
     C                     Z-ADDPDATE     ZLDTMT                                                   04/06/93
     C                     Z-ADDPTIME     ZLTMMT                                                   04/06/93
     C                     UPDATFLOCCOM                                                            04/06/93
     C                     ENDIF                          *IN99=*OFF                               04/06/93
     C                     ENDIF                          QQFAIL='Y'                               04/06/93
     C*                                                                                            04/06/93
     C*  If this is a resend and the copy was successful                                           04/06/93
     C*  (QQFAIL = 'N'), update the local CE status to '55'.                                       04/06/93
     C*  The CE status is updated to '55' so that the response                                     04/06/93
     C*  written by the receiving transfer program can update                                      04/06/93
     C*  the CE status to complete.                                                                04/06/93
     C*                                                                                            04/06/93
     C           P$SEND    IFEQ 'R'                                                                04/06/93
     C           QQFAIL    ANDEQ'N'                                                                04/06/93
     C           P$CENO    CHAINLOCCOM               99                                            04/06/93
     C           *IN99     IFEQ *OFF                                                               04/06/93
     C                     MOVE '55'      ZLSTAT                                                   04/06/93
     C                     CALL 'MZM620X' PZM620          Get date & time                          04/06/93
     C                     Z-ADDPDATE     ZLDTMT                                                   04/06/93
     C                     Z-ADDPTIME     ZLTMMT                                                   04/06/93
     C                     UPDATFLOCCOM                                                            04/06/93
     C                     ENDIF                          *IN99=*OFF                               04/06/93
     C                     ENDIF                          P$SEND='N'                               04/06/93
     C*                                                                                            04/06/93
     C*  If all the transmission files were copied successfully                                    04/06/93
     C*  into the data transfer files, delete the transmission                                     04/06/93
     C*  files records.                                                                            04/06/93
     C*                                                                                            04/06/93
     C           QQFAIL    IFEQ 'N'                                                                04/06/93
     C                     EXSR LTRANP                                                             04/06/93
     C                     ENDIF                          QQFAIL='N'                               04/06/93
     C*                                                                                            01/16/93
     C                     ENDSR                          LTRAN        SRCE3                       01/16/93
     C/SPACE 2                                                                                     01/15/92
     C**********  LTRANP SUBR  **********************  LTRANP SUBR  *                              04/06/93
     C*                                                             *                              04/06/93
     C*   The LTRANP purges all records in the transmission files   *                              04/06/93
     C*   that were copied into the data transfer files successfully *                             04/16/93
     C*   for a local CE.                                           *  SRCE3                       04/16/93
     C*                                                             *  SRCE3                       04/16/93
     C**************************************************************  SRCE3                        04/06/93
     C*                                                             *  SRCE3                       04/06/93
     C*   INDICATORS USED   :  NONE                                 *  SRCE3                       04/06/93
     C*                                                             *  SRCE3                       04/06/93
     C*   EXECUTED FROM     :  LTRAN                                *  SRCE3                       04/06/93
     C*                                                             *  SRCE3                       04/06/93
     C**************************************************************  SRCE3                        04/06/93
     C*                                                                SRCE3                       04/06/93
     C           LTRANP    BEGSR                                                                   04/06/93
     C*                                                                                            04/06/93
     C*  Call program MMC010 to delete all records for the processed                               04/06/93
     C*  CE# in the transmission File ODTTRN in the entity files                                   04/06/93
```

```
     5738PW1 V2R2M0  920615                SEU SOURCE LISTING                        06/01/93 11:50:05              PAGE   14

SOURCE FILE . . . . . . .   XLIBEM/MRPGSRC
MEMBER  . . . . . . . . .   MMC462

SEQNBR*...+... 1 ...+... 2 ...+... 3 ...+... 4 ...+... 5 ...+... 6 ...+... 7 ...+... 8 ...+... 9 ...+... 0
69000      C*  library.                                                                                       04/06/93
69100      C*                                                                                                 04/06/93
69200      C                     MOVE EFFLIB    PLIB                                                          04/06/93
69300      C                     MOVEL'ODTTRN'  PFILE      P      Pad blanks                                  04/06/93
69400      C                     MOVEL'ODCENO'  PFLD       P      Pad blanks                                  04/06/93
69500      C                     MOVE P$CENO    PVALU                                                         04/06/93
69600      C                     MOVE *BLANKS   PERR                                                          04/06/93
69700      C*                                                                                                 04/06/93
69800      C                     CALL 'MMC010'  PMC010                                                        04/06/93
69900      C*                                                                                                 04/06/93
70000      C*  Call program MMC010 to delete all records for the processed                                    04/06/93
70100      C*  CE# in the transmission File OMSTRN in the entity files                                        04/06/93
70200      C*  library.                                                                                       04/06/93
70300      C*                                                                                                 04/06/93
70400      C                     MOVE EFFLIB    PLIB                                                          04/06/93
70500      C                     MOVEL'OMSTRN'  PFILE      P      Pad blanks                                  04/06/93
70600      C                     MOVEL'OMCENO'  PFLD       P      Pad blanks                                  04/06/93
70700      C                     MOVE P$CENO    PVALU                                                         04/06/93
70800      C                     MOVE *BLANKS   PERR                                                          04/06/93
70900      C*                                                                                                 04/06/93
71000      C                     CALL 'MMC010'  PMC010                                                        04/06/93
71100      C*                                                                                                 04/06/93
71200      C*  Call program MMC010 to delete all records for the processed                                    04/06/93
71300      C*  CE# in the transmission File OCHTRN in the entity files                                        04/06/93
71400      C*  library.                                                                                       04/06/93
71500      C*                                                                                                 04/06/93
71600      C                     MOVE EFFLIB    PLIB                                                          04/06/93
71700      C                     MOVEL'OCHTRN'  PFILE      P      Pad blanks                                  04/06/93
71800      C                     MOVEL'OGCENO'  PFLD       P      Pad blanks                                  04/06/93
71900      C                     MOVE P$CENO    PVALU                                                         04/06/93
72000      C                     MOVE *BLANKS   PERR                                                          04/06/93
72100      C*                                                                                                 04/06/93
72200      C                     CALL 'MMC010'  PMC010                                                        04/06/93
72300      C*                                                                                                 04/06/93
72400      C*  Call program MMC010 to delete all records for the processed                                    04/06/93
72500      C*  CE# in the transmission File ODSTRN in the entity files                                        04/06/93
72600      C*  library.                                                                                       04/06/93
72700      C*                                                                                                 04/06/93
72800      C                     MOVE EFFLIB    PLIB                                                          04/06/93
72900      C                     MOVEL'ODSTRN'  PFILE      P      Pad blanks                                  04/06/93
73000      C                     MOVEL'OICENO'  PFLD       P      Pad blanks                                  04/06/93
73100      C                     MOVE P$CENO    PVALU                                                         04/06/93
73200      C                     MOVE *BLANKS   PERR                                                          04/06/93
73300      C*                                                                                                 04/06/93
73400      C                     CALL 'MMC010'  PMC010                                                        04/06/93
73500      C*                                                                                                 04/06/93
73600      C*  Call program MMC010 to delete all records for the processed                                    04/06/93
73700      C*  CE# in the transmission File OCMTRN in the entity files                                        04/06/93
73800      C*  library.                                                                                       04/06/93
73900      C*                                                                                                 04/06/93
74000      C                     MOVE EFFLIB    PLIB                                                          04/06/93
74100      C                     MOVEL'OCMTRN'  PFILE      P      Pad blanks                                  04/06/93
74200      C                     MOVEL'OCCENO'  PFLD       P      Pad blanks                                  04/06/93
```

```
     5738PW1 V2R2M0  920615              SEU SOURCE LISTING                      06/01/93 11:50:05              PAGE   15

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
74300      C                   MOVE P$CENO    PVALU                                                04/06/93
74400      C                   MOVE *BLANKS   PERR                                                 04/06/93
74500      C*                                                                                      04/06/93
74600      C                   CALL 'MMC010'  PMC010                                               04/06/93
74700      C*                                                                                      04/06/93
74800      C*  Call program MMC010 to delete all records for the processed                         04/06/93
74900      C*  CE# in the transmission File OATTRN in the entity files                              04/06/93
75000      C*  library.                                                                            04/06/93
75100      C*                                                                                      04/06/93
75200      C                   MOVE EFFLIB    PLIB                                                 04/06/93
75300      C                   MOVEL'OATTRN'  PFILE     P      Pad blanks                          04/06/93
75400      C                   MOVEL'ORCENO'  PFLD      P      Pad blanks                          04/06/93
75500      C                   MOVE P$CENO    PVALU                                                04/06/93
75600      C                   MOVE *BLANKS   PERR                                                 04/06/93
75700      C*                                                                                      04/06/93
75800      C                   CALL 'MMC010'  PMC010                                               04/06/93
75900      C*                                                                                      04/06/93
76000      C*  Call program MMC010 to delete all records for the processed                         04/06/93
76100      C*  CE# in the transmission File OADTRN in the entity files                              04/06/93
76200      C*  library.                                                                            04/06/93
76300      C*                                                                                      04/06/93
76400      C                   MOVE EFFLIB    PLIB                                                 04/06/93
76500      C                   MOVEL'OADTRN'  PFILE     P      Pad blanks                          04/06/93
76600      C                   MOVEL'OACENO'  PFLD      P      Pad blanks                          04/06/93
76700      C                   MOVE P$CENO    PVALU                                                04/06/93
76800      C                   MOVE *BLANKS   PERR                                                 04/06/93
76900      C*                                                                                      04/06/93
77000      C                   CALL 'MMC010'  PMC010                                               04/06/93
77100      C*                                                                                      04/06/93
77200      C*  Call program MMC010 to delete all records for the processed                         04/06/93
77300      C*  CE# in the transmission File OCSTRN in the entity files                              04/06/93
77400      C*  library.                                                                            04/06/93
77500      C*                                                                                      04/06/93
77600      C                   MOVE EFFLIB    PLIB                                                 04/06/93
77700      C                   MOVEL'OCSTRN'  PFILE     P      Pad blanks                          04/06/93
77800      C                   MOVEL'OUCENO'  PFLD      P      Pad blanks                          04/06/93
77900      C                   MOVE P$CENO    PVALU                                                04/06/93
78000      C                   MOVE *BLANKS   PERR                                                 04/06/93
78100      C*                                                                                      04/06/93
78200      C                   CALL 'MMC010'  PMC010                                               04/06/93
78300      C*                                                                                      04/06/93
78400      C*  Call program MMC010 to delete all records for the processed                         04/06/93
78500      C*  CE# in the transmission File OPMTRN in the entity files                              04/06/93
78600      C*  library.                                                                            04/06/93
78700      C*                                                                                      04/06/93
78800      C                   MOVE EFFLIB    PLIB                                                 04/06/93
78900      C                   MOVEL'OPMTRN'  PFILE     P      Pad blanks                          04/06/93
79000      C                   MOVEL'ONCENO'  PFLD      P      Pad blanks                          04/06/93
79100      C                   MOVE P$CENO    PVALU                                                04/06/93
79200      C                   MOVE *BLANKS   PERR                                                 04/06/93
79300      C*                                                                                      04/06/93
79400      C                   CALL 'MMC010'  PMC010                                               04/06/93
79500      C*                                                                                      04/06/93
```

```
     5738PW1 V2R2M0  920615                SEU SOURCE LISTING                       06/01/93 11:50:05              PAGE   16

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
79600      C*  Call program MMC010 to delete all records for the processed                                     04/06/93
79700      C*  CE# in the transmission File COPTRN in the entity files                                         04/06/93
79800      C*  library.                                                                                        04/06/93
79900      C*                                                                                                  04/06/93
80000      C                   MOVE EFFLIB    PLIB                                                             04/06/93
80100      C                   MOVEL'COPTRN'  PFILE     P      Pad blanks                                      04/06/93
80200      C                   MOVEL'OOCENO'  PFLD      P      Pad blanks                                      04/06/93
80300      C                   MOVE P$CENO    PVALU                                                            04/06/93
80400      C                   MOVE *BLANKS   PERR                                                             04/06/93
80500      C*                                                                                                  04/06/93
80600      C                   CALL 'MMC010'  PMC010                                                           04/06/93
80700      C*                                                                                                  04/06/93
80800      C                   ENDSR                          LTRANP         SRCE3                             04/06/93
80900      C*                                                                                                  04/06/93
81000      C/SPACE 2                                                                                           04/06/93
81100      C********** RSEND  SUBR  *********************** RSEND  SUBR  *                                     01/15/92
81200      C*                                                             *                                    01/15/92
81300      C*   The RSEND  handles sending of data for a remote CE.       *                                    04/16/93
81400      C*   It loads all required parameters into MCGNR DS and        *                                    04/16/93
81500      C*   calls Generic Transfer Procedure with MCGNR passed as     *                                    04/16/93
81600      C*   a parameter.  The name of the Generic Transfer Procedure  *                                    01/15/92
81700      C*   is passed to this program in PGNRC.                       *                                    01/15/92
81800      C*                                                             *  SRCE3                             04/06/93
81900      C***************************************************************  SRCE3                             04/06/93
82000      C*                                                             *  SRCE3                             04/06/93
82100      C*   INDICATORS USED  :  99                                    *  SRCE3                             04/06/93
82200      C*                                                             *  SRCE3                             04/06/93
82300      C*   EXECUTED FROM    :  MAINLN                                *  SRCE3                             04/06/93
82400      C*                                                             *  SRCE3                             04/06/93
82500      C***************************************************************  SRCE3                             04/06/93
82600      C*                                                                SRCE3                             04/06/93
82700      C           RSEND     BEGSR                                                                         01/15/92
82800      C*                                                                                                  01/15/92
82900      C*  This DO loop is executed only once; it is used to control the                                   01/16/92
83000      C*  flow of the subroutine.  If the expected information is                                         01/16/92
83100      C*  missing in REMCOM or SYSXRF the program skips out to the end                                    01/16/92
83200      C*  of the routine without calling generic transfer procedure.                                      01/16/92
83300      C*                                                                                                  01/16/92
83400      C                   DO                                                                              04/16/93
83500      C*                                                                                                  02/11/92
83600      C*                                                                                                  01/16/92
83700      C*  Clear the data structure before loading it.                                                     01/16/92
83800      C*                                                                                                  01/16/92
83900      C                   CLEAR$MCGNR                                                                     01/16/92
84000      C*                                                                                                  01/16/92
84100      C*  The selection value is the CE# passed to this program and its                                   01/16/92
84200      C*  length is 15 positions.                                                                         01/25/93
84300      C*                                                                                                  01/16/92
84400      C                   MOVE P$CENO    $SVALA                                                           09/11/92
84500      C                   MOVE P$CENO    $CENO                                                            09/11/92
84600      C                   MOVE '15'      $SFLA                                                            01/15/92
84700      C                   MOVE P$SEND    $SEND                                                            09/11/92
84800      C*                                                                                                  01/25/93
```

```
     5738PW1 V2R2M0  920615              SEU SOURCE LISTING                        06/01/93 11:50:05 -           PAGE   17

SOURCE FILE . . . . . . .   XLIBEM/MRPGSRC
MEMBER  . . . . . . . . .   MMC462

SEQNBR*...+... 1 ...+... 2 ...+... 3 ...+... 4 ...+... 5 ...+... 6 ...+... 7 ...+... 8 ...+... 9 ...+... 0
84900      C*  Load Distribute/Redistribute byte with 'D'.                                                    01/25/93
85000      C*                                                                                                 02/11/92
85100      C                     MOVE 'D'       $DORR                                                         01/25/93
85200      C*                                                                                                 02/11/92
85300      C*  If sending for the first time the extract files need to be                                     02/11/92
85400      C*  loaded; if resending, the extract files may or may not have                                    02/11/92
85500      C*  been loaded already, depending on the status.                                                  02/11/92
85600      C*                                                                                                 02/11/92
85700      C                     MOVE 'N'       $LDEXT                                                        03/18/92
85800      C          P$SEND     IFEQ 'S'                                                                     09/11/92
85900      C                     MOVE 'Y'       $LDEXT                                                        01/15/92
86000      C                     ENDIF                            P$SEND='S'                                  09/11/92
86100      C*                                                                                                 01/15/92
86200      C          P$SEND     IFEQ 'R'                                                                     09/11/92
86300      C          ZMSTAT     ANDEQ'42'                                                                    01/15/92
86400      C                     MOVE 'Y'       $LDEXT                                                        01/15/92
86500      C                     ENDIF                            P$SEND='R'                                  09/11/92
86600      C*                                                                                                 01/25/93
86700      C*  All source files involved reside in the same entity files                                      01/25/93
86800      C*  library (EFFLIB) found in ENTFIL.                                                              03/23/93
86900      C*                                                                                                 01/25/93
87000      C          ZMOREN     CHAINENTFIL               99                                                 01/25/93
87100      C          *IN99      IFEQ *ON                                                                     01/25/93
87200      C                     LEAVE                                                                        01/25/93
87300      C                     ENDIF                            *IN99=*ON                                   01/25/93
87400      C*                                                                                                 01/25/93
87500      C*  To get the extract and the target library names CHAIN to                                       01/16/92
87600      C*  SYSXRF to retrieve FXELIB and FXDLIB.                                                          03/23/93
87700      C*  If the Cross-Reference record is missing, then give REMCOM                                     03/23/93
87800      C*  status '65' and do not call the generic transfer pgm.                                          03/23/93
87900      C*  Return an error code of '4' to the calling processor.                                          11/22/92
88000      C*                                                                                                 02/11/92
88100      C                     MOVE CQSYS     KLSYS                                                         03/18/92
88200      C                     MOVE ZMSYS     KTSYS                                                         01/15/92
88300      C          KSYSXR     CHAINSYSXRF               99                                                 01/16/92
88400      C          *IN99      IFEQ *ON                                                                     01/16/92
88500      C          P$CENO     CHAINREMCOM               99                                                 09/11/92
88600      C          *IN99      IFEQ *OFF                                                                    02/27/92
88700      C                     MOVE '65'      ZMSTAT                                                        02/11/92
88800      C                     UPDATFREMCOM                                                                 02/11/92
88900      C                     ENDIF                            *IN99=*OFF                                  02/27/92
89000      C                     MOVE '4'       P$ERR                                                         11/22/92
89100      C                     LEAVE                                                                        01/16/92
89200      C                     ENDIF                            *IN99=*ON                                   01/16/92
89300      C*                                                                                                 03/23/93
89400      C*                                                                                                 03/23/93
89500      C*  Load data for the Order Detail Transmission File ODTTRN.                                       03/23/93
89600      C*                                                                                                 03/23/93
89700      C                     MOVE 'ODCENO'  $SFLD1            Selection fl                                03/23/93
89800      C                     MOVE 'ODCENO'  $CEF1             CE# field                                   03/23/93
89900      C*                                                                                                 03/23/93
90000      C                     MOVEL'ODTTRN'  $SCEF1            Source file                                 03/23/93
90100      C                     MOVE EFFLIB    $SCEL1            Source lib                                  03/23/93
```

```
5738PW1 V2R2M0  920615                SEU SOURCE LISTING                      06/01/93 11:50:05           PAGE   18

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
90200      C*                                                                                        02/27/92
90300      C                 MOVEL'EXODET'  $EXTF1          Extract file                             03/23/93
90400      C                 MOVE FXELIB    $EXTL1          Extract lib                              03/23/93
90500      C*                                                                                        01/15/92
90600      C                 MOVEL'DTODET'  $TGTF1          Target file                              01/25/93
90700      C                 MOVE FXDLIB    $TGTL1          Target lib                               01/25/93
90800      C*                                                                                        01/15/92
90900      C*                                                                                        03/23/93
91000      C*  Load data for the Order Master Transmission File OMSTRN.                                03/23/93
91100      C*                                                                                        03/23/93
91200      C                 MOVE 'OMCENO'  $SFLD2          Selection fl                             03/23/93
91300      C                 MOVE 'OMCENO'  $CEF2           CE# field                                03/23/93
91400      C*                                                                                        03/23/93
91500      C                 MOVEL'OMSTRN'  $SCEF2          Source file                              03/23/93
91600      C                 MOVE EFFLIB    $SCEL2          Source lib                               03/23/93
91700      C*                                                                                        03/23/93
91800      C                 MOVEL'EXOMST'  $EXTF2          Extract file                             03/23/93
91900      C                 MOVE FXELIB    $EXTL2          Extract lib                              03/23/93
92000      C*                                                                                        03/23/93
92100      C                 MOVEL'DTOMST'  $TGTF2          Target file                              03/23/93
92200      C                 MOVE FXDLIB    $TGTL2          Target lib                               03/23/93
92300      C*                                                                                        03/23/93
92400      C*                                                                                        03/23/93
92500      C*  Load data for the Order Charge Transmission File OCHTRN.                                03/23/93
92600      C*                                                                                        03/23/93
92700      C                 MOVE 'OGCENO'  $SFLD3          Selection fl                             03/23/93
92800      C                 MOVE 'OGCENO'  $CEF3           CE# field                                03/23/93
92900      C*                                                                                        03/23/93
93000      C                 MOVEL'OCHTRN'  $SCEF3          Source file                              03/23/93
93100      C                 MOVE EFFLIB    $SCEL3          Source lib                               03/23/93
93200      C*                                                                                        03/23/93
93300      C                 MOVEL'EXOCHT'  $EXTF3          Extract file                             04/08/93
93400      C                 MOVE FXELIB    $EXTL3          Extract lib                              03/23/93
93500      C*                                                                                        03/23/93
93600      C                 MOVEL'DTOCHT'  $TGTF3          Target file                              04/06/93
93700      C                 MOVE FXDLIB    $TGTL3          Target lib                               03/23/93
93800      C*                                                                                        03/23/93
93900      C*                                                                                        03/23/93
94000      C*  Load data for the Order Discount Transmission File ODSTRN.                              03/23/93
94100      C*                                                                                        03/23/93
94200      C                 MOVE 'OICENO'  $SFLD4          Selection fl                             03/23/93
94300      C                 MOVE 'OICENO'  $CEF4           CE# field                                03/23/93
94400      C*                                                                                        03/23/93
94500      C                 MOVEL'ODSTRN'  $SCEF4          Source file                              03/23/93
94600      C                 MOVE EFFLIB    $SCEL4          Source lib                               03/23/93
94700      C*                                                                                        03/23/93
94800      C                 MOVEL'EXODST'  $EXTF4          Extract file                             04/08/93
94900      C                 MOVE FXELIB    $EXTL4          Extract lib                              03/23/93
95000      C*                                                                                        03/23/93
95100      C                 MOVEL'DTODST'  $TGTF4          Target file                              04/06/93
95200      C                 MOVE FXDLIB    $TGTL4          Target lib                               03/23/93
95300      C*                                                                                        03/23/93
95400      C*                                                                                        03/24/93
```

```
     5738PW1 V2R2M0  920615              SEU SOURCE LISTING                    06/01/93 11:50:05             PAGE   19

SOURCE FILE . . . . . . .  XLIBEM/MRPGSRC
MEMBER  . . . . . . . . .  MMC462

SEQNBR*...+... 1 ...+... 2 ...+... 3 ...+... 4 ...+... 5 ...+... 6 ...+... 7 ...+... 8 ...+... 9 ...+... 0
 95500      C*  Load data for the Order Comment Transmission File OCMTRN.                                  03/24/93
 95600      C*                                                                                             03/24/93
 95700      C                    MOVE 'OCCENO'  $SFLD5          Selection fl                               03/24/93
 95800      C                    MOVE 'OCCENO'  $CEF5           CE# field                                  03/24/93
 95900      C*                                                                                             03/24/93
 96000      C                    MOVEL'OCMTRN'  $SCEF5          Source file                                03/24/93
 96100      C                    MOVE EFFLIB    $SCEL5          Source lib                                 03/24/93
 96200      C*                                                                                             03/24/93
 96300      C                    MOVEL'EXOCMT'  $EXTF5          Extract file                               04/08/93
 96400      C                    MOVE FXELIB    $EXTL5          Extract lib                                03/24/93
 96500      C*                                                                                             03/24/93
 96600      C                    MOVEL'DTOCMT'  $TGTF5          Target file                                04/06/93
 96700      C                    MOVE FXDLIB    $TGTL5          Target lib                                 03/24/93
 96800      C*                                                                                             03/24/93
 96900      C*                                                                                             03/24/93
 97000      C*  Load data for the Order Attribute Override Transmission File                                03/24/93
 97100      C*  OATTRN.                                                                                    03/24/93
 97200      C                    MOVE 'ORCENO'  $SFLD6          Selection fl                               03/24/93
 97300      C                    MOVE 'ORCENO'  $CEF6           CE# field                                  03/24/93
 97400      C*                                                                                             03/24/93
 97500      C                    MOVEL'OATTRN'  $SCEF6          Source file                                03/24/93
 97600      C                    MOVE EFFLIB    $SCEL6          Source lib                                 03/24/93
 97700      C*                                                                                             03/24/93
 97800      C                    MOVEL'EXOATT'  $EXTF6          Extract file                               04/08/93
 97900      C                    MOVE FXELIB    $EXTL6          Extract lib                                03/24/93
 98000      C*                                                                                             03/24/93
 98100      C                    MOVEL'DTOATT'  $TGTF6          Target file                                04/06/93
 98200      C                    MOVE FXDLIB    $TGTL6          Target lib                                 03/24/93
 98300      C*                                                                                             03/24/93
 98400      C*                                                                                             03/24/93
 98500      C*  Load data for the Order Address Override Transmission File                                  03/24/93
 98600      C*  OADTRN.                                                                                    03/24/93
 98700      C                    MOVE 'OACENO'  $SFLD7          Selection fl                               03/24/93
 98800      C                    MOVE 'OACENO'  $CEF7           CE# field                                  03/24/93
 98900      C*                                                                                             03/24/93
 99000      C                    MOVEL'OADTRN'  $SCEF7          Source file                                03/24/93
 99100      C                    MOVE EFFLIB    $SCEL7          Source lib                                 03/24/93
 99200      C*                                                                                             03/24/93
 99300      C                    MOVEL'EXOADT'  $EXTF7          Extract file                               04/08/93
 99400      C                    MOVE FXELIB    $EXTL7          Extract lib                                03/24/93
 99500      C*                                                                                             03/24/93
 99600      C                    MOVEL'DTOADT'  $TGTF7          Target file                                04/06/93
 99700      C                    MOVE FXDLIB    $TGTL7          Target lib                                 03/24/93
 99800      C*                                                                                             03/24/93
 99900      C*                                                                                             03/24/93
100000      C*  Load data for the Customer Attibuter Override Transmission                                 03/24/93
100100      C*  File OCSTRN.                                                                               03/24/93
100200      C                    MOVE 'OUCENO'  $SFLD8          Selection fl                               03/24/93
100300      C                    MOVE 'OUCENO'  $CEF8           CE# field                                  03/24/93
100400      C*                                                                                             03/24/93
100500      C                    MOVEL'OCSTRN'  $SCEF8          Source file                                03/24/93
100600      C                    MOVE EFFLIB    $SCEL8          Source lib                                 03/24/93
100700      C*                                                                                             03/24/93
```

```
      5738PW1 V2R2M0  920615                SEU SOURCE LISTING                      06/01/93 11:50:05              PAGE   20

 SOURCE FILE . . . . . . .   XLIBEM/MRPGSRC
 MEMBER  . . . . . . . . .   MMC462

 SEQNBR*...+... 1 ...+... 2 ...+... 3 ...+... 4 ...+... 5 ...+... 6 ...+... 7 ...+... 8 ...+... 9 ...+... 0
 100800      C                    MOVEL'EXOCST'  $EXTF8          Extract file                              04/08/93
 100900      C                    MOVE FXELIB    $EXTL8          Extract lib                               03/24/93
 101000      C*                                                                                            03/24/93
 101100      C                    MOVEL'DTOCST'  $TGTF8          Target file                               04/06/93
 101200      C                    MOVE FXDLIB    $TGTL8          Target lib                                03/24/93
 101300      C*                                                                                            03/24/93
 101400      C*                                                                                            03/24/93
 101500      C*  Load data for the Order Promotion Transmission File OPMTRN.                               03/24/93
 101600      C*                                                                                            03/24/93
 101700      C                    MOVE 'ONCENO'  $SFLD9          Selection fl                              03/24/93
 101800      C                    MOVE 'ONCENO'  $CEF9           CE# field                                 03/24/93
 101900      C*                                                                                            03/24/93
 102000      C                    MOVEL'OPMTRN'  $SCEF9          Source file                               03/24/93
 102100      C                    MOVE EFFLIB    $SCEL9          Source lib                                03/24/93
 102200      C*                                                                                            03/24/93
 102300      C                    MOVEL'EXOPMT'  $EXTF9          Extract file                              04/08/93
 102400      C                    MOVE FXELIB    $EXTL9          Extract lib                               03/24/93
 102500      C*                                                                                            03/24/93
 102600      C                    MOVEL'DTOPMT'  $TGTF9          Target file                               04/06/93
 102700      C                    MOVE FXDLIB    $TGTL9          Target lib                                03/24/93
 102800      C*                                                                                            03/24/93
 102900      C*                                                                                            03/24/93
 103000      C*  Load data for the Generic COP Transmission File COPTRN.                                   03/24/93
 103100      C*                                                                                            03/24/93
 103200      C                    MOVE 'OOCENO'  $SFLD0          Selection fl                              03/24/93
 103300      C                    MOVE 'OOCENO'  $CEF0           CE# field                                 03/24/93
 103400      C*                                                                                            03/24/93
 103500      C                    MOVEL'COPTRN'  $SCEF0          Source file                               03/24/93
 103600      C                    MOVE EFFLIB    $SCEL0          Source lib                                03/24/93
 103700      C*                                                                                            03/24/93
 103800      C                    MOVEL'EXCOPT'  $EXTF0          Extract file                              03/24/93
 103900      C                    MOVE FXELIB    $EXTL0          Extract lib                               03/24/93
 104000      C*                                                                                            03/24/93
 104100      C                    MOVEL'DTCOPT'  $TGTF0          Target file                               03/24/93
 104200      C                    MOVE FXDLIB    $TGTL0          Target lib                                03/24/93
 104300      C*                                                                                            03/24/93
 104400      C*                                                                                            03/23/93
 104500      C*                                                                                            03/23/93
 104600      C*  The transmission should be Remote, Distributed File type, and                             01/16/92
 104700      C*  CE# should be deleted in source file when done.                                           01/27/93
 104800      C*                                                                                            01/16/92
 104900      C                    MOVE 'R'       $RORL                                                     01/15/92
 105000      C                    MOVE 'DF'      $TYPE                                                     01/15/92
 105100      C                    MOVE 'D'       $DORB                                                     01/27/93
 105200      C*                                                                                            01/15/92
 105300      C*  Call the Generic Transfer Procedure (the name is passed to                                01/16/92
 105400      C*  this program).  Pass the value of the error code received                                 03/11/92
 105500      C*  to the calling program.                                                                   03/11/92
 105600      C*                                                                                            03/11/92
 105700      C                    CALL P$GNRC    PGNRTR                                                    09/11/92
 105800      C                    MOVE PERROR    P$ERR                                                     09/11/92
 105900      C*                                                                                            01/15/92
 106000      C                    ENDDO                          DO once                                   04/16/93
```

```
     5738PW1 V2R2M0  920615              SEU SOURCE LISTING                    06/01/93 11:50:05          PAGE   21

 SOURCE FILE . . . . . . .  XLIBEM/MRPGSRC
 MEMBER  . . . . . . . . .  MMC462

 SEQNBR*...+... 1 ...+... 2 ...+... 3 ...+... 4 ...+... 5 ...+... 6 ...+... 7 ...+... 8 ...+... 9 ...+... 0
106100      C*                                                                                          01/15/92
106200      C                  ENDSR                        RSEND         SRCE3                         01/15/92
106300      C*                                                                                          01/15/92

                            * * * *  E N D  O F  S O U R C E  * * * *
```

```
 5738PW1 V2R2M0  920615              SEU SOURCE LISTING                      06/01/93 11:50:28              PAGE    1

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
     H*****************************************************************                01/17/92
     H*                                                               *                01/17/92
     H*         Release - 03         Mod Level - 10                   *                06/26/92
     H*   THIS UNPUBLISHED COPYRIGHTED WORK CONTAINS TRADE SECRET     *                01/17/92
     H*   INFORMATION OF MARCAM CORPORATION.  USE, TRANSFER,          *                01/17/92
     H*   DISCLOSURE, OR COPYING WITHOUT ITS EXPRESSED WRITTEN        *                01/17/92
     H*   PERMISSION IS STRICTLY FORBIDDEN.                1993       *                06/26/92
     H*                                                               *                01/17/92
     H*   MODULE:              Enterprise Management                  *                01/17/92
     H*                                                               *                01/17/92
     H*   PROGRAM NAME:        MMC464 - Customer Order File           *                01/26/93
     H*                                 Receiving Transfer Program    *                01/17/92
     H*                                                               *                01/17/92
     H*   FUNCTION:            Receives data from Data Transfer Files *                01/26/93
     H*                        in Communications Files Library to     *                01/26/93
     H*                        the entity-level Customer Order Batch  *                01/26/93
     H*                        Files; issues a response record;       *                04/07/93
     H*                        retrieves values to pass back to       *                04/07/93
     H*                        MMC464X that are needed for Batch      *                04/07/93
     H*                        Order Entry.                           *                04/07/93
     H*                                                               *                01/26/93
     H*   CALLING PROGRAM:     MMC464X - Customer Order Files Receiving*               04/07/93
     H*                                  Xref Procedure.              *                04/07/93
     H*                                                               *                02/17/92
     H*   CALLED PROGRAM:      MMC300 - Write Local 'STSF' Response   *                10/13/92
     H*                                 Program.                      *                10/13/92
     H*                        MZM100 - Date Conversion Program       *                04/06/93
     H*                        MZM620X- Current Date and Time Retrieval*               04/06/93
     H*                                 Program                       *                04/06/93
     H*                                                               *                01/26/93
     H*   /COPY CODE:          NONE                                   *                04/07/92
     H*                                                               *                01/17/92
     H*****************************************************************                01/17/92
     H*               P R O G R A M   D E S C R I P T I O N           *                01/17/92
     H*****************************************************************                01/17/92
     H*                                                               *                01/17/92
     H*  This program is the Customer Order File Receiving Transfer   *                01/26/93
     H*  Program.  The program copies records marked with the CE#     *                05/01/91
     H*  passed from the Data Transfer Files to the entity-level      *                01/26/93
     H*  Customer Order Batch files.  (Note: the CL procedure adds    *                04/07/93
     H*  the Entity Files Library to the library list before this     *                04/07/93
     H*  program is called, so no overrides are needed for access to *                 04/07/93
     H*  Customer Order Batch files.)  Then, the program clears the   *                04/07/93
     H*  Data Transfer Files and calls Write Local Response Program   *                04/07/93
     H*  to issue a local response.  Finally, the following values    *                04/07/93
     H*  are retrieved to be passed back to the CL procedure for      *                04/07/93
     H*  the use by Batch Order Entry: COM installed and interfaced   *                04/07/93
     H*  byte, local entity, date format and current system date.     *                04/07/93
     H*  The program ends from mainline.                              *                04/07/93
     H*                                                               *                01/17/92
     H*****************************************************************                01/17/92
     H/SPACE 3                                                                         01/17/92
     F*****************************************************************                01/17/92
```

```
     5738PW1 V2R2M0  920615              SEU SOURCE LISTING                06/01/93 11:50:28          PAGE    2

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
  5400     F*          F U N C T I O N   O F   I N D I C A T O R S          *                         01/17/92
  5500     F*****************************************************************                         01/17/92
  5600     F*                                                               *                         01/26/93
  5700     F*   98 - General Indicator                                      *                         04/13/92
  5800     F*   99 - General Indicator                                      *                         04/13/92
  5900     F*                                                               *                         01/26/93
  6000     F*****************************************************************                         01/17/92
  6100     F/SPACE 2                                                                                  01/17/92
  6200     F*****************************************************************                         01/17/92
  6300     F*                                                               *                         01/17/92
  6400     F*                        FILE SPECIFICATIONS                    *                         01/17/92
  6500     F*                                                               *                         01/17/92
  6600     F*****************************************************************                         01/17/92
  6700     F*                                                                                         03/26/93
  6800     F*  COP Batch Files                                                                        03/30/93
  6900     F*                                                                                         03/30/93
  7000     FBCHADS  UF  E           K        DISK                          A                          04/07/93
  7100     F/SPACE 2                                                                                  03/30/93
  7200     FBCHATR  UF  E           K        DISK                          A                          04/07/93
  7300     F/SPACE 2                                                                                  03/30/93
  7400     FBCHCHG  UF  E           K        DISK                          A                          04/07/93
  7500     F/SPACE 2                                                                                  03/30/93
  7600     FBCHCOM  UF  E           K        DISK                          A                          04/07/93
  7700     F/SPACE 2                                                                                  03/30/93
  7800     FBCHCUS  UF  E           K        DISK                          A                          04/07/93
  7900     F/SPACE 2                                                                                  03/30/93
  8000     FBCHDET  UF  E           K        DISK                          A                          04/07/93
  8100     F/SPACE 2                                                                                  03/30/93
  8200     FBCHDIS  UF  E           K        DISK                          A                          04/07/93
  8300     F/SPACE 2                                                                                  03/30/93
  8400     FBCHMST  UF  E           K        DISK                          A                          04/07/93
  8500     F/SPACE 2                                                                                  03/30/93
  8600     FBCHPRM  UF  E           K        DISK                          A                          04/07/93
  8700     F/SPACE 2                                                                                  03/30/93
  8800     F*                                                                                         03/30/93
  8900     F*   COP Data Transfer Files                                                               03/26/93
  9000     F*                                                                                         03/26/93
  9100     FDTCOPTCEUF  E           K        DISK                                                     03/26/93
  9200     F/SPACE 2                                                                                  03/26/93
  9300     FDTOADTCEUF  E           K        DISK                                                     03/31/93
  9400     F/SPACE 2                                                                                  03/26/93
  9500     FDTOATTCEUF  E           K        DISK                                                     03/31/93
  9600     F/SPACE 2                                                                                  03/26/93
  9700     FDTOCHTCEUF  E           K        DISK                                                     03/31/93
  9800     F/SPACE 2                                                                                  03/26/93
  9900     FDTOCMTCEUF  E           K        DISK                                                     03/31/93
 10000     F/SPACE 2                                                                                  03/26/93
 10100     FDTOCSTCEUF  E           K        DISK                                                     03/31/93
 10200     F/SPACE 2                                                                                  03/26/93
 10300     FDTODETCEUF  E           K        DISK                                                     03/26/93
 10400     F/SPACE 2                                                                                  03/26/93
 10500     FDTODSTCEUF  E           K        DISK                                                     03/31/93
 10600     F/SPACE 2                                                                                  03/26/93
```

```
     5738PW1 V2R2M0  920615              SEU SOURCE LISTING                    06/01/93 11:50:28          PAGE    3

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
10700       FDTOMST  IF  E             K        DISK                                                        03/31/93
10800       F/SPACE 2                                                                                       03/31/93
10900       FDTOMSTCEUF  E             K        DISK                                                        03/31/93
11000       F            FDTOMST                             KRENAMEFDTOMS1                                 03/31/93
11100       F/SPACE 2                                                                                       03/26/93
11200       FDTOPMTCEUF  E             K        DISK                                                        03/31/93
11300       F/SPACE 2                                                                                       03/26/92
11400       F*                                                                                              03/31/93
11500       F*  Entity Definition File                                                                      03/31/93
11600       F*                                                                                              03/31/93
11700       FENTFIL  IF  E             K        DISK                                                        03/31/93
11800       F/SPACE 2                                                                                       03/31/93
11900       F*                                                                                              04/06/93
12000       F*  Module Interface File                                                                       04/06/93
12100       F*                                                                                              04/06/93
12200       FINTFAC  IF  E             K        DISK                                                        04/06/93
12300       F/SPACE 2                                                                                       04/06/93
12400       F*                                                                                              03/31/93
12500       F*  Local Communications Entry File                                                             03/31/93
12600       F*                                                                                              03/31/93
12700       FLOCCOM  IF  E             K        DISK                                                        03/26/93
12800       F/SPACE 2                                                                                       03/29/93
12900       F*                                                                                              05/26/93
13000       F*  Order Address File                                                                          05/26/93
13100       F*                                                                                              05/26/93
13200       FORDADS  IF  E             K        DISK                                                        05/26/93
13300       F*                                                                                              05/26/93
13400       F*  Order Attribute File                                                                        05/26/93
13500       F*                                                                                              05/26/93
13600       FORDATR  IF  E             K        DISK                                                        05/26/93
13700       F*                                                                                              05/26/93
13800       F*  Order Special Charge File                                                                   05/26/93
13900       F*                                                                                              05/26/93
14000       FORDCHG  IF  E             K        DISK                                                        05/26/93
14100       F*                                                                                              05/26/93
14200       F*  Order Comment File                                                                          05/26/93
14300       F*                                                                                              05/26/93
14400       FORDCOM  IF  E             K        DISK                                                        05/26/93
14500       F*                                                                                              05/26/93
14600       F*  Customer Attributes File                                                                    05/26/93
14700       F*                                                                                              05/26/93
14800       FORDCUS  IF  E             K        DISK                                                        05/26/93
14900       F*                                                                                              05/26/93
15000       F*  Order Detail File                                                                           05/26/93
15100       F*                                                                                              05/26/93
15200       FORDDET  IF  E             K        DISK                                                        05/26/93
15300       F*                                                                                              05/26/93
15400       F*  Order Discount File                                                                         05/26/93
15500       F*                                                                                              05/26/93
15600       FORDDIS  IF  E             K        DISK                                                        05/26/93
15700       F*                                                                                              03/31/93
15800       F*  Order Master File                                                                           03/31/93
15900       F*                                                                                              03/31/93
```

```
 5738PW1 V2R2M0  920615             SEU SOURCE LISTING                  06/01/93 11:50:28          PAGE    4

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
16000      FORDMST  IF  E           K        DISK                                                         03/31/93
16100      F*                                                                                             05/26/93
16200      F*  Order Promotion File                                                                       05/26/93
16300      F*                                                                                             05/26/93
16400      FORDPRM  IF  E           K        DISK                                                         05/26/93
16500      F/SPACE 2                                                                                      03/31/93
16600      F/SPACE 2                                                                                      04/06/93
16700      F*                                                                                             04/06/93
16800      F*  Cross-Applications Tailoring File                                                          04/06/93
16900      F*                                                                                             04/06/93
17000      FTALFLZ  IF  E                    DISK                                                         04/06/93
17100      F/SPACE 3                                                                                      01/17/92
17200      I*****************************************************************                             01/17/92
17300      I*                                                              *                              01/17/92
17400      I*                      INPUT SPECIFICATIONS                    *                              01/17/92
17500      I*                                                              *                              01/26/93
17600      I*****************************************************************                             01/26/93
17700      C/SPACE 3                                                                                      04/07/93
17800      C*****************************************************************                             01/17/92
17900      C*                                                              *                              01/17/92
18000      C*                       CALCULATION SPECS                      *                              01/17/92
18100      C*                                                              *                              01/17/92
18200      C*****************************************************************                             01/17/92
18300      C*                                                              *                              01/17/92
18400      C*****************************************************************                             01/17/92
18500      C*                        M A I N L I N E                       *                              01/17/92
18600      C*****************************************************************                             01/17/92
18700      C*                                                              *                              01/17/92
18800      C*   The MAINLINE is executed once.  It defines a PLIST with    *                              01/17/92
18900      C*   two parameters.  *INZSR is automatically executed after    *                              09/18/92
19000      C*   PLIST is received and performs initialization.             *                              01/17/92
19100      C*   First, LOCCOM is accessed with a given CE#.  Then,         *                              04/07/93
19200      C*   COPYF subroutine is executed to upload records from        *                              04/07/93
19300      C*   COP data transfer files to batch files.                    *                              04/07/93
19400      C*   Then MMC300 is called to write a local response.           *                              04/07/93
19500      C*   Then LDPARM subroutine is executed to retrieve parameters  *                              04/16/93
19600      C*   to be passed back to the calling CL procedure.             *                              04/16/93
19700      C*   Then LR is seton and the program ends from mainline.       *                              10/27/92
19800      C*                                                              *   SRCE3                      04/09/93
19900      C*****************************************************************  SRCE3                      04/09/93
20000      C*                                                              *   SRCE3                      04/09/93
20100      C*   INDICATORS USED  :  LR  99                                 *   SRCE3                      04/09/93
20200      C*                                                              *   SRCE3                      04/09/93
20300      C*   EXECUTES         :  COPYFL  LDPARM                         *   SRCE3                      04/09/93
20400      C*                                                              *   SRCE3                      04/09/93
20500      C*****************************************************************  SRCE3                      04/09/93
20600      C*                                                                                             04/09/93
20700      C*   The program receives one parameter CE# and returns four                                   04/09/93
20800      C*   parameters: COM installed and interfaced byte, Local Entity                               04/09/93
20900      C*   name, date format, and current system date.                                               04/09/93
21000      C*                                                                  SRCE3                      04/09/93
21100      C          *ENTRY    PLIST                                                                     01/17/92
21200      C                    PARM           P$CENO                                                     09/18/92
```

```
     5738PW1 V2R2M0  920615                  SEU SOURCE LISTING                      06/01/93 11:50:28                PAGE    5

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
21300      C                    PARM           P$COM                                                       04/02/93
21400      C                    PARM           P$ENT                                                       04/02/93
21500      C                    PARM           P$DFMT                                                      04/02/93
21600      C                    PARM           P$DATE                                                      04/02/93
21700      C*                                                                                              01/21/92
21800      C                    MOVE P$CENO    QQCENO                                                      09/18/92
21900      C          QQCENO    CHAINLOCCOM               99                                               04/07/92
22000      C          *IN99     IFEQ *OFF                                                                  01/21/92
22100      C*                                                                                              03/26/93
22200      C*   Records for the passed CE# in COP files should be copied to                                03/26/93
22300      C*   the batch files in the Entity Files Library.                                               04/07/93
22400      C*                                                                                              03/26/93
22500      C                    EXSR COPYFL                                                                01/18/92
22600      C*                                                                                              04/30/92
22700      C*   Next, a local RSPCOM record has to be written.  To do that                                 02/02/93
22800      C*   MMC300 is called with CE# passed as a parameter.                                           04/07/92
22900      C*                                                                                              04/07/92
23000      C                    MOVE QQCENO    PCENO                                                       04/07/92
23100      C                    CALL 'MMC300'  PMC300                                                      04/07/92
23200      C*                                                                                              04/06/93
23300      C*  Load the program parameters to be returned to the calling                                   04/06/93
23400      C*  CL procedure.                                                                               04/06/93
23500      C*                                                                                              04/06/93
23600      C                    EXSR LDPARM                                                                04/06/93
23700      C                    MOVE QQCOM     P$COM                                                       04/06/93
23800      C                    MOVE QQENT     P$ENT                                                       04/06/93
23900      C                    MOVE QQDFMT    P$DFMT                                                      04/06/93
24000      C                    Z-ADDQQDATE    P$DATE                                                      04/06/93
24100      C*                                                                                              04/07/92
24200      C                    ENDIF                               *IN99=*OFF                             01/21/92
24300      C*                                                                                              01/17/92
24400      C                    SETON                     LR                                               01/17/92
24500      C                    RETRN                                                                      01/17/92
24600      C/SPACE 2                                                                                       01/17/92
24700      C**********  $DEFSR SUBR  **********************  $DEFSR SUBR  *                                01/17/92
24800      C*                                                              *                               01/17/92
24900      C*   The $DEFSR subroutine performs the following functions:    *                               01/17/92
25000      C*                                                              *                               01/17/92
25100      C*     1. Defines program variables.  It is never executed.     *                               01/17/92
25200      C*                                                              *    SRCE3                      04/09/93
25300      C****************************************************************    SRCE3                      04/09/93
25400      C*                                                              *    SRCE3                      04/09/93
25500      C*   INDICATORS USED  :  NONE                                   *    SRCE3                      04/09/93
25600      C*                                                              *    SRCE3                      04/09/93
25700      C****************************************************************    SRCE3                      04/09/93
25800      C*                                                                   SRCE3                      04/09/93
25900      C          $DEFSR    BEGSR                                                                      01/17/92
26000      C*                                                                                              01/17/92
26100      C*  Define program variables:                                                                   09/09/92
26200      C*                                                                                              09/09/92
26300      C                    MOVE *BLANKS   $PGM    8        Program name                               09/09/92
26400      C                    MOVE *BLANKS   MODULE  1        MODULE                                     09/09/92
26500      C*                                                                                              09/09/92
```

```
     5738PW1 V2R2M0  920615                SEU SOURCE LISTING                         06/01/93 11:50:28             PAGE    6

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
26600      C*  Parameters used in PLISTs and local variables.                                                      04/06/93
26700      C*                                                                                                      01/17/92
26800      C           *LIKE     DEFN ZLCENO    P$CENO          CE#                                               04/06/93
26900      C                     MOVE *BLANKS   P$COM   1       COM inst & inf?                                   04/06/93
27000      C           *LIKE     DEFN EFNME     P$ENT           Local entity                                      04/06/93
27100      C           *LIKE     DEFN TADTFT    P$DFMT          User date fmt                                     04/06/93
27200      C           *LIKE     DEFN TAZDAT    P$DATE          Date - user fmt                                   04/06/93
27300      C                     MOVE *BLANKS   QQHLD   8       File hold                                         03/26/93
27400      C           *LIKE     DEFN ZLCENO    QQCENO                                                            01/18/92
27500      C           *LIKE     DEFN ZLCENO    PCENO                                                             04/06/93
27600      C           *LIKE     DEFN ZLDTMT    PDATE           Current Date                                      04/06/93
27700      C           *LIKE     DEFN ZLTMMT    PTIME           Current Time                                      04/06/93
27800      C           *LIKE     DEFN P$COM     QQCOM           COM inst & inf?                                   04/06/93
27900      C           *LIKE     DEFN P$DATE    QQDATE          Date - user fmt                                   04/06/93
28000      C           *LIKE     DEFN P$DFMT    QQDFMT          User date fmt                                     04/06/93
28100      C           *LIKE     DEFN P$ENT     QQENT           Local entity                                      04/06/93
28200      C           *LIKE     DEFN TAZDAT    $AFTER          Conv To date                                      04/06/93
28300      C           *LIKE     DEFN TAZDAT    $BEFOR          Conv From date                                    04/06/93
28400      C                     MOVE *BLANKS   $TYPE   1       Type of conv                                      04/06/93
28500      C           *LIKE     DEFN TADTFT    $USER           User date fmt                                     04/06/93
28600      C*                                                                                                      04/06/93
28700      C*  Define key fields used when reading INTFAC.                                                         04/06/93
28800      C*                                                                                                      04/06/93
28900      C           *LIKE     DEFN INAPP1    KAPP1           From Module                                       04/06/93
29000      C           *LIKE     DEFN INAPP2    KAPP2           To Module                                         04/06/93
29100      C*                                                                                                      10/16/92
29200      C*  Define key field used in KDTOMS key list.                                                           04/04/93
29300      C*                                                                                                      10/16/92
29400      C           *LIKE     DEFN OMORDN    KORDN           Order #                                           04/04/93
29500      C           *LIKE     DEFN OMCENO    KCENO           CE #                                              04/04/93
29600      C*                                                                                                      04/02/93
29700      C*  Define key fields used when reading batch files.                                                    04/02/93
29800      C*                                                                                                      04/02/93
29900      C           *LIKE     DEFN BACONO    KCONO           Company #                                         04/02/93
30000      C           *LIKE     DEFN BACUSN    KCUSN           Customer #                                        04/02/93
30100      C           *LIKE     DEFN BADATE    KDATE           Date                                              04/02/93
30200      C           *LIKE     DEFN BATIME    KTIME           Time                                              04/02/93
30300      C           *LIKE     DEFN BACSPO    KCSPO           Customer PO #                                     04/02/93
30400      C           *LIKE     DEFN BIADTP    KADTP           Address Type                                      04/02/93
30500      C           *LIKE     DEFN BJRESR    KRESR           Resource #                                        04/02/93
30600      C           *LIKE     DEFN BJRELN    KRELN           Release #                                         04/02/93
30700      C           *LIKE     DEFN BOCMTP    KCMTP           Comment Type                                      04/02/93
30800      C           *LIKE     DEFN BOCMTN    KCMTN           Comment #                                         04/04/93
30900      C           *LIKE     DEFN BOABRV    KABRV           Abbr Site                                         04/02/93
31000      C           *LIKE     DEFN BOSEQN    KSEQN           Sequence #                                        04/02/93
31100      C           *LIKE     DEFN HPFREE    KFREE           Free Resource                                     04/02/93
31200      C*                                                                                                      05/26/93
31300      C*  Define key field used in KORDCH key list.                                                           05/26/93
31400      C*                                                                                                      05/26/93
31500      C           *LIKE     DEFN OGHIST    KHIST           History Code                                      05/26/93
31600      C           *LIKE     DEFN OGSYDT    KSYDT           System Date                                       05/26/93
31700      C*                                                                                                      05/26/93
31800      C*  Define key field used in KORDDE key list.                                                           05/26/93
```

```
     5738PW1 V2R2M0  920615                 SEU SOURCE LISTING                    06/01/93 11:50:28          PAGE    7

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
31900       C*                                                                                              05/26/93
32000       C           *LIKE     DEFN ODPRES    KPRES            Paid Resr                                 05/26/93
32100       C*                                                                                              10/16/92
32200       C*                                                                                              04/02/93
32300       C*   Set up Key list for retrieving information from the                                        04/02/93
32400       C*   Batch Order Address File (BCHADS)                                                          04/02/93
32500       C*                                                                                              04/02/93
32600       C           KBCHAD    KLIST                                                                     04/02/93
32700       C                     KFLD           KCONO                                                      04/02/93
32800       C                     KFLD           KCUSN                                                      04/02/93
32900       C                     KFLD           KDATE                                                      04/02/93
33000       C                     KFLD           KTIME                                                      04/02/93
33100       C                     KFLD           KCSPO                                                      04/02/93
33200       C                     KFLD           KADTP                                                      04/02/93
33300       C*                                                                                              04/02/93
33400       C*                                                                                              04/02/93
33500       C*   Set up Key list for retrieving information from the                                        04/02/93
33600       C*   Batch Order Attribute File (BCHATR)                                                        04/02/93
33700       C*                                                                                              04/02/93
33800       C           KBCHAT    KLIST                                                                     04/02/93
33900       C                     KFLD           KCONO                                                      04/02/93
34000       C                     KFLD           KCUSN                                                      04/02/93
34100       C                     KFLD           KDATE                                                      04/02/93
34200       C                     KFLD           KTIME                                                      04/02/93
34300       C                     KFLD           KCSPO                                                      04/02/93
34400       C                     KFLD           KRESR                                                      04/02/93
34500       C                     KFLD           KRELN                                                      04/02/93
34600       C*                                                                                              04/02/93
34700       C*                                                                                              04/02/93
34800       C*   Set up Key list for retrieving information from the                                        04/02/93
34900       C*   Batch Order Comment File (BCHCOM)                                                          04/02/93
35000       C*                                                                                              04/02/93
35100       C           KBCHCO    KLIST                                                                     04/02/93
35200       C                     KFLD           KCONO                                                      04/02/93
35300       C                     KFLD           KCUSN                                                      04/02/93
35400       C                     KFLD           KDATE                                                      04/02/93
35500       C                     KFLD           KTIME                                                      04/02/93
35600       C                     KFLD           KCSPO                                                      04/02/93
35700       C                     KFLD           KCMTP                                                      04/02/93
35800       C                     KFLD           KRESR                                                      04/02/93
35900       C                     KFLD           KRELN                                                      04/02/93
36000       C                     KFLD           KCMTN                                                      04/02/93
36100       C                     KFLD           KABRV                                                      04/02/93
36200       C                     KFLD           KSEQN                                                      04/02/93
36300       C*                                                                                              04/02/93
36400       C*                                                                                              04/02/93
36500       C*   Set up Key list for retrieving information from the                                        04/02/93
36600       C*   Batch Order Special Charge File (BCHCHG)                                                   04/02/93
36700       C*                                                                                              04/02/93
36800       C           KBCHCH    KLIST                                                                     04/02/93
36900       C                     KFLD           KCONO                                                      04/02/93
37000       C                     KFLD           KCUSN                                                      04/02/93
37100       C                     KFLD           KDATE                                                      04/02/93
```

```
     5738PW1 V2R2M0  920615                 SEU SOURCE LISTING                    06/01/93 11:50:28              PAGE    8

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
37200       C                    KFLD          KTIME                                                       04/02/93
37300       C                    KFLD          KCSPO                                                       04/02/93
37400       C                    KFLD          KRESR                                                       04/02/93
37500       C                    KFLD          KRELN                                                       04/02/93
37600       C                    KFLD          KABRV                                                       04/02/93
37700       C                    KFLD          KSEQN                                                       04/02/93
37800       C*                                                                                             04/02/93
37900       C*   Set up Key list for retrieving information from the                                       04/02/93
38000       C*   Batch Customer Attributes File (BCHCUS)                                                   04/02/93
38100       C*                                                                                             04/02/93
38200       C          KBCHCU    KLIST                                                                     04/02/93
38300       C                    KFLD          KCONO                                                       04/02/93
38400       C                    KFLD          KCUSN                                                       04/02/93
38500       C                    KFLD          KDATE                                                       04/02/93
38600       C                    KFLD          KTIME                                                       04/02/93
38700       C                    KFLD          KCSPO                                                       04/02/93
38800       C*                                                                                             04/02/93
38900       C*                                                                                             04/02/93
39000       C*   Set up Key list for retrieving information from the                                       04/02/93
39100       C*   Batch Order Detail File (BCHDET)                                                          04/02/93
39200       C*                                                                                             04/02/93
39300       C          KBCHDE    KLIST                                                                     04/02/93
39400       C                    KFLD          KCONO                                                       04/02/93
39500       C                    KFLD          KCUSN                                                       04/02/93
39600       C                    KFLD          KDATE                                                       04/02/93
39700       C                    KFLD          KTIME                                                       04/02/93
39800       C                    KFLD          KCSPO                                                       04/02/93
39900       C                    KFLD          KRESR                                                       04/02/93
40000       C                    KFLD          KRELN                                                       04/02/93
40100       C*                                                                                             04/02/93
40200       C*                                                                                             04/02/93
40300       C*   Set up Key list for retrieving information from the                                       04/02/93
40400       C*   Batch Order Master File (BCHMST)                                                          04/02/93
40500       C*                                                                                             10/16/92
40600       C          KBCHMS    KLIST                                                                     03/31/93
40700       C                    KFLD          KCONO                                                       03/31/93
40800       C                    KFLD          KCUSN                                                       03/31/93
40900       C                    KFLD          KDATE                                                       04/02/93
41000       C                    KFLD          KTIME                                                       04/02/93
41100       C                    KFLD          KCSPO                                                       04/02/93
41200       C*                                                                                             10/16/92
41300       C*                                                                                             04/02/93
41400       C*   Set up Key list for retrieving information from the                                       04/02/93
41500       C*   Batch Order Discount File (BCHDIS)                                                        04/02/93
41600       C*                                                                                             04/02/93
41700       C          KBCHDI    KLIST                                                                     04/02/93
41800       C                    KFLD          KCONO                                                       04/02/93
41900       C                    KFLD          KCUSN                                                       04/02/93
42000       C                    KFLD          KDATE                                                       04/02/93
42100       C                    KFLD          KTIME                                                       04/02/93
42200       C                    KFLD          KCSPO                                                       04/02/93
42300       C                    KFLD          KRESR                                                       04/02/93
42400       C                    KFLD          KRELN                                                       04/02/93
```

```
     5738PW1 V2R2M0  920615                SEU SOURCE LISTING                         06/01/93 11:50:28              PAGE    9

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
42500      C                    KFLD           KSEQN                                                          04/02/93
42600      C*                                                                                                 04/02/93
42700      C*                                                                                                 04/02/93
42800      C*   Set up Key list for retrieving information from the                                           04/02/93
42900      C*   Batch Order Promotion File (BCHPRM)                                                           04/02/93
43000      C*                                                                                                 04/02/93
43100      C          KBCHPR    KLIST                                                                         04/02/93
43200      C                    KFLD           KCONO                                                          04/02/93
43300      C                    KFLD           KCUSN                                                          04/02/93
43400      C                    KFLD           KDATE                                                          04/02/93
43500      C                    KFLD           KTIME                                                          04/02/93
43600      C                    KFLD           KCSPO                                                          04/02/93
43700      C                    KFLD           KRESR                                                          04/02/93
43800      C                    KFLD           KRELN                                                          04/02/93
43900      C                    KFLD           KFREE                                                          04/02/93
44000      C*                                                                                                 04/02/93
44100      C*                                                                                                 04/02/93
44200      C*   Set up Key list for retrieving information from the                                           04/02/93
44300      C*   Data Transfer Order Master File (DTOMST)                                                      04/02/93
44400      C*                                                                                                 04/02/93
44500      C          KDTOMS    KLIST                                                                         04/02/93
44600      C                    KFLD           KORDN                                                          04/04/93
44700      C                    KFLD           KCENO                                                          04/04/93
44800      C*                                                                                                 04/06/93
44900      C*                                                                                                 04/06/93
45000      C*   Set up Key list for retrieving information from the                                           04/06/93
45100      C*   Module Interface File (INTFAC)                                                                04/06/93
45200      C*                                                                                                 04/06/93
45300      C          KINTFA    KLIST                                                                         04/06/93
45400      C                    KFLD           KAPP1                                                          04/06/93
45500      C                    KFLD           KAPP2                                                          04/06/93
45600      C*                                                                                                 05/26/93
45700      C*                                                                                                 05/26/93
45800      C*   Set up Key list for retrieving information from the                                           05/26/93
45900      C*   Order Address File (ORDADS)                                                                   05/26/93
46000      C*                                                                                                 05/26/93
46100      C          KORDAD    KLIST                                                                         05/26/93
46200      C                    KFLD           KORDN                                                          05/26/93
46300      C                    KFLD           KADTP                                                          05/26/93
46400      C*                                                                                                 05/26/93
46500      C*                                                                                                 05/26/93
46600      C*   Set up Key list for retrieving information from the                                           05/26/93
46700      C*   Order Attribute File (ORDATR)                                                                 05/26/93
46800      C*                                                                                                 05/26/93
46900      C          KORDAT    KLIST                                                                         05/26/93
47000      C                    KFLD           KORDN                                                          05/26/93
47100      C                    KFLD           KRESR                                                          05/26/93
47200      C                    KFLD           KRELN                                                          05/26/93
47300      C*                                                                                                 05/26/93
47400      C*                                                                                                 05/26/93
47500      C*   Set up Key list for retrieving information from the                                           05/26/93
47600      C*   Order Special Charge File (ORDCHG)                                                            05/26/93
47700      C*                                                                                                 05/26/93
```

```
     5738PW1 V2R2M0  920615                SEU SOURCE LISTING                      06/01/93 11:50:28              PAGE   10

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
47800      C          KORDCH    KLIST                                                                    05/26/93
47900      C                    KFLD           KHIST                                                     05/26/93
48000      C                    KFLD           KORDN                                                     05/26/93
48100      C                    KFLD           KSYDT                                                     05/26/93
48200      C                    KFLD           KRESR                                                     05/26/93
48300      C                    KFLD           KRELN                                                     05/26/93
48400      C                    KFLD           KABRV                                                     05/26/93
48500      C                    KFLD           KSEQN                                                     05/26/93
48600      C*                                                                                            05/26/93
48700      C*                                                                                            05/26/93
48800      C*   Set up Key list for retrieving information from the                                      05/26/93
48900      C*   Order Comment File (ORDCOM)                                                              05/26/93
49000      C*                                                                                            05/26/93
49100      C          KORDCO    KLIST                                                                    05/26/93
49200      C                    KFLD           KORDN                                                     05/26/93
49300      C                    KFLD           KCMTP                                                     05/26/93
49400      C                    KFLD           KRESR                                                     05/26/93
49500      C                    KFLD           KRELN                                                     05/26/93
49600      C                    KFLD           KCMTN                                                     05/26/93
49700      C                    KFLD           KABRV                                                     05/26/93
49800      C                    KFLD           KSEQN                                                     05/26/93
49900      C*                                                                                            05/26/93
50000      C*                                                                                            05/26/93
50100      C*   Set up Key list for retrieving information from the                                      05/26/93
50200      C*   Order Detail File (ORDDET)                                                               05/26/93
50300      C*                                                                                            05/26/93
50400      C          KORDDE    KLIST                                                                    05/26/93
50500      C                    KFLD           KORDN                                                     05/26/93
50600      C                    KFLD           KRESR                                                     05/26/93
50700      C                    KFLD           KRELN                                                     05/26/93
50800      C                    KFLD           KPRES                                                     05/26/93
50900      C*                                                                                            05/26/93
51000      C*                                                                                            05/26/93
51100      C*   Set up Key list for retrieving information from the                                      05/26/93
51200      C*   Order Discount File (ORDDIS)                                                             05/26/93
51300      C*                                                                                            05/26/93
51400      C          KORDDI    KLIST                                                                    05/26/93
51500      C                    KFLD           KORDN                                                     05/26/93
51600      C                    KFLD           KRESR                                                     05/26/93
51700      C                    KFLD           KRELN                                                     05/26/93
51800      C                    KFLD           KSEQN                                                     05/26/93
51900      C*                                                                                            05/26/93
52000      C*                                                                                            05/26/93
52100      C*   Set up Key list for retrieving information from the                                      05/26/93
52200      C*   Order Promotion File (ORDPRM)                                                            05/26/93
52300      C*                                                                                            05/26/93
52400      C          KORDPR    KLIST                                                                    05/26/93
52500      C                    KFLD           KORDN                                                     05/26/93
52600      C                    KFLD           KRESR                                                     05/26/93
52700      C                    KFLD           KRELN                                                     05/26/93
52800      C                    KFLD           KFREE                                                     05/26/93
52900      C*                                                                                            01/21/92
53000      C*   PLIST used when MMC300 is called.                                                        01/21/92
```

```
     5738PW1 V2R2M0  920615                 SEU SOURCE LISTING                          06/01/93 11:50:28          PAGE   11

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
53100      C*                                                                                   01/21/92
53200      C         PMC300    PLIST                                                            01/21/92
53300      C                   PARM           PCENO                                             01/21/92
53400      C*                                                                                   04/06/93
53500      C*   PLIST used when MZM100 is called.                                               04/06/93
53600      C*                                                                                   04/06/93
53700      C         PZM100    PLIST                                                            04/06/93
53800      C                   PARM           $TYPE                                             04/06/93
53900      C                   PARM           $BEFOR                                            04/06/93
54000      C                   PARM           $AFTER                                            04/06/93
54100      C                   PARM           $USER                                             04/06/93
54200      C*                                                                                   04/06/93
54300      C*   PLIST used when MZM620X is called.                                              04/06/93
54400      C*                                                                                   04/06/93
54500      C         PZM620    PLIST                                                            04/06/93
54600      C                   PARM           PDATE            Current Date                     04/06/93
54700      C                   PARM           PTIME            Current Time                     04/06/93
54800      C*                                                                                   01/17/92
54900      C*                                                                                   01/17/92
55000      C                   ENDSR                           $DEFSR         SRCE3             01/17/92
55100      C*                                                                                   01/17/92
55200      C/SPACE 2                                                                            01/17/92
55300      C**********  *INZSR SUBR  **********************  *INZSR SUBR  *                     01/17/92
55400      C*                                                              *                    01/17/92
55500      C*   The *INZSR subroutine performs the following functions:    *                    01/17/92
55600      C*                                                              *                    01/17/92
55700      C*     1. Performs initial calculations that need to be done    *                    01/17/92
55800      C*        on the initial call of the program.                   *                    01/17/92
55900      C*                                                              *                    01/17/92
56000      C*  NOTE:  The *INZSR is executed during the *INIT phase of     *                    01/17/92
56100      C*         RPG execution.                                       *                    01/17/92
56200      C*                                                              *  SRCE3             04/09/93
56300      C***************************************************************   SRCE3             04/09/93
56400      C*                                                              *  SRCE3             04/09/93
56500      C*   INDICATORS USED  :  99                                     *  SRCE3             04/09/93
56600      C*                                                              *  SRCE3             04/09/93
56700      C***************************************************************   SRCE3             04/09/93
56800      C*                                                                 SRCE3             04/09/93
56900      C          *INZSR    BEGSR                                                           01/17/92
57000      C*                                                                                   01/17/92
57100      C*  Define and initialize program variables                                          09/09/92
57200      C*                                                                                   09/09/92
57300      C                   MOVE 'M'       MODULE                                            09/09/92
57400      C                   MOVEL'MMC464'  $PGM             Program name                     01/26/93
57500      C*                                                                                   09/09/92
57600      C*                                                                                   01/17/92
57700      C                   ENDSR                           *INZSR         SRCE3             01/17/92
57800      C*                                                                                   01/17/92
57900      C/SPACE 2                                                                            03/29/93
58000      C**********  CLRADT SUBR  **********************  CLRADT SUBR  *                     03/29/93
58100      C*                                                              *                    03/29/93
58200      C*   The CLRADT subroutine deletes all records with CE# passed  *                    03/29/93
58300      C*   from the data transfer file DTOADT.                        *                    03/29/93
```

```
5738PW1 V2R2M0  920615                SEU SOURCE LISTING                    06/01/93 11:50:28          PAGE   12

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
58400     C*                                                              *  SRCE3                  04/09/93
58500     C****************************************************************  SRCE3                  04/09/93
58600     C*                                                              *  SRCE3                  04/09/93
58700     C*   INDICATORS USED  :  99                                     *  SRCE3                  04/09/93
58800     C*                                                              *  SRCE3                  04/09/93
58900     C*   EXECUTED FROM    :  COPYFL                                 *  SRCE3                  04/09/93
59000     C*                                                              *  SRCE3                  04/09/93
59100     C****************************************************************  SRCE3                  04/09/93
59200     C*                                                                 SRCE3                  04/09/93
59300     C          CLRADT    BEGSR                                                                03/29/93
59400     C*                                                                                        03/29/93
59500     C*   This loop reads sequentially all records in Data Transfer                            03/29/93
59600     C*   File DTOADT with CE# equal to the CE# passed (using logical                          03/29/93
59700     C*   view DTOADTCE) and deletes them.                                                     03/29/93
59800     C*                                                                                        03/29/93
59900     C          QQCENO    CHAINDTOADTCE             99                                         03/29/93
60000     C          *IN99     DOWEQ*OFF                                                            03/29/93
60100     C                    DELETDTOADTCE                                                        03/29/93
60200     C          QQCENO    READEDTOADTCE               99                                       03/29/93
60300     C                    ENDDO                         DOW *IN99=*OFF                         03/29/93
60400     C*                                                                                        03/29/93
60500     C*                                                                                        03/29/93
60600     C                    ENDSR                         CLRADT          SRCE3                  03/29/93
60700     C*                                                                                        03/29/93
60800     C/SPACE 2                                                                                 03/29/93
60900     C*********  CLRATT SUBR  **********************  CLRATT SUBR  *                           03/29/93
61000     C*                                                              *                         03/29/93
61100     C*   The CLRATT subroutine deletes all records with CE# passed  *                         03/29/93
61200     C*   from the data transfer file DTOATT.                        *                         03/29/93
61300     C*                                                              *  SRCE3                  04/09/93
61400     C****************************************************************  SRCE3                  04/09/93
61500     C*                                                              *  SRCE3                  04/09/93
61600     C*   INDICATORS USED  :  99                                     *  SRCE3                  04/09/93
61700     C*                                                              *  SRCE3                  04/09/93
61800     C*   EXECUTED FROM    :  COPYFL                                 *  SRCE3                  04/09/93
61900     C*                                                              *  SRCE3                  04/09/93
62000     C****************************************************************  SRCE3                  04/09/93
62100     C*                                                                 SRCE3                  04/09/93
62200     C          CLRATT    BEGSR                                                                03/29/93
62300     C*                                                                                        03/29/93
62400     C*   This loop reads sequentially all records in Data Transfer                            03/29/93
62500     C*   File DTOATT with CE# equal to the CE# passed (using logical                          03/29/93
62600     C*   view DTOATTCE) and deletes them.                                                     03/29/93
62700     C*                                                                                        03/29/93
62800     C          QQCENO    CHAINDTOATTCE             99                                         03/29/93
62900     C          *IN99     DOWEQ*OFF                                                            03/29/93
63000     C                    DELETDTOATTCE                                                        03/29/93
63100     C          QQCENO    READEDTOATTCE               99                                       03/29/93
63200     C                    ENDDO                         DOW *IN99=*OFF                         03/29/93
63300     C*                                                                                        03/29/93
63400     C*                                                                                        03/29/93
63500     C                    ENDSR                         CLRATT          SRCE3                  03/29/93
63600     C*                                                                                        03/29/93
```

```
5738PW1 V2R2M0  920615                 SEU SOURCE LISTING                        06/01/93 11:50:28              PAGE   13

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
63700      C/SPACE 2                                                                                     03/29/93
63800      C**********  CLRCHT SUBR  **********************  CLRCHT SUBR  *                              03/29/93
63900      C*                                                              *                              03/29/93
64000      C*   The CLRCHT subroutine deletes all records with CE# passed  *                              03/29/93
64100      C*   from the data transfer file DTOCHT.                        *                              03/29/93
64200      C*                                                              *   SRCE3                      04/09/93
64300      C****************************************************************   SRCE3                      04/09/93
64400      C*                                                              *   SRCE3                      04/09/93
64500      C*   INDICATORS USED  :  99                                     *   SRCE3                      04/09/93
64600      C*                                                              *   SRCE3                      04/09/93
64700      C*   EXECUTED FROM    :  COPYFL                                 *   SRCE3                      04/09/93
64800      C*                                                              *   SRCE3                      04/09/93
64900      C****************************************************************   SRCE3                      04/09/93
65000      C*                                                                  SRCE3                      04/09/93
65100      C           CLRCHT    BEGSR                                                                   03/29/93
65200      C*                                                                                            03/29/93
65300      C*   This loop reads sequentially all records in Data Transfer                                 03/29/93
65400      C*   File DTOCHT with CE# equal to the CE# passed (using logical                               03/29/93
65500      C*   view DTOCHTCE) and deletes them.                                                         03/29/93
65600      C*                                                                                            03/29/93
65700      C           QQCENO    CHAINDTOCHTCE             99                                            03/29/93
65800      C           *IN99     DOWEQ*OFF                                                               03/29/93
65900      C                     DELETDTOCHTCE                                                           03/29/93
66000      C           QQCENO    READEDTOCHTCE                 99                                        03/29/93
66100      C                     ENDDO                           DOW *IN99=*OFF                          03/29/93
66200      C*                                                                                            03/29/93
66300      C*                                                                                            03/29/93
66400      C                     ENDSR                           CLRCHT        SRCE3                      03/29/93
66500      C*                                                                                            03/29/93
66600      C/SPACE 2                                                                                     03/29/93
66700      C**********  CLRCMT SUBR  **********************  CLRCMT SUBR  *                              03/29/93
66800      C*                                                              *                              03/29/93
66900      C*   The CLRCMT subroutine deletes all records with CE# passed  *                              03/29/93
67000      C*   from the data transfer file DTOCMT.                        *                              03/29/93
67100      C*                                                              *   SRCE3                      04/09/93
67200      C****************************************************************   SRCE3                      04/09/93
67300      C*                                                              *   SRCE3                      04/09/93
67400      C*   INDICATORS USED  :  99                                     *   SRCE3                      04/09/93
67500      C*                                                              *   SRCE3                      04/09/93
67600      C*   EXECUTED FROM    :  COPYFL                                 *   SRCE3                      04/09/93
67700      C*                                                              *   SRCE3                      04/09/93
67800      C****************************************************************   SRCE3                      04/09/93
67900      C*                                                                  SRCE3                      04/09/93
68000      C           CLRCMT    BEGSR                                                                   03/29/93
68100      C*                                                                                            03/29/93
68200      C*   This loop reads sequentially all records in Data Transfer                                 03/29/93
68300      C*   File DTOCMT with CE# equal to the CE# passed (using logical                               03/29/93
68400      C*   view DTOCMTCE) and deletes them.                                                         03/29/93
68500      C*                                                                                            03/29/93
68600      C           QQCENO    CHAINDTOCMTCE             99                                            03/29/93
68700      C           *IN99     DOWEQ*OFF                                                               03/29/93
68800      C                     DELETDTOCMTCE                                                           03/29/93
68900      C           QQCENO    READEDTOCMTCE                 99                                        03/29/93
```

```
5738PW1 V2R2M0  920615                SEU SOURCE LISTING                     06/01/93 11:50:28              PAGE   14

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
69000      C                   ENDDO                           DOW *IN99=*OFF                                03/29/93
69100      C*                                                                                                03/29/93
69200      C*                                                                                                03/29/93
69300      C                   ENDSR                           CLRCMT         SRCE3                          03/29/93
69400      C*                                                                                                03/29/93
69500      C/SPACE 2                                                                                         03/29/93
69600      C********** CLRCOP SUBR ********************** CLRCOP SUBR *                                      03/29/93
69700      C*                                                           *                                    03/29/93
69800      C*   The CLRCOP subroutine deletes all records with CE# passed  *                                 03/29/93
69900      C*   from the data transfer file DTCOPT.                         *                                03/29/93
70000      C*                                                           *   SRCE3                            04/09/93
70100      C*************************************************************   SRCE3                            04/09/93
70200      C*                                                           *   SRCE3                            04/09/93
70300      C*   INDICATORS USED  :  99                                  *   SRCE3                            04/09/93
70400      C*                                                           *   SRCE3                            04/09/93
70500      C*   EXECUTED FROM    :  COPYFL                              *   SRCE3                            04/09/93
70600      C*                                                           *   SRCE3                            04/09/93
70700      C*************************************************************   SRCE3                            04/09/93
70800      C*                                                               SRCE3                            04/09/93
70900      C           CLRCOP    BEGSR                                                                       03/29/93
71000      C*                                                                                                03/29/93
71100      C*   This loop reads sequentially all records in Data Transfer                                    03/29/93
71200      C*   File DTCOPT with CE# equal to the CE# passed (using logical                                  03/29/93
71300      C*   view DTCOPTCE) and deletes them.                                                             03/29/93
71400      C*                                                                                                03/29/93
71500      C           QQCENO    CHAINDTCOPTCE             99                                                03/29/93
71600      C           *IN99     DOWEQ*OFF                                                                   03/29/93
71700      C                     DELETDTCOPTCE                                                               03/29/93
71800      C           QQCENO    READEDTCOPTCE                99                                             03/29/93
71900      C                     ENDDO                      DOW *IN99=*OFF                                   03/29/93
72000      C*                                                                                                03/29/93
72100      C*                                                                                                03/29/93
72200      C                     ENDSR                      CLRCOP         SRCE3                             03/29/93
72300      C*                                                                                                03/29/93
72400      C/SPACE 2                                                                                         03/26/93
72500      C********** CLRCST SUBR ********************** CLRCST SUBR *                                      03/29/93
72600      C*                                                           *                                    03/26/93
72700      C*   The CLRCST subroutine deletes all records with CE# passed  *                                 03/29/93
72800      C*   from the data transfer file DTOCST.                         *                                03/29/93
72900      C*                                                           *   SRCE3                            04/09/93
73000      C*************************************************************   SRCE3                            04/09/93
73100      C*                                                           *   SRCE3                            04/09/93
73200      C*   INDICATORS USED  :  99                                  *   SRCE3                            04/09/93
73300      C*                                                           *   SRCE3                            04/09/93
73400      C*   EXECUTED FROM    :  COPYFL                              *   SRCE3                            04/09/93
73500      C*                                                           *   SRCE3                            04/09/93
73600      C*************************************************************   SRCE3                            04/09/93
73700      C*                                                               SRCE3                            04/09/93
73800      C           CLRCST    BEGSR                                                                       03/29/93
73900      C*                                                                                                03/26/93
74000      C*   This loop reads sequentially all records in Data Transfer                                    03/26/93
74100      C*   File DTOCST with CE# equal to the CE# passed (using logical                                  03/29/93
74200      C*   view DTOCSTCE) and deletes them.                                                             03/29/93
```

```
5738PW1 V2R2M0  920615              SEU SOURCE LISTING              06/01/93 11:50:28              PAGE   15

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
     C*                                                                                   03/26/93
     C           QQCENO    CHAINDTOCSTCE             99                                   03/29/93
     C           *IN99     DOWEQ*OFF                                                      03/26/93
     C                     DELETDTOCSTCE                                                  03/29/93
     C           QQCENO    READEDTOCSTCE                 99                               03/29/93
     C                     ENDDO                           DOW *IN99=*OFF                 03/26/93
     C*                                                                                   03/26/93
     C*                                                                                   03/26/93
     C                     ENDSR                           CLRCST         SRCE3           03/29/93
     C*                                                                                   03/26/93
     C/SPACE 2                                                                            03/29/93
     C*********  CLRDET SUBR  *********************  CLRDET SUBR  *                       03/29/93
     C*                                                            *                      03/29/93
     C*   The CLRDET subroutine deletes all records with CE# passed *                     03/29/93
     C*   from the data transfer file DTODET.                      *                      03/29/93
     C*                                                            *      SRCE3           04/09/93
     C**************************************************************      SRCE3           04/09/93
     C*                                                            *      SRCE3           04/09/93
     C*   INDICATORS USED  :  99                                   *      SRCE3           04/09/93
     C*                                                            *      SRCE3           04/09/93
     C*   EXECUTED FROM    :  COPYFL                               *      SRCE3           04/09/93
     C*                                                            *      SRCE3           04/09/93
     C**************************************************************      SRCE3           04/09/93
     C*                                                                   SRCE3           04/09/93
     C           CLRDET    BEGSR                                                          03/29/93
     C*                                                                                   03/29/93
     C*   This loop reads sequentially all records in Data Transfer                       03/29/93
     C*   File DTODET with CE# equal to the CE# passed (using logical                     03/29/93
     C*   view DTODETCE) and deletes them.                                                03/29/93
     C*                                                                                   03/29/93
     C           QQCENO    CHAINDTODETCE             99                                   03/29/93
     C           *IN99     DOWEQ*OFF                                                      03/29/93
     C                     DELETDTODETCE                                                  03/29/93
     C           QQCENO    READEDTODETCE                 99                               03/29/93
     C                     ENDDO                           DOW *IN99=*OFF                 03/29/93
     C*                                                                                   03/29/93
     C*                                                                                   03/29/93
     C                     ENDSR                           CLRDET         SRCE3           03/29/93
     C*                                                                                   03/29/93
     C/SPACE 2                                                                            03/29/93
     C*********  CLRDST SUBR  *********************  CLRDST SUBR  *                       03/29/93
     C*                                                            *                      03/29/93
     C*   The CLRDST subroutine deletes all records with CE# passed *                     03/29/93
     C*   from the data transfer file DTODST.                      *                      03/29/93
     C*                                                            *      SRCE3           04/09/93
     C**************************************************************      SRCE3           04/09/93
     C*                                                            *      SRCE3           04/09/93
     C*   INDICATORS USED  :  99                                   *      SRCE3           04/09/93
     C*                                                            *      SRCE3           04/09/93
     C*   EXECUTED FROM    :  COPYFL                               *      SRCE3           04/09/93
     C*                                                            *      SRCE3           04/09/93
     C**************************************************************      SRCE3           04/09/93
     C*                                                                   SRCE3           04/09/93
```

```
     5738PW1 V2R2M0  920615                    SEU SOURCE LISTING                          06/01/93 11:50:28            PAGE   16

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
79600      C           CLRDST    BEGSR                                                                      03/29/93
79700      C*                                                                                               03/29/93
79800      C*   This loop reads sequentially all records in Data Transfer                                   03/29/93
79900      C*   File DTODST with CE# equal to the CE# passed (using logical                                 03/29/93
80000      C*   view DTODSTCE) and deletes them.                                                            03/29/93
80100      C*                                                                                               03/29/93
80200      C           QQCENO    CHAINDTODSTCE             99                                               03/29/93
80300      C           *IN99     DOWEQ*OFF                                                                  03/29/93
80400      C                     DELETDTODSTCE                                                              03/29/93
80500      C           QQCENO    READEDTODSTCE                99                                            03/29/93
80600      C                     ENDDO                          DOW *IN99=*OFF                              03/29/93
80700      C*                                                                                               03/29/93
80800      C*                                                                                               03/29/93
80900      C                     ENDSR                          CLRDST         SRCE3                        03/29/93
81000      C*                                                                                               03/29/93
81100      C/SPACE 2                                                                                        03/29/93
81200      C*********  CLRMST SUBR  *********************  CLRMST SUBR  *                                   03/29/93
81300      C*                                                           *                                   03/29/93
81400      C*   The CLRMST subroutine deletes all records with CE# passed  *                                03/29/93
81500      C*   from the data transfer file DTOMST.                      *                                  03/29/93
81600      C*                                                           *    SRCE3                          04/09/93
81700      C*************************************************************    SRCE3                          04/09/93
81800      C*                                                           *    SRCE3                          04/09/93
81900      C*   INDICATORS USED  :  99                                  *    SRCE3                          04/09/93
82000      C*                                                           *    SRCE3                          04/09/93
82100      C*   EXECUTED FROM    :  COPYFL                              *    SRCE3                          04/09/93
82200      C*                                                           *    SRCE3                          04/09/93
82300      C*************************************************************    SRCE3                          04/09/93
82400      C*                                                                SRCE3                          04/09/93
82500      C           CLRMST    BEGSR                                                                      03/29/93
82600      C*                                                                                               03/29/93
82700      C*   This loop reads sequentially all records in Data Transfer                                   03/29/93
82800      C*   File DTOMST with CE# equal to the CE# passed (using logical                                 03/29/93
82900      C*   view DTOMSTCE) and deletes them.                                                            03/29/93
83000      C*                                                                                               03/29/93
83100      C           QQCENO    CHAINDTOMSTCE             99                                               03/29/93
83200      C           *IN99     DOWEQ*OFF                                                                  03/29/93
83300      C                     DELETDTOMSTCE                                                              03/29/93
83400      C           QQCENO    READEDTOMSTCE                99                                            03/29/93
83500      C                     ENDDO                          DOW *IN99=*OFF                              03/29/93
83600      C*                                                                                               03/29/93
83700      C*                                                                                               03/29/93
83800      C                     ENDSR                          CLRMST         SRCE3                        03/29/93
83900      C*                                                                                               03/29/93
84000      C/SPACE 2                                                                                        03/29/93
84100      C*********  CLRPMT SUBR  *********************  CLRPMT SUBR  *                                   03/29/93
84200      C*                                                           *                                   03/29/93
84300      C*   The CLRPMT subroutine deletes all records with CE# passed  *                                03/29/93
84400      C*   from the data transfer file DTOPMT.                      *                                  03/29/93
84500      C*                                                           *    SRCE3                          04/09/93
84600      C*************************************************************    SRCE3                          04/09/93
84700      C*                                                           *    SRCE3                          04/09/93
84800      C*   INDICATORS USED  :  99                                  *    SRCE3                          04/09/93
```

```
     5738PW1 V2R2M0  920615                SEU SOURCE LISTING                      06/01/93 11:50:28              PAGE   17

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
84900      C*                                                            *    SRCE3                    04/09/93
85000      C*   EXECUTED FROM    :  COPYFL                               *    SRCE3                    04/09/93
85100      C*                                                            *    SRCE3                    04/09/93
85200      C**************************************************************    SRCE3                    04/09/93
85300      C*                                                                 SRCE3                    04/09/93
85400      C          CLRPMT    BEGSR                                                                  03/29/93
85500      C*                                                                                          03/29/93
85600      C*   This loop reads sequentially all records in Data Transfer                              03/29/93
85700      C*   File DTOPMT with CE# equal to the CE# passed (using logical                            03/29/93
85800      C*   view DTOPMTCE) and deletes them.                                                       03/29/93
85900      C*                                                                                          03/29/93
86000      C          QQCENO    CHAINDTOPMTCE             99                                           03/29/93
86100      C          *IN99     DOWEQ*OFF                                                              03/29/93
86200      C                    DELETDTOPMTCE                                                          03/29/93
86300      C          QQCENO    READEDTOPMTCE                 99                                       03/29/93
86400      C                    ENDDO                           DOW *IN99=*OFF                         03/29/93
86500      C*                                                                                          03/29/93
86600      C*                                                                                          03/29/93
86700      C                    ENDSR                           CLRPMT         SRCE3                   03/29/93
86800      C*                                                                                          03/29/93
86900      C/SPACE 2                                                                                   03/26/93
87000      C**********  COPYFL SUBR  **********************  COPYFL SUBR  *                            03/26/93
87100      C*                                                            *                             03/26/93
87200      C*   The COPYFL subroutine executes other routines to upload  *                             03/26/93
87300      C*   the data from COP data transfer files to entity-level    *                             03/26/93
87400      C*   batch files and to clear this data from data transfer    *                             03/26/93
87500      C*                                                            *    SRCE3                    04/09/93
87600      C**************************************************************    SRCE3                    04/09/93
87700      C*                                                            *    SRCE3                    04/09/93
87800      C*   INDICATORS USED  :  NONE                                 *    SRCE3                    04/09/93
87900      C*                                                            *    SRCE3                    04/09/93
88000      C*   EXECUTES         :  CLRADT  CLRATT  CLRCHT  CLRCMT       *    SRCE3                    04/09/93
88100      C*                       CLRCOP  CLRCST  CLRDET  CLRDST       *    SRCE3                    04/09/93
88200      C*                       CLRMST  CLRPMT  CPYADT  CPYATT       *    SRCE3                    04/09/93
88300      C*                       CPYCHT  CPYCMT  CPYCOP  CPYCST       *    SRCE3                    04/09/93
88400      C*                       CPYDET  CPYDST  CPYMST  CPYPMT       *    SRCE3                    04/09/93
88500      C*                                                            *    SRCE3                    04/09/93
88600      C*   EXECUTED FROM    :  MAINLN                               *    SRCE3                    04/09/93
88700      C*                                                            *    SRCE3                    04/09/93
88800      C**************************************************************    SRCE3                    04/09/93
88900      C*                                                                 SRCE3                    04/09/93
89000      C          COPYFL    BEGSR                                                                  03/26/93
89100      C*                                                                                          03/26/93
89200      C*   To process Order Master data copy the records from                                     03/30/93
89300      C*   DTOMST to BCHMST.                                                                      04/06/93
89400      C*                                                                                          03/30/93
89500      C                    EXSR CPYMST                                                            03/26/93
89600      C*                                                                                          03/30/93
89700      C*   To process Order Detail data copy the records from                                     03/30/93
89800      C*   DTODET to BCHDET.                                                                      04/06/93
89900      C*                                                                                          03/30/93
90000      C                    EXSR CPYDET                                                            03/30/93
90100      C*                                                                                          03/26/93
```

```
SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
90200      C*    To process Order Special Charges data copy the records            03/30/93
90300      C*    from DTOCHT to BCHCHG.                                            04/06/93
90400      C*                                                                      03/30/93
90500      C                       EXSR CPYCHT                                     03/30/93
90600      C*                                                                      03/30/93
90700      C*    To process Order Comment data copy the records                    03/30/93
90800      C*    from DTOCMT to BCHCOM.                                            04/06/93
90900      C*                                                                      03/30/93
91000      C                       EXSR CPYCMT                                     03/30/93
91100      C*                                                                      03/30/93
91200      C*    To process Order Discount data copy the records                   03/30/93
91300      C*    from DTODST to BCHDIS.                                            04/06/93
91400      C*                                                                      03/30/93
91500      C                       EXSR CPYDST                                     03/30/93
91600      C*                                                                      03/30/93
91700      C*    To process Order Promotion data copy the records                  03/30/93
91800      C*    from DTOPMT to BCHPRM.                                            04/06/93
91900      C*                                                                      03/30/93
92000      C                       EXSR CPYPMT                                     03/30/93
92100      C*                                                                      03/30/93
92200      C*    To process Customer Attribute Override data copy the              03/30/93
92300      C*    records from DTOCST to BCHCUS.                                    04/06/93
92400      C*                                                                      03/30/93
92500      C                       EXSR CPYCST                                     03/30/93
92600      C*                                                                      03/30/93
92700      C*    To process Order Address data copy the records from               03/30/93
92800      C*    DTOADT to BCHADS.                                                 04/06/93
92900      C*                                                                      03/30/93
93000      C                       EXSR CPYADT                                     03/30/93
93100      C*                                                                      03/30/93
93200      C*    To process Order Attribute Override data copy the records         03/30/93
93300      C*    records from DTOATT to BCHATR.                                    04/06/93
93400      C*                                                                      03/30/93
93500      C                       EXSR CPYATT                                     03/30/93
93600      C*                                                                      03/30/93
93700      C*    To process COP data copy the records from DTCOPT to               03/30/93
93800      C*    a batch file specified in the DTCOPT record.                      04/06/93
93900      C*                                                                      03/26/93
94000      C                       EXSR CPYCOP                                     03/26/93
94100      C*                                                                      03/26/93
94200      C*    Clear records from DTOMST, DTODET, DTOCHT, DTOCMT,                04/06/93
94300      C*    DTODST, DTOPMT, DTOCST, DTOADT, DTOATT, and DTCOPT                04/06/93
94400      C*    files that were just copied into the batch files.                 04/06/93
94500      C*                                                                      04/06/93
94600      C                       EXSR CLRMST                                     04/06/93
94700      C                       EXSR CLRDET                                     04/06/93
94800      C                       EXSR CLRCHT                                     04/06/93
94900      C                       EXSR CLRCMT                                     04/06/93
95000      C                       EXSR CLRDST                                     04/06/93
95100      C                       EXSR CLRPMT                                     04/06/93
95200      C                       EXSR CLRCST                                     04/06/93
95300      C                       EXSR CLRADT                                     04/06/93
95400      C                       EXSR CLRCOP                                     04/06/93
```

```
     5738PW1 V2R2NO  920615                    SEU SOURCE LISTING                     06/01/93 11:50:28              PAGE   19

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
 95500      C                    EXSR CLRATT                                                          04/06/93
 95600      C*                                                                                        03/26/93
 95700      C                    ENDSR                          COPYFL        SRCE3                   03/26/93
 95800      C*                                                                                        03/26/93
 95900      C/SPACE 2                                                                                 03/30/93
 96000      C*********  CPYADT SUBR  *********************  CPYADT SUBR  *                            03/30/93
 96100      C*                                                           *                            03/30/93
 96200      C*   The CPYADT subroutine copies all records for CE# passed *                            03/30/93
 96300      C*   from the data transfer file DTOADT to the entity-level  *                            03/30/93
 96400      C*   batch file BCHADS.                                      *                            03/30/93
 96500      C*                                                           *    SRCE3                   04/09/93
 96600      C*************************************************************    SRCE3                   04/09/93
 96700      C*                                                           *    SRCE3                   04/09/93
 96800      C*   INDICATORS USED  :  98  99                              *    SRCE3                   04/09/93
 96900      C*                                                           *    SRCE3                   04/09/93
 97000      C*   EXECUTED FROM    :  COPYFL                              *    SRCE3                   04/09/93
 97100      C*                                                           *    SRCE3                   04/09/93
 97200      C*************************************************************    SRCE3                   04/09/93
 97300      C*                                                                SRCE3                   04/09/93
 97400      C          CPYADT    BEGSR                                                                03/30/93
 97500      C*                                                                                        03/30/93
 97600      C*   This loop reads sequentially all records in Data Transfer                                03/30/93
 97700      C*   File DTOADT with CE# equal to the CE# passed (using logical                              03/30/93
 97800      C*   view DTOADTCE) and writes them into the batch file BCHADS.                               03/30/93
 97900      C*                                                                                        03/30/93
 98000      C          QQCENO    CHAINDTOADTCE             99                                         03/30/93
 98100      C          *IN99     DOWEQ*OFF                                                            03/30/93
 98200      C*                                                                                        03/30/93
 98300      C*   Retrieve Company Number, Customer Number and Customer PO                                 03/31/93
 98400      C*   Number from Data Transfer Order Master File (DTOMST).                                    03/31/93
 98500      C*                                                                                        03/31/93
 98600      C                    MOVE OAORDN    KORDN                                                 04/04/93
 98700      C                    MOVE QQCENO    KCENO                                                 03/31/93
 98800      C          KDTOMS    CHAINDTOMST               99                                         03/31/93
 98900      C          *IN99     IFEQ *OFF                                                            03/31/93
 99000      C*                                                                                        03/31/93
 99100      C                    MOVE OMCONO    KCONO                                                 03/31/93
 99200      C                    Z-ADDOMCUSN    KCUSN                                                 04/02/93
 99300      C                    Z-ADDOACPDT    KDATE                                                 04/06/93
 99400      C                    Z-ADDOACPTM    KTIME                                                 04/06/93
 99500      C                    MOVE OMCSPO    KCSPO                                                 03/31/93
 99600      C                    Z-ADDOAADTP    KADTP                                                 04/16/93
 99700      C          KBCHAD    CHAINBCHADS               98                                         04/02/93
 99800      C*                                                                                        03/30/93
 99900      C                    MOVE OMCONO    BICONO                                                04/04/93
100000      C                    Z-ADDOMCUSN    BICUSN                                                04/16/93
100100      C                    Z-ADDOACPDT    BIDATE                                                04/04/93
100200      C                    Z-ADDOACPTM    BITIME                                                04/04/93
100300      C*                                                                                        03/30/93
100400      C                    MOVE OMCSPO    BICSPO                                                04/06/93
100500      C                    Z-ADDOAADTP    BIADTP                                                04/16/93
100600      C                    MOVE OAORDN    BIORDN                                                04/04/93
100700      C                    MOVE OAADR1    BIADR1                                                04/16/93
```

```
     5738PW1 V2R2M0  920615                SEU SOURCE LISTING                         06/01/93 11:50:28          PAGE   20

 SOURCE FILE . . . . . . .  XLIBEM/MRPGSRC
 MEMBER  . . . . . . . . .  MMC464

 SEQNBR*...+... 1 ...+... 2 ...+... 3 ...+... 4 ...+... 5 ...+... 6 ...+... 7 ...+... 8 ...+... 9 ...+... 0
 100800      C*                                                                                              04/16/93
 100900      C                   MOVE OAADR2    BIADR2                                                       04/16/93
 101000      C                   MOVE OAADR3    BIADR3                                                       04/16/93
 101100      C                   MOVE OAADR4    BIADR4                                                       04/16/93
 101200      C                   MOVE OAADR5    BIADR5                                                       04/16/93
 101300      C*                                                                                              04/16/93
 101400      C                   MOVE OASTA     BISTA                                                        04/16/93
 101500      C                   MOVE OAPSTD    BIPSTD                                                       04/16/93
 101600      C                   MOVE OADFCR    BIDFCR                                                       04/16/93
 101700      C                   MOVE 'EM'      BIRSTA                                                       04/04/93
 101800      C*                                                                                              05/26/93
 101900      C*   If the action code is 'A' or 'C' then check the Order                                      05/26/93
 102000      C*   Address File (ORDADS) in the entity.  If the record already                                05/26/93
 102100      C*   exists there then the action code should be 'C' - change,                                  05/26/93
 102200      C*   otherwise it should be 'A' - add.                                                          05/26/93
 102300      C*                                                                                              05/26/93
 102400      C           OAACTN  IFEQ 'A'                                                                    05/26/93
 102500      C           OAACTN  OREQ 'C'                                                                    05/26/93
 102600      C                   MOVE OAORDN    KORDN                                                        05/26/93
 102700      C                   MOVE OAADTP    KADTP                                                        05/26/93
 102800      C           KORDAD  SETLLORDADS                 99                                              05/26/93
 102900      C           *IN99   IFEQ *ON                                                                    05/26/93
 103000      C                   MOVE 'C'       BIACTN                                                       05/26/93
 103100      C                   ELSE                                                                        05/26/93
 103200      C                   MOVE 'A'       BIACTN                                                       05/26/93
 103300      C                   ENDIF                         *IN99=*ON                                     05/26/93
 103400      C                   ENDIF                         OAACTN='A'                                    05/26/93
 103500      C*                                                                                              03/30/93
 103600      C*                                                                                              03/30/93
 103700      C           *IN98   IFEQ *OFF                                                                   03/30/93
 103800      C                   UPDATFBCHADS                                                                03/30/93
 103900      C                   ELSE                                                                        03/30/93
 104000      C                   WRITEFBCHADS                                                                03/30/93
 104100      C                   ENDIF                         *IN98=*OFF                                    03/30/93
 104200      C*                                                                                              03/30/93
 104300      C                   ENDIF                         *IN99=*OFF                                    04/02/93
 104400      C*                                                                                              04/02/93
 104500      C           QQCENO  READEDTOADTCE               99                                              03/30/93
 104600      C                   ENDDO                         DOW *IN99=*OFF                                03/30/93
 104700      C*                                                                                              03/30/93
 104800      C*                                                                                              03/30/93
 104900      C                   ENDSR                         CPYADT         SRCE3                          03/30/93
 105000      C*                                                                                              03/30/93
 105100      C/SPACE 2                                                                                       03/29/93
 105200      C**********  CPYATT SUBR  ***********************  CPYATT SUBR  *                               03/30/93
 105300      C*                                                              *                               03/29/93
 105400      C*   The CPYATT subroutine copies all records for CE# passed    *                               03/30/93
 105500      C*   from the data transfer file DTOATT to the entity-level     *                               03/29/93
 105600      C*   batch file BCHATR.                                         *                               03/29/93
 105700      C*                                                              *    SRCE3                      04/09/93
 105800      C****************************************************************    SRCE3                      04/09/93
 105900      C*                                                              *    SRCE3                      04/09/93
 106000      C*   INDICATORS USED  :  98  99                                 *    SRCE3                      04/09/93
```

```
     5738PW1 V2R2M0  920615              SEU SOURCE LISTING                06/01/93 11:50:28           PAGE   21

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
106100     C*                                                             *  SRCE3                   04/09/93
106200     C*   EXECUTED FROM    :  COPYFL                                *  SRCE3                   04/09/93
106300     C*                                                             *  SRCE3                   04/09/93
106400     C**************************************************************  SRCE3                   04/09/93
106500     C*                                                                SRCE3                   04/09/93
106600     C           CPYATT    BEGSR                                                               03/30/93
106700     C*                                                                                        03/29/93
106800     C*   This loop reads sequentially all records in Data Transfer                           03/29/93
106900     C*   File DTOATT with CE# equal to the CE# passed (using logical                         03/30/93
107000     C*   view DTOATTCE) and writes them into the batch file BCHATR.                          03/30/93
107100     C*                                                                                        03/29/93
107200     C           QQCENO    CHAINDTOATTCE             99                                        03/29/93
107300     C           *IN99     DOWEQ*OFF                                                           03/29/93
107400     C*                                                                                        03/29/93
107500     C*   Retrieve Company Number, Customer Number and Customer PO                            03/31/93
107600     C*   Number from Data Transfer Order Master File (DTOMST).                               03/31/93
107700     C*                                                                                        03/31/93
107800     C                     MOVE ORORDN    KORDN                                                03/31/93
107900     C                     MOVE QQCENO    KCENO                                                03/31/93
108000     C           KDTOMS    CHAINDTOMST               99                                        03/31/93
108100     C           *IN99     IFEQ *OFF                                                           03/31/93
108200     C*                                                                                        03/31/93
108300     C                     MOVE OMCONO    KCONO                                                03/31/93
108400     C                     Z-ADDOMCUSN    KCUSN                                                04/02/93
108500     C                     Z-ADDORCPDT    KDATE                                                04/06/93
108600     C                     Z-ADDORCPTM    KTIME                                                04/06/93
108700     C                     MOVE OMCSPO    KCSPO                                                03/31/93
108800     C                     MOVE ORRESR    KRESR                                                03/30/93
108900     C                     Z-ADDORRELN    KRELN                                                04/16/93
109000     C           KBCHAT    CHAINBCHATR               98                                        03/30/93
109100     C*                                                                                        03/29/93
109200     C                     MOVE OMCONO    BJCONO                                               04/16/93
109300     C                     Z-ADDOMCUSN    BJCUSN                                               04/16/93
109400     C                     Z-ADDORCPDT    BJDATE                                               03/30/93
109500     C                     Z-ADDORCPTM    BJTIME                                               03/30/93
109600     C*                                                                                        03/29/93
109700     C                     MOVE OMCSPO    BJCSPO                                               04/16/93
109800     C                     MOVE ORRESR    BJRESR                                               03/30/93
109900     C                     Z-ADDORRELN    BJRELN                                               04/16/93
110000     C                     MOVE ORORDN    BJORDN                                               03/30/93
110100     C*                                                                                        03/29/93
110200     C                     MOVE ORPTPI    BJPTPI                                               03/30/93
110300     C                     MOVE ORPTPA    BJPTPA                                               03/30/93
110400     C                     MOVE ORPTAK    BJPTAK                                               03/30/93
110500     C                     MOVE ORPTIV    BJPTIV                                               03/30/93
110600     C*                                                                                        03/29/93
110700     C                     MOVE ORFNIN    BJFNIN                                               03/30/93
110800     C                     MOVE ORINSA    BJINSA                                               03/30/93
110900     C                     MOVE ORRQPO    BJRQPO                                               03/30/93
111000     C                     MOVE ORRQTX    BJRQTX                                               03/30/93
111100     C*                                                                                        03/29/93
111200     C                     MOVE ORAGRP    BJAGRP                                               03/31/93
111300     C                     MOVE 'EM'      BJRSTA                                               03/30/93
```

```
     5738PW1 V2R2M0  920615                SEU SOURCE LISTING                    06/01/93 11:50:28             PAGE   22

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
111400     C*                                                                                          05/26/93
111500     C*   If the action code is 'A' or 'C' then check the Order                                  05/26/93
111600     C*   Attribute File (ORDATR) in the entity.  If the record already                          05/26/93
111700     C*   exists there then the action code should be 'C' - change,                              05/26/93
111800     C*   otherwise it should be 'A' - add.                                                      05/26/93
111900     C*                                                                                          05/26/93
112000     C          ORACTN    IFEQ 'A'                                                               05/26/93
112100     C          ORACTN    OREQ 'C'                                                               05/26/93
112200     C                    MOVE ORORDN    KORDN                                                   05/26/93
112300     C                    MOVE ORRESR    KRESR                                                   05/26/93
112400     C                    Z-ADDORRELN    KRELN                                                   05/26/93
112500     C          KORDAT    SETLLORDATR                  99                                        05/26/93
112600     C          *IN99     IFEQ *ON                                                               05/26/93
112700     C                    MOVE 'C'       BJACTN                                                  05/26/93
112800     C                    ELSE                                                                   05/26/93
112900     C                    MOVE 'A'       BJACTN                                                  05/26/93
113000     C                    ENDIF                          *IN99=*ON                               05/26/93
113100     C                    ENDIF                          ORACTN='A'                              05/26/93
113200     C*                                                                                          03/29/93
113300     C*                                                                                          03/29/93
113400     C          *IN98     IFEQ *OFF                                                              03/29/93
113500     C                    UPDATFBCHATR                                                           03/29/93
113600     C                    ELSE                                                                   03/29/93
113700     C                    WRITEFBCHATR                                                           03/29/93
113800     C                    ENDIF                          *IN98=*OFF                              03/29/93
113900     C*                                                                                          03/29/93
114000     C                    ENDIF                          *IN99=*OFF                              04/02/93
114100     C*                                                                                          04/02/93
114200     C          QQCENO    READEDTOATTCE                99                                        03/29/93
114300     C                    ENDDO                          DOW *IN99=*OFF                          03/29/93
114400     C*                                                                                          03/29/93
114500     C*                                                                                          03/29/93
114600     C                    ENDSR                          CPYATT         SRCE3                    03/30/93
114700     C*                                                                                          03/29/93
114800     C/SPACE 2                                                                                   03/30/93
114900     C********** CPYCHT SUBR ********************** CPYCHT SUBR *                                05/26/93
115000     C*                                                          *                               05/26/93
115100     C*   The CPYCHT subroutine copies all records for CE# passed   *                            05/26/93
115200     C*   from the data transfer file DTOCHT to the entity-level    *                            05/26/93
115300     C*   batch file BCHCHG.                                        *                            05/26/93
115400     C*                                                          *    SRCE3                      05/26/93
115500     C*************************************************************    SRCE3                     05/26/93
115600     C*                                                          *    SRCE3                      05/26/93
115700     C*   INDICATORS USED  :  98  99                              *    SRCE3                      05/26/93
115800     C*                                                          *    SRCE3                      05/26/93
115900     C*   EXECUTES         :  TRANSR                              *    SRCE3                      05/26/93
116000     C*                                                          *    SRCE3                      05/26/93
116100     C*   EXECUTED FROM    :  COPYFL                              *    SRCE3                      05/26/93
116200     C*                                                          *    SRCE3                      05/26/93
116300     C*************************************************************    SRCE3                     05/26/93
116400     C*                                                               SRCE3                      05/26/93
116500     C          CPYCHT    BEGSR                                                                  05/26/93
116600     C*                                                                                          05/26/93
```

```
5738PW1 V2R2M0  920615            SEU SOURCE LISTING                  06/01/93 11:50:28            PAGE   23

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
     C*   This loop reads sequentially all records in Data Transfer                                05/26/93
     C*   File DTOCHT with CE# equal to the CE# passed (using logical                              05/26/93
     C*   view DTOCHTCE) and writes them into the batch file BCHCHG.                               05/26/93
     C*                                                                                            05/26/93
     C          QQCENO    CHAINDTOCHTCE             99                                             05/26/93
     C          *IN99     DOWEQ*OFF                                                                05/26/93
     C*                                                                                            05/26/93
     C*   Retrieve Company Number, Customer Number and Customer PO                                 05/26/93
     C*   Number from Data Transfer Order Master File (DTOMST).                                    05/26/93
     C*                                                                                            05/26/93
     C                    MOVE OGORDN    KORDN                                                     05/26/93
     C                    MOVE QQCENO    KCENO                                                     05/26/93
     C          KDTOMS    CHAINDTOMST               99                                             05/26/93
     C          *IN99     IFEQ *OFF                                                                05/26/93
     C*                                                                                            05/26/93
     C                    MOVE OMCONO    KCONO                                                     05/26/93
     C                    Z-ADDOMCUSN    KCUSN                                                     05/26/93
     C                    Z-ADDOGCPDT    KDATE                                                     05/26/93
     C                    Z-ADDOGCPTM    KTIME                                                     05/26/93
     C                    MOVE OMCSPO    KCSPO                                                     05/26/93
     C                    MOVE OGRESR    KRESR                                                     05/26/93
     C                    Z-ADDOGRELN    KRELN                                                     05/26/93
     C                    MOVE OGABRV    KABRV                                                     05/26/93
     C                    Z-ADDOGSEQN    KSEQN                                                     05/26/93
     C          KBCHCH    CHAINBCHCHG               98                                             05/26/93
     C*                                                                                            05/26/93
     C                    MOVE OMCONO    BCCONO                                                    05/26/93
     C                    Z-ADDOMCUSN    BCCUSN                                                    05/26/93
     C                    Z-ADDOGCPDT    BCDATE                                                    05/26/93
     C                    Z-ADDOGCPTM    BCTIME                                                    05/26/93
     C*                                                                                            05/26/93
     C                    MOVE OMCSPO    BCCSPO                                                    05/26/93
     C                    MOVE OGRESR    BCRESR                                                    05/26/93
     C                    Z-ADDOGRELN    BCRELN                                                    05/26/93
     C                    MOVE OGABRV    BCABRV                                                    05/26/93
     C*                                                                                            05/26/93
     C                    Z-ADDOGSEQN    BCSEQN                                                    05/26/93
     C                    MOVE OGORDN    BCORDN                                                    05/26/93
     C                    MOVE OGSPTP    BCSPTP                                                    05/26/93
     C                    Z-ADDOGCHGS    BCCHGS                                                    05/26/93
     C*                                                                                            05/26/93
     C                    Z-ADDOGCHGH    BCCHGH                                                    05/26/93
     C                    Z-ADDOGSPCT    BCSPCT                                                    05/26/93
     C                    Z-ADDOGCOST    BCCOST                                                    05/26/93
     C                    Z-ADDOGCOSH    BCCOSH                                                    05/26/93
     C*                                                                                            05/26/93
     C                    Z-ADDOGCPCT    BCCPCT                                                    05/26/93
     C                    MOVE OGCURR    BCCURR                                                    05/26/93
     C                    MOVE OGALWD    BCALWD                                                    05/26/93
     C                    MOVE OGDESC    BCDESC                                                    05/26/93
     C*                                                                                            05/26/93
     C                    MOVE OGTXCT    BCTXCT                                                    05/26/93
     C                    MOVE OGFCR     BCFCR                                                     05/26/93
```

```
     5738PW1 V2R2M0  920615              SEU SOURCE LISTING              06/01/93 11:50:28          PAGE   24

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
122000      C                    MOVE OGAGRP    BCAGRP                                              05/26/93
122100      C                    Z-ADDOGCHGN    BCCHGN                                              05/26/93
122200      C*                                                                                      05/26/93
122300      C                    MOVE OGCHGO    BCCHGO                                              05/26/93
122400      C                    MOVE *BLANKS   BCDFLT                                              05/26/93
122500      C                    MOVE OGWHSE    BCWHSE                                              05/26/93
122600      C                    Z-ADDOGUAMS    BCUAMS                                              05/26/93
122700      C*                                                                                      05/26/93
122800      C                    Z-ADDOGUAMO    BCUAMO                                              05/26/93
122900      C                    MOVE OGCHUM    BCCHUM                                              05/26/93
123000      C                    MOVE 'EM'      BCRSTA                                              05/26/93
123100      C*                                                                                      05/26/93
123200      C*   If the action code is 'A' or 'C' then check the Order Special                          05/26/93
123300      C*   Charge File (ORDCHG) in the entity.  If the record already                             05/26/93
123400      C*   exists there then the action code should be 'C' - change,                              05/26/93
123500      C*   otherwise it should be 'A' - add.                                                      05/26/93
123600      C*                                                                                      05/26/93
123700      C          OGACTN    IFEQ 'A'                                                           05/26/93
123800      C          OGACTN    OREQ 'C'                                                           05/26/93
123900      C                    MOVE OGHIST    KHIST                                               05/26/93
124000      C                    MOVE OGORDN    KORDN                                               05/26/93
124100      C                    Z-ADDOGSYDT    KSYDT                                               05/26/93
124200      C                    MOVE OGRESR    KRESR                                               05/26/93
124300      C                    Z-ADDOGRELN    KRELN                                               05/26/93
124400      C                    MOVE OGABRV    KABRV                                               05/26/93
124500      C                    Z-ADDOGSEQN    KSEQN                                               05/26/93
124600      C          KORDCH    SETLLORDCHG                  99                                    05/26/93
124700      C          *IN99     IFEQ *ON                                                           05/26/93
124800      C                    MOVE 'C'       BCACTN                                              05/26/93
124900      C                    ELSE                                                               05/26/93
125000      C                    MOVE 'A'       BCACTN                                              05/26/93
125100      C                    ENDIF                          *IN99=*ON                           05/26/93
125200      C                    ENDIF                          OGACTN='A'                          05/26/93
125300      C*                                                                                      05/26/93
125400      C*                                                                                      05/26/93
125500      C          *IN98     IFEQ *OFF                                                          05/26/93
125600      C                    UPDATFBCHCHG                                                       05/26/93
125700      C                    ELSE                                                               05/26/93
125800      C                    WRITEFBCHCHG                                                       05/26/93
125900      C                    ENDIF                          *IN98=*OFF                          05/26/93
126000      C*                                                                                      05/26/93
126100      C                    ENDIF                          *IN99=*OFF                          05/26/93
126200      C*                                                                                      05/26/93
126300      C          QQCENO    READEDTOCHTCE                99                                    05/26/93
126400      C                    ENDDO                          DOW *IN99=*OFF                      05/26/93
126500      C*                                                                                      05/26/93
126600      C*                                                                                      05/26/93
126700      C                    ENDSR                          CPYCHT          SRCE3               05/26/93
126800      C*                                                                                      05/26/93
126900      C/SPACE 2                                                                               05/26/93
127000      C**********  CPYCMT SUBR  **********************  CPYCMT SUBR  *                        03/30/93
127100      C*                                                             *                        03/30/93
127200      C*   The CPYCMT subroutine copies all records for CE# passed   *                        03/30/93
```

```
     5738PW1 V2R2M0  920615                SEU SOURCE LISTING                          06/01/93 11:50:28                PAGE   25

 SOURCE FILE . . . . . . .    XLIBEM/MRPGSRC
 MEMBER  . . . . . . . . .    MMC464

 SEQNBR*...+... 1 ...+... 2 ...+... 3 ...+... 4 ...+... 5 ...+... 6 ...+... 7 ...+... 8 ...+... 9 ...+... 0
127300      C*   from the data transfer file DTOCMT to the entity-level       *                                      03/30/93
127400      C*   batch file BCHCOM.                                           *                                      03/30/93
127500      C*                                                                *    SRCE3                             04/09/93
127600      C*****************************************************************     SRCE3                             04/09/93
127700      C*                                                                *    SRCE3                             04/09/93
127800      C*   INDICATORS USED  :  98  99                                   *    SRCE3                             04/09/93
127900      C*                                                                *    SRCE3                             04/09/93
128000      C*   EXECUTED FROM    :  COPYFL                                   *    SRCE3                             04/09/93
128100      C*                                                                *    SRCE3                             04/09/93
128200      C*****************************************************************     SRCE3                             04/09/93
128300      C*                                                                     SRCE3                             04/09/93
128400      C          CPYCMT    BEGSR                                                                               03/30/93
128500      C*                                                                                                       03/30/93
128600      C*   This loop reads sequentially all records in Data Transfer                                           03/30/93
128700      C*   File DTOCMT with CE# equal to the CE# passed (using logical                                         03/30/93
128800      C*   view DTOCMTCE) and writes them into the batch file BCHCOM.                                          03/30/93
128900      C*                                                                                                       03/30/93
129000      C          QQCENO    CHAINDTOCMTCE             99                                                        03/30/93
129100      C          *IN99     DOWEQ*OFF                                                                           03/30/93
129200      C*                                                                                                       03/30/93
129300      C*   Retrieve Company Number, Customer Number and Customer PO                                            03/31/93
129400      C*   Number from Data Transfer Order Master File (DTOMST).                                               03/31/93
129500      C*                                                                                                       03/31/93
129600      C                    MOVE OCORDN    KORDN                                                                03/31/93
129700      C                    MOVE QQCENO    KCENO                                                                03/31/93
129800      C          KDTOMS    CHAINDTOMST               99                                                        03/31/93
129900      C          *IN99     IFEQ *OFF                                                                           03/31/93
130000      C*                                                                                                       03/31/93
130100      C                    MOVE OMCONO    KCONO                                                                03/30/93
130200      C                    Z-ADDOMCUSN    KCUSN                                                                04/02/93
130300      C                    Z-ADDOCCPDT    KDATE                                                                04/06/93
130400      C                    Z-ADDOCCPTM    KTIME                                                                04/06/93
130500      C                    MOVE OMCSPO    KCSPO                                                                03/30/93
130600      C                    MOVE OCCMTP    KCMTP                                                                04/06/93
130700      C                    MOVE OCRESR    KRESR                                                                04/23/93
130800      C                    Z-ADDOCRELN    KRELN                                                                04/16/93
130900      C                    Z-ADDOCCMTN    KCMTN                                                                04/16/93
131000      C                    MOVE OCABRV    KABRV                                                                04/02/93
131100      C                    Z-ADDOCSEQN    KSEQN                                                                04/16/93
131200      C          KBCHCO    CHAINBCHCOM               98                                                        04/04/93
131300      C*                                                                                                       03/30/93
131400      C                    MOVE OMCONO    BOCONO                                                               03/31/93
131500      C                    Z-ADDOMCUSN    BOCUSN                                                               04/16/93
131600      C                    Z-ADDOCCPDT    BODATE                                                               03/30/93
131700      C                    Z-ADDOCCPTM    BOTIME                                                               03/30/93
131800      C*                                                                                                       03/30/93
131900      C                    MOVE OMCSPO    BOCSPO                                                               03/31/93
132000      C                    MOVE OCCMTP    BOCMTP                                                               03/30/93
132100      C                    MOVE OCRESR    BORESR                                                               04/23/93
132200      C                    Z-ADDOCRELN    BORELN                                                               04/16/93
132300      C*                                                                                                       03/30/93
132400      C                    Z-ADDOCCMTN    BOCMTN                                                               04/16/93
132500      C                    MOVE OCABRV    BOABRV                                                               03/30/93
```

```
     5738PW1 V2R2M0  920615              SEU SOURCE LISTING                    06/01/93 11:50:28          PAGE   26

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
132600     C                    Z-ADDOCSEQN    BOSEQN                                                      04/16/93
132700     C                    MOVE OCORDN    BOORDN                                                      03/30/93
132800     C*                                                                                              03/30/93
132900     C                    MOVE OCONPI    BOONPI                                                      03/30/93
133000     C                    MOVE OCONPA    BOONPA                                                      03/30/93
133100     C                    MOVE OCONAK    BOONAK                                                      03/30/93
133200     C                    MOVE OCONIV    BOONIV                                                      03/30/93
133300     C*                                                                                              03/30/93
133400     C                    MOVE OCONBI    BOONBI                                                      03/30/93
133500     C                    MOVE OCONQT    BOONQT                                                      03/30/93
133600     C                    MOVE OCCMMT    BOCMMT                                                      03/30/93
133700     C                    MOVE 'EM'      BORSTA                                                      03/30/93
133800     C*                                                                                              05/26/93
133900     C*   If the action code is 'A' or 'C' then check the Order                                      05/26/93
134000     C*   Comment File (ORDCOM) in the entity.  If the record already                                05/26/93
134100     C*   exists there then the action code should be 'C' - change,                                  05/26/93
134200     C*   otherwise it should be 'A' - add.                                                          05/26/93
134300     C*                                                                                              05/26/93
134400     C          OCACTN    IFEQ 'A'                                                                   05/26/93
134500     C          OCACTN    OREQ 'C'                                                                   05/26/93
134600     C                    MOVE OCORDN    KORDN                                                       05/26/93
134700     C                    MOVE OCCMTP    KCMTP                                                       05/26/93
134800     C                    MOVE OCRESR    KRESR                                                       05/26/93
134900     C                    Z-ADDOCRELN    KRELN                                                       05/26/93
135000     C                    Z-ADDOCCMTN    KCMTN                                                       05/26/93
135100     C                    MOVE OCABRV    KABRV                                                       05/26/93
135200     C                    Z-ADDOCSEQN    KSEQN                                                       05/26/93
135300     C          KORDCO    SETLLORDCOM                99                                          05/26/93
135400     C          *IN99     IFEQ *ON                                                                   05/26/93
135500     C                    MOVE 'C'       BOACTN                                                      05/26/93
135600     C                    ELSE                                                                       05/26/93
135700     C                    MOVE 'A'       BOACTN                                                      05/26/93
135800     C                    ENDIF                        *IN99=*ON                                     05/26/93
135900     C                    ENDIF                        OCACTN='A'                                    05/26/93
136000     C*                                                                                              03/30/93
136100     C*                                                                                              03/30/93
136200     C          *IN98     IFEQ *OFF                                                                  03/30/93
136300     C                    UPDATFBCHCOM                                                               03/30/93
136400     C                    ELSE                                                                       03/30/93
136500     C                    WRITEFBCHCOM                                                               03/30/93
136600     C                    ENDIF                        *IN98=*OFF                                    03/30/93
136700     C*                                                                                              03/30/93
136800     C                    ENDIF                        *IN99=*OFF                                    04/02/93
136900     C*                                                                                              04/02/93
137000     C          QQCENO    READEDTOCMTCE              99                                            04/07/93
137100     C                    ENDDO                        DOW *IN99=*OFF                                03/30/93
137200     C*                                                                                              03/30/93
137300     C*                                                                                              03/30/93
137400     C                    ENDSR                        CPYCMT        SRCE3                           03/30/93
137500     C*                                                                                              03/30/93
137600     C/SPACE 2                                                                                       03/25/92
137700     C**********  CPYCOP SUBR  ***********************  CPYCOP SUBR  *                                03/26/93
137800     C*                                                             *                                03/25/92
```

```
5738PW1 V2R2M0  920615               SEU SOURCE LISTING                    06/01/93 11:50:28          PAGE   27

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
137900     C*   The CPYCOP subroutine reads DTCOPT file and determines    *                             03/26/93
138000     C*   into which batch file a deletion record has to be written. *                            03/26/93
138100     C*   Then it writes the appropriate record.                    *                             03/26/93
138200     C*                                                             *    SRCE3                    04/09/93
138300     C**************************************************************    SRCE3                    04/09/93
138400     C*                                                             *    SRCE3                    04/09/93
138500     C*   INDICATORS USED  :  98  99                                *    SRCE3                    04/09/93
138600     C*                                                             *    SRCE3                    04/09/93
138700     C*   EXECUTED FROM    :  COPYFL                                *    SRCE3                    04/09/93
138800     C*                                                             *    SRCE3                    04/09/93
138900     C**************************************************************    SRCE3                    04/09/93
139000     C*                                                                  SRCE3                    04/09/93
139100     C          CPYCOP    BEGSR                                                                   03/26/93
139200     C*                                                                                           03/25/92
139300     C*   This loop reads sequentially all records in Data Transfer                               03/26/92
139400     C*   File DTCOPT with CE# equal to the CE# passed (using logical                             03/26/93
139500     C*   view DTCOPTCE) and writes a deletion record into appropriate                            03/26/93
139600     C*   batch file.                                                                             03/26/93
139700     C*                                                                                           03/26/92
139800     C          QQCENO    CHAINDTCOPTCE             99                                            03/26/93
139900     C          *IN99     DOWEQ*OFF                                                               04/20/92
140000     C*                                                                                           03/31/93
140100     C*   Retrieve Company Number, Customer Number and Customer PO                                03/31/93
140200     C*   Number from Data Transfer Order Master File (DTOMST).                                   03/31/93
140300     C*                                                                                           03/31/93
140400     C                    MOVE OOORDN    KORDN                                                    03/31/93
140500     C                    MOVE QQCENO    KCENO                                                    03/31/93
140600     C          KDTOMS    CHAINDTOMST               99                                            03/31/93
140700     C          *IN99     IFEQ *OFF                                                               03/31/93
140800     C*                                                                                           03/31/93
140900     C*                                                                                           03/29/93
141000     C*  If the file name in OOFILE field is 'ORDCHG', then write                                 03/29/93
141100     C*  a record into Batch Special Charge File.                                                 03/29/93
141200     C*                                                                                           03/29/93
141300     C          OOFILE    IFEQ 'ORDCHG'                                                           03/29/93
141400     C                    MOVE OMCONO    KCONO                                                    03/30/93
141500     C                    Z-ADDOMCUSN    KCUSN                                                    03/29/93
141600     C                    Z-ADDOMCPDT    KDATE                                                    04/07/93
141700     C                    Z-ADDOMCPTM    KTIME                                                    04/07/93
141800     C                    MOVE OMCSPO    KCSPO                                                    03/29/93
141900     C                    MOVE OORESR    KRESR                                                    03/30/93
142000     C                    Z-ADDOORELN    KRELN                                                    04/16/93
142100     C                    MOVE OOABRV    KABRV                                                    03/30/93
142200     C                    Z-ADDOOSEQN    KSEQN                                                    04/16/93
142300     C          KBCHCH    CHAINBCHCHG               98                                            03/29/93
142400     C*                                                                                           03/29/93
142500     C                    MOVE OMCONO    BCCONO                                                   03/30/93
142600     C                    Z-ADDOMCUSN    BCCUSN                                                   03/30/93
142700     C                    Z-ADDOMCPDT    BCDATE                                                   04/06/93
142800     C                    Z-ADDOMCPTM    BCTIME                                                   04/06/93
142900     C*                                                                                           03/29/93
143000     C                    MOVE OMCSPO    BCCSPO                                                   03/30/93
143100     C                    MOVE OORESR    BCRESR                                                   03/29/93
```

```
     5738PW1 V2R2M0  920615                SEU SOURCE LISTING                       06/01/93 11:50:28              PAGE   28

    SOURCE FILE . . . . . . .  XLIBEM/MRPGSRC
    MEMBER  . . . . . . . . .  MMC464

    SEQNBR*...+... 1 ...+... 2 ...+... 3 ...+... 4 ...+... 5 ...+... 6 ...+... 7 ...+... 8 ...+... 9 ...+... 0
    143200      C                    Z-ADDOORELN    BCRELN                                                          04/16/93
    143300      C                    MOVE OOABRV    BCABRV                                                          03/29/93
    143400      C*                                                                                                  03/30/93
    143500      C                    Z-ADDOOSEQN    BCSEQN                                                          04/16/93
    143600      C                    MOVE OOACTN    BCACTN                                                          03/29/93
    143700      C*                                                                                                  03/29/93
    143800      C          *IN98     IFEQ *OFF                                                                      03/29/93
    143900      C                    UPDATFBCHCHG                                                                   03/29/93
    144000      C                    ELSE                                                                           03/29/93
    144100      C                    WRITEFBCHCHG                                                                   03/29/93
    144200      C                    ENDIF                              *IN98=*OFF                                  03/29/93
    144300      C                    ENDIF                              OOFILE='ORDCHG'                             03/30/93
    144400      C*                                                                                                  03/29/93
    144500      C*                                                                                                  03/29/93
    144600      C*  If the file name in OOFILE field is 'ORDCOM', then write                                       03/29/93
    144700      C*  a record into Batch Order Comment File.                                                         03/29/93
    144800      C*                                                                                                  03/29/93
    144900      C          OOFILE    IFEQ 'ORDCOM'                                                                  03/29/93
    145000      C                    MOVE OMCONO    KCONO                                                           03/30/93
    145100      C                    Z-ADDOMCUSN    KCUSN                                                           03/29/93
    145200      C                    Z-ADDOMCPDT    KDATE                                                           04/06/93
    145300      C                    Z-ADDOMCPTM    KTIME                                                           04/06/93
    145400      C                    MOVE OMCSPO    KCSPO                                                           03/29/93
    145500      C                    MOVE OOCMTP    KCMTP                                                           03/30/93
    145600      C                    MOVE ORESR     KRESR                                                           03/30/93
    145700      C                    Z-ADDOORELN    KRELN                                                           04/16/93
    145800      C                    Z-ADDOOCMTN    KCMTN                                                           04/16/93
    145900      C                    MOVE OOABRV    KABRV                                                           03/30/93
    146000      C                    Z-ADDOOSEQN    KSEQN                                                           04/16/93
    146100      C          KBCHCO    CHAINBCHCOM               98                                                   03/29/93
    146200      C*                                                                                                  03/29/93
    146300      C                    MOVE OMCONO    BOCONO                                                          03/30/93
    146400      C                    Z-ADDOMCUSN    BOCUSN                                                          03/30/93
    146500      C                    Z-ADDOMCPDT    BODATE                                                          04/06/93
    146600      C                    Z-ADDOMCPTM    BOTIME                                                          04/06/93
    146700      C*                                                                                                  03/29/93
    146800      C                    MOVE OMCSPO    BOCSPO                                                          03/30/93
    146900      C                    MOVE OOCMTP    BOCMTP                                                          03/30/93
    147000      C                    MOVE OORESR    BORESR                                                          03/29/93
    147100      C                    Z-ADDOORELN    BORELN                                                          04/16/93
    147200      C*                                                                                                  03/30/93
    147300      C                    Z-ADDOOCMTN    BOCMTN                                                          04/16/93
    147400      C                    MOVE OOABRV    BOABRV                                                          03/29/93
    147500      C                    Z-ADDOOSEQN    BOSEQN                                                          04/16/93
    147600      C                    MOVE OOACTN    BOACTN                                                          03/29/93
    147700      C*                                                                                                  03/29/93
    147800      C          *IN98     IFEQ *OFF                                                                      03/29/93
    147900      C                    UPDATFBCHCOM                                                                   03/29/93
    148000      C                    ELSE                                                                           03/29/93
    148100      C                    WRITEFBCHCOM                                                                   03/29/93
    148200      C                    ENDIF                              *IN98=*OFF                                  03/29/93
    148300      C                    ENDIF                              OOFILE='ORDCOM'                             03/30/93
    148400      C*                                                                                                  03/29/93
```

```
5738PW1 V2R2M0  920615            SEU SOURCE LISTING            06/01/93 11:50:28        PAGE   29

SOURCE FILE . . . . . . .   XLIBEM/MRPGSRC
MEMBER  . . . . . . . . .   MMC464

SEQNBR*...+... 1 ...+... 2 ...+... 3 ...+... 4 ...+... 5 ...+... 6 ...+... 7 ...+... 8 ...+... 9 ...+... 0
     C*                                                                          03/30/93
     C*  If the file name in OOFILE field is 'ORDDIS', then write                03/30/93
     C*  a record into Batch Order Discount File.                                03/31/93
     C*                                                                          03/30/93
     C           OOFILE    IFEQ 'ORDDIS'                                         03/30/93
     C                     MOVE OMCONO    KCONO                                  03/30/93
     C                     Z-ADDOMCUSN    KCUSN                                  03/30/93
     C                     Z-ADDOMCPDT    KDATE                                  04/07/93
     C                     Z-ADDOMCPTM    KTIME                                  04/07/93
     C                     MOVE OMCSPO    KCSPO                                  03/30/93
     C                     MOVE OORESR    KRESR                                  03/30/93
     C                     Z-ADDOORELN    KRELN                                  04/16/93
     C                     Z-ADDOOSEQN    KSEQN                                  04/16/93
     C           KBCHDI    CHAINBCHDIS               98                          03/30/93
     C*                                                                          03/30/93
     C                     MOVE OMCONO    BXCONO                                 03/30/93
     C                     Z-ADDOMCUSN    BXCUSN                                 03/30/93
     C                     Z-ADDOMCPDT    BXDATE                                 04/06/93
     C                     Z-ADDOMCPTM    BXTIME                                 04/06/93
     C*                                                                          03/30/93
     C                     MOVE OMCSPO    BXCSPO                                 03/30/93
     C                     MOVE OORESR    BXRESR                                 03/30/93
     C                     Z-ADDOORELN    BXRELN                                 04/16/93
     C                     Z-ADDOOSEQN    BXSEQN                                 04/16/93
     C*                                                                          03/30/93
     C                     MOVE OOACTN    BXACTN                                 03/30/93
     C*                                                                          03/30/93
     C           *IN98     IFEQ *OFF                                             03/30/93
     C                     UPDATFBCHDIS                                          03/30/93
     C                     ELSE                                                  03/30/93
     C                     WRITEFBCHDIS                                          03/30/93
     C                     ENDIF                          *IN98=*OFF             03/30/93
     C                     ENDIF                          OOFILE='ORDDIS'        03/30/93
     C*                                                                          03/30/93
     C*                                                                          03/30/93
     C*  If the file name in OOFILE field is 'ORDPRM', then write                03/30/93
     C*  a record into Batch Order Promotions File.                              03/31/93
     C*  (In promotion files, resc is loaded with the paid resc                  04/06/93
     C*   and free resc is loaded with the resc.)                                04/06/93
     C*                                                                          03/30/93
     C           OOFILE    IFEQ 'ORDPRM'                                         03/30/93
     C                     MOVE OMCONO    KCONO                                  03/30/93
     C                     Z-ADDOMCUSN    KCUSN                                  03/30/93
     C                     Z-ADDOMCPDT    KDATE                                  04/07/93
     C                     Z-ADDOMCPTM    KTIME                                  04/07/93
     C                     MOVE OMCSPO    KCSPO                                  03/30/93
     C                     MOVE OOPRES    KRESR                                  04/06/93
     C                     Z-ADDOORELN    KRELN                                  04/16/93
     C                     MOVE OORESR    KFREE                                  04/06/93
     C           KBCHPR    CHAINBCHPRM               98                          03/30/93
     C*                                                                          03/30/93
     C                     MOVE OMCONO    HPCONO                                 03/31/93
     C                     Z-ADDOMCUSN    HPCUSN                                 03/31/93
```

```
5738PW1 V2R2M0  920615                SEU SOURCE LISTING                  06/01/93 11:50:28              PAGE   30

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
153800      C                 Z-ADDOMCPDT    HPDATE                                                     04/06/93
153900      C                 Z-ADDOMCPTM    HPTIME                                                     04/06/93
154000      C*                                                                                          03/30/93
154100      C                 MOVE OMCSPO    HPCSPO                                                     03/31/93
154200      C                 MOVE OOPRES    HPRESR                                                     04/06/93
154300      C                 Z-ADDOORELN    HPRELN                                                     04/16/93
154400      C                 MOVE OORESR    HPFREE                                                     04/06/93
154500      C*                                                                                          03/30/93
154600      C                 MOVE OOACTN    HPACTN                                                     03/31/93
154700      C*                                                                                          03/30/93
154800      C         *IN98   IFEQ *OFF                                                                 03/30/93
154900      C                 UPDATFBCHPRM                                                              03/30/93
155000      C                 ELSE                                                                      03/30/93
155100      C                 WRITEFBCHPRM                                                              03/30/93
155200      C                 ENDIF                             *IN98=*OFF                              03/30/93
155300      C                 ENDIF                             OOFILE='ORDPRM'                         03/30/93
155400      C*                                                                                          03/30/93
155500      C*                                                                                          03/30/93
155600      C* If the file name in OOFILE field is 'ORDCUS', then write                                03/30/93
155700      C* a record into Batch Customer Attributes File.                                           03/31/93
155800      C*                                                                                          03/30/93
155900      C         OOFILE  IFEQ 'ORDCUS'                                                             03/30/93
156000      C                 MOVE OMCONO    KCONO                                                      03/30/93
156100      C                 Z-ADDOMCUSN    KCUSN                                                      03/30/93
156200      C                 Z-ADDOMCPDT    KDATE                                                      04/07/93
156300      C                 Z-ADDOMCPTM    KTIME                                                      04/07/93
156400      C                 MOVE OMCSPO    KCSPO                                                      03/30/93
156500      C         KBCHCU  CHAINBCHCUS               98                                              03/31/93
156600      C*                                                                                          03/30/93
156700      C                 MOVE OMCONO    BUCONO                                                     03/31/93
156800      C                 Z-ADDOMCUSN    BUCUSN                                                     03/31/93
156900      C                 Z-ADDOMCPDT    BUDATE                                                     04/06/93
157000      C                 Z-ADDOMCPTM    BUTIME                                                     04/06/93
157100      C*                                                                                          03/30/93
157200      C                 MOVE OMCSPO    BUCSPO                                                     03/31/93
157300      C                 MOVE OOACTN    BUACTN                                                     03/31/93
157400      C*                                                                                          03/30/93
157500      C         *IN98   IFEQ *OFF                                                                 03/30/93
157600      C                 UPDATFBCHCUS                                                              03/30/93
157700      C                 ELSE                                                                      03/30/93
157800      C                 WRITEFBCHCUS                                                              03/30/93
157900      C                 ENDIF                             *IN98=*OFF                              03/30/93
158000      C                 ENDIF                             OOFILE='ORDCUS'                         03/30/93
158100      C*                                                                                          03/31/93
158200      C*                                                                                          03/31/93
158300      C* If the file name in OOFILE field is 'ORDADS', then write                                03/31/93
158400      C* a record into Batch Order Address File.                                                 03/31/93
158500      C*                                                                                          03/31/93
158600      C         OOFILE  IFEQ 'ORDADS'                                                             03/31/93
158700      C                 MOVE OMCONO    KCONO                                                      03/31/93
158800      C                 Z-ADDOMCUSN    KCUSN                                                      03/31/93
158900      C                 Z-ADDOMCPDT    KDATE                                                      04/07/93
159000      C                 Z-ADDOMCPTM    KTIME                                                      04/07/93
```

```
5738PW1 V2R2M0  920615                SEU SOURCE LISTING                    06/01/93 11:50:28              PAGE   31

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
159100     C                    MOVE OMCSPO    KCSPO                                                03/31/93
159200     C                    Z-ADDOOADTP    KADTP                                                04/16/93
159300     C          KBCHAD    CHAINBCHADS               98                                        03/31/93
159400     C*                                                                                       03/31/93
159500     C                    MOVE OMCONO    BICONO                                               03/31/93
159600     C                    Z-ADDOMCUSN    BICUSN                                               03/31/93
159700     C                    Z-ADDOMCPDT    BIDATE                                               04/06/93
159800     C                    Z-ADDOMCPTM    BITIME                                               04/06/93
159900     C*                                                                                       03/31/93
160000     C                    MOVE OMCSPO    BICSPO                                               03/31/93
160100     C                    Z-ADDOOADTP    BIADTP                                               04/16/93
160200     C                    MOVE OOACTN    BIACTN                                               03/31/93
160300     C*                                                                                       03/31/93
160400     C          *IN98     IFEQ *OFF                                                           03/31/93
160500     C                    UPDATFBCHADS                                                        03/31/93
160600     C                    ELSE                                                                03/31/93
160700     C                    WRITEFBCHADS                                                        03/31/93
160800     C                    ENDIF                               *IN98=*OFF                      03/31/93
160900     C                    ENDIF                               OOFILE='ORDADS'                 03/31/93
161000     C*                                                                                       03/31/93
161100     C*                                                                                       03/31/93
161200     C*  If the file name in OOFILE field is 'ORDATR', then write                             03/31/93
161300     C*  a record into Batch Order Attribute File.                                            03/31/93
161400     C*                                                                                       03/31/93
161500     C          OOFILE    IFEQ 'ORDATR'                                                       03/31/93
161600     C                    MOVE OMCONO    KCONO                                                03/31/93
161700     C                    Z-ADDOMCUSN    KCUSN                                                03/31/93
161800     C                    Z-ADDOMCPDT    KDATE                                                04/07/93
161900     C                    Z-ADDOMCPTM    KTIME                                                04/07/93
162000     C                    MOVE OMCSPO    KCSPO                                                03/31/93
162100     C                    MOVE OORESR    KRESR                                                03/31/93
162200     C                    Z-ADDOORELN    KRELN                                                04/16/93
162300     C          KBCHAT    CHAINBCHATR               98                                        03/31/93
162400     C*                                                                                       03/31/93
162500     C                    MOVE OMCONO    BJCONO                                               03/31/93
162600     C                    Z-ADDOMCUSN    BJCUSN                                               03/31/93
162700     C                    Z-ADDOMCPDT    BJDATE                                               04/06/93
162800     C                    Z-ADDOMCPTM    BJTIME                                               04/06/93
162900     C*                                                                                       03/31/93
163000     C                    MOVE OMCSPO    BJCSPO                                               03/31/93
163100     C                    MOVE OORESR    BJRESR                                               03/31/93
163200     C                    Z-ADDOORELN    BJRELN                                               04/16/93
163300     C                    MOVE OOACTN    BJACTN                                               03/31/93
163400     C*                                                                                       03/31/93
163500     C          *IN98     IFEQ *OFF                                                           03/31/93
163600     C                    UPDATFBCHATR                                                        03/31/93
163700     C                    ELSE                                                                03/31/93
163800     C                    WRITEFBCHATR                                                        03/31/93
163900     C                    ENDIF                               *IN98=*OFF                      03/31/93
164000     C                    ENDIF                               OOFILE='ORDATR'                 04/02/93
164100     C*                                                                                       04/26/93
164200     C*                                                                                       04/26/93
164300     C*  If the file name in OOFILE field is 'ORDDET', then write                             04/26/93
```

```
5738PW1 V2R2M0  920615              SEU SOURCE LISTING                  06/01/93 11:50:28              PAGE   32

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
          C*  a record into Batch Order Detail File.                                                         04/26/93
          C*                                                                                                 04/26/93
          C           OOFILE    IFEQ 'ORDDET'                                                                04/26/93
          C                     MOVE OMCONO    KCONO                                                         04/26/93
          C                     Z-ADDOMCUSN    KCUSN                                                         04/26/93
          C                     Z-ADDOMCPDT    KDATE                                                         04/26/93
          C                     Z-ADDOMCPTM    KTIME                                                         04/26/93
          C                     MOVE OMCSPO    KCSPO                                                         04/26/93
          C                     MOVE OORESR    KRESR                                                         04/26/93
          C                     Z-ADDOORELN    KRELN                                                         04/26/93
          C           KBCHDE    CHAINBCHDET               98                                                 04/26/93
          C*                                                                                                 04/26/93
          C                     MOVE OMCONO    BTCONO                                                        04/26/93
          C                     Z-ADDOMCUSN    BTCUSN                                                        04/26/93
          C                     Z-ADDOMCPDT    BTDATE                                                        04/26/93
          C                     Z-ADDOMCPTM    BTTIME                                                        04/26/93
          C*                                                                                                 04/26/93
          C                     MOVE OMCSPO    BTCSPO                                                        04/26/93
          C                     MOVE OORESR    BTRESR                                                        04/26/93
          C                     Z-ADDOORELN    BTRELN                                                        04/26/93
          C                     MOVE OOACTN    BTACTN                                                        04/26/93
          C*                                                                                                 04/26/93
          C           *IN98     IFEQ *OFF                                                                    04/26/93
          C                     UPDATFBCHDET                                                                 04/26/93
          C                     ELSE                                                                         04/26/93
          C                     WRITEFBCHDET                                                                 04/26/93
          C                     ENDIF                           *IN98=*OFF                                   04/26/93
          C                     ENDIF                           OOFILE='ORDDET'                              04/26/93
          C*                                                                                                 03/31/93
          C                     ENDIF                           *IN99=*OFF                                   03/31/93
          C*                                                                                                 03/30/93
          C*                                                                                                 03/29/93
          C           QQCENO    READEDTCOPTCE                 99                                             04/02/93
          C                     ENDDO                           DOW *IN99=*OFF                               04/20/92
          C*                                                                                                 03/27/92
          C*                                                                                                 03/27/92
          C                     ENDSR                           CPYCOP         SRCE3                         03/26/93
          C*                                                                                                 03/25/92
          C/SPACE 2                                                                                          03/26/93
          C*********  CPYCST SUBR  ***********************  CPYCST SUBR  *                                   03/30/93
          C*                                                             *                                   03/30/93
          C*   The CPYCST subroutine copies all records for CE# passed   *                                   03/30/93
          C*   from the data transfer file DTOCST to the entity-level    *                                   03/30/93
          C*   batch file BCHCUS.                                        *                                   03/30/93
          C*                                                             *     SRCE3                         04/09/93
          C***************************************************************     SRCE3                         04/09/93
          C*                                                             *     SRCE3                         04/09/93
          C*   INDICATORS USED  :  98  99                                *     SRCE3                         04/09/93
          C*                                                             *     SRCE3                         04/09/93
          C*   EXECUTED FROM    :  COPYFL                                *     SRCE3                         04/09/93
          C*                                                             *     SRCE3                         04/09/93
          C***************************************************************     SRCE3                         04/09/93
          C*                                                                   SRCE3                         04/09/93
```

```
     5738PW1 V2R2M0  920615                 SEU SOURCE LISTING                       06/01/93 11:50:28            PAGE   33

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
169700      C           CPYCST    BEGSR                                                                  03/30/93
169800      C*                                                                                           03/30/93
169900      C*    This loop reads sequentially all records in Data Transfer                              03/30/93
170000      C*    File DTOCST with CE# equal to the CE# passed (using logical                            03/30/93
170100      C*    view DTOCSTCE) and writes them into the batch file BCHCUS.                             03/30/93
170200      C*                                                                                           03/30/93
170300      C           QQCENO    CHAINDTOCSTCE             99                                           03/30/93
170400      C           *IN99     DOWEQ*OFF                                                              03/30/93
170500      C*                                                                                           03/30/93
170600      C*    Retrieve the Customer PO Number from Data Transfer                                     04/02/93
170700      C*    Order Master File (DTOMST).                                                            04/02/93
170800      C*                                                                                           03/31/93
170900      C                     MOVE OUORDN    KORDN                                                   04/02/93
171000      C                     MOVE QQCENO    KCENO                                                   03/31/93
171100      C           KDTOMS    CHAINDTOMST               99                                           03/31/93
171200      C           *IN99     IFEQ *OFF                                                              03/31/93
171300      C*                                                                                           03/31/93
171400      C                     MOVE OUCONO    KCONO                                                   04/02/93
171500      C                     Z-ADDOUCUSN    KCUSN                                                   04/02/93
171600      C                     Z-ADDOUCPDT    KDATE                                                   04/06/93
171700      C                     Z-ADDOUCPTM    KTIME                                                   04/06/93
171800      C                     MOVE OMCSPO    KCSPO                                                   03/30/93
171900      C           KBCHCU    CHAINBCHCUS               98                                           04/06/93
172000      C*                                                                                           03/30/93
172100      C                     MOVE OUCONO    BUCONO                                                  04/02/93
172200      C                     Z-ADDOUCUSN    BUCUSN                                                  04/16/93
172300      C                     Z-ADDOUCPDT    BUDATE                                                  04/02/93
172400      C                     Z-ADDOUCPTM    BUTIME                                                  04/02/93
172500      C*                                                                                           03/30/93
172600      C                     MOVE OMCSPO    BUCSPO                                                  04/02/93
172700      C                     MOVE OUORDN    BUORDN                                                  04/02/93
172800      C                     MOVE OUAGRP    BUAGRP                                                  04/02/93
172900      C                     Z-ADDOUPLLC    BUPLLC                                                  04/16/93
173000      C*                                                                                           03/30/93
173100      C                     Z-ADDOUDLLC    BUDLLC                                                  04/16/93
173200      C                     MOVE OUCONT    BUCONT                                                  04/02/93
173300      C                     MOVE OUALWU    BUALWU                                                  04/02/93
173400      C                     MOVE OUALWI    BUALWI                                                  04/02/93
173500      C*                                                                                           03/30/93
173600      C                     MOVE OUPRCD    BUPRCD                                                  04/02/93
173700      C                     MOVE OUDSCD    BUDSCD                                                  04/02/93
173800      C                     MOVE OURPCD    BURPCD                                                  04/02/93
173900      C                     MOVE OUACBO    BUACBO                                                  04/02/93
174000      C*                                                                                           03/30/93
174100      C                     Z-ADDOUCTPR    BUCTPR                                                  04/16/93
174200      C                     MOVE OUREG1    BUREG1                                                  04/02/93
174300      C                     MOVE OUREG2    BUREG2                                                  04/02/93
174400      C                     MOVE OUREG3    BUREG3                                                  04/02/93
174500      C*                                                                                           04/02/93
174600      C                     MOVE OUREG4    BUREG4                                                  04/02/93
174700      C                     MOVE OUREG5    BUREG5                                                  04/02/93
174800      C                     MOVE OUREG6    BUREG6                                                  04/02/93
174900      C                     MOVE OUREG7    BUREG7                                                  04/02/93
```

```
5738PW1 V2R2M0  920615               SEU SOURCE LISTING                06/01/93 11:50:28          PAGE   34

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
           C*                                                                                  04/02/93
           C                     MOVE OUREG8    BUREG8                                         04/02/93
           C                     MOVE OUREG9    BUREG9                                         04/02/93
           C                     MOVE OUREGO    BUREGO                                         04/02/93
           C                     Z-ADDOUCRLM    BUCRLM                                         04/16/93
           C*                                                                                  04/02/93
           C                     MOVE OURSCC    BURSCC                                         04/02/93
           C                     MOVE OUCVPC    BUCVPC                                         04/02/93
           C                     MOVE OUTXB1    BUTXB1                                         04/02/93
           C                     MOVE OUTXB2    BUTXB2                                         04/02/93
           C                     MOVE OUTXB3    BUTXB3                                         04/07/93
           C                     MOVE OUTXB4    BUTXB4                                         04/07/93
           C*                                                                                  04/02/93
           C                     MOVE OUTXRG    BUTXRG                                         04/02/93
           C                     MOVE OUTMTX    BUTMTX                                         04/02/93
           C                     MOVE OUCNTY    BUCNTY                                         04/02/93
           C                     MOVE OUTRMS    BUTRMS                                         04/02/93
           C*                                                                                  04/02/93
           C                     MOVE 'EM'      BURSTA                                         04/02/93
           C*                                                                                  05/26/93
           C*  If the action code is 'A' or 'C' then check the Customer                        05/26/93
           C*  Attribute File (ORDCUS) in the entity.  If the record already                   05/26/93
           C*  exists there then the action code should be 'C' - change,                       05/26/93
           C*  otherwise it should be 'A' - add.                                               05/26/93
           C*                                                                                  05/26/93
           C           OUACTN    IFEQ 'A'                                                      05/26/93
           C           OUACTN    OREQ 'C'                                                      05/26/93
           C           OUORDN    SETLLORDCUS                 99                                05/26/93
           C           *IN99     IFEQ *ON                                                      05/26/93
           C                     MOVE 'C'       BUACTN                                         05/26/93
           C                     ELSE                                                          05/26/93
           C                     MOVE 'A'       BUACTN                                         05/26/93
           C                     ENDIF                         *IN99=*ON                       05/26/93
           C                     ENDIF                         OUACTN='A'                      05/26/93
           C*                                                                                  03/30/93
           C*                                                                                  03/30/93
           C           *IN98     IFEQ *OFF                                                     03/30/93
           C                     UPDATFBCHCUS                                                  03/30/93
           C                     ELSE                                                          03/30/93
           C                     WRITEFBCHCUS                                                  03/30/93
           C                     ENDIF                         *IN98=*OFF                      03/30/93
           C*                                                                                  03/30/93
           C                     ENDIF                         *IN99=*OFF                      04/02/93
           C*                                                                                  04/02/93
           C           QQCENO    READEDTOCSTCE               99                                03/30/93
           C                     ENDDO                         DOW *IN99=*OFF                  03/30/93
           C*                                                                                  03/30/93
           C*                                                                                  03/30/93
           C                     ENDSR                         CPYCST         SRCE3            03/30/93
           C*                                                                                  03/30/93
           C/SPACE 2                                                                           03/30/93
           C**********  CPYDET SUBR  ***********************  CPYDET SUBR  *                    03/30/93
           C*                                                             *                    03/30/93
```

```
     5738PW1 V2R2M0  920615                SEU SOURCE LISTING                     06/01/93 11:50:28              PAGE   35

 SOURCE FILE . . . . . . .   XLIBEM/MRPGSRC
 MEMBER  . . . . . . . . .   MMC464

 SEQNBR*...+... 1 ...+... 2 ...+... 3 ...+... 4 ...+... 5 ...+... 6 ...+... 7 ...+... 8 ...+... 9 ...+... 0
 180300      C*   The CPYDET subroutine copies all records for CE# passed    *                                  03/30/93
 180400      C*   from the data transfer file DTODET to the entity-level     *                                  03/30/93
 180500      C*   batch file BCHDET.                                         *                                  03/30/93
 180600      C*                                                              *    SRCE3                         04/09/93
 180700      C****************************************************************    SRCE3                         04/09/93
 180800      C*                                                              *    SRCE3                         04/09/93
 180900      C*   INDICATORS USED  :  98  99                                 *    SRCE3                         04/09/93
 181000      C*                                                              *    SRCE3                         04/09/93
 181100      C*   EXECUTES         :  TRANSR                                 *    SRCE3                         04/09/93
 181200      C*                                                              *    SRCE3                         04/09/93
 181300      C*   EXECUTED FROM    :  COPYFL                                 *    SRCE3                         04/09/93
 181400      C*                                                              *    SRCE3                         04/09/93
 181500      C****************************************************************    SRCE3                         04/09/93
 181600      C*                                                                   SRCE3                         04/09/93
 181700      C          CPYDET    BEGSR                                                                         03/30/93
 181800      C*                                                                                                 03/30/93
 181900      C*   This loop reads sequentially all records in Data Transfer                                     03/30/93
 182000      C*   File DTODET with CE# equal to the CE# passed (using logical                                   03/30/93
 182100      C*   view DTODETCE) and writes them into the batch file BCHDET.                                    03/30/93
 182200      C*                                                                                                 03/30/93
 182300      C          QQCENO    CHAINDTODETCE             99                                                  03/30/93
 182400      C          *IN99     DOWEQ*OFF                                                                     03/30/93
 182500      C*                                                                                                 03/31/93
 182600      C*   Retrieve Customer PO Number from Data Transfer Order                                          04/02/93
 182700      C*   Order Master File (DTOMST).                                                                   04/02/93
 182800      C*                                                                                                 03/31/93
 182900      C                    MOVE ODORDN    KORDN                                                          04/02/93
 183000      C                    MOVE QQCENO    KCENO                                                          03/31/93
 183100      C          KDTOMS    CHAINDTOMST               99                                                  03/31/93
 183200      C          *IN99     IFEQ *OFF                                                                     03/31/93
 183300      C*                                                                                                 03/30/93
 183400      C                    MOVE ODCONO    KCONO                                                          04/02/93
 183500      C                    Z-ADDODCUSN    KCUSN                                                          04/02/93
 183600      C                    Z-ADDODCPDT    KDATE                                                          04/06/93
 183700      C                    Z-ADDODCPTM    KTIME                                                          04/06/93
 183800      C                    MOVE OMCSPO    KCSPO                                                          03/30/93
 183900      C                    MOVE ODRESR    KRESR                                                          04/23/93
 184000      C                    Z-ADDODRELN    KRELN                                                          04/16/93
 184100      C*                                                                                                 04/02/93
 184200      C          KBCHDE    CHAINBCHDET               98                                                  04/02/93
 184300      C*                                                                                                 03/30/93
 184400      C                    MOVE ODCONO    BTCONO                                                         04/02/93
 184500      C                    Z-ADDODCUSN    BTCUSN                                                         04/02/93
 184600      C                    Z-ADDODCPDT    BTDATE                                                         04/02/93
 184700      C                    Z-ADDODCPTM    BTTIME                                                         04/02/93
 184800      C*                                                                                                 03/30/93
 184900      C                    MOVE OMCSPO    BTCSPO                                                         04/02/93
 185000      C                    MOVE ODRESR    BTRESR                                                         04/23/93
 185100      C                    Z-ADDODRELN    BTRELN                                                         04/16/93
 185200      C                    MOVE ODORDN    BTORDN                                                         04/02/93
 185300      C*                                                                                                 03/30/93
 185400      C                    Z-ADDODQYCS    BTQYCS                                                         04/16/93
 185500      C                    Z-ADDODRQDT    BTRQDT                                                         04/16/93
```

```
     5738PW1 V2R2M0  920615               SEU SOURCE LISTING                      06/01/93 11:50:28             PAGE   36

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
185600       C                Z-ADDODPMDT    BTPMDT                                                      04/16/93
185700       C                Z-ADDODPL      BTPL                                                        04/16/93
185800       C*                                                                                          03/30/93
185900       C                MOVE ODPDEC    BTPDEC                                                      04/02/93
186000       C                Z-ADDODPIVC    BTPIVC                                                      04/16/93
186100       C                MOVE ODFOBD    BTFOBD                                                      04/02/93
186200       C                Z-ADDODCSLN    BTCSLN                                                      04/16/93
186300       C*                                                                                          03/30/93
186400       C                MOVE ODCITM    BTCITM                                                      04/02/93
186500       C                MOVE ODITDS    BTITDS                                                      04/02/93
186600       C                MOVE ODWHSE    BTWHSE                                                      04/02/93
186700       C                MOVE ODORGN    BTORGN                                                      04/02/93
186800       C*                                                                                          03/30/93
186900       C                MOVE ODCSUM    BTCSUM                                                      04/02/93
187000       C                MOVE ODPRUM    BTPRUM                                                      04/02/93
187100       C                MOVE ODDSUM    BTDSUM                                                      04/02/93
187200       C                Z-ADDODPRMY    BTPRMY                                                      04/16/93
187300       C*                                                                                          03/30/93
187400       C                MOVE ODHLCD    BTHLCD                                                      04/02/93
187500       C                MOVE ODSTAT    BTSTAT                                                      04/02/93
187600       C                Z-ADDODTXCM    BTTXCM                                                      04/16/93
187700       C                Z-ADDODSPCH    BTSPCH                                                      04/16/93
187800       C*                                                                                          03/30/93
187900       C                MOVE ODTXCT    BTTXCT                                                      04/02/93
188000       C                MOVE ODITDC    BTITDC                                                      04/02/93
188100       C                MOVE ODPLCK    BTPLCK                                                      04/02/93
188200       C                MOVE ODDLCK    BTDLCK                                                      04/02/93
188300       C*                                                                                          03/30/93
188400       C                Z-ADDODDLI1    BTDLI1                                                      04/16/93
188500       C                Z-ADDODDLI2    BTDLI2                                                      04/16/93
188600       C                Z-ADDODDLI3    BTDLI3                                                      04/16/93
188700       C                Z-ADDODDLI4    BTDLI4                                                      04/16/93
188800       C*                                                                                          04/02/93
188900       C                Z-ADDODDLI5    BTDLI5                                                      04/16/93
189000       C                Z-ADDODDLI6    BTDLI6                                                      04/16/93
189100       C                Z-ADDODDLI7    BTDLI7                                                      04/16/93
189200       C                Z-ADDODDLI8    BTDLI8                                                      04/16/93
189300       C*                                                                                          04/02/93
189400       C                Z-ADDODDLI9    BTDLI9                                                      04/16/93
189500       C                Z-ADDODDL10    BTDL10                                                      04/16/93
189600       C                MOVE ODDOVR    BTDOVR                                                      04/02/93
189700       C                MOVE ODPOVR    BTPOVR                                                      04/02/93
189800       C*                                                                                          03/30/93
189900       C                MOVE ODOVRP    BTOVRP                                                      04/02/93
190000       C                MOVE ODOVRW    BTOVRW                                                      04/02/93
190100       C                MOVE ODTRDC    BTTRDC                                                      04/02/93
190200       C                MOVE ODREFN    BTREFN                                                      04/02/93
190300       C*                                                                                          03/30/93
190400       C                MOVE ODAGRP    BTAGRP                                                      04/04/93
190500       C                MOVE ODWSID    BTWSID                                                      04/02/93
190600       C                MOVE ODMIS1    BTMIS1                                                      04/02/93
190700       C                Z-ADDODMIS2    BTMIS2                                                      04/16/93
190800       C*                                                                                          04/02/93
```

```
5738PW1 V2R2M0  920615              SEU SOURCE LISTING                  06/01/93 11:50:28          PAGE   37

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
190900     C                   MOVE ODMIS3    BTMIS3                                              04/02/93
191000     C                   Z-ADDODRQTM    BTRQTM                                              04/16/93
191100     C                   Z-ADDODPMTM    BTPMTM                                              04/16/93
191200     C                   MOVE ODPRHC    BTPRHC                                              04/02/93
191300     C*                                                                                     04/02/93
191400     C                   MOVE ODIADJ    BTIADJ                                              04/02/93
191500     C                   MOVE ODSHIP    BTSHIP                                              04/02/93
191600     C                   MOVE ODSHDF    BTSHDF                                              04/02/93
191700     C                   MOVE ODOFEN    BTOFEN                                              04/02/93
191800     C*                                                                                     04/02/93
191900     C                   MOVE ODOTEN    BTOTEN                                              04/02/93
192000     C                   MOVE ODOREN    BTOREN                                              04/02/93
192100     C                   MOVE ODCENO    BTCENO                                              04/02/93
192200     C                   MOVE 'EM'      BTRSTA                                              05/26/93
192300     C*                                                                                     04/02/93
192400     C                   MOVE *BLANKS   BTEMPR                                              04/02/93
192500     C*                                                                                     05/26/93
192600     C*   If the action code is 'A' or 'C' then check the Order                             05/26/93
192700     C*   Detail File (ORDDET) in the entity.  If the record already                        05/26/93
192800     C*   exists there than the action code should be 'C' - change,                         05/26/93
192900     C*   otherwise it should be 'A' - add.                                                 05/26/93
193000     C*                                                                                     05/26/93
193100     C         ODACTN    IFEQ 'A'                                                           05/26/93
193200     C         ODACTN    OREQ 'C'                                                           05/26/93
193300     C                   MOVE ODORDN    KORDN                                               05/26/93
193400     C                   MOVE ODRESR    KRESR                                               05/26/93
193500     C                   Z-ADDODRELN    KRELN                                               05/26/93
193600     C                   MOVE ODPRES    KPRES                                               05/26/93
193700     C         KORDDE    SETLLORDDET              99                                        05/26/93
193800     C         *IN99     IFEQ *ON                                                           05/26/93
193900     C                   MOVE 'C'       BTACTN                                              05/26/93
194000     C                   ELSE                                                               05/26/93
194100     C                   MOVE 'A'       BTACTN                                              05/26/93
194200     C                   ENDIF                      *IN99=*ON                               05/26/93
194300     C                   ENDIF                      ODACTN='A'                              05/26/93
194400     C*                                                                                     03/30/93
194500     C*                                                                                     03/30/93
194600     C         *IN98     IFEQ *OFF                                                          03/30/93
194700     C                   UPDATFBCHDET                                                       03/30/93
194800     C                   ELSE                                                               03/30/93
194900     C                   WRITEFBCHDET                                                       03/30/93
195000     C                   ENDIF                      *IN98=*OFF                              03/30/93
195100     C*                                                                                     03/30/93
195200     C                   ENDIF                      *IN99=*OFF                              04/02/93
195300     C*                                                                                     04/02/93
195400     C         QQCENO    READEDTODETCE            99                                        03/30/93
195500     C                   ENDDO                      DOW *IN99=*OFF                          03/30/93
195600     C*                                                                                     03/30/93
195700     C*                                                                                     03/30/93
195800     C                   ENDSR                      CPYDET        SRCE3                     03/30/93
195900     C*                                                                                     03/30/93
196000     C/SPACE 2                                                                              03/30/93
196100     C*********  CPYDST SUBR  ***********************  CPYDST SUBR  *                       03/30/93
```

```
5738PW1 V2R2M0  920615                 SEU SOURCE LISTING                  06/01/93 11:50:28          PAGE   38

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
196200     C*                                                             *                  03/30/93
196300     C*   The CPYDST subroutine copies all records for CE# passed   *                  03/30/93
196400     C*   from the data transfer file DTODST to the entity-level    *                  03/30/93
196500     C*   batch file BCHDIS.                                        *                  03/30/93
196600     C*                                                             *    SRCE3         04/09/93
196700     C**************************************************************    SRCE3         04/09/93
196800     C*                                                             *    SRCE3         04/09/93
196900     C*   INDICATORS USED  :  98  99                                *    SRCE3         04/09/93
197000     C*                                                             *    SRCE3         04/09/93
197100     C*   EXECUTES         :  TRANSR                                *    SRCE3         04/09/93
197200     C*                                                             *    SRCE3         04/09/93
197300     C*   EXECUTED FROM    :  COPYFL                                *    SRCE3         04/09/93
197400     C*                                                             *    SRCE3         04/09/93
197500     C**************************************************************    SRCE3         04/09/93
197600     C*                                                                  SRCE3         04/09/93
197700     C          CPYDST    BEGSR                                                        03/30/93
197800     C*                                                                                03/30/93
197900     C*   This loop reads sequentially all records in Data Transfer                   03/30/93
198000     C*   File DTODST with CE# equal to the CE# passed (using logical                 03/30/93
198100     C*   view DTODSTCE) and writes them into the batch file BCHDIS.                  03/30/93
198200     C*                                                                                03/30/93
198300     C          QQCENO    CHAINDTODSTCE             99                                 03/30/93
198400     C          *IN99     DOWEQ*OFF                                                    03/30/93
198500     C*                                                                                03/30/93
198600     C*   Retrieve Company Number, Customer Number and Customer PO                    03/31/93
198700     C*   Number from Data Transfer Order Master File (DTOMST).                       03/31/93
198800     C*                                                                                03/31/93
198900     C                    MOVE OIORDN    KORDN                                         04/02/93
199000     C                    MOVE QQCENO    KCENO                                         03/31/93
199100     C          KDTOMS    CHAINDTOMST               99                                 03/31/93
199200     C          *IN99     IFEQ *OFF                                                    03/31/93
199300     C*                                                                                03/31/93
199400     C                    MOVE OMCONO    KCONO                                         03/30/93
199500     C                    Z-ADDOMCUSN    KCUSN                                         04/02/93
199600     C                    Z-ADDOICPDT    KDATE                                         04/06/93
199700     C                    Z-ADDOICPTM    KTIME                                         04/06/93
199800     C                    MOVE OMCSPO    KCSPO                                         03/30/93
199900     C                    MOVE OIRESR    KRESR                                         04/23/93
200000     C                    Z-ADDOIRELN    KRELN                                         04/16/93
200100     C                    Z-ADDOISEQN    KSEQN                                         04/16/93
200200     C          KBCHDI    CHAINBCHDIS               98                                 04/06/93
200300     C*                                                                                03/30/93
200400     C                    MOVE OMCONO    BXCONO                                        04/02/93
200500     C                    Z-ADDOMCUSN    BXCUSN                                        04/16/93
200600     C                    Z-ADDOICPDT    BXDATE                                        04/02/93
200700     C                    Z-ADDOICPTM    BXTIME                                        04/02/93
200800     C*                                                                                03/30/93
200900     C                    MOVE OMCSPO    BXCSPO                                        04/02/93
201000     C                    MOVE OIRESR    BXRESR                                        04/23/93
201100     C                    Z-ADDOIRELN    BXRELN                                        04/16/93
201200     C                    Z-ADDOISEQN    BXSEQN                                        04/16/93
201300     C                    MOVE OIORDN    BXORDN                                        04/02/93
201400     C*                                                                                03/30/93
```

```
5738PW1 V2R2M0  920615                SEU SOURCE LISTING                 06/01/93 11:50:28           PAGE   39

 SOURCE FILE . . . . . . .  XLIBEM/MRPGSRC
 MEMBER  . . . . . . . . .  MMC464

 SEQNBR*...+... 1 ...+... 2 ...+... 3 ...+... 4 ...+... 5 ...+... 6 ...+... 7 ...+... 8 ...+... 9 ...+... 0
201500      C                    MOVE OIDTYP    BXDTYP                                                      04/02/93
201600      C                    MOVE OIRESN    BXRESN                                                      04/02/93
201700      C                    MOVE OIRDES    BXRDES                                                      04/02/93
201800      C                    Z-ADDOIUAMS    BXUAMS                                                      04/16/93
201900      C*                                                                                              03/30/93
202000      C                    Z-ADDOIUAMO    BXUAMO                                                      04/16/93
202100      C                    MOVE OIDSUM    BXDSUM                                                      04/02/93
202200      C                    Z-ADDOIDPCT    BXDPCT                                                      04/16/93
202300      C                    MOVE OIPADS    BXPADS                                                      04/02/93
202400      C*                                                                                              03/30/93
202500      C                    Z-ADDOIDL      BXDL                                                        04/16/93
202600      C                    MOVE OISYSD    BXSYSD                                                      04/02/93
202700      C                    MOVE OISHIV    BXSHIV                                                      04/02/93
202800      C                    MOVE OIACRL    BXACRL                                                      04/02/93
202900      C*                                                                                              04/02/93
203000      C                    MOVE OIGLDT    BXGLDT                                                      04/02/93
203100      C                    MOVE OIAGRP    BXAGRP                                                      04/02/93
203200      C                    Z-ADDOIPROM    BXPROM                                                      04/16/93
203300      C                    Z-ADDOIDTIV    BXDTIV                                                      04/16/93
203400      C*                                                                                              04/02/93
203500      C                    MOVE OIPROF    BXPROF                                                      04/02/93
203600      C                    MOVE OIEVNT    BXEVNT                                                      04/02/93
203700      C*                                                                                              04/02/93
203800      C                    MOVE OIDLI1    BXDLI1                                                      04/02/93
203900      C                    MOVE OIDLI2    BXDLI2                                                      04/02/93
204000      C                    MOVE 'EM'      BXRSTA                                                      04/02/93
204100      C*                                                                                              05/26/93
204200      C*   If the action code is 'A' or 'C' then check the Order                                      05/26/93
204300      C*   Discount File (ORDDIS) in the entity.  If the record already                               05/26/93
204400      C*   exists there then the action code should be 'C' - change,                                  05/26/93
204500      C*   otherwise it should be 'A' - add.                                                          05/26/93
204600      C*                                                                                              05/26/93
204700      C          OIACTN    IFEQ 'A'                                                                   05/26/93
204800      C          OIACTN    OREQ 'C'                                                                   05/26/93
204900      C                    MOVE OIORDN    KORDN                                                       05/26/93
205000      C                    MOVE OIRESR    KRESR                                                       05/26/93
205100      C                    Z-ADDOIRELN    KRELN                                                       05/26/93
205200      C                    Z-ADDOISEQN    KSEQN                                                       05/26/93
205300      C          KORDDI    SETLLORDDIS                     99                                         05/26/93
205400      C          *IN99     IFEQ *ON                                                                   05/26/93
205500      C                    MOVE 'C'       BXACTN                                                      05/26/93
205600      C                    ELSE                                                                       05/26/93
205700      C                    MOVE 'A'       BXACTN                                                      05/26/93
205800      C                    ENDIF                             *IN99=*ON                                05/26/93
205900      C                    ENDIF                             OIACTN='A'                               05/26/93
206000      C*                                                                                              03/30/93
206100      C*                                                                                              03/30/93
206200      C          *IN98     IFEQ *OFF                                                                  03/30/93
206300      C                    UPDATFBCHDIS                                                               03/30/93
206400      C                    ELSE                                                                       03/30/93
206500      C                    WRITEFBCHDIS                                                               03/30/93
206600      C                    ENDIF                             *IN98=*OFF                               03/30/93
206700      C*                                                                                              04/02/93
```

```
     5738PW1 V2R2M0  920615                SEU SOURCE LISTING                    06/01/93 11:50:28               PAGE   40

   SOURCE FILE . . . . . . .   XLIBEM/MRPGSRC
   MEMBER  . . . . . . . . .   MMC464

   SEQNBR*...+... 1 ...+... 2 ...+... 3 ...+... 4 ...+... 5 ...+... 6 ...+... 7 ...+... 8 ...+... 9 ...+... 0
   206800      C                    ENDIF                           *IN99=*OFF                                     04/02/93
   206900      C*                                                                                                  03/30/93
   207000      C          QQCENO    READEDTODSTCE                 99                                               03/30/93
   207100      C                    ENDDO                           DOW *IN99=*OFF                                 03/30/93
   207200      C*                                                                                                  03/30/93
   207300      C*                                                                                                  03/30/93
   207400      C                    ENDSR                           CPYDST         SRCE3                           03/30/93
   207500      C*                                                                                                  03/30/93
   207600      C/SPACE 2                                                                                           03/26/93
   207700      C**********  CPYMST SUBR  ***********************  CPYMST SUBR  *                                   03/26/93
   207800      C*                                                            *                                     03/26/93
   207900      C*   The CPYMST subroutine copies all records for CE# passed    *                                     03/29/93
   208000      C*   from the data transfer file DTOMST to the entity-level     *                                     03/29/93
   208100      C*   batch file BCHMST.                                         *                                     03/29/93
   208200      C*                                                            *   SRCE3                             04/09/93
   208300      C**************************************************************   SRCE3                             04/09/93
   208400      C*                                                            *   SRCE3                             04/09/93
   208500      C*   INDICATORS USED  :  98  99                                 *   SRCE3                             04/09/93
   208600      C*                                                            *   SRCE3                             04/09/93
   208700      C*   EXECUTED FROM    :  COPYFL                                 *   SRCE3                             04/09/93
   208800      C*                                                            *   SRCE3                             04/09/93
   208900      C**************************************************************   SRCE3                             04/09/93
   209000      C*                                                                SRCE3                             04/09/93
   209100      C          CPYMST    BEGSR                                                                          03/26/93
   209200      C*                                                                                                  03/26/93
   209300      C*   This loop reads sequentially all records in Data Transfer                                        03/26/93
   209400      C*   File DTOMST with CE# equal to the CE# passed (using logical                                      03/26/93
   209500      C*   view DTOMSTCE) and writes them into the batch file BCHMST.                                       03/26/93
   209600      C*                                                                                                  03/26/93
   209700      C          QQCENO    CHAINDTOMSTCE             99                                                 03/26/93
   209800      C          *IN99     DOWEQ*OFF                                                                      03/26/93
   209900      C*                                                                                                  03/26/93
   210000      C                    MOVE OMCONO    KCONO                                                         03/26/93
   210100      C                    Z-ADDOMCUSN    KCUSN                                                         04/02/93
   210200      C                    Z-ADDOMCPDT    KDATE                                                         04/06/93
   210300      C                    Z-ADDOMCPTM    KTIME                                                         04/06/93
   210400      C                    MOVE OMCSPO    KCSPO                                                         03/26/93
   210500      C          KBCHMS    CHAINBCHMST               98                                                 03/26/93
   210600      C*                                                                                                  03/26/93
   210700      C                    MOVE OMCONO    BACONO                                                        03/26/93
   210800      C                    Z-ADDOMCUSN    BACUSN                                                        03/29/93
   210900      C                    Z-ADDOMCPDT    BADATE                                                        03/29/93
   211000      C                    Z-ADDOMCPTM    BATIME                                                        03/29/93
   211100      C*                                                                                                  03/26/93
   211200      C                    MOVE OMCSPO    BACSPO                                                        03/26/93
   211300      C                    MOVE OMORDN    BAORDN                                                        03/26/93
   211400      C                    MOVE OMEDIC    BAEDIC                                                        03/26/93
   211500      C                    MOVE OMSRCE    BASRCE                                                        03/26/93
   211600      C*                                                                                                  03/26/93
   211700      C                    Z-ADDOMRQDT    BARQDT                                                        04/16/93
   211800      C                    Z-ADDOMPMDT    BAPMDT                                                        04/16/93
   211900      C                    Z-ADDOMRQTM    BARQTM                                                        04/16/93
   212000      C                    Z-ADDOMPMTM    BAPMTM                                                        04/16/93
```

```
5738PW1 V2R2M0  920615              SEU SOURCE LISTING              06/01/93 11:50:28          PAGE   41

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
212100     C*                                                                                    03/26/93
212200     C                   Z-ADDOMORDT    BAORDT                                             04/16/93
212300     C                   Z-ADDOMORTM    BAORTM                                             04/16/93
212400     C                   MOVE OMPROF    BAPROF                                             03/26/93
212500     C                   MOVE OMUSOR    BAUSOR                                             03/26/93
212600     C*                                                                                    03/26/93
212700     C                   MOVE OMSTAT    BASTAT                                             03/26/93
212800     C                   MOVE OMCRHC    BACRHC                                             03/26/93
212900     C                   MOVE OMOTHC    BAOTHC                                             03/26/93
213000     C                   MOVE OMCSHC    BACSHC                                             03/26/93
213100     C                   MOVE OMWTHC    BAWTHC                                             03/26/93
213200     C*                                                                                    03/26/93
213300     C                   MOVE OMWUHC    BAWUHC                                             03/26/93
213400     C                   MOVE OMVLHC    BAVLHC                                             03/26/93
213500     C                   MOVE OMVUHC    BAVUHC                                             03/26/93
213600     C                   MOVE OMAMHC    BAAMHC                                             03/26/93
213700     C*                                                                                    03/26/93
213800     C                   MOVE OMMODE    BAMODE                                             03/26/93
213900     C                   Z-ADDOMHEAD    BAHEAD                                             04/16/93
214000     C                   Z-ADDOMTAIL    BATAIL                                             04/16/93
214100     C                   MOVE OMREFN    BAREFN                                             03/26/93
214200     C*                                                                                    03/26/93
214300     C                   MOVE OMPCUR    BAPCUR                                             03/26/93
214400     C                   MOVE OMOFOB    BAOFOB                                             03/26/93
214500     C                   Z-ADDOMSRGP    BASRGP                                             04/16/93
214600     C                   Z-ADDOMPRMY    BAPRMY                                             04/16/93
214700     C*                                                                                    03/26/93
214800     C                   Z-ADDOMTMAX    BATMAX                                             04/16/93
214900     C                   Z-ADDOMTMIV    BATMIV                                             04/16/93
215000     C                   MOVE OMOICM    BAOICM                                             03/26/93
215100     C                   Z-ADDOMCRMM    BACRMM                                             04/16/93
215200     C*                                                                                    03/26/93
215300     C                   MOVE OMOORD    BAOORD                                             03/26/93
215400     C                   MOVE OMPMHD    BAPMHD                                             03/26/93
215500     C                   MOVE OMAFLG    BAAFLG                                             03/26/93
215600     C                   Z-ADDOMSYDT    BASYDT                                             04/16/93
215700     C*                                                                                    03/26/93
215800     C                   MOVE OMIFLG    BAIFLG                                             03/26/93
215900     C                   MOVE OMTXLG    BATXLG                                             03/26/93
216000     C                   MOVE OMINST    BAINST                                             03/26/93
216100     C                   Z-ADDOMCUCR    BACUCR                                             04/16/93
216200     C*                                                                                    03/26/93
216300     C                   MOVE OMCUCC    BACUCC                                             03/26/93
216400     C                   MOVE OMRTLK    BARTLK                                             03/26/93
216500     C                   Z-ADDOMSPCH    BASPCH                                             04/16/93
216600     C                   Z-ADDOMPRTY    BAPRTY                                             04/16/93
216700     C*                                                                                    03/26/93
216800     C                   MOVE OMMIS1    BAMIS1                                             03/26/93
216900     C                   Z-ADDOMMIS2    BAMIS2                                             04/16/93
217000     C                   MOVE OMMIS3    BAMIS3                                             03/26/93
217100     C                   MOVE OMWHSE    BAWHSE                                             03/26/93
217200     C*                                                                                    03/26/93
217300     C                   MOVE OMIADJ    BAIADJ                                             03/26/93
```

```
5738PW1 V2R2M0  920615                 SEU SOURCE LISTING                    06/01/93 11:50:28            PAGE   42

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
217400     C                    MOVE OMBCHL    BABCHL                                             03/26/93
217500     C                    MOVE OMDLCK    BADLCK                                             03/26/93
217600     C                    MOVE OMSHIP    BASHIP                                             03/26/93
217700     C*                                                                                     03/26/93
217800     C                    MOVE OMDFWH    BADFWH                                             03/26/93
217900     C                    MOVE OMROUT    BAROUT                                             03/26/93
218000     C                    MOVE OMDOVR    BADOVR                                             03/26/93
218100     C                    MOVE OMOVRP    BAOVRP                                             03/26/93
218200     C*                                                                                     03/26/93
218300     C                    MOVE OMOVRW    BAOVRW                                             03/26/93
218400     C                    MOVE OMOTEN    BAOTEN                                             03/26/93
218500     C                    MOVE 'EM'      BARSTA                                             03/26/93
218600     C                    MOVE 'EM'      BABSTA                                             03/26/93
218700     C*                                                                                     03/26/93
218800     C*   If the action code is 'D' - delete, then load it as it is.                        03/26/93
218900     C*                                                                                     03/26/93
219000     C          OMACTN    IFEQ 'D'                                                          03/26/93
219100     C                    MOVE OMACTN    BAACTN                                             03/26/93
219200     C                    ENDIF                           OMACTN='D'                        03/26/93
219300     C*                                                                                     03/26/93
219400     C*   If the action code is blank then load 'P' - place holder.                         03/26/93
219500     C*                                                                                     03/26/93
219600     C          OMACTN    IFEQ ' '                                                          03/26/93
219700     C                    MOVE 'P'       BAACTN                                             03/26/93
219800     C                    ENDIF                           OMACTN=' '                        03/26/93
219900     C*                                                                                     03/26/93
220000     C*   If the action code is 'A' or 'C' then check the  Order                            03/26/93
220100     C*   Master File (ORDMST) in the entity.  If the record already                        03/26/93
220200     C*   exists there then the action code should be 'C' - change,                         03/26/93
220300     C*   otherwise it should be 'A' - add.                                                 03/26/93
220400     C*                                                                                     03/26/93
220500     C          OMACTN    IFEQ 'A'                                                          03/26/93
220600     C          OMACTN    OREQ 'C'                                                          03/26/93
220700     C          OMORDN    SETLLORDMST                 99                                    03/26/93
220800     C          *IN99     IFEQ *ON                                                          03/26/93
220900     C                    MOVE 'C'       BAACTN                                             03/26/93
221000     C                    ELSE                                                              03/26/93
221100     C                    MOVE 'A'       BAACTN                                             03/26/93
221200     C                    ENDIF                           *IN99=*ON                         03/26/93
221300     C                    ENDIF                           OMACTN='A'                        03/26/93
221400     C*                                                                                     04/06/93
221500     C                    MOVE OMCENO    BACENO                                             04/06/93
221600     C*                                                                                     03/26/93
221700     C          *IN98     IFEQ *OFF                                                         03/26/93
221800     C                    UPDATFBCHMST                                                      03/26/93
221900     C                    ELSE                                                              03/26/93
222000     C                    WRITEFBCHMST                                                      03/26/93
222100     C                    ENDIF                           *IN98=*OFF                        03/26/93
222200     C*                                                                                     03/26/93
222300     C          QQCENO    READEDTOMSTCE               99                                    03/26/93
222400     C                    ENDDO                           DOW *IN99=*OFF                    03/26/93
222500     C*                                                                                     03/26/93
222600     C*                                                                                     03/26/93
```

```
     5738PW1 V2R2M0  920615                SEU SOURCE LISTING                      06/01/93 11:50:28          PAGE   43

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
222700      C                   ENDSR                          CPYMST          SRCE3                              03/26/93
222800      C*                                                                                                    03/26/93
222900      C/SPACE 2                                                                                             03/31/93
223000      C*********  CPYPMT SUBR  *********************** CPYPMT SUBR  *                                       03/31/93
223100      C*                                                             *                                      03/31/93
223200      C*   The CPYPMT subroutine copies all records for CE# passed   *                                      03/31/93
223300      C*   from the data transfer file DTOPMT to the entity-level    *                                      03/31/93
223400      C*   batch file BCHPRM.                                        *                                      03/31/93
223500      C*                                                             *  SRCE3                               04/09/93
223600      C**************************************************************** SRCE3                               04/09/93
223700      C*                                                             *  SRCE3                               04/09/93
223800      C*   INDICATORS USED  :  98  99                                *  SRCE3                               04/09/93
223900      C*                                                             *  SRCE3                               04/09/93
224000      C*   EXECUTES         :  TRANSR                                *  SRCE3                               04/09/93
224100      C*                                                             *  SRCE3                               04/09/93
224200      C*   EXECUTED FROM    :  COPYFL                                *  SRCE3                               04/09/93
224300      C*                                                             *  SRCE3                               04/09/93
224400      C**************************************************************** SRCE3                               04/09/93
224500      C*                                                                SRCE3                               04/09/93
224600      C         CPYPMT    BEGSR                                                                             03/31/93
224700      C*                                                                                                    03/31/93
224800      C*   This loop reads sequentially all records in Data Transfer                                        03/31/93
224900      C*   File DTOPMT with CE# equal to the CE# passed (using logical                                      03/31/93
225000      C*   view DTOPMTCE) and writes them into the batch file BCHPRM.                                       03/31/93
225100      C*                                                                                                    03/31/93
225200      C         QQCENO    CHAINDTOPMTCE             99                                                      03/31/93
225300      C         *IN99     DOWEQ*OFF                                                                         03/31/93
225400      C*                                                                                                    03/31/93
225500      C*   Retrieve Company Number, Customer Number and Customer PO                                         03/31/93
225600      C*   Number from Data Transfer Order Master File (DTOMST).                                            03/31/93
225700      C*                                                                                                    03/31/93
225800      C                   MOVE ONORDN    KORDN                                                              03/31/93
225900      C                   MOVE QQCENO    KCENO                                                              03/31/93
226000      C         KDTOMS    CHAINDTOMST               99                                                      03/31/93
226100      C         *IN99     IFEQ *OFF                                                                         03/31/93
226200      C*                                                                                                    03/31/93
226300      C                   MOVE OMCONO    KCONO                                                              03/31/93
226400      C                   Z-ADDOMCUSN    KCUSN                                                              04/02/93
226500      C                   Z-ADDONCPDT    KDATE                                                              04/06/93
226600      C                   Z-ADDONCPTM    KTIME                                                              04/06/93
226700      C                   MOVE OMCSPO    KCSPO                                                              03/31/93
226800      C                   MOVE ONRESR    KRESR                                                              04/23/93
226900      C                   Z-ADDONRELN    KRELN                                                              04/16/93
227000      C                   MOVE ONFREE    KFREE                                                              03/31/93
227100      C         KBCHPR    CHAINBCHPRM               98                                                      04/06/93
227200      C*                                                                                                    03/31/93
227300      C                   MOVE OMCONO    HPCONO                                                             03/31/93
227400      C                   Z-ADDOMCUSN    HPCUSN                                                             03/31/93
227500      C                   Z-ADDONCPDT    HPDATE                                                             03/31/93
227600      C                   Z-ADDONCPTM    HPTIME                                                             03/31/93
227700      C*                                                                                                    03/31/93
227800      C                   MOVE OMCSPO    HPCSPO                                                             03/31/93
227900      C                   MOVE ONORDN    HPORDN                                                             03/31/93
```

```
5738PW1 V2R2M0  920615                SEU SOURCE LISTING                06/01/93 11:50:28          PAGE   44

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
        C                    MOVE ONRESR    HPRESR                                              04/23/93
        C                    Z-ADDONRELN    HPRELN                                              04/16/93
        C*                                                                                      03/31/93
        C                    MOVE ONFREE    HPFREE                                              03/31/93
        C                    Z-ADDONQTY     HPQTY                                               04/16/93
        C                    MOVE ONUMSR    HPUMSR                                              03/31/93
        C*                                                                                      03/31/93
        C                    MOVE ONRESN    HPRESN                                              03/31/93
        C                    MOVE ONRDES    HPRDES                                              03/31/93
        C                    MOVE ONAGRP    HPAGRP                                              03/31/93
        C                    MOVE ONSYSG    HPSYSG                                              03/31/93
        C*                                                                                      03/31/93
        C                    Z-ADDONDL      HPDL                                                04/16/93
        C                    MOVE ONDLTP    HPDLTP                                              03/31/93
        C                    Z-ADDONPROM    HPPROM                                              04/16/93
        C                    MOVE 'EM'      HPRSTA                                              03/31/93
        C*                                                                                      05/26/93
        C*   If the action code is 'A' or 'C' then check the Order                              05/26/93
        C*   Promotion File (ORDPRM) in the entity.  If the record already                      05/26/93
        C*   exists there then the action code should be 'C' - change,                          05/26/93
        C*   otherwise it should be 'A' - add.                                                  05/26/93
        C*                                                                                      05/26/93
        C          ONACTN    IFEQ 'A'                                                           05/26/93
        C          ONACTN    OREQ 'C'                                                           05/26/93
        C                    MOVE ONORDN    KORDN                                               05/26/93
        C                    MOVE ONRESR    KRESR                                               05/26/93
        C                    Z-ADDONRELN    KRELN                                               05/26/93
        C                    MOVE ONFREE    KFREE                                               05/26/93
        C          KORDPR    SETLLORDPRM                   99                                   05/26/93
        C          *IN99     IFEQ *ON                                                           05/26/93
        C                    MOVE 'C'       HPACTN                                              05/26/93
        C                    ELSE                                                               05/26/93
        C                    MOVE 'A'       HPACTN                                              05/26/93
        C                    ENDIF                           *IN99=*ON                          05/26/93
        C                    ENDIF                           ONACTN='A'                         05/26/93
        C*                                                                                      03/31/93
        C*                                                                                      03/31/93
        C          *IN98     IFEQ *OFF                                                          03/31/93
        C                    UPDATFBCHPRM                                                       03/31/93
        C                    ELSE                                                               03/31/93
        C                    WRITEFBCHPRM                                                       03/31/93
        C                    ENDIF                           *IN98=*OFF                         03/31/93
        C*                                                                                      03/31/93
        C                    ENDIF                           *IN99=*OFF                         04/02/93
        C*                                                                                      04/02/93
        C          QQCENO    READEDTOPMTCE                 99                                   03/31/93
        C                    ENDDO                           DOW *IN99=*OFF                     03/31/93
        C*                                                                                      03/31/93
        C*                                                                                      03/31/93
        C                    ENDSR                           CPYPMT       SRCE3                 03/31/93
        C*                                                                                      03/31/93
        C/SPACE 2                                                                               03/26/93
        C**********  LDPARM SUBR  **********************  LDPARM SUBR  *                        04/06/93
```

```
SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
233300     C*                                                             *                             04/06/93
233400     C*  The LDPARM subroutine performs the following functions:    *                             04/06/93
233500     C*                                                             *                             04/06/93
233600     C*    1. Retrieves the name of the local entity, user date     *                             04/06/93
233700     C*       format, the current date in user format, and whether  *                             04/06/93
233800     C*       COM is installed and interfacing in this entity.      *                             04/06/93
233900     C*       The result will be passed back to the calling program.*                             04/06/93
234000     C*                                                             *   SRCE3                     04/09/93
234100     C**************************************************************   SRCE3                     04/09/93
234200     C*                                                             *   SRCE3                     04/09/93
234300     C*  INDICATORS USED  :  99                                     *   SRCE3                     04/09/93
234400     C*                                                             *   SRCE3                     04/09/93
234500     C*  EXECUTED FROM    :  MAINLN                                 *   SRCE3                     04/09/93
234600     C*                                                             *   SRCE3                     04/09/93
234700     C**************************************************************   SRCE3                     04/09/93
234800     C*                                                                 SRCE3                     04/09/93
234900     C           LDPARM    BEGSR                                                                  04/06/93
235000     C*                                                                                           04/06/93
235100     C* Do loop to control the flow of the subroutine.                                            04/06/93
235200     C*                                                                                           04/06/93
235300     C                     DO                                                                     04/06/93
235400     C*                                                                                           04/06/93
235500     C* Use the name of the local entity from LOCCOM for the local                                04/07/93
235600     C* CE being processed and load this into QQENT.                                              04/06/93
235700     C* QQENT has to be loaded first because it is used in                                        04/06/93
235800     C* the next step - in the loading of QQCOM.                                                  04/06/93
235900     C*                                                                                           04/06/93
236000     C                     MOVE ZLENT     QQENT                                                   04/06/93
236100     C*                                                                                           04/06/93
236200     C* Find out whether COM is installed and interfacing. If so                                  04/06/93
236300     C* load QQCOM with 'Y'. Otherwise, load it with 'N'.                                         04/06/93
236400     C*                                                                                           04/06/93
236500     C                     MOVE 'N'       QQCOM                                                   04/06/93
236600     C*                                                                                           04/06/93
236700     C           QQENT     CHAINENTFIL               99                                           04/06/93
236800     C           *IN99     IFEQ *OFF                                                              04/06/93
236900     C           EFCOM     ANDEQ'Y'                        Installed                              04/06/93
237000     C                     MOVE 'M'       KAPP1                                                   04/06/93
237100     C                     MOVE 'O'       KAPP2                                                   04/06/93
237200     C           KINTFA    CHAININTFAC               99                                           04/06/93
237300     C           *IN99     IFEQ *OFF                                                              04/06/93
237400     C           ININTC    ANDEQ'Y'                        Interfacing                            04/06/93
237500     C                     MOVE 'Y'       QQCOM                                                   04/06/93
237600     C                     ENDIF                           *IN99=*OFF                             04/06/93
237700     C                     ENDIF                           *IN99=*OFF                             04/06/93
237800     C*                                                                                           04/06/93
237900     C* If QQCOM is not 'Y', a GPLDA data area won't be created in                                04/06/93
238000     C* the CL procedure. Thus QQDFMT and QQDATE are not needed.                                  04/06/93
238100     C*                                                                                           04/06/93
238200     C           QQCOM     IFEQ 'N'                                                               04/06/93
238300     C                     LEAVE                                                                  04/06/93
238400     C                     ENDIF                           QQCOM='N'                              04/06/93
238500     C*                                                                                           04/06/93
```

```
5738PW1 V2R2M0  920615                SEU SOURCE LISTING                06/01/93 11:50:28          PAGE   46

SOURCE FILE . . . . . . .  XLIBEM/MRPGSRC
MEMBER  . . . . . . . . .  MMC464

SEQNBR*...+... 1 ...+... 2 ...+... 3 ...+... 4 ...+... 5 ...+... 6 ...+... 7 ...+... 8 ...+... 9 ...+... 0
238600     C*  If QQCOM is 'Y', load the user date format and current date                          04/06/93
238700     C*  in user format into QQDFMT and QQDATE respectively.                                  04/06/93
238800     C*  Leave the do loop if no TALFLZ record is found. We cannot                            04/06/93
238900     C*  load QQDATE without knowing the user date format.                                    04/06/93
239000     C*                                                                                       04/06/93
239100     C              1         CHAINTALFLZ               99                                   04/06/93
239200     C              *IN99     IFEQ *ON                                                        04/06/93
239300     C                        LEAVE                                                           04/06/93
239400     C                        ENDIF                             *IN99=*ON                     04/06/93
239500     C                        MOVE TADTFT    QQDFMT                                           04/06/93
239600     C*                                                                                       04/06/93
239700     C*  Retrieve the current date in YMD format by calling MZM620X,                          04/06/93
239800     C*  convert it into user date format and load it into QQDATE.                            04/06/93
239900     C*                                                                                       04/06/93
240000     C                        CALL 'MZM620X' PZM620                                           04/06/93
240100     C                        Z-ADDPDATE     $BEFOR                                           04/06/93
240200     C                        MOVE '1'       $TYPE              YMD to user                   04/06/93
240300     C                        MOVE QQDFMT    $USER                                            04/06/93
240400     C                        CALL 'MZM100'  PZM100                                           04/06/93
240500     C                        Z-ADD$AFTER    QQDATE                                           04/06/93
240600     C*                                                                                       04/06/93
240700     C                        ENDDO                             DO                            04/06/93
240800     C*                                                                                       04/06/93
240900     C                        ENDSR                             LDPARM       SRCE3            04/06/93
241000     C*                                                                                       04/06/93

                        * * * *  E N D   O F   S O U R C E  * * * *
```

APPENDIX C

TO

UNITED STATES PATENT APPLICATION

FOR

IMPROVED METHOD AND APPARATUS FOR CONVERSION OF TRANSFERRED DIGITAL DATA by

Janice S. Pitt
John Lawton

---

The following depicts the layout of the file containing the table elements 52A-52E, as well as an audit log corresponding to the exemplary system of Appendix B. These materials are © Marcam Corporation

5738SS1 V2R2M0 920925 AUDIT LOG 06/03/93 11:21:08 PAGE 1

Library/File . . . . . . XLIBBMP/APPDBP

Member . . . . . . . . . APPDBP

Job Title . . . . . . . WORK WITH DATA IN A FILE

| Appl Pgm | From Rel-Mod Lvl | To Rel-Mod Lvl | Desc | Appl Type | Init Pgm | Extract Pgm |
|---|---|---|---|---|---|---|
| MMU360 | 03-10 | 03-10 | Order Transmission Files Load | DD | MMC460 | (none) |

| Send Trnsf Pgm | Recv Trnsf Pgm | Generic Trnsf Proc | GPLDA Send Xfer Pgm | GPLDA Refmt Pgm | Appl Priority | Dt Last Mt |
|---|---|---|---|---|---|---|
| MMC462 | MMC464 | MMC180X | (none) | (none) | H | 930310 |

Blank Area

*** END OF DPU AUDIT REPORT ***

```
5738PW1 V2R2M0  920615              SEU SOURCE LISTING                    06/03/93 11:22:33        PAGE    2

SOURCE FILE . . . . . . .  XLIB310/MMDDSSRC
MEMBER  . . . . . . . . .  APPDEF

SEQNBR*...+... 1 ...+... 2 ...+... 3 ...+... 4 ...+... 5 ...+... 6 ...+... 7 ...+... 8 ...+... 9 ...+... 0
 5400      A            FDAPGM     R                  REFFLD(PROC   )                                  08/01/91
 5500      A                                          COLHDG('Send Trnsf Pgm')                           11/28/90
 5600      A                                          TEXT('Sending Transfer Pgm')                       11/28/90
 5700      A**                                                                                           11/29/90
 5800      A**                                                                                           11/29/90
 5900      A            FDRPGM     R                  REFFLD(PROC   )                                  08/01/91
 6000      A                                          COLHDG('Recv Trnsf Pgm')                           11/28/90
 6100      A                                          TEXT('Recving Transfer Pgm')                       11/28/90
 6200      A**                                                                                           11/29/90
 6300      A**                                                                                           11/29/90
 6400      A            FDGPGM     R                  REFFLD(PROC   )                                  08/01/91
 6500      A                                          COLHDG('Generic Trnsf Proc')                       08/01/91
 6600      A                                          TEXT('Generic Transfer Proc')                      08/01/91
 6700      A**                                                                                           01/28/91
 6800      A**                                                                                           01/28/91
 6900      A            FDPPGM     R                  REFFLD(PROC   )                                  08/01/91
 7000      A                                          COLHDG('GPLDA Send Xfer Pgm')                      03/09/92
 7100      A                                          TEXT('GPLDA Sending Transfer Pgm')                 03/09/92
 7200      A**                                                                                           03/09/92
 7300      A**                                                                                           03/09/92
 7400      A            FDXPGM     R                  REFFLD(PROC   )                                  03/09/92
 7500      A                                          COLHDG('GPLDA Refmt Pgm')                          03/09/92
 7600      A                                          TEXT('GPLDA Reformatting Pgm')                     03/09/92
 7700      A**                                                                                           08/20/92
 7800      A**                                                                                           08/20/92
 7900      A            FDPRTY     R                  REFFLD(PRTY   )                                  08/20/92
 8000      A                                          COLHDG('Appl Priority')                            08/20/92
 8100      A                                          TEXT('Application Priority')                       08/20/92
 8200      A*                                         H = High Priority                                  08/20/92
 8300      A*                                         L = Low Priority                                   08/20/92
 8400      A**                                                                                           11/29/90
 8500      A**                                                                                           11/29/90
 8600      A            FDDTMT     R                  REFFLD(DTMT   )                                  10/17/90
 8700      A**                                                                                           08/20/92
 8800      A**                                                                                           08/20/92
 8900      A            FDBLNK     R                  REFFLD(BLNK   )                                  08/20/92
 9000      A**                                                                                           10/17/90
 9100      A**                                                                                           11/29/90
 9200      A*$  Key fields:                                                                              11/29/90
 9300      A**                                                                                           11/29/90
 9400      A**                                                                                           11/29/90
 9500      A           K FDPGM                                                                           10/17/90
 9600      A           K FDFRRL                                                                          01/08/91
 9700      A           K FDTRRL                                                                          01/08/91

                    * * * *  E N D  O F  S O U R C E  * * * *
```

```
5738PW1 V2R2M0  920615                    SEU SOURCE LISTING                    06/03/93 11:22:33          PAGE    1

SOURCE FILE . . . . . . .  XL18310/MMDDSSRC
MEMBER  . . . . . . . . .  APPDEF

SEQNBR*...+... 1 ...+... 2 ...+... 3 ...+... 4 ...+... 5 ...+... 6 ...+... 7 ...+... 8 ...+... 9 ...+... 0
   100     A**                                                                                        07/18/90
   200     A*$  PP           Permanent Physical File                                                  07/18/90
   300     A**                                                                                        07/18/90
   400     A**  APPDEF       Application Definition File                                              10/17/90
   500     A**                                                                                        07/18/90
   600     A*$  Description:                                                                          07/18/90
   700     A**                                                                                        07/18/90
   800     A**  This file stores information defined for all applications                             10/17/90
   900     A**  designed to function across multiple sites.  The information                          10/07/92
  1000     A**  includes application attributes and the names of the programs                        10/07/92
  1100     A**  that manipulate the data passed between sites.                                        10/07/92
  1200     A**                                                                                        07/18/90
  1300     A**                                                                                        07/18/90
  1400     A                                        REF(MMSTRF)                                       10/17/90
  1500     A                                        UNIQUE                                            10/17/90
  1600     A**                                                                                        10/17/90
  1700     A**                                                                                        10/17/90
  1800     A          R FAPPDEF                     TEXT('APPLICATION DEFINITION FILE')               11/28/90
  1900     A**                                                                                        07/18/90
  2000     A**                                                                                        07/18/90
  2100     A            FDPGM     R                 REFFLD(PGM    )                                   10/17/90
  2200     A                                        COLHDG('Appl Pgm')                                11/28/90
  2300     A                                        TEXT('Application Pgm')                           11/28/90
  2400     A**                                                                                        01/08/91
  2500     A**                                                                                        01/08/91
  2600     A            FDFREL    R                 REFFLD(RELL   )                                   01/08/91
  2700     A                                        COLHDG('From Rel-Mod Lvl')                        01/15/91
  2800     A                                        TEXT('From Release-Mod Level')                    01/15/91
  2900     A**                                                                                        01/08/91
  3000     A**                                                                                        01/08/91
  3100     A            FDTREL    R                 REFFLD(RELL   )                                   01/08/91
  3200     A                                        COLHDG('To Rel-Mod Lvl')                          01/15/91
  3300     A                                        TEXT('To Release-Mod Level')                      01/15/91
  3400     A**                                                                                        11/29/90
  3500     A**                                                                                        11/29/90
  3600     A            FDDESC    R                 REFFLD(DESC   )                                   10/17/90
  3700     A**                                                                                        11/29/90
  3800     A**                                                                                        11/29/90
  3900     A            FDTYPE    R                 REFFLD(TYPE   )                                   10/17/90
  4000     A                                        COLHDG('Appl Type')                               11/28/90
  4100     A                                        TEXT('Application Type')                          11/28/90
  4200     A**                                                                                        11/29/90
  4300     A**                                                                                        11/29/90
  4400     A            FDIPGM    R                 REFFLD(PROC   )                                   08/01/91
  4500     A                                        COLHDG('Init Pgm')                                11/28/90
  4600     A                                        TEXT('Initialization Pgm')                        11/28/90
  4700     A**                                                                                        09/03/91
  4800     A**                                                                                        09/03/91
  4900     A            FDEPGM    R                 REFFLD(PROC   )                                   09/03/91
  5000     A                                        COLHDG('Extract Pgm')                             09/03/91
  5100     A                                        TEXT('Extraction Pgm')                            09/03/91
  5200     A**                                                                                        11/29/90
  5300     A**                                                                                        11/29/90
```

We claim:

1. A method of data conversion for use with a digital data processing system of the type having first file storage means for storing a first relational database, said first relational database including a plurality of digital records representing information used by a first selected version of a computer program, second file storage means capable of storing a second relational database, said second relational database including a plurality of digital records representing at least a portion of said information for use by a second selected version of said computer program, said data conversion apparatus comprising A. a file management step for generating and storing in said second relational database a plurality of digital records for use by said second selected version of said computer program, wherein each such generated digital record includes at least selected information from a corresponding digital record of said first relational database, B. said file management step including a conversion step for generating said digital records for storage in said second relational database by converting at least selected information contained in the corresponding digital record of said first relational database, wherein said conversion is a function of (i) the identity of said first selected version of said computer program, and (ii) the identity of said second selected version of said computer program C. said conversion step includes the steps of accessing a selected entry in a table of entries, each storing a procedure-representative signal representative of procedure for converting information contained in at least a component of a digital record of said first relational database to information contained in at least one corresponding component of a digital record of said second relational database, said entry being selected as a function of the identities of said selected versions of said computer program with which said first and second relational databases are associated, and ii) executing the procedure represented by the procedure-representative signal stored in said selected entry to perform said conversion.

2. A data conversion method according to claim 1, including

A. a table-loading step for storing, in at least one said table entry, an identity of a subroutine of steps for converting information contained in at least a component of said digital record of said first relational database to information contained in at least one corresponding component of said digital record of said second relational database, and B. said execution step comprises means for executing said subroutine for executing said procedure to perform said conversion.

3. A data conversion method according to claim 2, wherein said execution step further comprises the step of configuring a central processing unit to execute a subroutine identified in one of said table entries to perform a conversion.

4. Data conversion apparatus according to claim 1 wherein said first and second file storage means are disposed remotely from one another, and wherein said file management step comprises A. a data transfer step for converting said plurality of digital records of said first relational database to a standard file transfer format for transfer to said conversion means, B. said conversion step includes disassembler means responsive to receipt of said plurality of digital records of said first relational database in said standard file transfer format for identifying information contained in at least selected components of said digital records thereof.

5. Data conversion apparatus for use with a digital data processing system of the type having first file storage means for storing a first relational database, said first relational database including a plurality of digital records representing information used by a first selected version of a computer program, second file storage means capable of storing a second relational database, said second relational database including a plurality of digital records representing at least a portion of said information for use by a second selected version of said computer program, said data conversion apparatus comprising A. file management means, coupled to said first and second file storage means, for generating and storing in said second relational database a plurality of digital records for use by said second selected version of said computer program, wherein each such generated digital record includes at least selected information from a corresponding digital record of said first relational database, B. said file management means includes conversion means for generating said digital records for storage in said second relational database by converting at least selected information contained in the corresponding digital record of said first relational database, wherein said conversion is a function of (i) the identity of said first selected version of said computer program, and (ii) the identity of said second selected version of said computer program, C. said conversion means comprising i) a plurality of table entry means, each for storing a procedure-representative signal representative of a procedure for converting information contained in at least a component of a digital record of said first relational database to information contained in at least one corresponding component of a digital record of said second relational database, ii) execution means for accessing a selected said table entry means as a function of the identities of said selected versions of said computer program with which said first and second relational databases are associated, and for executing the procedure represented by the procedure-representative signal stored therein to perform said conversion.

6. Data conversion apparatus according to claim 5, wherein

A. at least one said table entry means comprises means for storing as said procedure-representative signal an identity of a subroutine of steps for converting information contained in at least a component of said digital record of said first relational database to information contained in at least one corresponding component of said digital record of said second relational database, and B. said execution means comprises means for executing said subroutine for executing said procedure to perform said conversion.

7. Data conversion apparatus according to claim 6, wherein said execution means further comprises means for configuring a central processing unit coupled with said second file storage means to execute said subroutine for executing said procedure to perform said conversion.

8. Data conversion apparatus according to claim 5 wherein said first and second file storage means are disposed remotely from one another and wherein said file management means comprises A. data transfer means coupled to said first file storage means for converting said plurality of digital records of said first relational database to a standard file transfer format for transfer to said conversion means, B. said conversion means includes disassembler means responsive to receipt of said plurality of digital records of said first relational database in said standard file transfer format for identifying information contained in at least selected components of said digital records thereof.

* * * * *